(12) United States Patent
Rieger et al.

(10) Patent No.: US 12,189,778 B2
(45) Date of Patent: *Jan. 7, 2025

(54) SYSTEMS AND METHODS FOR CONTROL SYSTEM SECURITY

(71) Applicants: Battelle Energy Alliance, LLC, Idaho Falls, ID (US); Virginia Commonwealth University, Richmond, VA (US)

(72) Inventors: Craig G. Rieger, Pocatello, ID (US); Timothy R. McJunkin, Idaho Falls, ID (US); Milos Manic, Henrico, VA (US); Kasun Amarasinghe, Richmond, VA (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 864 days.

This patent is subject to a terminal disclaimer.

(21) Appl. No.: 17/094,474

(22) Filed: Nov. 10, 2020

(65) Prior Publication Data

US 2021/0209233 A1 Jul. 8, 2021

Related U.S. Application Data

(63) Continuation of application No. 16/204,983, filed on Nov. 29, 2018, now Pat. No. 10,896,261.

(51) Int. Cl.
*G06F 21/57* (2013.01)
*G05B 19/042* (2006.01)
*H04L 9/40* (2022.01)

(52) U.S. Cl.
CPC ....... *G06F 21/577* (2013.01); *G05B 19/0425* (2013.01); *H04L 63/1433* (2013.01); *G06F 2221/034* (2013.01)

(58) Field of Classification Search
CPC ............ G06F 21/577; G06F 2221/034; H04L 63/1416; H04L 63/1433; G05B 19/0425; Y04S 40/20
See application file for complete search history.

(56) References Cited

U.S. PATENT DOCUMENTS 5,805,785 A 9/1998 Dias et al.
7,020,701 B1 3/2006 Gelvin et al.
(Continued)

FOREIGN PATENT DOCUMENTS

WO 2016172514 10/2016
WO 2017090045 6/2017

OTHER PUBLICATIONS

Davis et al., A Cyber-Physical Modeling and Assessment Framework for Power Grid Infrastructures, University of Illinois Urbana-Champaign, 2015.*

(Continued)

*Primary Examiner* — Minh Dinh

(57) ABSTRACT

A resilient security agent determines a cyber and/or physical health of a control system by, inter alia, communicating cyber-physical key data through cyber-physical control paths of the system, and determining error introduced by the communication. The resilient security agent may be further configured to verify the integrity of acquired cyber-physical state information. The cyber health of the control system may be evaluated by comparing the acquired cyber state information to one or more cyber state profiles. The physical health of the control system may be evaluated by comparing the acquired physical state information to one or more physical state profiles.

21 Claims, 20 Drawing Sheets

(56) References Cited

U.S. PATENT DOCUMENTS

| | | | |
|---|---|---|---|
| 7,272,602 | B2 | 9/2007 | Moulton |
| 7,370,223 | B2 | 5/2008 | Olmstead et al. |
| 7,711,779 | B2 | 5/2010 | Goodman et al. |
| 8,392,496 | B2 | 3/2013 | Linden et al. |
| 9,203,859 | B2 | 12/2015 | Sampigethaya |
| 9,483,292 | B2 | 11/2016 | Turgeman et al. |
| 9,552,470 | B2 | 1/2017 | Turgeman et al. |
| 9,697,355 | B1 | 7/2017 | Park et al. |
| 9,836,512 | B1 | 12/2017 | Singh et al. |
| 9,841,736 | B2 | 12/2017 | Grgic et al. |
| 9,930,058 | B2 | 3/2018 | Carpenter et al. |
| 11,599,688 | B2 * | 3/2023 | Krause .................. G06F 30/20 |
| 2004/0049698 | A1 | 3/2004 | Ott et al. |
| 2010/0162036 | A1 | 6/2010 | Linden et al. |
| 2011/0093426 | A1 | 4/2011 | Hoglund |
| 2013/0132149 | A1 | 5/2013 | Wei et al. |
| 2013/0198847 | A1 | 8/2013 | Sampigethaya |
| 2014/0137257 | A1 | 5/2014 | Martinez et al. |
| 2015/0205966 | A1 | 7/2015 | Chowdhury |
| 2015/0261958 | A1 | 9/2015 | Hale et al. |
| 2015/0293516 | A1 | 10/2015 | Akiyama et al. |
| 2016/0344760 | A1 | 11/2016 | Sarkesain |
| 2017/0011217 | A1 | 1/2017 | Turgeman et al. |
| 2017/0046519 | A1 * | 2/2017 | Cam .................. G06N 7/01 |
| 2017/0163444 | A1 | 6/2017 | McLaughlin et al. |
| 2017/0270295 | A1 | 9/2017 | Park et al. |
| 2018/0115561 | A1 | 4/2018 | Sun et al. |
| 2018/0205755 | A1 | 7/2018 | Kavi et al. |
| 2018/0295154 | A1 | 10/2018 | Crabtree et al. |
| 2018/0300477 | A1 | 10/2018 | Galula et al. |
| 2018/0329593 | A1 | 11/2018 | Metha et al. |

OTHER PUBLICATIONS

"Extended European Search Report," EU Application No. 19889239.0, PCT Application No. PCT/US2019063366, Oct. 7, 2022, 9 pages.

Amarasinghe et al., "Framework for Data Driven Health Monitoring of Cyber-Physical Systems," 2018 Resilience Week (RWS), Aug. 20-23, 2018, pp. 25-30, doi: 10.1109/RWEEK.2018.8473535.

Bradley, et al., "Optimization and Control of Cyber-Physical Vehicle Systems", Sensors 2015, 15,23020-23049; doi: 10/3390/s 150923020.

Breitinger, et al., "File Detection on Network Traffic Using Approximate Matching", The Journal of Digital Forensics, Security and Law, vol. 9, No. 2, Article 3, 2014.

Damiani, et al., "An Open Digest-Based Technique for Spam Detection", ISCA PDCS (2004).

Dunham, et al., "A Fuzzy Future in Malware Research", ISSA Journal 17, Aug. 2013.

Kornblum, et al., "Identifying Almost Identical Files Using Context Triggered Piecewise Hashing", Science Direct, 5 Digital Investigation 3S (2006) S91-S9.

O'Hanlon, et al., "Real-Time GPS Spoofing Detection via Correlation of Encrypted Signals", Navigation, Journal of the Institute of Navigation, vol. 60, No. 4, Winter 2013, pp. 267-278.

Pajic, et al., "Design and Implementation of Attack-Resilient Cyberphysical Systems", IEEE Control Systems Magazine, Apr. 7, 2017, 1066-033X/17.

Shafique, et al., "Intelligent Security Measures for Smart Cyber-Physical Systems", IEEE Aug. 2018, DOL10.1109/DSD.2018.00058, Conference:2018 21st Euromicro Conference on Digital System Design (DSD).

Shepard, et al., "Drone Hack—Spoofing Attack Demonstration on a Civilian Unmanned Aerial Vehicle", GPS World, Aug. 2012.

Wan, et al., "Enabling Cyber-Physical Systems with Machine-to-Machine Technologies", Int. J. Ad Hoc and Ubiquitous Computing, vol. 13, Nos. 3/4, 2013.

Zhou, et al., "Security in cyber-physical systems: challenges and solutions", Int. J. Autonomous and Adaptive Communications Systems, vol. 10, No. 4, 2017, 391-408.

Zhu, et al., "A Hierarchical Security Architecture for Cyber-Physical Systems", 4th International Symposium on Resilient Control Systems, Boise, Idaho, 2011.

"International Search Report and Written Opinion", PCT Application No. PCT/US2019/063366, Mar. 25, 2020, 11 pages.

"Notice of Allowance and Fee(s) Due", U.S. Appl. No. 16/204,983, Aug. 12, 2020, 11 pages.

* cited by examiner

SYSTEMS AND METHODS FOR CONTROL SYSTEM SECURITY

STATEMENT REGARDING FEDERALLY SPONSORED RESEARCH OR DEVELOPMENT

This invention was made with government support under Contract Number DE AC07-05-ID14517 awarded by the United States Department of Energy. The government has certain rights in the invention.

CROSS REFERENCE TO RELATED APPLICATIONS

This application claims priority to U.S. patent application Ser. No. 16/204,983 filed Nov. 29, 2018, which is incorporated by reference herein.

TECHNICAL FIELD

This disclosure relates to control system security and, in particular, to systems, methods, apparatus, and/or non-transitory computer-readable storage media for holistically evaluating the cyber-physical health of a control system and/or respective control loops thereof.

BACKGROUND

As used herein, a "cyber-physical" system refers to a system comprising cyber components configured to operatively and/or communicatively couple physical components to computational components (and vice versa). As used herein, a "computational component" may refer to a component configured to implement control logic and/or a control function pertaining to a physical process and/or physical process attribute. As used herein, a "physical component" may refer to any suitable means for realizing the control logic and/or control function, which may comprise one or more of: monitoring, sensing, modifying, actuating, modulating, managing, regulating, and/or controlling the physical processes and/or physical process attribute. As used herein, a "cyber component" may refer to any suitable means for communicatively and/or operatively coupling a computational component to a component (e.g., cyber infrastructure to couple physical components to the computational and/or control substrates of the system).

Conventional techniques for securing cyber-physical systems may attempt to protect internal communication infrastructure from cyber-attack. Conventional systems may not, however, correlate the health of the cyber components and/or detected cyber anomalies with the state of physical components potentially affected thereby (and may be incapable of doing so since the cyber-security components may not be tied to particular physical components of the system). The health of the physical components may be evaluated separately and independently from the cyber components. Conventional techniques for detecting anomalies in physical components may rely on rudimentary recognition techniques based upon known failure modes of the physical components.

Conventional techniques for securing cyber-physical systems may attempt to guarantee the security and/or integrity of the network(s) used to communicate with physical components of the system. Such security guarantees may be based on perimeter security whereby internal network(s) of the system are secured from attack and/or intrusion from one or more external networks (e.g., may rely on securing gateway(s) and/or external channel(s) of the system). Based on these guarantees, conventional systems may assume that internal communications with physical components are secure. Accordingly, a successful attack on a gateway, external communication channel, and/or physical component of the system could result in complete compromise. Furthermore, an attacker may be able to affect the cyber-physical system via compromised physical components, even while the security guarantees are maintained. Conventional systems may, therefore, be incapable of adequately securing cyber-physical systems from diverse cyber and/or physical attack.

What is needed are systems, methods, apparatus, and/or non-transitory computer-readable storage media for securing cyber-physical systems that impose minimal overhead, are capable of detecting cyber and physical attack and/or failure modes, and are capable of assessing the validity of the acquired cyber and/or physical state of the control system.

SUMMARY

Disclosed herein are systems, methods, apparatus, and/or non-transitory computer-readable storage media for securing a control system (and/or respective control elements thereof), which may comprise: evaluating the cyber-physical health of the control system; determining error metrics corresponding to communication of context-specific cyber-physical state information through respective control systems of the control system; detecting anomalies in the control system and/or quantifying a confidence in an acquired cyber-physical state of the control system based on, inter alia, the determined error metrics; identifying causes of detected anomalies; acquiring the cyber-physical state of the control system; monitoring the acquired cyber-physical state; comparing the acquired cyber-physical state to learned cyber and/or physical behaviors; and/or the like.

Additional aspects and advantages will be apparent from the following detailed description of preferred embodiments, which proceeds with reference to the accompanying drawings.

DETAILED DESCRIPTION

Figure 1A:
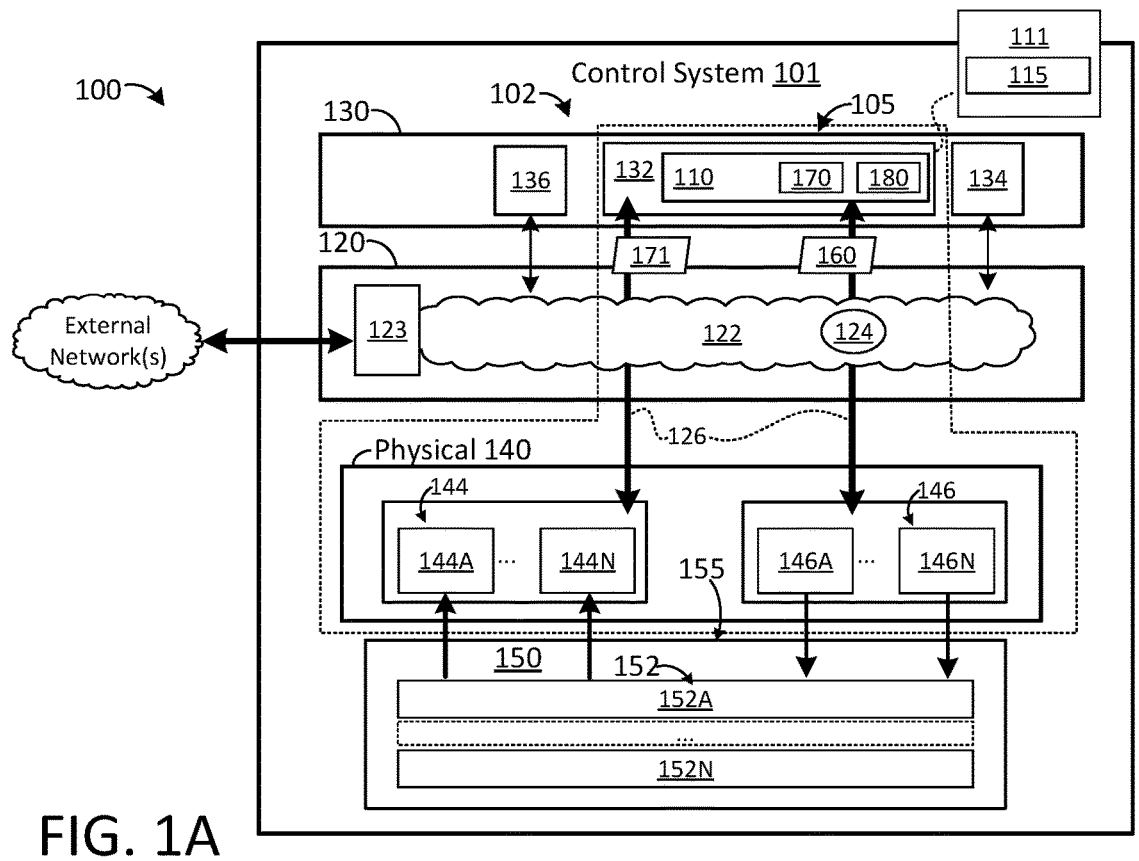
FIG. 1A is a schematic block diagram of one embodiment of a cyber-physical system, as disclosed herein.

FIG. 1A is a schematic block diagram of one embodiment of a cyber-physical system 100, as disclosed herein. The cyber-physical system 100 may comprise cyber-physical components 102, as disclosed herein (e.g., may feature a tight coupling between cyber communication, computation, and physical substrates). The cyber-physical system 100 may comprise one or more of: an industrial control system, an intelligent control system, a distributed control system, am embedded control system, a vehicle control system, a building control system, a process control system, a plant control system, a manufacturing control system, a power control system, a power grid system, a Supervisory Control and Data Acquisition (SCADA) system, and/or the like. In the FIG. 1A embodiment, the cyber-physical system 100 comprises a control system 101. The control system 101 may comprise cyber-physical components (components 102), which may include, but are not limited to: cyber communication components (cyber components 120), cyber computational and/or control components (computational components 130), physical components 140, and/or the like. The control system 101 may further comprise a resilient security agent 110, which, as disclosed in further detail herein, may be configured to prevent, detect, and/or mitigate cyber-physical attacks.

The control system 101 may comprise and/or implement one or more "cyber-physical control elements" 105. As used herein, a "cyber-physical control element" (CPCE) 105 refers to cyber-physical components 102 configured to implement control functions pertaining to one or more physical process variables 155. As used herein a "physical process variable" or "process variable" 155 may refer to any suitable physical phenomena capable of being sensed, measured, monitored, adjusted, manipulated, managed, protected, regulated, and/or otherwise controlled by cyber-physical components 102 of the control system 101. A physical process variable (PPV) 155 may comprise a manipulated variable of a control function implemented by the CPCE 105. A PPV 155 may comprise and/or correspond to one or more of a physical process 150, a physical process attribute 152, and/or the like. As used herein, a "physical process" 150, may refer to any physical phenomena and/or process capable of being controlled by a cyber-physical system 100, which may include, but is not limited to: an industrial process, a mechanical process, an electromechanical process, an electrical process, an electrical power process, an electrical power generation process, an electrical power distribution process, an electrical power conditioning process, an electrical power storage process, an electrical power load process, a manufacturing process, a fluid process, a chemical process, and/or the like. As used herein, an attribute 152 of a physical process 150 (or "physical process attribute" 152) may refer to any suitable attribute, variable, process variable, characteristic, parameter, and/or state capable of controlled by a cyber-physical system 100. As used herein, "controlling" a PPV 155 may refer to one or more of: sensing, measuring, monitoring, adjusting, manipulating, managing, regulating, protecting, and/or otherwise controlling the PPV 155 by use of cyber-physical components 102 of the control system 101. Therefore, as used herein, a CPCE 105 may comprise, embody, and/or correspond to one or more cyber-physical components 102 of the control system 101. A CPCE 105 may comprise, embody, and/or implement one or more of a control function, a cyber-physical control function, a control path, a cyber-physical control path, a control loop, a cyber-physical control loop, control means, cyber-physical control means, and/or the like. As disclosed in further detail herein, a CPCE 105 may comprise cyber, computational, and/or physical components 140, 130, and/or 140 of the control system 101.

Computational and/or control operations of a CPCE 105 may be implemented by computational components 130, which may be tightly coupled to corresponding physical components 140 of the CPCE 105 by one or more cyber components 120. The cyber components 120 of the control system 101 may comprise, embody, and/or implement cyber communication services, which be configured to operatively and/or communicatively couple components 102 of the control system 101. The cyber components 120 may comprise any suitable means for operatively and/or communicatively coupling physical components 140 of the control system 101 to computational components 130 of the control system 101, which may include, but are not limited to: communication components, communication devices, communication interface components, communication media, communication ports, concentrator components, concentrator devices, receivers, transmitters, transceivers, transducers, repeaters, network components, network devices, network interfaces, network components, network communication media (e.g., network wiring, ports, and/or the like), network hubs, network concentrators, network switches, network routers, network security devices, network firewalls, network filters, network drivers, network protocol drivers, cyber nodes (cyber nodes 124), and/or the like. In some embodiments, the cyber components 120 may comprise, embody, and/or implement a control system network 122. As used herein, a control system (CS) network 122 may refer to any suitable means for communicatively coupling components 102 of a cyber-physical system 100, such as the control system 101. The CS network 122 may include, but is not limited to: a communication network, an electronic communication network, an internal network, an Internet Protocol (IP) network, a wireless network, a Local Area Network (LAN), a Wide Area Network (WAN), a Virtual Private Network (VPN), a wireless network (e.g., IEEE 802.11a-n wireless network, Bluetooth® network, Near-Field Communication (NFC) network, and/or the like), a public switched telephone network (PSTN), a mobile network (e.g., a network configured to implement one or more technical standards or communication methods for mobile data communication, such as Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), High Speed Uplink Packet Access (HSUPA), Long Term Evolution (LTE), LTE-A (Long Term Evolution-Advanced), and/or the like), an embedded network, a control network, a process control network, a sensor network, an actuator network, a SCADA network, a Distributed Network Protocol (DNP3) network, an International Electrotechnical Commission 60870 (IEC 60870) network, an Experimental Physics and Industrial Control System (EPICS), a combination of networks, a Phasor network, a plurality of networks, a plurality of separate networks, a plurality of communicatively and/or operatively coupled networks, and/or the like. In some embodiments, the cyber components 120 may be further configured to secure communications on the CS network 122, which may comprise encrypting, signing, authenticating, and/or verifying the integrity of messages communicated within the CS network 122. As used herein, a message communicated on the CS network 122 may comprise one or more: signals, control signals, control system signals, commands, sensor commands, actuator commands, sensor signals, sensor data signals, actuator signals, actuator command signals, packets, data packets, network packets, IP packets, DNP3 packets, SCADA packets, synchrophasors, synchrophasor data, and/or the like.

In some embodiments, the cyber components 120 may further comprise cyber security components 123, which may be configured to securely couple the CS network 122 (and/or portions thereof) to one or more external networks. The cyber security components 123 may comprise perimeter security means configured to prevent, detect, and/or mitigate attacks from the external networks. The cyber security components 123 may include, but are not limited to: gateways, channels, firewalls, port monitors, network filters, intrusion detection systems, and/or the like, as disclosed herein.

The CS network 122 may comprise and/or be configured to communicatively couple a plurality of cyber nodes (cyber nodes 124). As used herein, "cyber node," "cyber node," or "node" 124 of a cyber-physical system 100, refers to a point at which cyber communication (e.g., messages as disclosed above) may be received, sent, transmitted, generated, forwarded, routed, and/or otherwise communicated within the control system 101. A cyber node 124 may comprise any suitable cyber-physical component 102 of the control system 101 capable of being operatively and/or communicatively coupled to the CS network 122, including, but not limited to: a cyber component 120 (e.g., cyber infrastructure such as a network device, concentrator, hub, router, gateway, network interface device, cyber security component 123, and/or the like), a computational component 130 (e.g., a computing device, a controller 132, an automation controller 134, a monitoring device, an RTU, and/or the like), a networked physical component 140 (e.g., a networked sensor device 144, a networked actuator device 146), and/or the like. The networked sensor/actuator devices 144/146 may comprise respective cyber nodes 124 (not shown in FIG. 1B to avoid obscuring details of the disclosed embodiments).

The computational components 130 of the control system 101 may comprise, embody, and/or implement computational services of the control system 101, which may include, but are not limited to: computational services, control services, monitoring services, configuration services, interface services, human-machine-interface (HMI) services, and/or the like. The computational components 130 may comprise any suitable means for implementing computational services, which may include, but are not limited to: a processor, a general-purpose processor, an application-specific processor, an Application-Specific Integrated Circuit (ASIC), a Field Programmable Gate Array (FPGA), a computing device (e.g., a device comprising a processor, memory, non-transitory storage, a network interface, and/or the like), a monitoring device, an HMI device, a supervisory computing device, a Remote Terminal Unit (RTU), an Intelligent Electronic Device (IED), a control device, a process controller, a microcontroller, control logic, programmable logic, a programmable logic controller (PLC), a controller, a linear controller, a Proportional-Integral-Derivative (PID) controller, a control element, a relay, a protective relay, a safety relay, a switch, an automation controller, a Real-Time Automation Controller (RTAC), and/or the like. In the FIG. 1A embodiment, the computational components 130 of the control system 101 may include a controller 132, an automation controller 134, and an HMI device 136. The disclosure is not limited in this regard, however, and could be adapted to include any number and/or type of computational components 130.

The physical components 140 of the control system 101 may comprise and/or correspond to one or more PPV 155, as disclosed herein (e.g., one or more physical processes 150 and/or physical process attributes 152). The physical components 140 may further comprise components configured to implement physical operations, which may include, but are not limited to: sensing, measuring, monitoring, manipulating, actuating, affecting, modifying, managing, regulating, and/or controlling respective PPV 155 (and/or other physical components 140). The physical components 140 may comprise any suitable means for implementing physical operations, including, but not limited to: mechanical devices, electromechanical devices, electrical devices, solid-state devices, digital devices, analog devices, pneumatic devices, hydraulic devices, monitoring devices, receiver devices, transceiver devices, physical control devices, sensing devices (e.g., sensor devices 144), actuation devices (e.g., actuator devices 146), and/or the like.

In some embodiments, physical components 140 of the control system 101 may be operatively and/or communicatively coupled to one or more other components 102 of the control system 101. A physical component 140 may be coupled to other physical components 140 of the control system 101, cyber components 120 of the control system 101, computational components 130 of the control system 101, and/or the like (e.g., may be operatively and/or communicatively coupled to the controller 132, as illustrated in FIG. 1A). A physical component 140 that is operatively and/or communicatively coupled to one or more other components 102 of the control system 101 may be referred to as a "receiver" of the one or more components 102. Physical components 140 of the control system 101 may comprise and/or be coupled to means for interfacing with other components 102 of the control system 101, which may comprise means for transmitting signals to and/or receiving signals from other components 102 of the control system 101. The means for interfacing may comprise one or more of: a transducer, an analog-to-digital converter (DAC), a receiver, a transmitter, a transceiver, a port, an interface, a communication port, a communication interface, communication media, a network port, a network interface, a network interface device, network communication media, and/or the like. In some embodiments, one or more physical components 140 of the control system 101 may be directly coupled to one or more other components 102 of the control system 101. The one or more physical components 140 may, for example, be directly coupled to the controller 132 by a direct device-to-device coupling, dedicated communication media, and/or the like. Alternatively, or in addition, one or more physical components 140 of the control system 101 may be operatively and/or communicatively coupled to the CS network 122 by, inter alia, cyber components 120 of the control system 101 (e.g., may comprise and/or be communicatively coupled to the CS network 122). A physical component 140 that is operatively and/or communicatively coupled to the CS network 122 may be referred to as a "networked" physical component 140.

As disclosed above, the physical components 140 of the control system 101 may comprise means for performing one or more physical operations, which may include, but are not limited to: sensor devices 144, actuator devices 146, and/or the like (e.g., sensor devices 144A-N and actuator devices 146A-N, as illustrated in FIG. 1A). As used herein, a sensor device 144 of the control system 101 may comprise any suitable means for obtaining information pertaining to a PPV 155, which may include, but is not limited to, one or more of: a SCADA sensor, an active sensor, a passive sensor, a measurement device, a monitoring device, an electromechanical sensor device, an electrical measurement device, a current measurement device, a voltage measurement device, a capacitance measurement device, an inductive sensor, a resistance measurement device, an impedance measurement device, a phase measurement unit (PMU), a magnetic sensor, a magnetic field sensor, an Anisotropic Magneto-Resistive (AMR) sensor, an arc detection device, a Hall effect sensor, a power measurement device, an electrical power measurement device (e.g., a power meter), a light sensor, a color sensor, a photoelectric sensor, an electro-optical radiation sensor, an infra-red sensor, an image capture device, a mechanical measurement device, a mechanical power measurement device, a torque sensor, a tachometer, a position sensor, a Global Positioning System (GPS) device, a velocity measurement device, a vehicle speed sensor, a speedometer, an angular velocity sensor, an orientation sensor, a tile sensor, a compass, an accelerometer, a gyroscope, a pressure sensor, a shock sensor, a vibration sensor, an ultrasonic sensor, a temperature sensor, a thermocouple device, a humidity sensor, a proximity sensor, a chemical sensor, a particulate sensor, a gas sensor, a smoke sensor, a flow sensor, a level sensor, a touch sensor, a nanosensor, and/or the like.

The physical components 140 of the control system 101 may further comprise actuator devices 146A-N. As used herein, an actuator device 146 of the control system 101 may comprise any suitable means for implementing physical operations pertaining to a PPV 155. An actuator device 146 may comprise, but is not limited to, one or more of: a SCADA actuator, a linear actuator, a rotary actuator, a fluid actuator, a hydraulic actuator, a hydraulic cylinder actuator, a pneumatic actuator, a mechanical actuator, a rack and pinion actuator, a comb drive actuator, a chain actuator, a screw jack actuator, a magnetic actuator, an electric actuator, an electromechanical actuator, an electric motor, a servo-mechanism, a solenoid, a stepper motor, a torque motor, a shape-memory allow actuator, a switch, a rotary switch, a toggle switch, an electronic switch, an electrically operated switch, a relay, a solid-state relay, an analogue switch, a crossbar switch, a transistor switch, an electromechanical relay, an attracted armature relay, an induction relay, a mechanical relay, a moving coil relay, a motor-operated relay, a thermal relay, a circuit breaker, a Twisted and Coiled Polymer (TCP) actuator, a Supercoiled Polymer (SCP) actuator, a thermal actuator, a thermal bimorph actuator, a soft actuator, a Shape Memory Polymer (SMP) actuator, a Photopolymer/light Activated Polymer (LAP) actuator, a Dielectric Elastomer (DE) actuator, an Ionic Polymer Metal Composite (IPMC) actuator, an Electroactive Polymer (EAP) actuator, and/or the like. In some embodiments, an actuator device 146 may be configured to acquire state information pertaining to one or more PPV 155 (a physical process 150 and/or attribute(s) 152 thereof), the actuator device 146 itself, physical operations implemented by the actuator device 146, and/or the like. The actuator device 146 may be further configured to communicate acquired state information to one or more computational components 130. Alternatively, or in addition, the actuator device 146 may comprise and/or be coupled to one or more sensor devices 144, which may be configured to acquire and/or communicate the state information, as disclosed herein. As illustrated in FIG. 1A, the physical components 140 of the CPCE 105 may comprise one or more actuator devices 146A-N, each comprising suitable means for implementing physical operations pertaining to a PPV 155 of the CPCE 105, which may comprise moving, manipulating, regulating, and/or actuating mechanism(s) operatively coupled to the PPV 155.

As disclosed above, the control system 101 may comprise, embody, and/or be configured to implement one or more CPCE 105. Implementing a CPCE 105 may comprise controlling one or more PPV 155 by use of cyber-physical components 102 of the control system 101. A CPCE 105 may, therefore, comprise and/or embody cyber-physical components 102 of the control system 101. As illustrated in FIG. 1A, a CPCE 105 may comprise: computational components 130 configured to implement one or more control function(s) pertaining to respective PPV 155 of the CPCE 105, physical components 140 by which the computational components 130 realize the control function(s), and cyber components 120 by which the computational components 130 of the CPCE 105 may be operatively and/or communicatively coupled to the physical components 140 of the CPCE 105.

The computational components 130 of the CPCE 105 illustrated in FIG. 1A may comprise a controller 132. The controller 132 may be configured to implement a control function pertaining to one or more PPV 155. The physical components 140 of the CPCE 105 illustrated in FIG. 1A may, therefore, comprise one or more PPV 155, and physical components 140 by which the controller 132 senses, measures, monitors, adjusts, manipulates, manages, regulates, and/or otherwise controls the PPV 155, such as one or more sensor devices 144A-N, one or more actuator devices 146A-N, and/or the like. The CPCE 105 of FIG. 1A may further comprise cyber components 120 (e.g., cyber nodes 124) by which the controller 132 may be operatively and/or communicatively coupled to the physical components 140 of the CPCE 105.

The controller 132 may comprise any suitable means for implementing computational and/or control operations, as disclosed herein. Implementing the control function of the CPCE 105 may comprise the controller 132: determining a state of the control function (e.g., a state of PPV 155 of the control function), and determining control decisions in accordance with the determined state. As used herein, the state of a control function of a CPCE 105 may refer to one or more of: a state of the physical components 140 of the CPCE 105, a state of the PPV 155 of the CPCE 105, a state of physical components 140 operatively coupled to the PPV 155 (e.g., a state of one or more of the sensor devices 144A-N, actuator devices 146A-N, and/or the like), a state of the computational components 130 of the CPCE 105 (e.g., a state of the controller 132), a state of cyber components 120 of the CPCE 105, and/or the like.

In some embodiments, the control function of the CPCE 105 may comprise controlling the value of the PPV 155, and implementing the control function may comprise the controller 132: acquiring a current state of the PPV 155 by use of one or more sensor devices 144A-N, and determining control decisions to reduce an error between the acquired state of the PPV 155 and a target state or set point. The controller 132 may acquire the current state of the PPV 155 by use of one or more sensor devices 144A-N, and may realize the control decisions by use of one or more actuator devices 146A-N. In some embodiments, the controller 132 may be configured to implement a PID control function, which may comprise the controller 132: acquiring a state of the PPV 155 by use of one or more physical components 140 of the CPCE 105 (e.g., by use of one or more sensor devices 144A-N), calculating an error value e(t) quantifying deviation between the acquired state of the PPV 155 and a target state, and determining proportional, integral, and/or derivative components of a control output u(t) to minimize the error value e(t) over time (the control output u(t) corresponding to physical operations implemented by, e.g., one or more actuator devices 146A-N). Alternatively, or in addition, the control function implemented by the controller 132 may comprise a protective function, which may comprise: monitoring a state of the PPV 155 (by use of one or more sensor devices 144A-N), and determining whether to take one or more protective actions in accordance with the monitored state (the protective actions to be realized by one or more actuator devices 146A-N). By way of non-limiting example, the CPCE 105 may implement a protective relay function configured to open a branch breaker in response to detection of a fault state. Although particular examples of control functions are described herein, the disclosure is not limited in this regard and could be adapted for use with any suitable monitoring and/or control means configured to implement any suitable control, protection, regulation, monitoring, and/or management operations pertaining to any suitable physical process 150, physical process attribute 152, and/or PPV 155.

As disclosed above, the computational components 130 of a CPCE 105, such as the controller 132, may utilize physical components 140 to implement control function(s) of the CPCE 105. The physical components 140 of the CPCE 105 illustrated in FIG. 1A may comprise one or more sensor devices 144A-N, which may be configured to: acquire information pertaining to PPV 155, and/or one or more other physical components 140 of the CPCE 105, communicate the acquired information to the controller 132, and so on. A sensor device 144 may communicate information acquired thereby using any suitable communication means, including, but not limited to: signals, control signals, control system signals, sensor signals, sensor data signals, device-to-device couplings, packets, data packets, network packets, IP packets, DNP3 packets, SCADA packets, synchrophasors, synchrophasor data, and/or the like. In some embodiments, one or more of the sensor devices 144A-N may be coupled to the CS network 122 (e.g., may comprise networked physical components 140 and/or may be coupled to the CS network 122 by one or more cyber components 120). Alternatively, or in addition, one or more of the sensor devices 144A-N may be directly coupled to one or more computational components 130 of a CPCE 105, as disclosed herein (e.g., may be directly coupled to the controller 132 of the CPCE 105 of FIG. 1A). In some embodiments, one or more of the sensor devices 144A-N may be configured to communicate sensor data to other cyber-physical components 102 of the control system 101, such as another controller 132 (not shown in FIG. 1A to avoid obscuring details of the illustrated embodiments), an automation controller 134, an HMI device 136, and/or the like. In some embodiments, a sensor device 144 may be adapted to receive and/or implement configuration data, which may comprise configuring the sensor device 144, configuring communication of acquired data by the sensor device 144, configure data acquisition of the sensor device 144 (e.g., configure data acquisition frequency, sample period, resolution, etc.), and/or the like. The sensor configuration data may be communicated through the CS network 122, directly from the controller 132 (or other cyber-physical component 102), and/or the like.

The actuator devices 146A-N of the control system 101 may be configured to implement physical operations, which physical operations may comprise affecting, manipulating, modifying, regulating, protecting, managing, and/or otherwise controlling one or more of: a PPV 155 (e.g., physical process 150 and/or physical process attribute(s) 152A-N thereof), other physical components 140, and/or the like. The actuation device(s) 146A-N may be configured to implement physical operations in response to control signal(s), which may comprise, but are not limited to: signals, control signals, control system signals, actuator signals, actuator control signals, commands, actuator commands, messages, packets, data packets, network packets, IP packets, DNP3 packets, SCADA packets, and/or the like. In some embodiments, one or more of the sensor devices 144A-N may be coupled to the CS network 122 (e.g., may comprise networked physical components 140 and/or may be coupled to the CS network 122 by one or more cyber components 120). Alternatively, or in addition, one or more of the actuator devices 146A-N may be directly coupled to one or more cyber computational components 130, as disclosed herein (e.g., may be directly coupled to the controller 132 of the CPCE 105 of FIG. 1A). As disclosed above, the controller 132 may utilize one or more of the actuator devices 146A-N to implement the control function of the CPCE 105. The one or more actuator devices 146A-N may be configured to implement physical operations in response to control signal(s) from the controller 132. Alternatively, or in addition, one or more of the actuator devices 146A-N may be configured to implement physical operations in response to command signal(s) from other cyber-physical components 102 of the control system 101, such as another controller 132 (not shown in FIG. 1A to avoid obscuring details of the illustrated embodiments), an automation controller 134, an HMI device 136, and/or the like. In some embodiments, an actuator device 146 may be adapted to receive and/or implement configuration data, which may comprise configuring the actuator device 146, identifying components 102 authorized to issue control signals to the actuator device 146, configuring a response of the actuator device 146 to control signals, configuring physical operations implemented by the actuator device 146 (e.g., adjusting a control sensitivity, setting a range and/or throw of physical operations), and/or the like. The actuator configuration data may be communicated through the CS network 122, directly from the controller 132 (or other cyber-physical component 102), and/or the like.

In some embodiments, the CPCE 105 may comprise and/or be coupled to an automation controller 134. The automation controller 134 may be configured to implement an automation function that involves and/or comprises a plurality of CPCE 105 (other CPCE 105 not shown in FIG. 1A to avoid obscuring details of the illustrated embodiments). The automation controller 134 may be configured to monitor, coordinate, manage, and/or control operation of one or more CPCE 105, which may comprise: configuring cyber components 120 of the CPCE 105, configuring computational components 130 of the CPCE 105 (e.g., configuring the controller 132 to implement a specified control function, specify a set point for the control function, and/or the like), configuring physical components 140 of the CPCE 105, monitoring computational components 130 of the CPCE 105, monitoring physical components 140 of the CPCE 105 (e.g., monitoring sensor and/or actuator devices 144/146 of the CPCE 105), monitoring PPV 155 of the CPCE 105 (e.g., by use of sensor devices 144 of the CPCE 105), controlling physical components 140 of the CPCE 105 (e.g., issuing commands to actuator devices 146 of the CPCE 105), and/or the like. Alternatively, or in addition, an automation controller 134 may control one or more CPCE 105, which may comprise implementing control functions of the CPCE 105, as disclosed herein.

Although FIG. 1A depicts an exemplary CPCE 105 comprising particular cyber-physical components 102 of the control system 101, including in particular: cyber components 120, computational components 130, and/or physical components 140, the disclosure is not limited in this regard and could comprise CPCE 105 comprising any suitable cyber-physical component(s) 102 configured to control any type and/or number of PPV 155, physical processes 150, and/or physical process attributes 152 in accordance with any suitable control function. Moreover, cyber-physical components 102 of the control system 101 may be used in multiple CPCE 105, a computational component 130 may be used to implement a plurality of different CPCE 105, a sensor device 144 may be configured to provide sensor and/or measurement data to computational components 130 of a plurality of CPCE 105, an actuator device 146 may be configured to implement physical operation(s) in response to commands from computational components 130 of a plurality of CPCE 105, and so on.

As disclosed above, the controller 132 may be configured to implement a control function of the CPCE 105 by use of physical components 140 (e.g., by use of one or more sensor and/or actuator devices 144/146). The controller 132 may utilize one or more physical components 140 to: acquire the state of the CPCE 105 (e.g., determine the state of the PPV 155 and/or other physical components 140 of the CPCE 105), and realize control decisions pertaining to the PPV 155. The controller 132 may, therefore, be "closely coupled to" and/or have a "physical dependency" on the one or more physical components 140. As used herein, a "physical dependency" of a CPCE 105 refers to a dependency of a computational component 130 of a CPCE 105 (e.g., the controller 132), on one or more physical components 140 of the CPCE 105. In some embodiments, a physical component 140 of a CPCE 105 may have a "cyber dependency" on one or more computational components 130 of the CPCE 105. As disclosed above, an actuator device 146 of the CPCE 105 of FIG. 1A may be configured to implement physical operations pertaining to the PPV 155 in accordance with control signal(s) generated by the controller 132 of the CPCE 105. The actuator device 146 may, therefore, have a cyber dependency on the controller 132. The actuator device 146 may also have cyber dependencies on cyber components 120 by which the actuator device 146 is operatively and/or communicatively coupled to the controller 132. Dependencies between cyber-physical components 102 of a CPCE 105 may be referred to as "cyber-physical dependencies." The CPCE 105 illustrated in FIG. 1A may comprise cyber-physical dependencies between the controller 132 and the physical components 140 on which the controller 132 depends to implement control function(s) of the CPCE 105, which may comprise cyber-physical dependencies between the controller 132 and physical components 140 by which the controller 132 acquires information pertaining to the state of the CPCE 105, and actuator device(s) by which the controller 132 realizes control operations, and so on, a disclosed herein.

As disclosed above, conventional techniques for securing cyber-physical systems 100 may be configured to prevent and/or detect attacks directed against cyber components 120 (e.g., protect the CS network 122 from external attack). Conventional systems may attempt to guarantee security of CS network(s) 122 based on perimeter security (e.g., by securing gateway(s) and/or channel(s) to external networks) and, as such, may operate under the assumption that internal communications are secure and can be trusted. Alternatively, some conventional systems may attempt to secure internal communication (e.g., may encrypt and/or sign messages communicated on internal network(s) 122). These conventional systems may also monitor physical components 140 to detect known failure modes. These conventional techniques, however, may provide inadequate protection, and may be incapable of detecting and/or mitigating certain types of cyber-physical attacks. Due to resource constraints, conventional systems may primarily rely on perimeter security, such that a successful attack on the perimeter security measures may result in complete compromise. Moreover, even if internal communications are secured, conventional security techniques may still leave the control system 101 venerable; attackers may still be able to affect the control system 101 via the physical and/or computational environment.

Conventional systems may not be capable of detecting and/or mitigating attacks directed against physical and/or computational components of a cyber-physical system 100. As used herein, a "physical" or "component" attack refers to an attack pertaining to particular cyber-physical components 102. Cyber-physical components 102 may be attacked through an external network, the CS network 122, or through the physical and/or computational environment. A physical component 140 may be attacked by, inter alia, altering the physical environment (e.g., moving or obscuring a sensor device 144), connecting to local communication means of an actuator device 146 (e.g., an on-board communication port), and/or the like. A component attack may further comprise utilizing compromised cyber-physical components 102 to disrupt operation of the control system 101 (and/or one or more CPCE 105 thereof) by, inter alia, implementing "adversarial operations." As used herein, an "adversarial operation" refers to an operation configured to disrupt and/or interfere with the operation of the control system 101 and/or a CPCE 105 thereof. An adversarial operation may comprise causing a cyber-physical component 102 to introduce adversarial signals into the control system 101, modify response(s) to control signals, modify computational and/or control operations, and/or the like. A physical component attack may comprise causing a sensor device 144 to feed adversarial sensor data to a controller 132, causing an actuator device 146 to change its response to control signals, and so on. By way of further non-limiting example, a component attack may be directed against computational components 130, which may slow down control operations implemented thereby (e.g., cause the controller 132 to implement higher-priority, computationally intensive tasks), modify the control function(s) implemented by the controller 132, changing parameters of the control function(s), and/or the like.

Conventional mechanisms for securing cyber-physical systems 100 may be incapable of detecting component attacks and/or distinguishing such attacks from cyber-attack. Moreover, the adversarial operations (and corresponding adversarial signals) of a component attack may be configured to emulate nominal internal communication and, as such, may not be detected by conventional systems, including conventional systems that attempt to secure internal communications. Furthermore, even if anomalous communications are detected, conventional systems may misidentify such anomalies as indicative of a cyber-attack as opposed to an attack directed to particular component(s) 102 of the control system 101.

A component attack may result in anomalous cyber behavior within the CS network 122 which may be manifested as, inter alia, anomalous cyber communication corresponding to the adversarial operations performed by compromised components 102 and/or attempts by components 102 of the control system 101 to respond to disruptions caused by such anomalous operations (e.g., changes in communication to/from components 102 of the control system 101 on network(s) 122 of the control system 101). As disclosed above, conventional systems may not be capable of distinguishing communications resulted from a component attack from communications indicative of nominal operation. For example, messages comprising adversarial signals produced by a compromised sensor device 144 may be similar to messages comprising non-adversarial signals produced by the sensor device 144 during normal operation. By way of further example, messages comprising adversarial control signals output by a compromised controller 132 (and/or return signals from a compromised actuator device 146) may be similar to messages during nominal operation. It may not be possible, therefore to detect component attacks by conventional cyber health monitoring. Moreover, even if a conventional system were capable of detecting cyber anomalies resulting from a component attack, the conventional system would still be incapable of determining the cause of such cyber anomalies. Conventional systems may attempt to detect cyber-attacks using cyber components 120 (e.g., cyber security components 123, such as intrusion detection systems), which have no tie to physical components 140 of the control system 101 to which the component attack is directed (e.g., physical components 140, such as sensor devices 144, actuator devices 146, and/or the like). Therefore, since conventional recognition of cyber-attacks rely on monitoring cyber components 120 that are separate and/or independent of the physical and/or computational environment of the control system 101, conventional systems may not be capable of detecting cyber anomalies resulting from component attacks and/or determining the source of such anomalies (e.g., may misidentify the cause of cyber anomalies as a cyber-attack and/or compromise of the CS network 122, rather than an attack affecting physical components 140 of the control system 101).

Conventional systems may also be incapable of adequately responding to physical anomalies resulting from a component attack. Physical anomalies resulting from a component attack may not be detectable by conventional security systems (since communications pertaining to the compromised components are within the CS network 122, which such systems may assume is secure). Moreover, even conventional systems configured to monitor physical components 140 may be incapable of detecting physical anomalies arising due to component attacks. As disclosed above, the physical anomalies caused by a component attack may not correspond to physical anomalies associated with known failure modes of the physical components 140 of the control system 101. Therefore, conventional physical health monitoring may be incapable of detecting component attacks. Moreover, even if a conventional system were capable of detecting physical anomalies associated with a component attack, the conventional system would still be incapable of determining that the cause of such physical anomalies is a component attack as opposed to a physical failure mode. Furthermore, conventional systems may be incapable of identifying compromised physical components 140 and/or distinguishing compromised physical components 140 from physical components 140 that are experiencing physical failure.

As disclosed above, the control system 101 may comprise a resilient security (RS) agent 110. In some embodiments, the RS agent 110 may comprise and/or be embodied by computational components 130 of the control system 101, such as a computing device, an RTU, a PLC, a controller 132, an automation controller 134, an HMI device 136, and/or the like. In the FIG. 1A embodiment, the RS agent 110 is implemented on the controller 132. As disclosed in further detail herein, the RS agent 110 may be configured to secure the control system 101, which may comprise: generating state keys 160 comprising cyber-physical key data corresponding to a current cyber-physical state of the control system 101 (and/or respective regions thereof), communicating the state keys 160 through CPCE 105 of the control system 101, and determining cyber-physical health metadata 180 pertaining to the control system 101 based on, inter alia, error metrics 175 corresponding to communication of the state keys 160. The RS agent 110 may be configured to generate and/or communicate state keys 160 in accordance with cyber-physical state metadata 111, which comprise, characterize, define, and/or otherwise indicate a cyber-physical state of the control system 101. The state keys 160 may comprise cyber-physical key data 162, which may be derived from the current and/or real-time cyber-physical state of the control system 101. The cyber-physical key data 162 may comprise a cyber seed configured to characterize a cyber state of the control system 101 (and/or selected region thereof), and a physical seed configured to characterize a physical state of the control system 101 (and/or selected region thereof). Accordingly, it may be impossible for an attacker to spoof and/or replay state keys 160. Moreover, the state keys 160 may be derived using simple computational techniques, such that generation and communication of the state keys 160 imposes low overhead, and can be implemented by cyber-physical components 102 with minimal computational resources (e.g., by controllers 132, PLC, and/or the like).

The state keys 160 communicated by the RS agent 110 may comprise and/or correspond to a cyber-physical state of the control system 101 (and/or respective regions thereof). As used herein, the "cyber-physical state" of a cyber-physical system 100, such as the control system 101, may refer to a state of cyber-physical components 102 of the control system 101, which may comprise and/or correspond to: a state of cyber and/or physical services implemented by respective cyber-physical components 102, a configuration of respective cyber-physical components 102, utilization of respective cyber-physical components 102, and/or the like. The RS agent 110 may comprise and/or be communicatively coupled to cyber-physical state metadata 111, which may be configured to comprise, define, and/or characterize the cyber-physical state of the control system 101 (and/or respective regions thereof). The cyber-physical state metadata 111 may comprise cyber-state parameters 112, which may correspond to respective aspects, characteristics, and/or features of the cyber-physical state of the control system 101. In some embodiments, the RS agent 110 may be configured to acquire and/or maintain the cyber-physical state metadata 111 (e.g., by acquiring information pertaining to the cyber-physical state of the control system 101 from, inter alia, respective cyber-physical components 102 thereof). Alternatively, or in addition, the RS agent 110 may be communicatively coupled to cyber-physical state metadata 111 acquired by another entity (not shown in FIG. 1A to avoid obscuring details of the disclosed embodiments).

The cyber-physical state metadata 111 may comprise and/or correspond to a cyber-physical topology 115 of the control system 101. As used herein, the "cyber-physical topology" 115 of a cyber-physical system 100 may refer to a cyber and/or physical arrangement of the cyber-physical components 102 thereof. The cyber-physical topology 115 of the control system 101 may, therefore, be unique to the control system 101, unique to a particular configuration of the control system 101, unique to particular cyber-physical state(s) of the control system 101, and/or the like. The cyber-physical topology 115 of the control system 101 may comprise, define, and/or characterize cyber paths 126 of the control system 101. As used herein, a cyber path 126 refers to means by which respective cyber and/or computational components 120/130 of the control system 101 may be operatively and/or communicatively coupled to respective physical components 140 and/or PPV 155 of the control system 101 (and vice versa). The cyber-physical topology 115 of the control system 101 illustrated in FIG. 1A may comprise, define, and/or characterize cyber paths 126 by which the controller 132 (and/or other computational components 130) may be operatively and/or communicatively coupled to respective sensor and/or actuator devices 144/146. A cyber path 126 may comprise one or more cyber components 120, portions of the CS network 122, cyber nodes 124, one or more device-to-device couplings, and/or the like, as disclosed herein. The cyber-physical topology 115 may further comprise, define, and/or characterize a physical control topology of the control system 101, which may comprise information pertaining to physical control couplings and/or or correlational relationships between computational and/or physical components 130/140 of the control system 101 and respective PPV 155 (e.g., physical processes 150 and/or physical process attributes 152). In the FIG. 1A embodiment, the physical control topology may correspond to couplings between the controller 132 and respective sensor/actuator devices 144A-N/146A-N, and/or PPV 155A-N (e.g., may indicate physical couplings between respective sensor/actuator devices 144A-N/146A-N and respective physical processes 150 and/or physical process attributes 152).

Figure 1B:
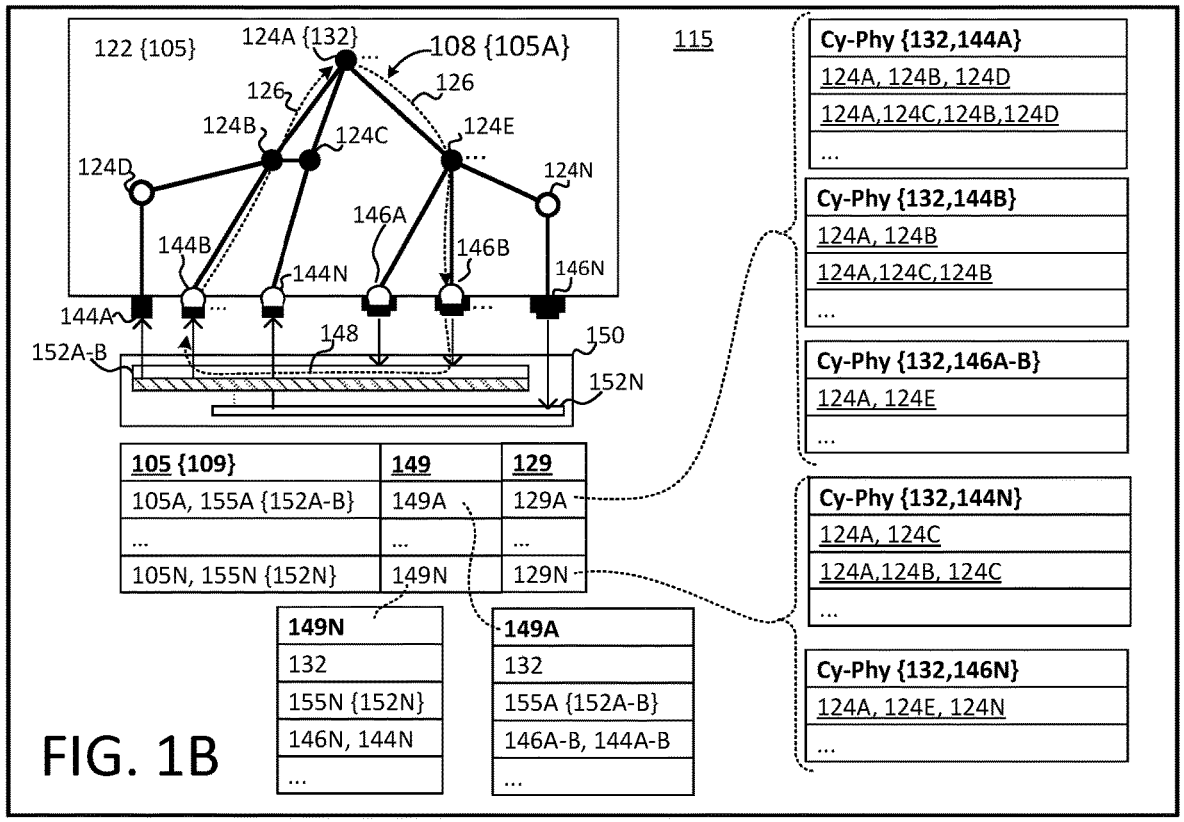
FIG. 1B is a schematic block diagram of one embodiment of data structure(s) comprising a cyber-physical topology, as disclosed herein.

FIG. 1B illustrates embodiments of data structure(s) configured to comprise, define, and/or characterize embodiments of a cyber-physical topology 115, as disclosed herein. In some embodiments, the cyber-physical topology 115 of a control system 101 may comprise and/or be embodied by a configuration of the control system 101 (and/or a configuration of respective cyber-physical components 102 of the control system). Alternatively, or in addition, the cyber-physical topology 115 may be represented and/or maintained by use of one or more data structures, such as one or more of the data structures illustrated in FIG. 1B. Data structures comprising information pertaining to the cyber-physical topology 115 of a control system 101 may be maintained within any suitable computer-readable medium, including a memory, volatile memory, non-volatile memory, non-volatile storage, firmware, and/or the like.

In some embodiments, the cyber-physical topology 115 may comprise information pertaining to cyber communication within the control system 101, including information pertaining means by which computational components 130 of the control system 101 are operatively and/or communicatively coupled to respective physical components 140. As illustrated in FIG. 1B, the cyber-physical topology 115 may comprise and/or represent cyber nodes 124 of the control system 101 (e.g., cyber nodes 124A-N). The cyber-physical topology 115 may, therefore, comprise, represent, and/or correspond to a topology of the CS network 122. The cyber-physical topology 115 illustrated in FIG. 1B may correspond to the control system 101 depicted in FIG. 1A and, as such, may comprise information pertaining to the controller 132. As illustrated, the controller 132 may be communicatively coupled to the CS network 122 and, as such, may comprise and/or correspond to a cyber node 124A of the CS network 122. The cyber-physical topology 115 may further comprise cyber nodes 124B-D, which may represent and/or correspond to cyber components 120 by which portions of the CS network 122 are implemented (e.g., may comprise network devices, concentrators, switches, routers, and/or the like).

In some embodiments, the cyber-physical topology 115 may further comprise information pertaining to relationships between physical components 140 of the control system 101. As illustrated in FIG. 1B, the cyber-physical topology 115 may comprise and/or represent relationships between sensor and/or actuator devices 144A-N/146A-N and respective PPV 155 (respective physical processes 150, physical process attributes 152A-N, and/or the like). The cyber-physical topology 115 may comprise information pertaining to respective sensor devices 144A-N, and may indicate that one or more of the sensor device(s) 144A-N are operatively coupled to the physical process 150 (and/or respective physical process attributes 152A-N thereof). The cyber-physical topology 115 may be further configured to indicate PPV 155 capable of being sensed, measured, and/or monitored by respective sensor devices 144A-N, indicate types of sensor data capable of being acquired by respective sensor devices 144A-N, and/or the like. The cyber-physical topology 115 may identify actuator devices 146A-N that are operatively coupled to the physical process 150 (and/or respective physical process attributes 152A-N thereof), indicate PPV 155 capable of being adjusted, manipulated, managed, protected, regulated, managed, and/or otherwise controlled by respective actuator devices 146A-N, indicate types of physical operations capable of being implemented by the respective actuator devices 146A-N, and/or the like. Although FIG. 1B illustrates embodiments of a cyber-physical topology 115 comprising particular cyber-physical components 102, the disclosure is not limited in this regard, and may be adapted for use with any suitable cyber-physical components 102 operatively coupled to any number and/or type of PPV 155 in any suitable configuration.

In some embodiments, the cyber-physical topology 115 may further comprise information pertaining to respective CPCE 105 of the control system 101. In the FIG. 1B embodiment, a CPCE 105 may comprise a physical control section 149 and a cyber section 129. The physical control section 149 may comprise and/or correspond to cyber-physical components 102 configured to sense, measure, monitor, adjust, manipulate, manage, regulate, and/or otherwise control a PPV 155 of a CPCE 105 (e.g., a physical process 150 and/or one or more physical process attribute(s) 152 thereof). The physical control section 149 of a CPCE 105 may comprise computational component(s) 130 configured to implement control functions pertaining to a specified PPV 155, and physical components 140 by which the control functions may be realized (e.g., a controller 132 configured to implement a control function pertaining to a PPV 155 by use of one or more sensor devices 144 and/or actuator devices 146). The physical control section 149 of a CPCE 105 may comprise and/or correspond to one or more physical control couplings 148. As used herein, a "physical process control coupling" or "physical control coupling" 148 refers to a coupling that comprises and/or corresponds control of a PPV 155 by computational and/or physical components 130/140 of a CPCE 105. A physical control coupling 148 may, therefore, refer to a coupling that comprises and/or corresponds to a physical process 150 and/or one or more physical process attributes 152 controlled by a CPCE 105. The cyber section 129 of a CPCE 105 may comprise information pertaining to cyber-physical couplings and/or paths 126 between computational component(s) 130 of the CPCE 105 and physical components 140 of the CPCE 105, including alternative cyber paths (e.g., different routes through the CS network 122 coupling the same components 130/140).

As illustrated in FIG. 1B, the control system 101 of FIG. 1A may comprise a plurality of CPCE 105A-N, each configured to control respective PPV 155A-N. The CPCE 105A may be configured to control PPV 155A, which may comprise and/or correspond to physical process attributes 152A-B (of the physical process 150), and so on, with CPCE 105N being configured to control PPV 155N, which may comprise and/or correspond to physical process attribute 152N. The physical control section 149A of the CPCE 105A may indicate that the controller 132 is configured to implement control functions pertaining to the PPV 155A using sensor devices 144A-B and actuator devices 146A-B. The physical control section 149N of the CPCE 105N may indicate that the controller 132 is also configured to implement control functions pertaining to PPV 155N using sensor device 144N and actuator device 146N. The cyber sections 129A-N may comprise information pertaining to cyber-physical couplings and/or paths 126 between computation components 130 of respective CPCE 105A-N and physical components 140 of the respective CPCE 105A-N. In the FIG. 1B embodiment, a cyber path 126 may be represented as a sequence of cyber nodes 124. The disclosure is not limited in this regard, however, and could be adapted to use any suitable means for representing and/or defining cyber-physical couplings and/or paths 126 (e.g., network address table, routing table, and/or the like). As illustrated in FIG. 1B, the cyber section 129A of the CPCE 105A may comprise a sequence of cyber nodes 124 by which messages may be communicated between the controller 132 (at cyber node 124A) and cyber nodes 124 coupled to respective physical components 140 of the CPCE 105A (respective sensor devices 144A-B, actuator devices 146A-B, and/or the like, including alternative paths). The cyber section 129N may indicate cyber paths 126 by which the controller 132 may be communicatively coupled to the physical components 140 of the CPCE 105N (e.g., sensor device 144N and actuator device 146N, respectively).

The cyber-physical topology 115 may further comprise information pertaining to control paths through respective CPCE 105 (cyber-physical control element paths 108). As used herein, a "control path" or "cyber-physical control" (CPC) path 108 refers to a path through cyber-physical components 102 of a CPCE 105 that comprises and/or corresponds to the PPV 155 of the CPCE 105. A CPCE 105 may comprise a plurality of CPC path(s) 108, each corresponding to a respective path by which computational components 130 of the CPCE 105 control a PPV 155. A CPC path 108 may comprise: a first cyber path 126, a physical control coupling 148, and a second cyber path 126. The first cyber path 126 may comprise a cyber path 126 between a computational component 130 of the CPCE 105 and the physical control coupling 148, and the second cyber path 126 may comprise a cyber path 126 from the physical control coupling 148 back to the computational component 130. As disclosed above, a physical control coupling 148 refers to a coupling that comprises and/or corresponds to a PPV 155 of a CPCE 105 (e.g., a physical process 150 and/or one or more attributes 152 thereof). As disclosed in further detail herein, a physical control coupling 148 may comprise a coupling between physical components 140 of the CPCE 105 that passes through and/or across the PPV 155 (e.g., may comprise a path from an actuator device 146 to a sensor device 144 by, across, and/or through the PPV 155). Alternatively, or in addition, a physical control coupling 148 may comprise a correlation between the PPV 155 and one or more cyber-physical components 102 operatively coupled thereto (e.g., may comprise correlation(s) between a state of the PPV 155 and/or a state of one or more physical components 140 operatively coupled thereto). Therefore, as used herein, a CPC path 108 may refer to a cyber path comprising one or more cyber paths 126 of the CPCE 105, and one or more physical couplings 148 of the CPCE 105 (the physical couplings 148 comprising and/or corresponding to respective PPV 155 of the CPCE 105).

FIG. 1B depicts an exemplary CPC path 108 of the CPCE 105A (labeled 108{105A} in FIG. 1B). The CPC path 108 illustrated in FIG. 1B may comprise: a first cyber path 126 through the cyber section 129A of the CPCE 105A (e.g., a first cyber path 126 from the controller 132 to the actuator device 146B), a physical control coupling 148 through the physical control section 149A of the CPCE 105A (e.g., a physical coupling 148 from the actuator device 146B to the sensor device 144A by, across, and/or through physical process attribute 152A), and a second cyber path 126 through the cyber section 129A (e.g., a second cyber path 126 from the sensor device 144B back to the controller 132).

Referring back to FIG. 1A, the RS agent 110 may be configured to determine and/or evaluate a cyber and/or physical state of the control system 101 by use of and/or in accordance with, inter alia, cyber-physical state metadata 111. The RS agent 110 may be configured to generate state keys 160, which may comprise key data corresponding to the cyber-physical state of the control system 101. The RS agent 110 may be further configured to communicate the state keys 160 through respective CPCE 105 of the control system 101 (in accordance with the cyber-physical topology 115 of the control system 101, as disclosed above), obtain validation data 171 in response to communication of respective state keys 160, and determine cyber-physical health metadata 180 pertaining to the control system 101 by, inter alia, comparing respective state keys 160 to corresponding validation data 171.

Figure 2:
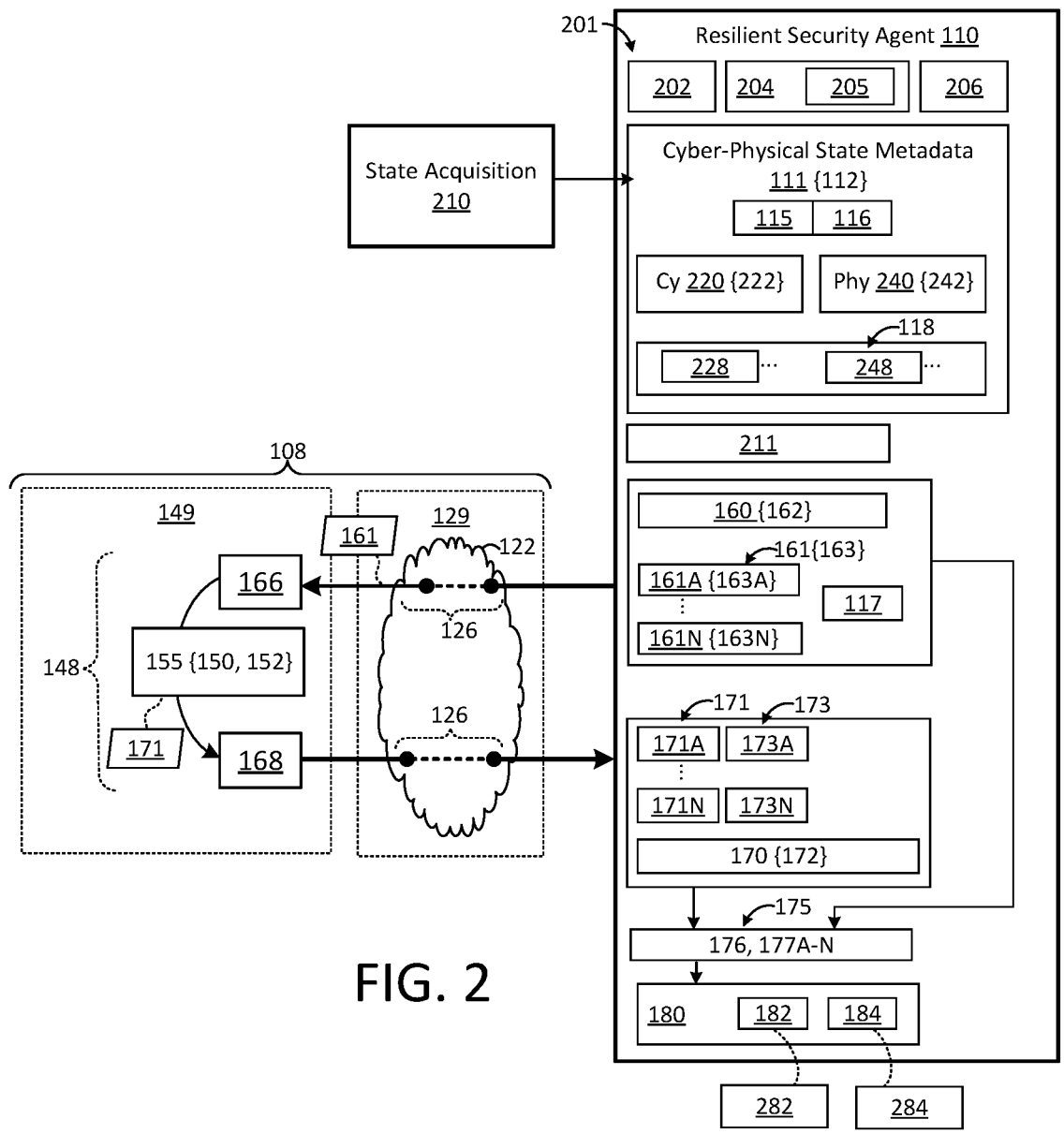
FIG. 2 is a schematic block diagram of one embodiment of resilient security agent, as disclosed herein.

FIG. 2 is a schematic block diagram of one embodiment of an RS agent 110, as disclosed herein. The RS agent 110 may comprise, be embodied by, and/or be coupled to computing resources 201, which may include, but are not limited to: processing resources 202, storage resources 204, cyber communication resources 206, and/or the like. The processing resources 202 may comprise any suitable means for implementing computational services, as disclosed herein (e.g., a processor, general-purpose processor, ASIC, programmable logic, a PLC, and/or the like). The storage resources 204 may comprise any suitable means for storing and/or maintaining data, such as volatile memory, random access memory (RAM), static RAM (SRAM), dynamic RAM (DRAM), non-volatile memory, battery-backed RAM, non-volatile storage resources, non-transitory storage resources, a non-transitory storage device, a non-transitory storage medium, a solid-state storage device, a solid-state storage medium, and/or the like. The cyber communication resources 206 may comprise any suitable means for communicatively and/or operatively coupling the RS agent 110 to the CS network 122, such as a network interface, a network interface device, and/or the like. In some embodiments, RS agent 110 (and/or portions thereof) may be embodied as hardware components, such as the computing resources 201 disclosed above. Alternatively, or in addition, the RS agent 110 (and/or portions thereof) may be embodied as computer-readable instructions 205 stored within the non-transitory storage resources 206. The computer-readable instructions 205 may be configured for execution by the processing resources 202 of the RS agent 110, which execution may cause the RS agent 110 to implement operations for securing a control system 101, as disclosed herein.

The RS agent 110 may be configured to communicate state keys 160 through selected regions of the control system 101. The state keys 160 may comprise and/or be derived from the cyber-physical state of the control system 101, as indicated by cyber-physical state metadata 111. In the FIG. 2 embodiment, the cyber-physical state metadata 111 may comprise, inter alia, cyber state metadata 220. The cyber state metadata 220 may be configured to comprise, define, and/or characterize a cyber state of the control system 101. As used herein, the "cyber state" of a cyber-physical system 100, such as a control system 101 as disclosed herein, may refer to one or more of: a cyber state of one or more components 102 of the control system 101, a state of cyber components 120 of the control system 101, a configuration of cyber components 120, a utilization of cyber components 120 (e.g., utilization of particular cyber components 120 and/or cyber nodes 124), a state of the CS network 122, a utilization of the CS network 122, a configuration of the CS network 122, and/or the like.

In some embodiments, the cyber state metadata 220 may comprise, define, and/or characterize a cyber state at one or more cyber nodes (cyber nodes 124) of the control system 101. The cyber state metadata 220 may comprise, define, and/or characterize any suitable aspect of cyber communication at a cyber node 124. In some embodiments, the cyber state metadata 220 may comprise statistical characteristics of cyber communication at particular cyber nodes 124, which characteristics may include, but are not limited to: communication speed, mean time delta between messages, mean message latency, number of messages per destination, number of message sources, mean message size, number of zero size messages, mean data length, maximum data length, data speed, and/or the like. Alternatively, or in addition, the cyber state metadata 220 may comprise parameters 222 corresponding to cyber communication between particular cyber nodes 124 (e.g., communication between a controller 132 and one or more sensor devices 144, actuator devices 146, automation controllers 134, and/or the like), which may include, but are not limited to: communication speed to/from the nodes 124, mean time delta between messages to/from the nodes 124, latency of messages communicated between the nodes 124, mean size of messages communicated between the nodes 124, and/or the like. Although particular examples of cyber state metadata 220 and/or cyber state parameters 222 are described herein, the disclosure is not limited in this regard, and could be adapted to utilize any suitable information pertaining to a cyber state of a cyber-physical system 100, including acquiring, estimating, determining, and/or monitoring any suitable type of cyber state parameter 222 pertaining to any suitable characteristic and/or aspect of the cyber state of the control system 101.

In some embodiments, the cyber state metadata 220 may comprise, define, and/or characterize a cyber state of respective CPCE 105 of the control system 101. As used herein, the cyber state of a CPCE 105 may refer to a cyber state of cyber-physical components 102 of the CPCE 105 (e.g., a cyber state of cyber components 120 by which computational components 130 of the CPCE 105 are coupled to physical components of the CPCE 105, a state of the cyber section 129 of the CPCE 105, and/or the like, as disclosed herein). The cyber state of a CPCE 105 may, therefore, comprise and/or correspond to a subset of the cyber state of the control system 101. The cyber state of a CPCE 105 may be comprised, defined, and/or characterized by the state of cyber communication at cyber nodes 124 by which computational components 130 of the CPCE 105 are operatively and/or communicatively coupled to physical components of the CPCE 105.

In some embodiments, the cyber-physical state metadata 111 may further comprise physical state metadata 240, which may comprise, define, and/or characterize a physical state of the control system 101. As used herein, the "physical state" of a cyber-physical system 100, such as a control system 101 as disclosed herein, may refer to one or more of: a physical state of one or more cyber-physical components 102 of the control system 101, a state of physical components 140 of the control system 101 (e.g., a state of one or more of a physical process 150, physical process attributes 152, sensor devices 144, actuator devices 146, and/or the like), a configuration of physical components 140 (e.g., a configuration of one or more sensor and/or actuator devices 144/146), a utilization of physical components 140 (e.g., utilization of one or more sensor and/or actuator devices 144/146), a state of physical operations implemented by physical components 140 of the control system (e.g., a state of data acquisition by one or more sensor devices 144, a state of physical operations implemented by one or more actuator devices 146, etc.), and/or the like. The physical state metadata 240 may comprise parameters (physical state parameters 242), which may comprise, define, and/or characterize: the physical state of the control system 101, particular cyber-physical components 102, particular physical components 140, particular regions of the control system 101, particular CPCE 105, particular CPC paths 108, particular physical control couplings 148, and/or the like.

In some embodiments, the physical state metadata 240 may comprise, define, and/or characterize the physical state of one or more sensor devices 144A-N of the control system 101. The physical state metadata 240 pertaining to a sensor device 144 may comprise any suitable information pertaining to the sensor device 144 including, but not limited to: a configuration of the sensor device 144, data acquired by the sensor device 144, characteristics of the acquired sensor data, diagnostic data, and/or the like. The physical state metadata 240 pertaining to a sensor device 144 may comprise any suitable information pertaining to the configuration of the sensor device 144, as disclosed herein (e.g., a frequency at which the sensor device 144 is configured to acquire sensor data, acquisition period, resolution, communication settings, and/or the like). The physical state metadata 240 may further comprise information pertaining to data acquired by a sensor device 144, which may comprise sensor and/or measurement data pertaining to a particular physical process 150, physical process attribute 152, particular physical components 140, and/or the like. The physical state metadata 240 may further comprise characteristics of data acquired by a sensor device 144, which may include, but are not limited to: a maximum value of the sensor data, a minimum value of the sensor data, a distribution of the sensor data, statistical properties of the sensor data (e.g., a mean, deviation, and/or variance of the sensor data), and/or the like. The physical state metadata 240 may also include diagnostic data pertaining to the sensor device 144, which may comprise a status of the sensor device 144, an error rate of sensor data acquired by the sensor device 144, a condition of the sensor device 144, and/or the like.

The physical state metadata 240 may further comprise, define, and/or characterize the physical state of one or more actuator devices 146A-N of the control system 101. The physical state metadata 240 pertaining to an actuator device 146 may comprise any suitable information pertaining to the actuator device 146 including, but not limited to: a configuration of the actuator device 146, physical operations implemented by the actuator device 146, diagnostic data, and/or the like. The physical state metadata 240 may comprise any suitable information pertaining to the configuration of an actuator device 146, as disclosed herein (e.g., response of the actuator device 146 to control signals, sensitivity of the actuator device 146, and/or the like). The physical state metadata 240 may indicate a degree to which the actuator device 146 is configured to modulate a particular physical process 150 and/or physical process attribute 152. By way of non-limiting example, the physical state of an actuator device 146 comprising a protecting relay may indicate whether the protective relay is open or closed. By way of further non-limiting example, the physical state of an actuator device 146 comprising a valve control device may indicate a degree to which the valve control device is open (e.g., fully open, 40% open, fully closed, or the like). By way of additional non-limiting example, the physical state of an actuator device 146 configured to supply power to an electric motor may indicate an amount of power being currently being supplied thereto (e.g., 100% power, 40% power, no power, wattage, and/or the like). The physical state metadata 240 may further comprise diagnostic information pertaining to the actuator device 146 comprise a status of the actuator device 146, a condition of the actuator device 146, and/or the like. The physical state metadata 240 pertaining to an actuator device 146 may further comprise sensor data pertaining to the actuator device 146 and/or physical processes 150 coupled thereto, such as temperature, power draw, load, efficiency, and/or the like.

In some embodiments, the physical state metadata 240 may further comprise and/or characterize a physical state of computational components 130 on which one or more physical components 140 depend (e.g., computational components 130 that are tightly coupled to one or more physical components 140, as disclosed herein). The physical state metadata 240 may be configured to characterize operation of the controller 132 of the CPCE 105 of FIG. 1A, such as a response time of the controller 132 to sensor data acquired by one or more of the sensor devices 144A-N, a response time of a control function of the controller 132 (e.g., time between acquisition of sensor data and corresponding control operations), a latency for communication of control signal(s) to one or more actuator devices 146A-N, and/or the like.

The physical state metadata 240 may be further configured to define and/or characterize the state of one or more physical processes 150 and/or physical process attributes 152. Physical state parameters 242 characterizing the state of a physical process 150 and/or physical process attribute 152 may comprise and/or correspond to a physical state of one or more components 102 operatively coupled thereto (e.g., the state of one or more sensor devices 144A-N, actuator devices 146A-N, computational components 130, and/or the like). The physical state parameters 242 pertaining to a physical process 150 may include, but are not limited to: sensor data acquired one or more sensor devices 144A-N operatively coupled to the physical process 150, characteristics of the acquired sensor data, physical operations implemented by one or more actuator devices 146A-N operatively coupled to the physical process 150, characteristics of the physical operations, and/or the like. The physical state parameters 242 pertaining to a physical process attribute 152 may include, but are not limited to: sensor data acquired one or more sensor devices 144A-N operatively coupled to the physical process attribute 152, characteristics of the acquired sensor data, physical operations implemented by one or more actuator devices 146A-N operatively coupled to the physical process attribute 152, characteristics of the physical operations, and/or the like.

In some embodiments, physical state metadata 240 may be further configured to comprise, define, and/or characterize a physical state of respective CPCE 105 of the control system 101. As used herein, the physical state of a CPCE 105 refers to a physical state of cyber-physical components 102 of the CPCE 105 (e.g., a physical state of cyber-physical components 102 involved in the implementation of the CPCE 105, as disclosed herein), a physical state of the PPV 155 of the CPCE 105, and/or the like. The physical state of the CPCE 105A illustrated in FIG. 1B may comprise and/or correspond to a physical state of one or more of the sensor devices 144A-B and/or actuator devices 146A-B. Alternatively, or in addition, the physical state of the CPCE 105A may further comprise and/or correspond to one or more of: a physical state of the PPV 155A (e.g., the physical process 150 and/or physical process attributes 152A-B), a physical state of the controller 132, and/or the like, as disclosed herein.

As disclosed above, the RS agent 110 may be communicatively coupled to cyber-physical state metadata 111 acquired by, inter alia, a state acquisition component 210. The state acquisition component 210 may comprise any suitable means for acquiring cyber-physical state metadata 111, as disclosed herein. The state acquisition component 210 may comprise a computational component 130 and/or computer-readable instructions stored on a non-transitory storage medium, the instructions configured to cause the computational component 130 to acquire and/or maintain cyber-physical state metadata 111, as disclosed herein. The state acquisition component 210 may comprise one or more of a state monitor, state estimator, a state observer, and/or the like. Alternatively, or in addition, the RS agent 110 is configured to acquire the cyber-physical state of the control system 101 (and/or respective CPCE 105 thereof), which may comprise: determining, estimating, and/or acquiring and/or maintaining cyber-physical state metadata 111 pertaining to the control system 101 (and/or respective CPCE 105 thereof). The RS agent 110 may be configured to determine, estimate, and/or otherwise acquire: a cyber state of the control system 101 (e.g., cyber state metadata 220), a physical state of the control system 101 (e.g., physical state metadata 240), and/or the like. The RS agent 110 may be configured to acquire information pertaining to a cyber and/or physical state of the control system 101 by, inter alia, requesting cyber and/or physical state information from respective cyber-physical components 102 of the control system 101, monitoring cyber-physical components 102 of the control system 101, monitoring message(s) communicated on the CS network 122 (e.g., message sniffing, message sampling, packet inspection, deep packet inspection, and/or the like), monitoring sensor data communicated to computational components 130 of the control system 101 (from one or more physical components 140), monitoring control signals communicated from computational components 130 of the control system 101 (to one or more physical components 140), and/or the like. The RS agent 110 may be further configured to determine and/or estimate the cyber and/or physical state of the control system 101 by use of the acquired information.

In some embodiments, the RS agent 110 (and/or state acquisition component 210) may be configured to maintain and/or determine one or more cyber-physical state signatures 118. As used herein, a "cyber-physical state signature" (CPSS) 118 refers to a signature configured to comprise, characterize, validate, authenticate, correspond to, and/or be derived from the cyber and/or physical state of a cyber-physical system 100 (and/or a portion thereof), such as the control system 101, as disclosed herein. A CPSS 118 may comprise a signature configured to comprise, characterize, validate, authenticate, correspond to, and/or be derived from cyber-physical state metadata 111 of the control system 101 (and/or portion(s) thereof). As used herein, a CPSS 118 may comprise and/or refer to one or more of: a cyber state signature 228, a physical state signature 248, and/or the like. As used herein, a cyber state signature 228 refers to a CPSS 118 configured to comprise, characterize, validate, authenticate, correspond to, and/or be derived from cyber state metadata 220 of the control system 101 (and/or portion(s) thereof). As used herein, a physical state signature 248 refers to a CPSS 118 configured to comprise, characterize, validate, authenticate, correspond to, and/or be derived from physical state metadata 240 of the control system 101 (and/or portion(s) thereof).

A CPSS 118 may be generated by, inter alia, applying a signature generating function to selected portions of the cyber-physical state metadata 111. The signature generating function may comprise any suitable means for generating a signature, including but not limited to: a cryptographic signature function, a non-cryptographic signature function, a checksum, a hash function, a cryptographic hash function, a non-cryptographic hash function, a piecewise hash function, a Context Triggered Piecewise Hash (CTPH) function, a fuzzy hash function, a Nilsimsa hash function, and/or the like. Deriving a CPSS 118 may comprise: serializing the cyber-physical state metadata 111 and/or selected portion(s) thereof (e.g., serializing data structure(s) comprising the cyber-physical state metadata 111, cyber state metadata 220, physical state metadata 240, selected portion(s) thereof, and/or the like), and applying a signature generation function to the serialized data. Generating a cyber state signature 228 may comprise: serializing the cyber state metadata 220 and/or portion(s) thereof, and applying a signature generation function to the serialized data. Generating a physical state signature 248 may comprise: serializing the physical state metadata 240 and/or portion(s) thereof, and applying a signature generation function to the serialized data.

In some embodiments, the RS agent 110 may be configured to generate CPSS 118 in accordance with a signature schema 116 (disclosed in further detail herein), such that portions of a CPSS 118 may be correlated to particular portions of the cyber-physical state metadata 111 (and/or other CPSS 118). The RS agent 110 may be configured to generate CPSS 118 in accordance with a CTPH signature generating function, which may comprise: A) initializing a rolling hash function and a non-rolling hash function, B) feeding the serialized data to each of the rolling hash function and the non-rolling hash function, C) in response to the rolling hash function producing a predetermined trigger value: recording at least a portion of the current state of the non-rolling hash function in the signature output, and continuing back at (A). In one embodiment, the rolling hash function r comprises x, y, z, c, and window parameters, wherein x, y, z, and c are initialized to zero; window is an array of N values (each initialized to zero); and the rolling hash is updated in response to a byte d, in accordance with the following pseudo code:

```
update(r) {
    y=y-x
    y=y+N*d
    x=x+d
    X=x-window [c mod M]
    window [c mod N]=d
    c=c+1
    z=z<<5
    z=z⊕d
    return (x+y+z)
}
```

The non-rolling hash function may comprise any suitable means for computing a non-rolling hash value including, but not limited to: a cryptographic hash function, a non-cryptographic hash function, and/or the like. The non-rolling hash function may comprise one or more of an MD5 hash function, a Fowler-Noll-Vo (FNV) hash function, and/or the like. The trigger of the rolling hash function may correspond to a size and/or organization of the cyber-physical state metadata 111, the cyber-physical topology 115, a signature schema 116 (disclosed in further detail herein), and/or the like. The RS agent 110 may be further configured to derive a CPSS 118 (state_sig) from cyber and/or physical state metadata (state metadata) at each of two block sizes b and b*2, in accordance with the following pseudo code:

```
input=serialize(state_metadata)
b=determine_block_size (input)
initialize_rolling hash(r)
initialize_traditional_hash(h1)
initialize_traditional_hash(h2)
state_sig1=" "
state_sig2=" "
for each byte d in input {
    update_rolling hash(r,d)
    update_traditional_hash(h1,d)
    update_traditional_hash(h2,d)
```

```
if (get_rolling_hash(r) mod b=b-1) then {
    state_sig1+=get_traditional_hash(h1) mod 64
    initialize_traditional_hash(h1)
}
if (get_rolling_hash(r) mod (b*2)=b*2-1) then {
    state_sig2+=get_traditional_hash(h2) mod 64
    initialize_traditional_hash(h2)
    }
 }
}
state_sig=b+":"+state_sig1+":"+state_sig2
```

In some embodiments, CPSS 118 may correspond to respective portions of the control system 101. The RS agent 110 may comprise and/or maintain a plurality of CPSS 118, each CPSS 118 corresponding to a cyber and/or physical state of a respective portion(s) of the control system 101 (and/or respective portion of the cyber-physical state metadata 111). Alternatively, or in addition, portion(s) of a CPSS 118 may correspond to portion(s) of the control system 101 (and/or portion(s) of the cyber-physical state metadata 111). In some embodiments, the RS agent 110 may be configured to generate and/or manage CPSS 118 in accordance with a signature schema 116. As used herein, a signature schema 116 refers to means by which CPSS 118 may be correlated with respective portions of the control system 101 (e.g., particular cyber-physical components 102, CPCE 105, CPC paths 108, CPCE sections 109, and/or the like), portions of the cyber-physical state metadata 111, and/or other CPSS 118. The cyber-physical topology 115 may, therefore, comprise and/or correspond to the signature schema 116. The signature schema 116 may define a scheme by which CPSS 118 are generated from cyber-physical state metadata 111. The signature schema 116 may specify cyber-physical state metadata 111 to incorporate into one or more CPSS 118, determine a manner in which the specified cyber-physical state metadata 111 are serialized, specify a configuration of the signature generation function by which the CPSS 118 are derived from the serialized data, and/or the like. The signature schema 116 may be configured to correlate particular CPSS 118 (and/or portions thereof) with the cyber-physical state metadata 111 from which the particular CPSS 118 were derived. The signature schema 116 may be further configured to correlate CPSS 118 (and/or portions thereof) with portions of the control system 101 (e.g., portions of the control system 101 corresponding to the cyber-physical state metadata 111 from which the CPSS 118 were derived). The signature schema 116 may be configured to correlate CPSS 118 by, inter alia, identifying the cyber-physical state metadata 111 from which respective CPSS 118 were derived, and correlating the identified cyber-physical state metadata 111 to the cyber-physical components 102, CPCE 105, CPC paths 108, and/or CPCE sections 109 characterized thereby.

Figure 3A:
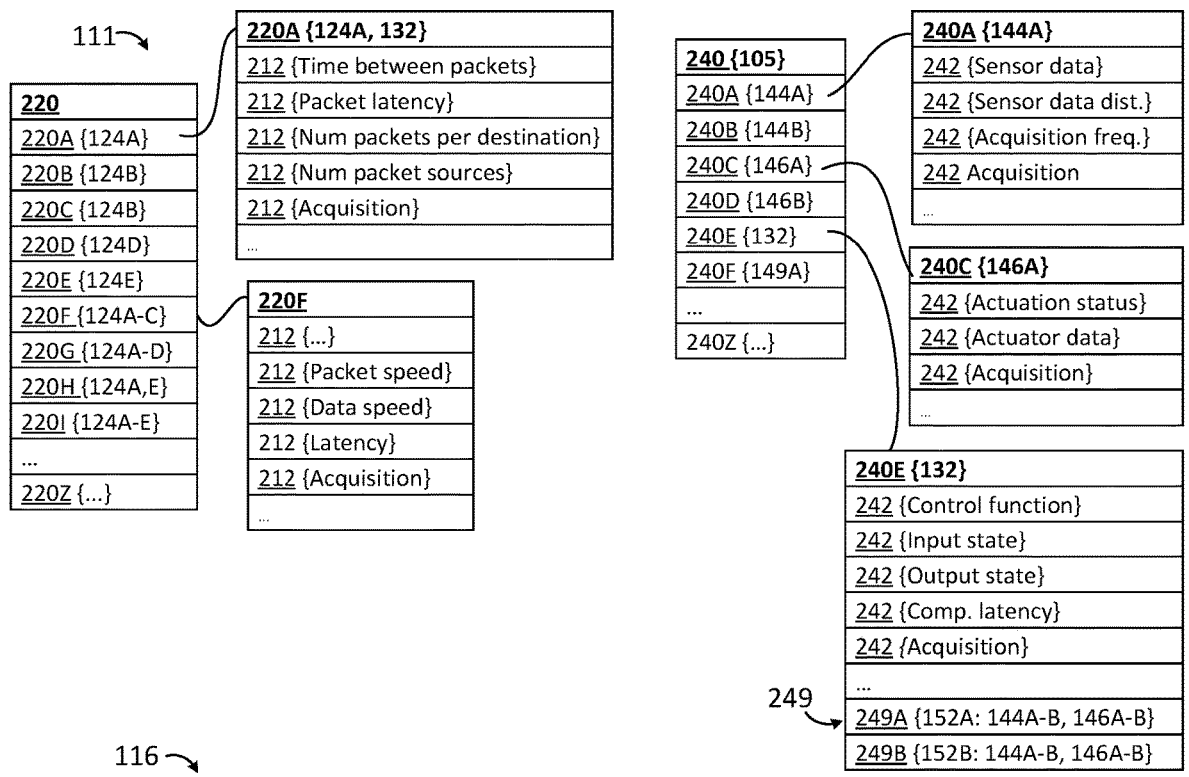
FIG. 3A is a schematic block diagram illustrating embodiments of data structures comprising embodiments of cyber-physical state metadata, as disclosed herein.

FIG. 3A illustrates embodiments of data structure(s) comprising embodiments of cyber-physical state metadata 111 and/or signature schema 116, as disclosed herein. The cyber-physical state metadata 111 of the FIG. 3A embodiment may correspond to the cyber-physical topology 115 illustrated in FIG. 1B. The cyber-physical state metadata 111 illustrated in FIG. 3A may comprise, define, and/or characterize a cyber and/or physical state of CPCE 105A (cyber-physical state metadata 111 pertaining to other portions of the control system 101, such as CPCE 105N are omitted to avoid obscuring details of the disclosed embodiments). In FIG. 3A, the cyber-physical state metadata 111 may comprise cyber state metadata 220 and physical state metadata 240, as disclosed herein. The cyber state metadata 220 may comprise, define, and/or characterize a cyber state of the CPCE 105A (e.g., a state of the cyber section 129A of CPCE 105A). The cyber state metadata 220 may comprise information pertaining to a state of respective cyber regions of the control system 101. As used herein, a "cyber region" refers to particular cyber components 120 (e.g., cyber nodes 124), CPCE 105, CPE paths 108, CPCE sections 109, cyber paths 126, and/or the like. The cyber state metadata 220 may comprise information pertaining to a state of the cyber section 129A of CPCE 105A. The cyber state metadata 220A may comprise, define, and/or characterize a state of cyber communication at cyber node 124A (e.g., at the controller 132) by use of any suitable information, as disclosed herein. In the FIG. 3A embodiment, the cyber state metadata 220A may comprise cyber state parameters 212, which may comprise and/or correspond to statistical characteristics of cyber communication at cyber node 124A, as disclosed herein (e.g., time between packets, packet latency, number of packets per destination, and/or the like). The cyber state parameters 212 of the cyber state metadata 220A may further comprise information pertaining to acquisition of the cyber state metadata 220A (e.g., may indicate an age of the cyber state metadata 220A, particular cyber state parameters 212, and/or the like). The cyber state metadata 220B-E may comprise, define, and/or characterize a state of cyber communication at cyber nodes 124B-E, respectively (individual cyber state parameters 212 of 220B-E not shown in FIG. 1B to avoid obscuring details of the illustrated embodiments). Alternatively, or in addition, the cyber state metadata 220 may be configured to maintain information pertaining to a state of cyber regions comprising a plurality of cyber components 120 (and/or cyber nodes 124), such as information pertaining to particular cyber paths 126, CPCE cyber sections 129, and/or the like. The cyber state metadata 220F may comprise, define, and/or characterize a state of cyber communication between the controller 132 and sensor device 144B and, as such, may comprise cyber state parameters 212 as disclosed above and/or cyber state parameters 212 pertaining to packet speed, data speed, and/or latency for cyber communication therebetween (e.g., a state of cyber paths 126 comprising cyber nodes 124A, 124B, and/or 124C). The cyber state metadata 220G may comprise information pertaining to cyber communication between the controller and sensor device 144A (e.g., cyber paths 126 comprising cyber nodes 124A, 124B, 124C, and/or 124D). Cyber state metadata 220H may comprise information pertaining to cyber communication between the controller 132 and actuator devices 146A-B (e.g., cyber paths 126 comprising cyber nodes 124A and 124E), and so on. In some embodiments, the cyber state metadata 220I may comprise information pertaining to the state of the cyber section 129A of CPCE 105A, including the respective cyber nodes 124A-E and/or respective cyber paths 126 coupling the controller 132 to respective physical components 140 (e.g., sensor devices 144A-B and actuator devices 146A-B). In some embodiments, cyber state metadata 220Z may comprise information pertaining to a cyber state of the control system 101, including the cyber state of the CS network 122, respective CPCE 105, CPCE paths 108, cyber sections 129, the CS network 122, and/or the like.

The physical state metadata 240 illustrated in FIG. 3A may comprise, define, and/or characterize the state of, inter alia, the physical control section 149A of CPCE 105A (e.g., the physical state of cyber-physical components 102 of the physical control section 149A, such as the sensor devices 144A-B, actuator devices 146A-B, and/or the like). The physical state metadata 240A may comprise, define, and/or characterize a physical state of the sensor device 144A by use of any suitable physical state information, as disclosed herein. The physical state metadata 240A may comprise physical state parameters 242, which may comprise and/or correspond to one or more of: sensor data acquired by the sensor device 144A, a distribution of the acquired sensor data (e.g., an average, mean, maximum, minimum, and/or deviation of the acquired sensor data), a configuration of the sensor device 144A (e.g., sensor acquisition frequency), and/or the like. In some embodiments, the physical state metadata 240A may further comprise acquisition parameters 242, which may comprise information pertaining to the acquisition of the physical state metadata 240A (and/or respective physical parameters 242 thereof), as disclosed herein. The physical state metadata 240B may comprise, define, and/or characterize a physical state of the sensor device 144B. The physical state metadata 240B may comprise a plurality of physical state parameters 242, as disclosed above (individual physical state parameters 242 not shown to avoid obscuring details of the disclosed embodiments). The physical state metadata 240C may comprise, define, and/or characterize a state of the actuator device 146A by use of any suitable physical state information, as disclosed herein. The physical state metadata 240C may comprise physical state parameters 242, which may comprise and/or correspond to one or more of: an actuation status of the actuator device 144A (e.g., a status and/or state of physical operations implemented by the actuator device 144A), actuator data, and/or the like. The actuator data may comprise information pertaining to the actuator device 144A, such as a configuration of the actuator device 144A, a temperature of the actuator device 144A, a load on the actuator device 144A, diagnostics, and/or the like. The physical state metadata 240B may comprise, define, and/or characterize a physical state of actuator device 146B. The physical state metadata 240D may comprise a plurality of physical state parameters 242, as disclosed above (individual physical state parameters 242 not shown to avoid obscuring details of the disclosed embodiments).

In some embodiments, the physical state metadata 240 may further comprise physical state metadata 240E, which may comprise, define, and/or characterize a physical state of computational components 130 of the CPCE 105A (e.g., a physical state of the controller 132). The physical state metadata 240E may comprise any suitable information pertaining to the physical state of the controller 132, including physical state parameters 242 comprising and/or corresponding to one or more of: the control function implemented by the controller 132 (e.g., parameters of the control function, a target for the physical process attribute 152A, and/or the like), an input state of the controller 132 (e.g., a state of input data received at the controller 132, which may comprise and/or correspond to sensor data communicated to the controller 132 from the sensor device 144A), an output state of the controller 132 (e.g., control directives and/or signals output by the controller 132 to the actuator device 144A), a computational latency of the controller 132 (e.g., time required to perform computational and/or control operations), and/or the like. In some embodiments, the physical state metadata 240 may further comprise information pertaining to a physical state of respective physical control regions. As used herein, a "physical control region" refers to particular computational computation components 130, physical components 140, and/or PPV 155 (e.g., computational and/or physical components 130/140 of respective CPCE 105, CPC paths 108, physical control sections 149, and/or the like). In the FIG. 3A embodiment, the physical state metadata 240F may be configured to characterize a state of physical control section 149A and, as such, may comprise and/or correspond to physical state metadata 240A-E. In some embodiments, the physical state metadata 240Z may be configured to characterize a physical state of the control system 101 and, as such, may comprise and/or correspond to physical state information pertaining to substantially all of the physical and/or computational components 140/130 of the control system, respective CPCE 105, CPCE paths 108, physical couplings 148, physical control sections 149, and/or PPV 155 of the control system 101.

In some embodiments, the physical state metadata 220 may further comprise information pertaining to physical control couplings 148 and/or physical control sections 149 of respective CPCE 105. FIG. 3A illustrates embodiments of physical control metadata 249 pertaining to the physical control section 149A of CPCE 105A. In the FIG. 3A embodiment, the physical control metadata 249 is organized with physical state metadata 240E pertaining to the controller 132 of CPE 105A. The disclosure is not limited in this regard, however, and could be configured to maintain physical control metadata 249 in any suitable means, location, and/or data structure. As used herein, physical control metadata 249 refers to information pertaining the control of particular PPV 155 by particular computational and/or physical components 130/140. Physical control metadata 249 may comprise a physical control model configured to, inter alia, correlate a state a PPV 155 with control inputs and/or outputs. Physical control metadata 249 may comprise a mathematical model by which the state of actuator devices 146 coupled to the PPV 155 may be correlated with the state of sensor devices 144 coupled to the PPV 155 (and vice versa). Physical control metadata 249 may correspond to control function(s) pertaining to the PPV 155 (e.g., may correspond to the transfer function and/or other control model by which a controller 132 determines control outputs for one or more actuator devices 146 in response to control inputs and/or feedback pertaining to the PPV 155, received from the sensor and/or actuator devices 144/146). Physical control metadata 249 may provide for verifying a state of a physical control coupling 148, which may comprise determining whether the physical state of the PPV 155 as indicated by the sensor device(s) 144 coupled thereto is consistent with the physical state of the PPV 155 as indicated by the actuator device(s) 146 coupled thereto (and vice versa). By way of non-limiting example, the PPV 155 of a physical control coupling 148 may comprise a motor. Sensor devices 144 coupled to the motor may indicate an amount of mechanical power being output by the motor (e.g., may indicate a speed of the motor in rotations per minute (RPM), load on the motor, torque, and/or the like). An actuator device 146 coupled to the motor may selectively couple the motor to an electrical power source and, as such, the state of the actuator device 146 may indicate an amount of power being supplied to the motor. The physical control metadata 249 may indicate that the output power of the motor (as indicated by the sensor devices 144) should be within a specified range of the input power (as indicated by the state of the actuator device 146). Inconsistencies may indicate compromise of one or more of the computational and/or physical components 140 (one or more of the controller 132, sensor and/or actuator devices 144/146), failure of one or more of the physical components 140 (and/or the PPV 155 itself), and/or the like. By way of further non-limiting example, the PPV 155 of a physical control coupling 148 may comprise a protective relay configured to, inter alia, control branch breakers coupled to one or more generators, one or more loads, and/or the like. The state of the sensor and/or actuator devices 144/146 may indicate whether generators and/or loads are in phase with one another, whether one or more the branches is experiencing a fault (e.g., a ground fault, phase-to-phase fault), and/or the like. The physical control metadata 249 may indicate whether the state of the PPV 155 is consistent with the control functions thereof (e.g., may model the protection function implemented by the corresponding controller, which may indicate that out-of-phase conditions return to stability within threshold period(s) of time, grounded branches are tripped within threshold period(s) of time, and/or the like).

As disclosed above, generating CPSS 118 in accordance with the signature schema 116 may comprise generating CPSS 118 corresponding to particular regions of the control system 101 (e.g., cyber-physical components 102, CPCE 105, CPC paths 108, CPCE sections 109, and/or the like). Generating a CPSS 118 corresponding to particular cyber-physical components 102 of the control system 101 may comprise: identifying portion(s) of the cyber-physical state metadata 111 pertaining to the particular cyber-physical components 102, and deriving a CPSS 118 from the identified cyber-physical state metadata 111, as disclosed herein. Generating a CPSS 118 corresponding to a particular CPCE 105 may comprise: identifying portion(s) of the cyber-physical state metadata 111 pertaining to the cyber-physical state of the CPCE 105 (e.g., identifying portion(s) of the cyber-physical state metadata 111 pertaining to cyber-physical components 102 within one or more CPCE sections 109), and deriving a CPSS 118 from the identified cyber-physical state metadata 111, as disclosed herein. In some embodiments, the RS agent 110 may be further configured to generate CPSS 118 corresponding to particular CPC paths 108. Generating a CPSS 118 corresponding to a particular CPC path 108 may comprise: identifying portion(s) of the cyber-physical state metadata 111 pertaining to cyber-physical components 102 included in the CPC path 108, and deriving a CPSS 118 from the identified cyber-physical state metadata 111, as disclosed herein. The signature schema 116 may be configured to correlate CPSS 118 with the portion(s) of the cyber-physical state metadata 111 from which the CPSS 118 were derived. The signature schema 116 may be further configured to correlate CPSS 118 with particular cyber-physical components 102, CPCE 105, CPC paths 108, CPCE sections 109, and/or the like.

In some embodiments, the RS agent 110 may be further configured to generate cyber state signatures 228 in accordance with the signature schema 116, as disclosed herein. Generating cyber state signatures 228 in accordance with the signature schema 116 may comprise generating cyber state signatures 228 corresponding to selected portions of the cyber state metadata 220 (e.g., portions of the cyber state metadata 220 corresponding to selected cyber-physical components 102, CPCE 105, CPC paths 108, CPCE sections 109, and/or the like), and correlating the selected portions of the cyber state metadata 220 with respective cyber state signatures 228 (and/or portions of the cyber state signatures 228) derived therefrom. The signature schema 116 may, therefore, provide for correlating cyber state signatures 228 with particular portions of the cyber state metadata 220 and/or particular portions of the control system 101.

In some embodiments, physical state signatures 248 may be derived in accordance with the signature schema 116, as disclosed herein. Generating physical state signatures 248 in accordance with the signature schema 116 may comprise generating physical state signatures 248 corresponding to selected portions of the physical state metadata 240 (e.g., portions of the physical state metadata 240 corresponding to selected cyber-physical components 102, CPCE 105, CPC paths 108, CPCE sections 109, and/or the like), and correlating the selected portions of the physical state metadata 240 with respective physical state signatures 248 (and/or portions of the physical state signatures 248) derived therefrom. The signature schema 116 may, therefore, provide for correlating physical signatures 248 with particular portions of the physical state metadata 240 and/or particular portions of the control system 101.

FIG. 3A depicts embodiments of a signature schema 116, as disclosed herein. The signature schema 116 of FIG. 3A may correspond to the cyber-physical topology 115 of FIG. 1B and, in particular, to a cyber-physical topology of the CPCE 105A. The signature schema 116 illustrated in FIG. 3A may define cyber state signatures 228 corresponding to the cyber section 129A of the CPCE 105A. The signature schema 116 may define a cyber state signature 228A, which may be derived from cyber state metadata 220A and, as such, may correspond to a cyber state of the controller 132 (e.g., a state of cyber communication at cyber node 124A). The signature schema 116 may further define cyber state signatures 228B-E, which may be derived from cyber state metadata 220B-E, respectively and, as such, may correspond to a state of cyber communication at respective cyber nodes 124B-E of cyber section 129A. Alternatively, or in addition, the signature schema 116 may define cyber state signatures 228 corresponding to cyber regions comprising a plurality of cyber components 120 (and/or cyber nodes 124), such as information pertaining to particular cyber paths 126, CPCE cyber sections 129, and/or the like. The cyber state signature 228F may be configured to characterize cyber paths 126 between the controller 132 and sensor device 144B and, as such, may be derived from cyber state metadata 220A-C and/or 220F. The signature schema 116 may further define a cyber state signature 228G, which may be configured to characterize cyber communication between the controller 132 and sensor devices 144A and, as such, may be derived from cyber state metadata 220A-D and/or 220G. The signature schema 116 may further define a cyber state signature 228H, which may be configured to characterize cyber communication between the controller 132 and actuator devices 146A-B and, as such, may be derived from cyber state metadata 220A, 220E, and/or 220H. The signature schema 116 may further define a cyber state signature 228I, which may be configured to characterize a state of the cyber section 129A and, as such, may be derived from one or more of cyber state metadata 220A-H. The signature schema 116 may further define a cyber state signatures 228Z, which may be configured to characterize a cyber state of the control system 101 (e.g., the CS network 122) and, as such, may be derived from substantially all of the cyber state metadata 220. The signature schema 116 may define other cyber state signatures 228 corresponding to other portions of the control system 101, other CPCE 105B-N, and/or the like (not shown in FIG. 3A to avoid obscuring details of the illustrated embodiments).

The signature schema 116 may be further configured to define physical state signatures 248, which may be derived from specified portion(s) of the physical state metadata 240 and, as such, may characterize a physical state of respective: cyber-physical components 102, respective CPCE 105, respective CPC paths 108, respective CPCE sections 109, and/or the like. In the FIG. 3A embodiment, the signature schema 116 may be configured to define physical state signatures 248 corresponding to the CPCE 105A illustrated in FIG. 1B. The signature schema 116 may define physical state signatures 248A-D, which may be derived from respective physical state metadata 240A-D and, as such, may correspond to a physical state of respective sensor/actuator devices 144A-B/146A-B of the physical control section 149A of CPCE 105A. The signature schema 116 may further define a physical state signature 248 pertaining to the controller 132 (derived from physical state metadata 240E). In some embodiments, the signature schema 116 may further define signature schemas pertaining to the PPV 155A of CPCE 105A, such as a physical state signature 248F corresponding to the physical state of the sensor/actuator devices 144A-B/146A-B coupled to physical process attributes 152A-B (derived from physical state metadata 240A-D). The signature schema 116 may further define a physical state signature 248G, which may correspond to the physical state of the physical control section 149A of CPCE 105A, including a physical state of the computational components 130 thereof (e.g., a physical state of the controller 132 and the sensor/actuator devices 144A-B/146A-B, derived from physical state metadata 240A-E and/or 240F). In some embodiments, the signature schema 116 may further define a physical state signature 248N, which may be derived from substantially all of the physical state metadata 240 (e.g., physical state metadata 240A-N) and, as such, may correspond to a physical state of the control system 101. The signature schema 116 may define other physical signatures 248 corresponding to other portions of the control system 101, other CPCE 105, and/or the like (not shown in FIG. 3A to avoid obscuring details of the illustrated embodiments).

In some embodiments, the signature schema 116 may define relationships between respective CPSS 118. The relationships may correspond to the cyber-physical state metadata 111 from which respective CPSS 118 were derived. The relationships may be established by, inter alia, generating CPSS 118 in accordance with the signature schema 116 and/or by configuring the signature generating function in accordance with the signature schema 116. As disclosed above, the signature generating function may comprise a context triggered and/or piecewise signature generating function (e.g., a CTPH and/or fuzzy hash function), which may be configured to generate a sequence of signature values in response to input data (and/or trigger(s) detected therein). The RS agent 110 may generate CPSS 118, such that respective portions and/or sequences thereof correspond to respective portions of the cyber-physical state metadata 111 (e.g., respective cyber state metadata 220A-N, physical state metadata 240A-N, and/or the like).

Figure 3B:
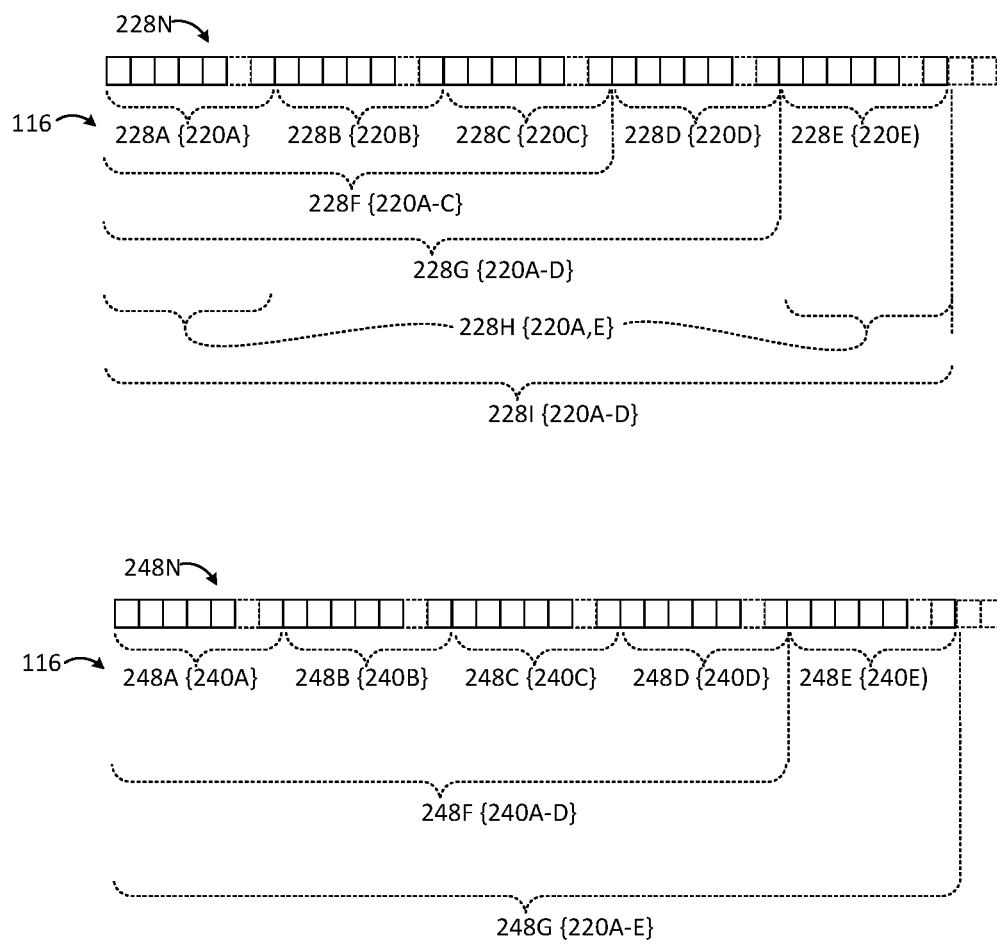
FIG. 3B illustrates relationships between cyber and/or physical state signatures, as disclosed herein.

The RS agent 110 and/or signature schema 116 may be configured to map portions of a CPSS 118 to respective cyber-physical state metadata 111, portions of the control system 101, and/or one or more other CPSS 118. As illustrated in FIG. 3B, the RS agent 110 and/or signature schema 116 may define mappings between the cyber state signatures 228A-N and/or physical state signatures 248A-N illustrated in FIG. 3A. The signature schema 116 may indicate that the cyber state signature 228N is derived from substantially all of the cyber state metadata 220 (e.g., cyber state metadata 220A-N) and, as such, covers, encompasses, and/or comprises each of the cyber state signatures 228A-I. The signature schema 116 may identify portions and/or sequences within the cyber state signature 228N that comprise and/or correspond to respective cyber state signatures 228A-I (and vice versa). As illustrated in FIG. 3B, the signature schema 116 may indicate that a first portion of the cyber state signature 228N comprises cyber state signature 228A, a second portion comprises cyber state signature 228B, and so on, with a fifth portion comprising cyber state signature 228E. The signature schema 116 may further define mappings between respective cyber state signatures 228A-I. The signature schema 116 may indicate that cyber state signature 228F comprises cyber state signatures 228A-C, cyber state signature 228G comprises cyber state signatures 228A-D, cyber state signature 228H comprises cyber state signatures 228A and 228E, cyber state signature 228I comprises cyber state signatures 228A-H, and so on.

As illustrated in FIG. 3B, the RS agent 110 and/or signature schema 116 may be further configured to define mappings between the physical state signatures 248A-N of FIG. 3A. The signature schema 116 may indicate that the physical state signature 248N is derived from substantially all of the physical state metadata 240 (e.g., physical state metadata 240A-N) and, as such, covers, encompasses, and/or comprises respective physical state signatures 248A-G, and may indicate portions and/or sequences within the physical state signature 248N that comprise the respective physical state signatures 248A-G (and vice versa). As illustrated in FIG. 3B, the signature schema 116 may indicate that a first portion of the physical state signature 248N comprises physical state signature 248A, a second portion comprises physical state signature 248B, and so on, with a fifth portion comprising physical state signature 248E. The signature schema 116 may further define mappings between respective physical state signatures 248A-G. The signature schema 116 may indicate that physical state signature 248F comprises physical state signatures 248A-D, physical state signature 248G comprises physical state signatures 248A-E, and so on. Although particular embodiments of CPSS 118 and/or signature schema 116 are described herein, the disclosure is not limited in this regard and may be adapted for use with any suitable signature types generated in accordance with any suitable scheme.

Referring back to FIG. 1A, as disclosed above, a cyber-physical attack may cause compromised components 102 to implement adversarial operations and/or inject adversarial signals into the control system 101. A cyber-physical attack may result in one or more components 102 providing adversarial cyber-physical state information, resulting in an inaccurate or even adversarial estimation of the cyber-physical state of the control system 101. The RS agent 110 may be configured to ensure that the cyber-physical state metadata 111 is valid by, inter alia, monitoring CPCE 105 of the control system 101, each CPCE 105 comprising a cyber section 129, a physical control section 149, and/or the like, as disclosed herein. The RS agent 110 may be configured to: jointly acquire cyber and/or physical validation information, verify the integrity of the cyber-physical state of the control system 101, and/or use the verified cyber-physical data to evaluate a cyber-physical health of the control system 101. The RS agent 110 may jointly assess the cyber and physical state of the control system 101, which may enable the RS agent 110 to detect cyber-physical attacks, including: attacks directed against particular components 102 of the control system 101, attacks through the physical environment, attacks through the computational environment, and/or the like.

In some embodiments, the RS agent 110 may be configured to validate portions of the cyber-physical state metadata 111 and/or assess a cyber-physical health of the control system 101. As illustrated in FIG. 1A, the RS agent 110 may be configured to communicate cyber-physical state keys (state keys 160) through CPCE 105 of the control system 101, receive validation data 171 in response to communication of the state keys 160, and generate validation keys 170 from the corresponding validation data 171. The RS agent 110 may be further configured to validate a cyberphysical state of the control system 101 and/or determine a cyber-physical health of the control system 101 based on, inter alia, error introduced during communication of the state keys 160 through portions of the control system 101.

Referring back to FIG. 2, the RS agent 110 may be configured to generate state keys 160 comprising cyber-physical key data 162. As used herein, "cyber-physical key data" (CPKD) 162 may comprise any suitable information pertaining to a cyber-physical state of the control system 101, as disclosed herein. The CPKD 162 of a state key 160 may correspond to a cyber-physical state of the control system 101. The CPKD 162 may comprise, correspond to, and/or be derived from the cyber-physical state metadata 111 (and/or portion(s) thereof), which may include, but is not limited to: cyber-physical state parameters 112, CPSS 118, cyber state metadata 220, cyber state parameters 222, cyber state signatures 228, physical state metadata 240, physical state parameters 242, physical state signatures 248, portion(s) thereof, and/or the like. In some embodiments, generating the CPKD 162 for a state key 160 may comprise incorporating CPKD 162 of one or more previously generated state keys 160. The CPKD 162 of a state key 160 may comprise cyber key data (a cyber seed and/or cyber seed data) and/or physical key data (a physical seed and/or physical seed data). The cyber key data may be derived from cyber state metadata 220 (and/or portion(s) thereof). The physical key data may be derived from physical state metadata 240 (and/or portion(s) thereof).

The RS agent 110 may be further configured to communicate the state keys 160 through respective CPCE 105 of the control system 101, acquire validation data 171 in response to the communicating, and generate corresponding validation keys 170 by use of the acquired validation data 171. The validation keys 170 may comprise cyber-physical validation data (CPVD) 172, which may correspond to the CPKD 162 of the corresponding state key 160. The RS agent 110 may be configured to compare the validation keys 170 to corresponding state keys 160, which may comprise comparing CPKD 162 of the state keys 160 to CPVD 172 of the corresponding validation keys 170. As disclosed in further detail herein, the RS agent 110 may be configured to determine cyber-physical health metadata 180 pertaining to the cyber-physical system 100 based, inter alia, on the comparing.

As illustrated in FIG. 2, the RS agent 110 may be configured to generate state keys 160 by use of, inter alia, the cyber-physical state metadata 111, as disclosed herein. The state keys 160 generated by the RS agent 110 may comprise respective identifiers, which may be configured to: distinguish the state keys 160 from other state keys 160 generated thereby, determine a temporal order of the state keys 160, provide for associating validation data 171 received at the RS agent 110 with respective state keys 160, provide for synchronizing the state keys 160 (and/or validation data 171 returned in response to the state keys 160), and/or the like. In some embodiments, each state key 160 generated by the RS agent 110 may comprise one or more of an identifier, a unique identifier, a sequence number, a sequence identifier, a timestamp, synchronization data, and/or the like. As disclosed above, each state key 160 may comprise CPKD 162, as disclosed herein. In some embodiments, the CPKD 162 may correspond to a current, acquired cyber-physical state of the control system 101. The CPKD 162 of each state key 160 may, therefore, comprise, correspond to, and/or be derived from at least a portion of: the cyber state of the control system 101 (e.g., comprise at least a portion of the cyber state metadata 220, one or more cyber state parameters 222, one or more cyber state signatures 228, and/or the like), and the physical state of the control system 101 (e.g., comprise at least a portion of the physical state metadata 240, one or more physical state parameters 242, one or more cyber state signatures 248, and/or the like).

In some embodiments, the RS agent 110 may be configured to generate state keys 160 that comprise "corresponding" CPKD 162. As used herein, "corresponding" CPKD 162 refers to CPKD 162 that comprises, corresponds to, and/or is derived from a cyber and/or physical state of corresponding regions of the control system 101. As used herein, a region of a control system 101 may refer to one or more cyber-physical components 102, CPCE 105, CPC paths 108, CPCE sections 109, cyber nodes 124, cyber paths 126, PPV 155, physical process couplings 148, and/or the like. Cyber-physical state information that covers a region of the control system 101 may, therefore, refer to cyber-physical state information that comprises, defines, and/or characterizes a cyber and/or physical state of the region. Corresponding CPKD 162 may refer to CPKD 162 that that comprise cyber state metadata 220 and physical state metadata 240 that cover corresponding regions of the control system 101. The RS agent 110 may be configured to generate CPKD 162 from cyber state information (e.g., cyber state metadata 220, cyber state parameters 222, cyber state signatures 228) and physical state information (e.g., cyber state metadata 220, cyber state parameters 222, cyber state signatures 228) that pertain to corresponding regions of the control system 101. The RS agent 110 may be configured to generate state keys 160 comprising corresponding CPKD 162 by use of the cyber-physical topology 115 and/or signature schema 116, as disclosed herein. The RS agent 110 may generate state keys 160 such that the CPKD 162 of respective state keys 160 comprise and/or correspond to a cyber state and physical state of corresponding portions of the control system 101 (e.g., portions that are operatively and/or communicatively coupled, are part of the same CPCE 105, are on same CPC paths 108, and/or the like). By way of non-limiting example, the RS agent 110 may incorporate cyber state information pertaining to particular cyber components 120 into the CPKD 162 of a state key 160 (e.g., a state of cyber communication at particular cyber nodes 124) and, in response, may incorporate physical state information pertaining to cyber-physical components 102 that are operatively and/or communicatively coupled to the particular cyber components 120. By way of further non-limiting example, the RS agent 110 may incorporate a physical state of particular physical components 140 into the CPKD 162 of a state key 160 (e.g., a physical state of particular sensor and/or actuator devices 144/146) and, in response, may incorporate cyber state information into the CPKD 162 corresponding to cyber-physical components 102 that are operatively and/or communicatively coupled to the particular physical components 140.

In some embodiments, the RS agent 110 may be configured to generate state keys 160 comprising CPKD 162 that covers selected regions of the control system 101. As used herein, CPKD 162 that "covers" a particular region of the control system 101 refers to CPKD 162 that comprises, corresponds to, and/or is derived from cyber-physical state metadata 111 corresponding to the particular region, which may comprise and/or correspond to one or more CPCE 105 (and/or CPC paths 108, CPCE sections 109, and/or cyber-physical components 102 thereof). Generating CPKD 162 that covers a selected region of the control system 101 may comprise: identifying cyber-physical state metadata 111 that corresponds to the selected region, and generating the CPKD 162 by use of the identified cyber-physical state metadata 111. Cyber-physical state metadata 111 that corresponds to a selected region of the control system 101 may be identified by use of the cyber-physical topology 115 and/or signature schema 116, as disclosed herein. A CPKD 162 may covers a selected region of the control system may comprise and/or correspond to one or more of: cyber-physical state metadata 111, cyber-physical state parameters 112, CPSS 118, cyber state metadata 220, cyber state parameters 222, cyber state signatures 228, physical state metadata 240, physical state parameters 242, physical state signatures 248, portion(s) thereof, and or the like.

The RS agent 110 may be configured to select regions of the control system 101 to be covered by the CPKD 162 of respective state keys 160 at any suitable granularity. The RS agent 110 may be configured to generate CPKD 162 configured to cover particular: cyber-physical components 102, CPCE 105, CPC paths 108, CPCE sections 109, cyber paths 126, physical process couplings 148, and/or the like. The RS agent 110 may be configured to select regions to be covered by the CPKD 162 of respective state keys 160 in accordance with any suitable selection mechanism, including, but not limited to: random selection, pseudorandom selection, a round-robin selection, an adaptive selection (to ensure adequate coverage of the control system 101), weighted selection (to increase monitoring of venerable and/or sensitive portions of the control system 101 by the CPKD 162), a deterministic selection (e.g., a selection in accordance with an isolation scheme, as disclosed in further detail herein), and/or the like.

The RS agent 110 may be configured to communicate state keys 160 through the control system 101. In some embodiments, the RS agent 110 may be configured to communicate respective state keys 160 through regions of the control system 101 covered by the CPKD 162 thereof (e.g., through regions of the control system 101 covered by the CPKD 162 of the respective state keys 160, as disclosed herein). Selecting regions of the control system 101 to be covered by CPKD 162 of respective state keys 160 may, therefore, comprise selecting regions of the control system 101 through which the respective state keys 160 are to be communicated. Alternatively, the RS agent 110 may be configured to communicate state keys 160 through selected regions of the control system 101 that may, or may not, be selected in accordance with the regions of the control system 101 covered by the CPKD 162 thereof.

In some embodiments, communicating state keys 160 through the control system 101 may comprise the RS agent 110 parsing the state keys 160 into a plurality of fragments 161, transmitting each fragment 161 through respective CPE paths 108, and receiving validation data 171 in response to the communication. In some embodiments, each state key fragment 161 may comprise a respective CPKD fragment 163, which may comprise at least a portion of the cyber and/or physical state key data of the CPKD 162 of the corresponding state key 160. In some embodiments, each fragment 161 may further comprise a fragment identifier, which may be configured to: associate fragments 161 with respective state keys 160 (distinguish fragments 161 of respective state keys 160 and/or fragments 161 of other state keys 160), associate the fragments 161 with portion(s) of the state key 160, provide for associating validation data 171 received at the RS agent 110 with the state key 160 and/or respective fragments 161 thereof (e.g., associate validation data 171 returned in response to communication of respective fragments 161 of the state key 160), provide for synchronizing the fragments 161 (and/or validation data 171 returned in response to the fragments 161), and/or the like.

In the FIG. 2 embodiment, the RS agent 110 is configured to parse state keys 160 into a plurality of fragments 161A-N, including a first fragment 161A and a last fragment 161N, each fragment 161A-N comprising a respective fragment of the CPKD 162 (e.g., a respective CPKD fragment 163A-N). In some embodiments, the CPKD fragment 163A of the first fragment 161A may comprise and/or correspond to a cyber state of the control system 101, and the last fragment 161N may comprise and/or correspond to a physical state of the control system 101 (e.g., the CPKD fragment 163A may comprise portion(s) of the CPKD 162 pertaining to the cyber state of the region of the control system 101 covered by the CPKD 162, and the CPKD fragment 163N may comprise portion(s) of the CPKD 162 pertaining to the physical state of the region). Alternatively, the CPKD fragments 163A-N may comprise and/or correspond to portions of the CPKD 162 corresponding to the cyber and physical state of the control system 101.

In some embodiments, the RS agent 110 may be configured to generate state key fragments 161 in accordance with a parsing schema 117. The parsing schema 117 may correspond to the cyber-physical state metadata 111, cyber-physical topology 115, and/or signature schema 116, as disclosed herein. The parsing schema 117 may define a schema by which CPKD 162 of respective state keys 160 may be parsed into a plurality of CPKD fragments 163A-N, each CPKD fragment 163A-N comprising and/or corresponding to cyber and/or physical key data covering at least a portion of the region covered by the CPKD 162. The parsing schema 117 may provide for generating CPKD fragments 163A-N comprise cyber and/or physical state information configured to cover corresponding regions of the control system 101 (e.g., corresponding sub-regions of the region covered by the CPKD 162). As disclosed above, the CPKD 162 of a state key 160 may be configured to cover selected regions of the control system 101. The RS agent 110 may generate fragments 161A-N of respective state keys 160, such that each fragment 161A-N comprises a CPKD fragment 163A-N that comprises and/or is derived from corresponding cyber and/or physical state information, as disclosed herein. In some embodiments, parsing a CPKD 162 of a state key 160 may comprise: generating a CPKD fragment 163A for a first fragment 161A of the state key 160 that comprises and/or corresponds to a cyber-physical state of a first portion of the region covered by the CPKD 162; and generating a CPKD fragment 163N for a last fragment 161N of the state key 160 that comprises and/or corresponds to a second portion of the region. By way of non-limiting example, the CPKD fragment 163A may comprise cyber-physical state parameters 112 and/or CPSS 118 configured to characterize the cyber and/or physical state of the first portion of the region, and the CPKD fragment 163N may comprise cyber-physical state parameters 112 and/or CPSS 118 configured to characterize the cyber and/or physical state of the second portion. Therefore, the CPKD fragment 163A of the first state key fragment 161A may cover the first portion of the region, and the CPKD fragment 163N of the last state key fragment 161N may cover the second portion of the region.

As disclosed above, the RS agent 110 may be configured to communicate state keys 160 through the control system 101, which may comprise parsing the state keys 160 into a plurality of fragments 161A-N, and communicating the respective fragments 161A-N through the control system 101. In some embodiments, communicating the fragments 161A-N of a state key 160 may comprise sending the fragments 161A-N through the CS network 122, receiving validation data 171A-N returned in response to communication of the respective key fragments 161A-N, and using the returned validation data 171A-N to, inter alia, evaluate a cyber and/or physical health of the control system 101, as disclosed herein. In some embodiments, validation data 171 returned in response to communication of a state key fragment 161 may comprise a cyber-physical reproduction or copy thereof (e.g., validation data 171A-N may comprise a cyber-physical reproduction of CPKD fragments 163A-N, respectively). As used herein, a "cyber-physical reproduction" or "cyber-physical copy" of data, such as CPKD 162 (and/or a CPKD fragment 163A-N), refers to a copy and/or reproduction of the data as communicated through a cyber-physical system 100, such as the control system 101. A cyber-physical reproduction of a CPKD fragment 163A-N may comprise a copy and/or reproduction of the CPKD fragment 163A-N as communicated through the control system 101. The RS agent 110 may be configured to determine cyber-physical health metadata 180 pertaining to the control system 101 by, inter alia, comparing respective state keys 160 to validation data 171A-N acquired in response to communication of respective fragments 161A-N of the respective state keys 160. The RS agent 110 may be configured to compare respective validation data 171A-N to corresponding portions of the state key 160 (e.g., corresponding portions of the CPKD 162 of the state key 160). As disclosed above, each state key fragment 161A-N of the state key 160 may comprise a respective CPKD fragment 163A-N, which may comprise one or more of: cyber-physical state metadata 111, a cyber-physical state parameter 112, a CPSS 118, cyber state metadata 220, a cyber state parameter 222, a cyber state signature 228, physical state metadata 240, a physical state parameter 242, a physical state signature 248, portion(s) thereof, and/or the like. The validation data 171 acquired in response to communication of the state key fragment 161 may, therefore, comprise a cyber-physical reproduction of the CPKD fragment 163 thereof (e.g., a cyber-physical reproduction of the cyber-physical state metadata 111, the cyber-physical state parameter 112, the CPSS 118, the cyber state metadata 220, a cyber state parameter 222, a cyber state signature 228, physical state metadata 240, a physical state parameter 242, a physical state signature 248, portion(s) thereof, and/or the like). The RS agent 110 may be configured to compare cyber-physical reproductions of respective CPKD fragments 163A-N (of respective validation data 171A-N) to corresponding CPKD fragments 161A-N of the original state key 160. As disclosed in further detail herein, the RS agent 110 may determine fragment errors 177A-N configured to quantify an error, difference, and/or distance between respective CPKD fragments 163A-N and corresponding cyber-physical reconstructions thereof (e.g., validation CPKD fragments 173A-N, as communicated through respective CPC paths 108 of the control system 101).

In some embodiments, the RS agent 110 may be configured to generate a cyber-physical reconstruction of respective state keys 160 (validation keys 170) by use of the validation data 171A-N returned in response to communication of respective fragments 161A-N of the state keys 160. As used herein, a "cyber-physical reconstruction" of data, such as a state key 160, refers to data reconstructed from a plurality of cyber-physical reproductions, each cyber-physical reproduction corresponding to a respective portion of the data. The RS agent 110 may be configured to acquire validation data 171A-N corresponding to each fragment 161A-N of a state key 160, and use the acquired validation data 171A-N to generate a validation key 170 corresponding to the state key 160. Acquiring the validation data 171A-N may comprise the RS agent 110 receiving messages comprising the validation data 171A-N through the CS network 122 (e.g., via one or more cyber paths 126). Alternatively, or in addition, acquiring the validation data 171A-N may comprise detecting messages comprising respective validation data 171A-N within the CS network 122. The detecting may comprise monitoring cyber communication on the CS network 122 to detect messages comprising validation data 171 corresponding to state key fragments 161. The monitoring may comprise sniffing and/or inspecting messages on the CS network 122 to detect messages corresponding to communication of respective state key fragments 161A-N (e.g., based on identifying and/or addressing information of the messages, contents of the messages, data of the messages, data streams of the messages, and/or the like). The RS agent 110 may be configured to retrieve the detected messages through the CS network 122 (e.g., retrieve broadcast messages on the CS network 122, retrieve messages communicated through cyber nodes 124 coupled to the RS agent 110, and/or the like).

In some embodiments, the RS agent 110 may be further configured to synchronize the acquired validation data 171A-N, which may comprise associating the validation data 171A-N with a corresponding state key 160. The RS agent 110 may associate a message comprising validation data 171 with a corresponding state key 160 by use of one or more of: an identifier of the state key 160, an identifier of the message, an address of the message, an identifier of the validation data 171 (e.g., a fragment identifier of the corresponding state key fragment 161), and/or the like. The synchronizing may further comprise determining a latency of respective validation data 171A-N, which may comprise the RS agent 110 determining a time between state key fragments 161A-N corresponding to the validation data 171A-N were transmitted on the CS network 122 and a time at which the corresponding validation data 171A-N were acquired (e.g., a time at which messages comprising the respective validation data 171A-N were returned and/or detected by the RS agent 110). The synchronizing may further comprise rejecting validation data 171A-N in response to a latency thereof exceeding a latency threshold.

Generating the validation key 170 may further comprise determining validation cyber-physical key data (validation CPKD 172) for the validation key 170. Determining the validation CPKD 172 may comprise generating validation CPKD fragments 173A-N by use of the acquired validation data 171A-N. As disclosed above, in some embodiments, each state key fragment 161A-N may comprise a respective portion of the CPKD 162 of the state key 160 (e.g., a respective CPKD fragment 163A-N, comprising respective cyber-physical state metadata 111, cyber-physical state parameters 112, CPSS 118, cyber state metadata 220, cyber state parameters 222, cyber state signatures 228, physical state metadata 240, physical state parameters 242, physical state signatures 248, portions thereof, and/or the like). The acquired validation data 171A-N may comprise cyber-physical reproductions of respective fragments 161A-N of the state key 160 and, as such, may comprise cyber-physical reproductions of respective CPKD fragments 163A-N thereof (e.g., comprise cyber-physical reproductions of respective portions of the CPKD 162 of the state key 160). Therefore, in some embodiments, the acquired validation data 171A-N may comprise the validation CPKD fragments 173A-N. Generating the validation CPKD 172 of the validation key 170 may comprise obtaining the validation CPKD fragments 173A-N from the acquired validation data 171A-N, and combining the validation CPKD fragments 173A-N to form the validation CPKD 172. The combining may comprise arranging the validation CPKD fragments 173A-N in accordance with an arrangement of the corresponding CPKD fragments 163A-N within the CPKD 162 of the state key 160. The RS agent 110 may be configured to recombine the CPKD fragments 173A-N in accordance with the signature schema 116, as disclosed herein.

As disclosed above, the RS agent 110 may be configured to communicate fragments 161 of respective state keys 160 through selected regions of the control system 101. The RS agent 110 may be configured to communicate state key fragments 161 through regions of the control system 101 covered by the CPKD fragments 163 thereof, as disclosed herein. Alternatively, the RS agent 110 may be configured to communicate state keys 160 and/or fragments 161 thereof through regions that may, or may not, correspond to the region of the control system covered by the CPKD 162 and/or CPKD fragments 163 thereof.

In some embodiments, communicating a state key fragment 161 may comprise transmitting the state key fragment 161 to a selected actuator device 146 (through the CS network 122), the actuator device 146 transmitting validation data 171 corresponding to the state key fragment 161 to a selected sensor device 144 (by, across, and/or through a PPV 155), and the sensor device 144 returning the validation data 171 to the RS agent 110 (through the CS network 122). The actuator device 146 and/or sensor device 144 may be selected in accordance with any suitable selection mechanism and/or criteria, as disclosed herein.

In some embodiments, the RS agent 110 may be configured to communicate state key fragments 161A-N through selected CPCE 105. Communicating a state key fragment 161 through a selected CPCE 105 may comprise communicating the fragment 161 through the cyber section 129 of the CPCE 105 and the physical control section 149 of the CPCE 105. Communicating a state key 160 through a selected CPCE 105 may comprise communicating fragments 161 thereof through CPC paths 108 thereof, each CPC path 108 comprising a first cyber path 126, a physical control coupling 148, and a second cyber path 126, as disclosed herein. Communicating a state key fragment 161 through a CPC path 108 may comprise transmitting the state key fragment 161 through: a first cyber path 126, a physical control coupling 148, and a second cyber path 126. As disclosed in further detail herein, communicating a state key fragment 161 through the physical control coupling 148 may comprise communicating validation data 171 by, across, and/or through a PPV 155 (e.g., a physical process 150 and/or physical process attribute(s) 152 thereof). The CPCE 105 and/or CPC path 108 may be selected in accordance with any suitable selection mechanism and/or criteria, as disclosed herein (e.g., may be selected in accordance with a region of the control system 101 covered by the CPKD fragment 163 thereof). Communicating a state key fragment 161 through a CPC path 108 may comprise sending the fragment 161 to the physical control coupling 148 through the first cyber path 126, and receiving validation data 171 communicated through, across, and/or by use of the physical control coupling 148 through the second cyber path 126.

In some embodiments, communicating a state key fragment 161 through a CPC path 108 may comprise sending the fragment 161 to a correlator 166 (through a first cyber path 126). As used herein, a correlator 166 refers to a cyber-physical component 102 of the control system 101 configured to determine and/or communicate validation data 171 corresponding to a state key fragment 161 through, across, and/or by use of a PPV 155. The correlator 166 may be configured to communicate the validation data 171 through, by, and/or across the physical process 150 and/or physical process attribute(s) 152 of the physical control coupling 148. As used herein, a receiver 168 refers to a cyber-physical component 102 of the control system 101 configured to detect, receive, and/or interpret validation data 171 communicated by a correlator 166. A receiver 168 may be configured to detect, receive, and/or interpret validation data 171 communicated through, by, and/or across the physical process 150 and/or physical process attribute(s) 152 of the physical control coupling 148.

In some embodiments, the correlator 166 comprises and/or is coupled to an actuator device 146, the actuator device 146 operatively coupled to the PPV 155 of the physical coupling 148. The correlator 166 (e.g., actuator device 146) may be configured to receive the state key fragment 161, and transmit correlation signal(s) comprising the validation data 171 to a selected receiver 168. The correlator 166 (e.g., actuator device 146) may be configured to transmit the correlation signal(s) by, inter alia, performing physical operations configured to affect, manipulate, and/or modify the physical process 150 and/or physical process attribute(s) 152, as disclosed herein. The correlator 166 may be configured to convert the state key fragment 161 into physical operations capable of being performed thereby, the physical operations configured to produce changes in the PPV 155 (e.g., physical process 150 and/or physical process attribute(s) 152) corresponding to the validation data 171. In some embodiments, the changes may be configured to have negligible effects on the PPV 155 and/or control functions pertaining thereto. In some embodiments, the correlator 166 may be configured to communicate the validation data 171 on a physical medium of the PPV 155. By way of non-limiting example, the PPV 155 may comprise the transmission and/or distribution of electrical power on a conductor, and the correlator 166 (e.g., actuator device 146) may be configured to transmit the validation data 171 on the conductor by, inter alia, power-line communication (PLC), and/or other technique. The correlator 166 (e.g., actuator device 146) may be configured to transmit the validation data 171 on any suitable medium associated with the PPV 155 including, but not limited to: a physical medium, an electrical medium (e.g., one or more conductors, traces, lines, and/or the like), an acoustic medium, a hydraulic medium, a pneumatic medium, a wireless medium (e.g., an electromagnetic signal propagation medium), and/or the like. Alternatively, or in addition, the correlator 166 (e.g., actuator device 146) may be configured to communicate the validation data 171 by use of signal(s) being communicated across, though, and/or by the PPV 155. The correlator 166 (e.g., actuator device 146) may be configured to communicate the validation data 171 on signal(s) carried on a physical process 150 and/or physical process attribute(s) 152 (may use a signal being propagated on, across, and/or through physical process 150 and/or attribute(s) 152 as a carrier signal, modulate the signal, and/or otherwise use the signal for communication of the validation data 171). Alternatively, or in addition, the correlator 166 (e.g., actuator device 146) may be configured to embed the validation data 171 in signals and/or data being communicated via the PPV 155 (e.g., may embed the validation data 171 by steganography, network steganography, image steganography, and/or any other suitable technique).

In some embodiments, the receiver 168 comprises and/or is coupled to a sensor device 144 operatively coupled to the PPV 155 of the physical control coupling 148. The receiver 168 (sensor device 144) may be configured to: receive validation data 171 communicated by the correlator 166, and return the validation data 171 to the RS agent 110 via the CS network 122. Receiving the validation data 171 may comprise the receiver 168 (e.g., sensor device 144) acquiring sensor data comprising the validation data 171 communicated across the PPV 155, as disclosed above. Receiving the validation data 171 may further comprise the sensor device 144 (and/or a computational component 130 closely coupled thereto) detecting the validation data 171 within the acquired sensor data. Receiving the validation data 171 may comprise identifying correlation signal(s) and/or validation data 171 within the acquired sensor data, isolating the identified correlation signal(s) and/or validation data 171, extracting the identified correlation signal(s) and/or validation data 171, filtering the acquired sensor data, and/or the like. Alternatively, or in addition, receiving the validation data 171 may comprise receiving signal(s) comprising the validation data 171 on a medium corresponding to the PPV 155 of the physical coupling 148 (e.g., a physical process 150 and/or physical process attribute(s) 152), such as a physical medium, electrical medium, acoustic medium, hydraulic medium, pneumatic medium, wireless medium, and/or the like, as disclosed above. In some embodiments, the receiver 168 (e.g., sensor device 144) may be configured to receive validation data 171 communicated on a signal of the PPV 155, and/or embedded in signal(s) and/or data communicated through the PPV 155, as disclosed above.

In some embodiments, the correlator 166 may comprise and/or be coupled to a computational component 130 of the control system 101 configured to communicate validation data 171 corresponding to the state key fragment 161 across the physical control coupling 148 (e.g., by use of one or more physical component(s) 140 tightly coupled thereto). The correlator 166 may comprise and/or be coupled to a controller 132 configured to: receive the state key fragment 161 and, in response, cause one or more actuator devices 146 to transmit validation data 171 by, across and/or through, the physical process 150 and/or physical process attributes(s) 152, as disclosed herein. In some embodiments, the receiver 168 may comprise and/or be coupled to a computational component 130 configured to receive validation data 171 communicated by, across, and/or through the physical process 150 and/or physical process attribute 152 by use of one or more physical component(s) 140 tightly coupled thereto. The receiver 168 may comprise a controller 132 configured to: receive validation data 171 by use of one or more sensor devices 144 operatively coupled to the physical process 150 and/or physical process attribute(s) 152, as disclosed herein. The receiver 168 (e.g., controller 132) may be configured to determine the validation data 171 by use of sensor data acquired by the one or more sensor devices 144, and return the validation data 171 to the RS agent 110, as disclosed herein.

In some embodiments, the correlator 166 may comprise a computational component 130 configured to, inter alia, receive the state key fragment 161, and determine validation data 171 corresponding to the fragment 161 by use of one or more physical components 140 operatively and/or communicatively coupled thereto. The computational component 130 may further comprise the receiver 168, and may be configured to return the determined validation data 171 to the RS agent 110, as disclosed herein. The correlator 166 (e.g., controller 132) may be configured to determine the validation data 171 by, inter alia, determining cyber-physical key data corresponding to the CPKD fragment 163 of the state key fragment 161. The correlator 166 (e.g., controller 132) may determine the cyber-physical key data by, inter alia, acquiring cyber-physical state information corresponding to the CPKD fragment 163 (e.g., a cyber-physical state of the PPV 155 and/or physical components 140 operatively coupled thereto, such as one or more actuator devices 146, sensor devices 144, and/or the like), and deriving the cyber-physical key data from the acquired cyber-physical state information. Determining the validation data 171 may comprise using the physical control metadata 249 to verify that the physical state of the PPV 155 as indicated by one or more actuator devices 146 coupled thereto is consistent with a state of the PPV 155 as indicated by corresponding sensor devices 144. Determining the validation data 171 may comprise predicting a state of the PPV 155 based on a state of the actuator devices 146, acquiring the state of the PPV 155 based on a state of the sensor devices 144, and/or comparing the predicted state to the acquired state. The state of the PPV 155 may be determined and/or estimated in accordance with physical control metadata 249 pertaining thereto, which may comprise, inter alia, a model by which a state of the PPV 155 (as indicated by one or more sensor devices 144) may be determined from a state of actuator devices 146 operatively coupled thereto. Determining the validation data 171 may comprise introducing noise and/or error into the cyber-physical reproduction of the state key fragment 161 (the validation data 171) in accordance with noise and/or error between the predicted state and the acquired state. The receiver 168 (e.g., controller 132) may be further configured to return validation data 171 comprising the cyber-physical key data to the RS agent 110, as disclosed herein. Although particular mechanisms for communicating state keys 160, state key fragments 161, and/or corresponding validation data 171 are described herein, the disclosure is not limited in this regard, and could be adapted to communicate state keys 160, state key fragments 161, and/or corresponding validation data 171 using any suitable means (e.g., by, across and/or through any suitable PPV 155 and/or in accordance with any suitable cyber-physical state information pertaining thereto).

Communicating a state key 160 may further comprise the RS agent 110 acquiring validation data 171A-N returned in response to communication of respective fragments 161A-N of the state key 160, and determining validation CPKD fragments 173A-N by use of the acquired validation data 171A-N. Acquiring the validation data 171A-N may comprise validating messages comprising the validation data 171A-N, associating the validation data 171A-N with the state key 160, synchronizing the validation data 171A-N, determining a latency of respective validation data 171A-N, and/or the like, as disclosed herein. The RS agent 110 may be further configured to generate a validation key 170, which may comprise a cyber-physical reconstruction of the CPKD 162 of the state key 160 (may comprise validation CPKD 172). Generating the validation key 170 may comprise reconstructing the validation CPKD 172 by use of the determined validation CPKD fragments 173A-N, which may comprise reconstructing the validation CPKD 172 in accordance with parsing schema 117 by which the corresponding fragments 161A-N (and/or CPKD fragments 163A-N thereof) were generated, as disclosed herein.

In some embodiments, the RS agent 110 may be configured to compare state keys 160 to validation data 171 returned in response to communication of the state keys 160 through portions of the control system 101. The comparing may comprise comparing respective state keys 160 to corresponding validation keys 170 (e.g., comparing CPKD 162 of respective state keys 160 to validation CPKD 172 of the corresponding validation keys 170). Alternatively, or in addition, the comparing may comprise comparing fragments 161A-N of respective state keys 160 to corresponding validation data 171A-N (and/or comparing CPKD fragments 163A-N to corresponding validation CPKD fragments 173A-N). The RS agent 110 may be further configured to determine and/or maintain error metrics 175 pertaining to communication of the state keys 160, including, but not limited to: key errors 176, fragment errors 177, and/or the like. The RS agent 110 may be configured to determine key error metrics (key errors 176), which may correspond to an error, distance, and/or difference between validation keys 170 and corresponding state keys 160 (and/or validation CPKD 172 and the CPKD 162 of corresponding state keys 160). The key error metric 176 for a state key 160 may be configured to quantify error introduced by the cyber-physical reconstruction of the state key 160 (e.g., by communication of fragments 161 of the state key 160 through respective CPC paths 108 of the control system 101). Alternatively, or in addition, the RS agent 110 may be configured to determine fragment error metrics (fragment errors 177), which may correspond to an error, distance, and/or difference between state key fragments 161 and corresponding validation data 171 (and/or CPKD fragments 163 and the corresponding validation CPKD fragments 173). The fragment error 177 for a state key fragment 161 may be configured to quantify error introduced by the cyber-physical reproduction thereof (e.g., by communication of the fragment 161 through a CPC path 108 of the control system 101). In some embodiments, the key error 176 of a state key 160 may correspond to fragment errors 177A-N of respective fragments 161A-N thereof.

The RS agent 110 may be configured to determine error metrics 175 between state keys 160, CPKD 162, state key fragments 161, and/or CPKD fragments 163 ($S_1$) and corresponding validation keys 170, validation CPKD 172, validation data 171, and/or CPKD fragments 173 ($S_2$), using any suitable means. In some embodiments, the RS agent 110 is configured to calculate error metrics 175 in accordance with, inter alia, a root mean square (RMS) technique, as follows:

$$e_{RMS} = \sqrt{\frac{1}{N}\sum_{i=0}^{N-1}(s_1[i] - s_2[i])^2}$$

In the expression above, $e_{RMS}$ may comprise an RMS error between $S_1$ and $S_2$, and N may be a length of $S_1$ and $S_2$.

Alternatively, or in addition, the RS agent 110 may be configured to calculate error metrics 175 in accordance with, inter alia, an edit distance, as follows:

$$e = i + d + 3c + 5w$$
$$c + w \leq \min(l_1, l_2)$$
$$i + d = |l_1, l_2|$$

In the expression above, $l_1$ may comprise a length of $S_1$ (the state key 160, CPKD 162, fragment 161, CPKD fragment 163, and/or the like), $l_2$ may be a length of $S_2$ (the validation key 170, validation CPKD 172, validation data 171, validation CPKD fragment 173, and/or the like), i is a number of insertions, d is a number of deletions, c is a number of changes, and w is a number of swaps between $S_1$ and $S_2$. In some embodiments, the edit distance may be rescaled from κ-64 to 0-100, to produce an error metric M, as follows:

$$M = \frac{100e(s_1, s_2)}{64(l_1 + l_2)}$$

The error metric (M) may comprise a weighted percentage of a degree to which $S_1$ and Sz deviate from being homologous sequences of one another (e.g., how many bits differ and/or are in different orders). A low error metric (M) may, therefore, indicate that $S_1$ and $S_2$ correspond to a common ancestor (e.g., a same or cyber-physical state and/or CPKD 162/163). A high error metric (M) may indicate little or no homology between $S_1$ and $S_2$ (e.g., may indicate significant changes to the cyber-physical state, CPKD 162, CPKD fragment 163, and/or the like). Although particular embodiments for determining error metrics are described herein, the disclosure is not limited in this regard and could be adapted to use any suitable means, technique, and/or mechanism for quantifying error introduced by communication of state keys 160 and/or state key fragments 161 through respective CPC paths 108 of a control system 101, as disclosed herein.

The RS agent 110 may be further configured to determine a cyber-physical health of the control system 101 and/or validate cyber-physical state metadata 111 (and/or portions thereof) based on, inter alia, error metrics 175 determined in response to communicating respective state keys 160, as disclosed herein. As disclosed above, the cyber-physical state metadata 111 used to characterize the cyber-physical state of the control system 101 may be acquired from respective cyber-physical components 102 (e.g., by requesting cyber-physical state information from respective cyber-physical components 102, monitoring communication on the CS network 122, estimating cyber-physical state information, and/or the like). If one or more of the cyber-physical components 102 is compromised, the cyber-physical state information acquired therefrom may be inaccurate (or even adversarial), leading to inaccuracies in the determination, estimation, and/or acquisition of the cyber-physical state of the control system 101 (e.g., an attacker may introduce adversarial cyber-physical state information through a compromised component 102, through the physical environment, via the CS network 122, from an external network, and/or the like). Communication of state keys 160 through respective CPCE 105 and/or CPC paths 108 of the control system 101 may ensure that cyber-physical state information acquired from cyber-physical component(s) 102 thereof are accurate. Although an attacker may be able to emulate and/or "spoof" communication on the CS network 122 (e.g., inject adversarial messages, signals and/or the like), attackers (and/or cyber-physical components 102 compromised thereby) may be incapable of emulating and/or spoofing communication of state keys 160 (and/or state key fragments 161), as disclosed herein, much less communicating state keys 160 comprising cyber-physical key data 162 that comprises, and/or corresponds to context-specific cyber-physical state metadata 111 and/or CPSS 118. For example, attackers may have no knowledge of the cyber-physical topology 115 and/or cyber-physical state information from which the cyber-physical state metadata 111 and/or CPSS 118 are derived and, as such, may be incapable of emulating communication of state keys 160, state key fragments 161 and/or corresponding validation data 171, as disclosed herein. Moreover, even if an external attacker were able to capture state key fragments 161 and/or validation data 171 within the CS network 122, the use of CPKD 162 covering different regions of the control system 101 (e.g., comprising and/or derived from different cyber-physical state metadata 111 and/or CPSS 118 in accordance with a cyber-physical topology 115 and/or signature schema 116), changes to the underlying cyber-physical state metadata 111 itself (and/or corresponding CPSS 118), the use of state keys 160 and/or state key fragments 161 comprising CPKD 162 and/or CPKD fragments 163 covering different regions of the control system 101, and communication of state keys 160 and/or fragments 161 through different regions of the control system 101 (e.g., communication of state key fragments 161 by, across, and/or through physical process couplings 148 of different CPCE 105) may make it impossible for an attacker to employ such captured data in a replay or similar attack (or use captured data to attempt to reverse engineer state keys and/or state key fragments 161 for replay). Although an attacker may compromise a cyber-physical component 102 of the control system 101, the attacker may be incapable of configuring the compromised component 102 to properly communicate state keys 160 and/or state key fragments 161, as disclosed herein. Furthermore, the RS agent 110 may be capable of operating on relatively simple devices. The RS agent 110 may be configured to derive CPSS signatures 118 using low-overhead techniques, which may be capable of operating on rudimentary devices, such as PLC.

The RS agent 110 may determine cyber-physical health metadata 180 for the control system 101 by use of error metrics 175 pertaining to communication of state keys 160 and/or state key fragments 161 through respective regions of the control system 101. As disclosed above, increasing error metrics 175 may indicate increased error in communication of state keys 160 and/or state key fragments 161 through the control system 101, which increased error may be due to degradation to the cyber and/or physical health of the control system 101. Accordingly, health metrics of the cyber-physical health metadata 180 may be inversely proportional to the error metrics 175 determined by the RS agent 110. In one embodiment, the RS agent 110 may be configured to determine the cyber-physical health metadata 180 based on, inter alia, error metrics 175 of state keys 160 most recently generated and/or communicated through the control system 101. The cyber-physical health metadata 180 may comprise and/or correspond to a state key window (e.g., error metrics of the last N state keys 160). By way of non-limiting example, the RS agent 110 may be configured to calculate health metrics comprising a last N error metrics 175 ($e$), as follows:

$$CPH = N \sum_{i=1}^{N} \frac{1}{e_i}$$

In the expression above, CPH may comprise a cyber-physical health metric, and $e_i$ may comprise error metrics 175 associated respective state keys 160 of the last N state keys 160.

The cyber-physical health metadata 180 may further comprise confidence metrics pertaining to the cyber-physical state metadata 111. The cyber-physical health metadata 180 may quantify a confidence that the cyber-physical state metadata 111 accurately reflects the cyber-physical state of the control system 101. As disclosed above, the cyber-physical state metadata 111 may be determined by, inter alia, acquiring cyber-physical state information from respective regions of the control system 101 (e.g., respective cyber-physical components 102, CPCE 105, CPC paths 108, CPCE sections 109, and/or the like). The cyber-physical state information may be acquired from regions through which the RS agent 110 is configured to communicate respective state keys 160 and/or state key fragments 161. Error metrics 175 corresponding to communication of respective state keys 160 and/or state key fragments 161 may, therefore, correspond to error in cyber-physical state information from which the cyber and/or physical state of the control system 101 is acquired (and/or from which the cyber-physical state metadata 111 are determined). The confidence metrics determined by the RS agent 110 may, therefore, be inversely proportional to the error metrics 175, such that increases to the error metrics 175 result in decreased confidence metrics, and vice versa. In some embodiments, the RS agent 110 may determine confidence metrics by use of one or more error metrics 175 (e.g., a last N error metrics 175, as disclosed above).

In some embodiments, the RS agent 110 may be further configured to associate error metrics 175 with particular regions of the control system 101 (e.g., particular CPCE 105, CPC paths 108, CPCE sections 109, cyber-physical components 102, cyber nodes 124, cyber paths 126, physical process couplings 148, and/or the like). As disclosed above, the error metrics 175 determined in response to communication of state keys 160 (and/or respective state key fragments 161) through respective regions of the control system 101 may indicate an error introduced by communication through the respective regions. The RS agent 110 may be configured to associate error metrics 175 of particular state keys 160 (and/or respective state key fragments 161) with regions of the control system 101 through which the particular state keys 160 (and/or respective key fragments 161) were communicated. The RS agent 110 may be configured to associate key errors 176 with CPCE 105 through which the corresponding state keys 160 were communicated, associate fragment errors 177A-N with CPC paths 108 through which the corresponding state key fragments 161 were communicated, and so on. The RS agent 110 may be configured to determine cyber-physical health metrics 180 corresponding to respective regions of the control system 101 (e.g., respective CPCE 105, CPC paths 108, cyber-physical components 102, and/or the like), which may be based on, inter alia, error metrics 175 associated with the respective regions, as disclosed above.

In some embodiments, the RS agent 110 may be further configured to associate error metrics 175 with respective portions of the cyber-physical state metadata 111. The RS agent 110 may be configured to associate error metrics 175 of particular state keys 160 (and/or respective state key fragments 161) with portions of the cyber-physical state metadata 111 corresponding to regions of the control system 101 through which the particular state keys 160 (and/or respective key fragments 161) were communicated (e.g., portions of the cyber-physical state metadata 111 corresponding to the CPCE 105, CPC paths 108, CPCE sections 109, cyber-physical components 102, cyber nodes 124, and/or the like, through which the state keys 160 and/or state key fragments 161 were communicated). The RS agent 110 may be further configured to determine confidence metrics for respective portions of the cyber-physical state metadata 111. The confidence metrics may be based on, inter alia, error metrics associated with the respective portions of the cyber-physical state metadata 111, as disclosed herein.

As disclosed above, the fragments 161 of a state key 160 may be communicated through one or more CPCE 105 (through respective CPC paths 108 of the CPCE 105). The state keys 160 communicated by the RS agent 110 may, therefore, "cover" respective cyber-physical control regions of the control system 101. As used herein, the cyber-physical control region "covered" by a state key 160 (the "region" covered by the state key 160, or "covered region" of the state key 160) refers to the cyber-physical control region of the control system 101 through which the state key 160 (and/or fragments 161 thereof) is communicated. A cyber-physical control region may comprise and/or correspond to one or more CPCE 105 (and/or regions thereof). In some embodiments, the RS agent 110 may configure state keys 160 to cover regions corresponding to the CPKD 162 thereof. Alternatively, the RS agent 110 may configure state keys 160 to cover regions of the control system 101 that may, or may not, correspond to regions covered by the CPKD 162 thereof. The RS agent 110 may select regions to be covered by respective state keys 160 based on any suitable criteria, as disclosed herein, which selection may be independent of the CPKD 162 of the respective state keys 160.

Communicating a state key 160 through a selected region of the control system 101 may comprise communicating respective fragments 161A-N thereof through respective CPC paths 108 of the region. Communicating a state key fragment 161 through a CPC path 108 may comprise sending the fragment 161 through the cyber section 129 of a CPCE 105 of the region to the physical control section 149 of the CPCE 105, and communicating corresponding validation data 171A-N from the physical control section 149 of the CPCE 105 back through the cyber section 129 of the CPCE 105. Communicating a state key fragment 161 may comprise the RS agent 110: sending the fragment 161 to a selected correlator 166 (through an input cyber path 126), causing the correlator 166 (e.g., a selected actuator device 146) to communicate corresponding validation data 171 to a selected receiver 168 (e.g., a selected sensor device 144) by, across, and/or through a PPV 155 of the CPCE 105, and causing the receiver 168 to return the validation data 171 to the RS agent 110 (through a return cyber path 126). Accordingly, the CPC path 108 through which a state key 160 is communicated, may be represented as follows:

| Input Cy-Phy 126 | Physical control coupling 148 | Return Cy-Phy 126 |
|---|---|---|
| 124 . . . | 166 {146}     155 {150, 152}<br>168 {144} | 124 . . . |

The input cyber path 126 may comprise cyber node(s) 124 through which the RS agent 110 sends the state key fragment 161 to a selected correlator 166 (e.g., actuator device 146) of the physical control coupling 148. The physical control coupling 148 may identify the PPV 155 by, across, and/or through which the correlator 166 transmits corresponding validation data 171 to a selected receiver 168 (e.g., sensor device 144). The return cyber path 126 may comprise cyber node(s) 124 through which the validation data 171 are returned to the RS agent 110. The region covered by a state key 160 may comprise a union of the CPC paths 108 through which respective fragments 161 thereof are communicated (e.g., a union of the CPCE 105 corresponding to the respective CPC paths 108).

As disclosed herein, the error metrics 175 of a state key 160 may quantify error in the cyber-physical reconstruction of the resulting validation key 170 (and/or cyber-physical reproductions of the resulting validation data 171). The error metrics 175 of a state key 160 that covers a selected region of the control system 101 may, therefore, quantify error introduced by communication by, across, and/or through the selected region. The RS agent 110 may, therefore, be configured to attribute the key error 176 of a state key 160 to the cyber-physical components 102 of the region covered thereby (e.g., determine that one or more cyber-physical components 102 within the region contributed to the resulting key error 176). The RS agent 110 may be further configured to attribute fragment errors 177A-N of the state to cyber-physical components 102 of the CPC paths 108 through which the corresponding fragments 161A-N of the state key 160 were communicated (e.g., determine that one or more cyber-physical components 102 of the respective CPC paths 108 contributed to the corresponding fragment error 177A-N). The RS agent 110 may be configured to record error metrics 175 attributed to respective cyber-physical components 102 (and/or corresponding cyber-physical state metadata 111) in the cyber-physical health metadata 180, as disclosed herein.

In some embodiments, the RS agent 110 may be further configured to further refine the cyber-physical components 102 to which particular error metrics 175 are attributed by, inter alia, communicating overlapping and/or related state keys 160, and evaluating the resulting error metrics 175 thereof. As disclosed above, state keys 160 (and/or the fragments 161 thereof) may cover respective regions of the control system 101. As used herein, "related" or "overlapping" state keys 160 refer to state keys 160 that cover at least a portion of a designated "overlap region." As used herein, a "target" or "overlap" region may refer to a cyber-physical control region, as disclosed herein (e.g., may comprise one or more CPCE 105). An overlap region may, therefore, comprise and/or correspond to a group of cyber-physical components 102, CPC paths 108, CPCE sections 109, cyber nodes 124, and/or the like. Overlapping state keys 160 may refer to state keys 160 configured for communication through a same overlap region (e.g., through one or more CPCE 105 of the overlap region). Overlapping state keys 160 may, therefore, refer to state keys 160 configured for communication through overlapping CPC paths 108. As used herein, "related" or "overlapping" CPC paths 108 refer to CPC paths 108 through a same overlap region of the control system 101 (e.g., CPC paths 108 through one or more CPCE 105 of the overlap region). Overlapping CPC paths 108 may correspond to respective cyber paths 126 and/or physical process couplings 148 of the overlap region. For example, first and second CPC paths 108 through a same overlap region may cover respective portions, sections, and/or sub-regions of the overlap region (e.g., may cover respective CPCE 105, CPCE sections 109, cyber paths, and/or physical couplings 148 of the overlap region). The RS agent 110 may configure overlapping CPC paths 108 to isolate particular regions and/or cyber-physical components 102 (e.g., to differ with respect to inclusion/exclusion of particular cyber-physical components 102 of the overlap region). Overlapping CPC paths 108 configured to isolate particular portions of an overlap region may be referred to herein as "isolation" CPC paths 108. By way of further example, the first and second overlapping CPC paths 108 may comprise isolation CPC paths 108: the first CPC path 108 may include first cyber-physical components 102 that are not included in the second CPC path 108 and/or the second CPC path 108 may include second cyber-physical components 102 that are not included in the first CPC path 108. The RS agent 110 may configure isolation CPC paths 108 to isolate particular cyber-physical regions and/or components 102, which may enable differences in the error metrics 175 thereof to be attributed to the particular cyber-physical regions and/or components 102. The RS agent 110 may be configured to evaluate error metrics 175 of overlapping state keys 160 and/or isolation CPC paths 108 to, inter alia, further refine the cyber-physical components 102 (and/or corresponding cyber-physical state metadata 111) to which error metrics 175 should be attributed. The RS agent 110 may, therefore, determine a cause and/or source of anomalous error metrics 175.

By way of non-limiting example, the RS agent 110 may communicate a first state key 160A through CPCE 105A, which may correspond to CPCE 105A as illustrated in FIG. 1B. The first state key 160A may, therefore, cover CPCE 105A. Communicating the first state key 160A may comprise communicating respective fragments 161A-N thereof through respective CPC paths 108 of CPCE 105A, acquiring corresponding validation data 171A-N, and determining error metrics 177A-N, as follows:

| 160A {105A} | | | | | |
|---|---|---|---|---|---|
| CPC path 108 | In. 126 | Physical control coupling 148 | | Ret. 126 | Frag. error |
| 108AA {161AA} | 124A, E | 146A | 152A 144A | 124D, B, C, A | 171AA: 177AA |
| ... | ... | | | | ... |
| 108AN {161AN} | 124A, E | 146B | 152B 144B | 124B, A | 171AN: 177AN |

As indicated above, communication of fragment 161AA may comprise communicating the fragment 161AA through CPC path 108AA, which may comprise: the RS agent 110 sending the fragment 161AA to a first correlator 166 (actuator device 146A) through an input cyber path 126 comprising cyber nodes 124A and 124E; the actuator device 146A transmitting corresponding validation data 171AA to a first receiver 168 (sensor device 144A) through physical process attribute 152A; and the sensor device 144A returning the validation data 171AA to the RS agent 110 through a first return cyber path 126 comprising cyber nodes 124D, B, C, and A. The resulting fragment error 177AA may quantify an error between the fragment 161AA and the acquired validation data 171AA, as disclosed herein. Communicating fragment 161AN through CPC path 108AN may comprise the RS agent 110: transmitting the fragment 161AN to a second correlator 166 (actuator device 146B) through the input cyber path 126; the actuator device 146B transmitting corresponding validation data 171AN to a second receiver 168 (sensor device 144B) through physical process attribute 152B; and the sensor device 144B returning the validation data 171AN to the RS agent 110 through a second return cyber path 126 comprising cyber nodes 124B and 124A. The resulting fragment error 177AN may correspond to an error between the fragment 161AN and the corresponding validation data 171AN, as disclosed herein.

The respective error metrics 177AA-AN may indicate a cyber-physical health of the cyber-physical components of the respective CPC paths 108AA-AN. The error metric 177AA may indicate a cyber-physical health of cyber nodes 124A-E, sensor device 144A, actuator device 146A, and/or physical process attribute 152A. The error metric 177AN may indicate a cyber-physical health of cyber nodes 124A, B and E, sensor device 144B, actuator device 146B, and/or physical process attribute 152B. Differences between the fragment errors 177AA-AN may be attributed to inclusion and/or exclusion of cyber-physical components 102 in respective CPC paths 108A-N. Differences in the fragment errors 177AA-AN may correspond to differences in a cyber-physical health of one or more of the: cyber node 124C, sensor devices 144A-B, actuator devices 146A-B, physical process attributes 152A-B, and/or the like.

In some embodiments, the RS agent 110 may be configured to adapt communication of state keys 160 and/or state key fragments 161 to, inter alia, further refine cyber-physical components 102 to which particular error metrics 175 may be attributed (e.g., determine the cause and/or source of anomalous error metrics 175). The adaptations may comprise configuring communication of a series of overlapping state keys 160, which, as disclosed above, may be communicated through a same overlap region of the control system 101. The RS agent 110 may configure communication of the state keys 160 through isolation CPC paths 108 that vary with respect to inclusion/exclusion of particular cyber-physical components 102, such that differences in error metrics 175 thereof may be attributed to the particular cyber-physical components 102 included/excluded in the respective isolation CPC paths 108.

In response to communication of the state key 160A, the RS agent 110 may adapt communication of a subsequent state key 160B, as disclosed above. The RS agent 110 may configure state key 160B to overlap with state key 160A, which may comprise configuring state key 160B for communication through CPCE 105A. The RS agent 110 may be configured to communicate fragments 161BA-BN through CPC paths 108BA-BN, that may correspond to the same CPCE 105A, but differ from the CPC paths 108AA-AN of state key 160A with respect to inclusion and/or exclusion of particular cyber-physical components 102. The RS agent 110 may be configured to communicate the state key 160B, as follows:

| 160B {105B} | | | | | |
|---|---|---|---|---|---|
| CPC path 108 | In. 126 | Physical control coupling 148 | | Ret. 126 | Frag. error |
| 108BA {161BA} | 124A, E | 146A | 152A 144A | 124D, B, A | 171BA: 177BA |
| ... | ... | | | | ... |
| 108BN {161BN} | 124A, E | 146B | 152B 144A | 124B, A | 171BN: 177BN |

The error metric 177BA may quantify error introduced during communication of fragment 161A through CPC path 108BA, which differs from CPC path 108AA with respect to cyber node 124C. The RS agent 110 may configure the fragment 161BA to bypass cyber node 124C, while utilizing the same or similar cyber-physical components 102 of CPC path 108AA. Since CPC paths 108AA and 108BA only differ with respect to cyber node 124C, the RS agent 110 may attribute differences between fragment errors 177AA and 177BA to cyber node 124C. In one embodiment, the fragment error 177AA may be anomalous and, in response, the RS agent 110 may adapt communication of subsequent state keys 160 (e.g., state key 160B) to isolate components of the CPC path 108AA associated with the fragment error 177AA. The RS agent 110 may determine that the fragment error 171BA is nominal and, since the CPC path 108BA differs from the CPC path 108AA associated with the anomalous fragment error 177AA by inclusion of cyber node 124C, the RS agent 110 may determine that cyber node 124C was the source and/or cause of the anomaly (e.g., the cyber node 124C may be compromised and/or subject to cyber-attack). The RS agent 110 may be further configured to communicate subsequent state keys 160 to verify that cyber node 124C is the source of the anomaly (e.g., by communicating subsequent state keys 160 through paths that differ with respect to their inclusion of cyber node 124C, and comparing the resulting error metrics 175).

As illustrated above, the RS agent 110 may configure the CPC path 108BN through which state key fragment 161BN may be configured to isolate one or more cyber-physical components 102 of CPC path 108AN. The RS agent 110 may adapt the CPC path 108BN of the subsequent state key 160B in order to, inter alia, refine the cyber-physical components 102 to which the resulting fragment errors 177AN and/or 177BN may be attributed, as disclosed above. The RS agent 110 may configure the CPC path 108BN to differ from CPC path 108AN with respect to selected cyber-physical components 102. The CPC path 108BN may differ from the CPC path 108AN with respect to the physical couplings 148 thereof. The physical coupling of CPC path 108BN may comprise transmitting validation data 171BN from the actuator device 146B to sensor device 144A (rather than to sensor device 144B, as in CPC path 108AN). The RS agent 110 may, therefore, determine that differences between fragment errors 177AN and 177BN may be attributed to communication through the physical control coupling 148 comprising actuator device 146B and sensor device(s) 144A or 144B. The RS agent 110 may further determine that a cause and/or source of a higher fragment error 177AN as compared to 177BN is sensor device 144B, and a cause and/or source of a higher fragment error 177BN compared to 177AN is sensor device 144A.

In some embodiments, the RS agent 110 may be further configured to detect high error metrics 175 and, in response, configure communication of subsequent state keys 160 and/or state key fragments 161 to, inter alia, determine a source and/or cause thereof. In response to detecting high error metrics 175 (e.g., error metrics 175 that exceed one or more error threshold), the RS agent 110 may be configured to determine a "error region," which may comprise region(s) of the control system 101 covered by the state keys 160 having the high error metrics 175. The RS agent 110 may be further configured to identify cyber-physical components 102 included in the determined error region, which may be potential causes of the high error metrics 175. The RS agent 110 may be configured to maintain a group comprising cyber-physical components 102 that are potential causes of the high error metric 175 (an "error group"), which may initially comprise the identified cyber-physical components 102. The RS agent 110 may, therefore, initially attribute the high error metrics 175 to cyber-physical components 102 within the error group. In some embodiments, the RS agent 110 may be further configured to further determine and/or refine the cause and/or source of error metrics 175, which may comprise excluding cyber-physical components 102 as potential causes of high error metrics 175 (e.g., refining the error group and/or error region), determining anomaly weights for the identified cyber-physical components 102, the anomaly weights indicating a likelihood that respective cyber-physical components 102 are a cause of the high error metrics 175, determining error weights for the identified cyber-physical components 102, the error weights indicating error metrics 175 attributable to respective cyber-physical components 102, and/or the like. The RS agent 110 may be configured to communicate overlapping state keys 160, evaluate error metrics 175 of the overlapping state keys 160, and determine and/or refine the cause of error metrics 175 based on the evaluation.

The RS agent 110 may be configured to adapt communication of state keys 160 in accordance with a cyber-physical isolation scheme. Implementing a cyber-physical isolation scheme may comprise the RS agent 110 configuring overlapping state keys 160 to isolate selected cyber regions in a cyber isolation scheme (e.g., isolating cyber components 120, cyber nodes 124, and/or the like). The RS agent 110 may communicate overlapping state keys 160 through isolation CPC paths 108 having same or similar computational and/or physical components 130/140 (same or similar physical process couplings 148), while varying selected portions of the cyber regions thereof (e.g., varying cyber paths 126 thereof). The RS agent 110 may communicate fragments 161 of the overlapping state keys 160 to the same or similar correlators 166, and/or acquire validation data 171 from the same or similar receivers 168. Implementing a cyber isolation scheme may further comprise the RS agent 110 modifying cyber paths 126 of respective state key fragments 161 (and/or corresponding validation data 171) to include and/or omit selected cyber regions, such that communication of the overlapping state keys 160 and/or fragments 161 cover different cyber regions within the overlap region. The RS agent 110 may be further configured to evaluate error metrics 175 of the overlapping state keys 160 (and/or state key fragments 161), detect changes in the error metrics 175, and attribute the detected changes to particular cyber regions (in accordance with differences between the cyber components 120 included and/or omitted in the respective isolation CPC paths 108). Implementing a cyber-physical isolation scheme may further comprise the RS agent isolating physical control regions in a physical isolation scheme (e.g., isolating computational and/or physical components 130/140), which may comprise the RS agent 110 communicating overlapping state keys 160 through isolation CPC paths 108 having same or similar cyber regions (e.g., cyber paths 126), while varying the physical control regions thereof (e.g., varying the computational and/or physical components 130/140, and/or physical couplings 148 through which state key fragments 161 are transmitted and/or corresponding validation data 171 are received). Implementing a physical isolation scheme may comprise the RS agent 110 communicating state key fragments 161 of the overlapping state keys 160 through the same or similar cyber paths 126, while modifying the physical control regions to include and/or exclude selected physical components 140 and/or communicate validation data 171 by, across, and/or through different physical processes 150 and/or physical process attributes 152. The RS agent 110 may be further configured to evaluate error metrics 175 of the overlapping state keys 160, detect changes in the error metrics 175, and attribute the detected changes to particular computational and/or physical components 130/140 (in accordance with the components 130/140 included in and/or excluded from the respective isolation CPC paths 108).

In one embodiment, the RS agent 110 may detect a state key 160 having an anomalous error metric 175 and, in response, may adapt one or more subsequent state keys 160 to overlap with the region covered thereby (e.g., may generate state keys 160 that overlap the region covered by state key 160 having the anomalous error metric 175). The RS agent 110 may communicate the overlapping state keys 160 through isolation paths 108 that, as disclosed above, may vary with respect to inclusion and/or exclusion of particular cyber-physical components 102. The RS agent 110 may configure the isolation paths 108 in accordance with a cyber and/or physical isolation scheme, as disclosed above. The RS agent 110 may evaluate error metrics 175 of the overlapping state keys 160. In response to an overlapping state key 160 having low error metrics 175, the RS agent 110 may indicate that cyber-physical components 102 covered thereby may be excluded as potential causes of the anomalous error metric 175 (may be removed from the error group and/or region). In response to an overlapping state key 160 having a high error metric 175, the RS agent 110 may indicate that cyber-physical components 102 covered thereby, that have not already been excluded as potential causes of the anomaly, may be retained as a potential cause of the anomaly. The RS agent 110 may continue adapting communication of subsequent state keys 160 to further refine the potential causes of the anomaly, which may comprise communicating the subsequent state keys 160 through isolation CPCE paths 108 configured to selectively include and/or exclude cyber-physical components 102 remaining in the error group and/or region. The RS agent 110 may continue iteratively adapting communication of subsequent state keys 160 until the cause of the anomaly is determined, no further refinement is possible (per the cyber-physical topology 115 of the control system 101), and/or another termination criterion is satisfied.

Although particular examples of modifications to communication of state keys 160 and/or state key fragments 161 are described herein, the disclosure is not limited in this regard and may be adapted to utilize any suitable modifications and/or adaptations to the communication of the state keys 160, state key fragments 161, and/or the like, to determine, indicate, and/or isolate cyber-physical components 102, cyber nodes 124, cyber paths 126, and/or physical process couplings 148 of the control system 101 such that error metrics 175 (and/or portions thereof) may be attributed thereto.

In some embodiments, in response to detection of an anomalous metric 175, the RS agent 110 may be configured to: identify cyber-physical components 102 that are potential causes of the anomaly, and determine anomaly weights for the identified cyber-physical components 102, the anomaly weights indicating a likelihood that respective cyber-physical components 102 are a cause of the anomaly. The identified cyber-physical components 102 may comprise cyber-physical components 102 covered by the state key 160 having the anomalous error metric 175. The RS agent 110 may be configured to assign initial anomaly weights to each identified cyber-physical component 102, communicate overlapping state keys 160 through isolation CPC paths 108 (according to a cyber and/or physical isolation scheme, as disclosed above), and adjust the anomaly weights of respective cyber-physical components 102 based on the error metrics 175 determined in response to communication of the overlapping state keys 160 through the respective CPC paths 108. The RS agent 110 may be configured to increase the anomaly weights of cyber-physical components 102 covered by overlapping state keys 160 having higher error metrics 175, and decrease the anomaly weights of cyber-physical components 102 covered by overlapping state keys 160 having lower error metrics 175. Alternatively, or in addition, the RS agent 110 may be configured to increase the anomaly weights of cyber-physical components 102 included in isolation CPC paths 108 associated with higher fragment errors 177, and decrease the anomaly weights of cyber-physical components 102 included in isolation CPC paths 108 associated with lower fragment errors 177. The RS agent 110 may continue iteratively refining the anomaly weights of the identified cyber-physical components 102 until a termination criterion is satisfied (e.g., until the anomaly weights have converged, the anomaly weights of respective cyber-physical components 102 diverge sufficiently to enable the cause of the anomalous error metrics 175 to be determined, no further refinement is possible, and/or another criterion is satisfied).

In some embodiments, the RS agent 110 may be configured to determine error weights for cyber-physical components 102 within particular regions of the control system 101. The RS agent 110 may configure a series of state keys 160 for communication through a specified region of the control system 101, the specified region comprising one or more CPCE 105 (e.g., a series of overlapping state keys 160). The RS agent 110 may be further configured to communicate the series of overlapping state keys 160 (and/or fragments 161 thereof) through respective isolation CPC paths 108, and may configure the isolation CPC paths 108 to selectively include and/or exclude particular cyber-physical components 102.

In some embodiments, the RS agent 110 may compare error metrics 175 of respective overlapping state keys 160 (and/or respective isolation CPC paths 108). The comparing may comprise detecting deltas between the error metrics 175 (error metric Δ values). In response to detecting an error metric Δ that exceeds an error Δ threshold, the RS agent 110 may be configured to adapt subsequent state keys 160 to determine a cause and/or source of the error metric Δ (e.g., by identifying cyber-physical components 102 that are potential causes of the error metric Δ, and implementing cyber and/or physical isolation scheme(s) to refine and/or weight the identified cyber-physical components 102 as potential sources of the error metric Δ, as disclosed herein). In some embodiments, the RS agent 110 may configure a series of state keys 160 for communication through a specified overlap region. RS agent 110 may configure the overlapping state keys 160 for communication through respective isolation CPC paths 108 (e.g., in accordance with a cyber-physical isolation scheme, as disclosed herein). The RS agent 110 may be configured to determine error weights for respective cyber-physical components 102 within the specified region based on, inter alia, error metrics 175 of the series of overlapping state keys 160. The RS agent 110 may be configured to determine error weights for respective cyber-physical components 102 within a specified region by, inter alia: assigning an initial error weight to each cyber-physical component 102 within the specified region (and/or assigning previously determined error weights thereof), communicating a series of overlapping state keys 160 through respective isolation CPC paths 108 of the specified region, evaluating error metrics 175 of the series of state keys 160, and adjusting the error weights assigned to the respective cyber-physical components 102 in accordance with the resulting error metrics 175. The RS agent 110 may be configured to increase the error weights of cyber-physical components 102 covered by state keys 160 having higher error metrics 175, and decrease the error weights of cyber-physical components 102 covered by state keys 160 having lower error metrics 175. Alternatively, or in addition, the RS agent 110 may be configured to increase the error weights of cyber-physical components 102 included in isolation CPC paths 108 having higher fragment errors 177, and decrease the error weights of cyber-physical components 102 included in isolation CPC paths 108 having lower fragment errors 177. The RS agent 110 may continue iteratively refining the error weights until a termination criterion is satisfied, as disclosed herein.

The RS agent 110 may determine cyber-physical health metadata 180 for the control system 101 based on, inter alia, the error metrics 175 determined for state keys 160 communicated through the control system 101, as disclosed herein. The RS agent 110 may be further configured to determine cyber-physical health metrics for respective regions of the control system 101 based on, inter alia, error metrics 175 corresponding to state keys 160 that cover the respective regions. The RS agent 110 may determine cyber-physical health metrics for respective CPCE 105 of the control system 101 based on, inter alia, error metrics 175 of state keys 160 that cover the respective CPCE 105. The RS agent 110 may be further configured to determine cyber-physical health metrics for respective CPC paths 108, which may be based on, inter alia, error metrics 175 corresponding to communication of state keys 160 (and/or state key fragments 161) through the respective CPC paths 108 (e.g., fragment errors 177). The RS agent 110 may be further configured to determine cyber-physical health metrics for particular cyber-physical components 102 (e.g., groups of one or more cyber-physical components 102, CPCE sections 109, and/or the like) based on, inter alia, error metrics of state keys 160 and/or state key fragments 161 by, across, and/or through the particular cyber-physical components 102. The RS agent 110 may be further configured to determine cyber-physical health metrics for particular cyber-physical components 102 (and/or groups thereof) based on, inter alia, anomalies attributed thereto, anomaly weights and/or error weights determined therefor, and/or the like, as disclosed herein. The RS agent 110 may be further configured to determine confidence metrics pertaining to the cyber-physical state metadata 111 (and/or respective thereof). The confidence metrics may be based on, inter alia, the error metrics 175 determined for state keys 160 communicated through the control system 101, as disclosed herein. The RS agent 110 may be further configured to determine confidence metrics for cyber-physical state metadata 111 corresponding to respective CPCE 105, CPC paths 108, CPCE sections 109, cyber-physical components 102, and/or the like, based on, inter alia, the error metrics 175, anomalies attributed thereto, anomaly weights and/or error weights, as disclosed above. The RS agent 110 may be further configured to determine and/or monitor cyber-physical health of the control system 101 (and respective regions thereof), which may comprise determining cyber health metrics 282 indicating and physical health metrics 284. The cyber health metrics 282 may be configured to indicate a cyber health of the control system 101 (and/or respective regions thereof). The cyber health metrics 282 may indicate a health of cyber communication within the control system 101, a health of the CS network 122 (and/or respective portions thereof), a health of respective cyber components 120, a health of respective cyber nodes 124, and/or the like. The cyber health metrics 282 may be based on, inter alia, error metrics 175 of state keys 160 communicated through CPC paths 108 of the control system 101 (e.g., error metrics 175 for state keys 160 communicated through respective cyber components 120, cyber nodes 124, portions of the CS network 122, and/or the like, as disclosed herein). The cyber health metrics 282 may further incorporate confidence metrics determined for the cyber state metadata 220 (and/or portions thereof), as disclosed herein.

The physical health metrics 284 may be configured to indicate a physical health of the control system 101 (and/or respective regions thereof). The physical health metrics 284 may indicate a health of respective CPCE 105, CPC paths 108, computational components 130, physical components 140, physical control couplings 148, PPV 155, and/or the like. The physical health metrics 284 may be based on, inter alia, error metrics 175 of state keys 160 communicated through physical control sections 149 of respective CPCE 105 of the control system 101 (e.g., error metrics 175 for validation data 171 communicated by, across, and/or through physical control couplings 148 of the control system 101, as disclosed herein). The physical health metrics 284 may further incorporate confidence metrics determined for the cyber state metadata 220 (and/or portions thereof), as disclosed herein.

Figure 4:
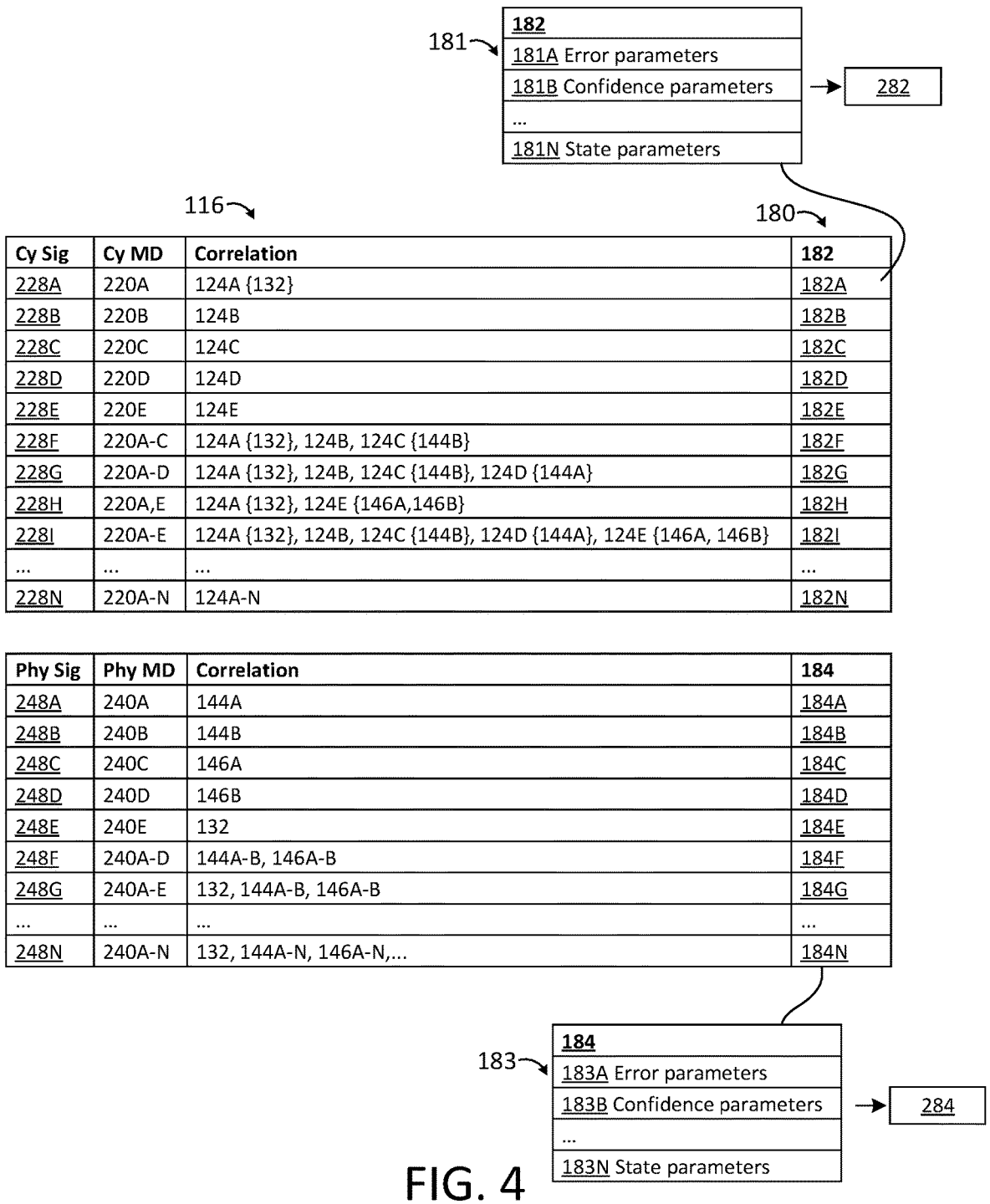
FIG. 4 is a schematic block diagram illustrating embodiments of data structures comprising cyber-physical health metadata, as disclosed herein.

FIG. 4 depicts embodiments of cyber-physical health metadata 180, as disclosed herein. In the FIG. 4 embodiment, the cyber-physical health metadata 180 may be included in the cyber-physical topology 115 and/or signature schema 116. The cyber-physical health metadata 180 maintained by the RS agent 110 may comprise cyber health metadata 182 and physical health metadata 184. The RS agent 110 may be configured to maintain cyber health metadata 182 and/or physical health metadata 184 corresponding to respective portions of the control system 101 as illustrated in FIG. 1B. The RS agent 110 may be configured to determine cyber and/or physical health metadata 182, 184 pertaining to the CPCE 105A and/or respective portions thereof. The RS agent 110 may be configured to determine cyber health metadata 182 pertaining to respective regions of the cyber section 129A of CPCE 105A (respective cyber regions, such as respective cyber components 120, cyber nodes 124, cyber paths 126, and/or the like).

The cyber health metadata 182 may comprise information pertaining to the cyber health of the control system 101 (and/or respective regions thereof), as disclosed herein. The cyber health metadata 182 may comprise one or more cyber health parameters 181, which may include, but are not limited to: error parameters 181A, confidence parameters 181B, state parameters 181N, and/or the like. The error parameters 181A may comprise information pertaining to error metrics 175 associated with communication of state keys 160 (and/or state key fragments 161) by, across, and/or through respective cyber regions of the control system 101 (e.g., respective cyber components 120, cyber nodes 124, cyber paths 126, cyber sections 129, and/or the like). The error parameters 181A may comprise a distribution of error metrics 175 (e.g., average, mean, minimum, maximum, variance, deviation, and/or the like), an age of the error metrics 175 (e.g., a time since error metrics 175 corresponding to the cyber region were acquired by the RS agent 110), error metrics 175 and/or weights attributed to respective cyber regions (e.g., error weights determined for respective cyber region), anomalies attributed to respective cyber regions (e.g., anomaly weights determined for respective cyber regions), and/or the like. The confidence parameters 181B may indicate a confidence in cyber state metadata 220 pertaining to respective cyber regions. The confidence parameters 181B may quantify a confidence that the cyber state metadata 220 corresponding to respective cyber regions accurately represents the cyber states thereof. The confidence parameters 181B may be based on, inter alia, the error parameters 181A of the cyber health metadata 182, as disclosed herein. The state parameters 181N may indicate a health of the cyber state of the control system 101 (and/or respective cyber regions thereof). The state parameters 181N may be based on the error and/or confidence parameters 181A/181B. Alternatively, or in addition, the state parameters 181N may be determined by, inter alia, comparing a cyber state of the control system 101 (e.g., the cyber state metadata 220 and/or respective portions thereof) to predetermined cyber behaviors (e.g., cyber state baselines, cyber state profiles, and/or the like, as disclosed in further detail herein). The state parameters 181N may indicate a degree to which the cyber state of the control system 101 (and/or respective cyber regions thereof) correspond to "healthy" cyber states and/or behaviors. Alternatively, or in addition, the state parameters 181N may indicate a degree to which the cyber state of the control system 101 (and/or respective cyber regions thereof) correspond to "unhealthy" cyber states and/or behaviors. Determining the state parameters 181N may comprise comparing cyber state metadata 220 to corresponding cyber state characteristics corresponding to respective "healthy" and/or "unhealthy" cyber behaviors (e.g., "healthy" and/or "unhealthy" cyber state baselines 552, as disclosed in further detail herein). The state parameters 181N may, therefore, indicate whether the cyber state of the control system 101 (as indicated by the cyber state metadata 220) corresponds to "healthy" cyber behavior or to "unhealthy" cyber behavior indicative of cyber-attack, cyber compromise, and/or the like. The cyber health metadata 182 may further comprise one or more cyber health metrics 282, which may be configured to quantify a cyber health of the control system 101 (and/or respective cyber regions thereof). The cyber health metrics 282 may be based on, inter alia, health parameters 181A-N of the cyber health metadata 182, as disclosed herein. The cyber health metrics 282 may be inversely proportional to the error parameters 181A and/or proportional to the confidence parameters 181B. Alternatively, or in addition, the cyber health metrics 282 may be inversely proportional to error, differences, and/or distances between the cyber state metadata 220 and "healthy" cyber behaviors and/or proportional to error, differences, and/or distances between the cyber state metadata 220 and "unhealthy" cyber behaviors (as indicated by the state parameters 181N).

The physical health metadata 184 may comprise information pertaining to the physical health of the control system 101 (and/or respective regions thereof), as disclosed herein. The physical health metadata 184 may comprise one or more physical health parameters 183, which may include, but are not limited to: error parameters 183A, confidence parameters 183B, state parameters 183N, and/or the like, as disclosed herein. The error parameters 183A may comprise information pertaining to error metrics 175 associated with communication of state keys 160 (and/or state key fragments 161) by, across, and/or through respective physical control regions of the control system 101 (e.g., through respective physical control sections 149). The error parameters 183A of the physical may comprise a distribution of error metrics 175 (e.g., average, mean, minimum, maximum, variance, deviation, and/or the like), an age of the error metrics 175 (e.g., a time since error metrics 175 corresponding to the physical region were acquired by the RS agent 110), error metrics 175 and/or weights attributed to respective physical control regions (e.g., error weights determined for respective physical control regions), anomalies attributed to respective physical control regions (e.g., anomaly weights determined for respective physical regions), and/or the like. The confidence parameters 183B may indicate a confidence in physical state metadata 240 pertaining to respective physical control regions. The confidence parameters 183B may quantify a confidence that the physical state metadata 240 corresponding to respective physical control regions accurately represents the physical states thereof. The confidence parameters 183B may be based on, inter alia, the error parameters 183A of the physical health metadata 184, as disclosed herein. The state parameters 183N may indicate a health of the physical state of the control system 101 (and/or respective physical control regions thereof). The state parameters 183N may be based on the error and/or confidence parameters 183A/183B. Alternatively, or in addition, the state parameters 183N may be determined by, inter alia, comparing a physical state of the control system 101 (e.g., the physical state metadata 240 and/or respective portions thereof) to predetermined physical control behaviors (e.g., physical state baselines, physical state profiles, and/or the like, as disclosed in further detail herein). The state parameters 183N may indicate a degree to which the physical state of the control system 101 (and/or respective physical control regions thereof) correspond to "healthy" physical states and/or behaviors. Alternatively, or in addition, the state parameters 183N may indicate a degree to which the physical state of the control system 101 (and/or respective physical control regions thereof) correspond to "unhealthy" physical behaviors. Determining the state parameters 183N may comprise comparing physical state metadata 240 to corresponding physical state characteristics corresponding to respective "healthy" and/or "unhealthy" physical states and/or behaviors (e.g., "healthy" and/or "unhealthy" physical state baselines 554, as disclosed in further detail herein). The state parameters 183N may, therefore, indicate whether the physical state of the control system 101 (as indicated by the physical state metadata 220) corresponds to "healthy" physical behavior or to physical behavior indicative of a component attack, a physical attack, compromise of computational and/or physical components 130/140, a physical failure mode, and/or the like. The physical health metadata 184 may further comprise one or more physical health metrics 284, which may be configured to quantify a physical health of the control system 101 (and/or respective physical regions thereof). The physical health metrics 284 may be based on, inter alia, physical health parameters 183A-N, as disclosed herein. The physical health metrics 284 may be inversely proportional to the error parameters 183A and/or proportional to the confidence parameters 183B. Alternatively, or in addition, the physical health metrics 284 may be inversely proportional to error, differences, and/or distances between the physical state metadata 240 and "healthy" physical behaviors and/or proportional to error, differences, and/or distances between the physical state metadata 240 and "unhealthy" physical behaviors (as indicated by the state parameters 183N).

As illustrated in FIG. 4, the RS agent 110 may be configured to maintain a cyber health metadata 182 (and cyber health metrics 282) pertaining to the control system 101 (and/or respective cyber regions thereof. The RS agent 110 may be configured to determine and/or maintain a plurality of cyber health metadata 182A-N (and corresponding cyber health metrics 282), including cyber health metadata 182A-E pertaining to the health of cyber regions comprising respective cyber nodes 124A-E of CPCE 105A (and corresponding cyber state metadata 220A-E), cyber health metadata 182F-H pertaining to the health of cyber regions corresponding to respective cyber paths 126 of CPCE 105A (and corresponding cyber state metadata 220A-C, 220A-D, and 220A-E, respectively), and a cyber health metadata 182L pertaining to the health of the cyber section 129 of CPCE 105A (and corresponding cyber state metadata 220A-E). The RS agent 110 may be further configured to determine cyber health metadata 182N pertaining to substantially all of the cyber components 120 of the control system 101 (and corresponding to substantially all of the cyber state metadata 220A-N).

The RS agent 110 may be further configured to maintain physical health metadata 184 (and physical health metrics 284) pertaining to the control system 101 (e.g., respective physical control regions thereof). FIG. 4 illustrates embodiments of physical health metadata 184 pertaining to CPCE 105A, including: physical health metadata 184A-E pertaining to sensor devices 144A-B and actuator devices 146A-B, respectively (and corresponding physical state metadata 240A-D); physical health metadata 184E pertaining to the controller 132 (and corresponding physical state metadata 240E); physical health metadata 184F pertaining to the health of physical components 140 of CPCE 105A (e.g., sensor and actuator devices 144A-B/146A-B, and corresponding physical state metadata 240A-D); and physical state metadata 184G pertaining physical control section 149A (e.g., the controller 132, sensor devices 144A-B, actuator devices 146A-B, PPV 155A, and corresponding physical state metadata 240A-E). The RS agent 110 may be further configured to determine physical health metadata 184N pertaining to substantially all of the computational and/or physical components 130/140 of the control system 101, and which may correspond to substantially all of the physical state metadata 240A-N.

Referring back to FIG. 2, the RS agent 110 may be further configured to implement mitigation operations based on and/or in response to the error metrics 175, the determined cyber-physical health metadata 180, cyber health metadata 182, cyber health metrics 282, physical health metadata 184, physical health metrics 284, and/or the like. The mitigation operations may include, but are not limited to: providing access to the cyber-physical state of the control system 101 (and/or respective regions thereof), providing access to the cyber state metadata 220 (and/or respective portions thereof), providing access to the physical state metadata 240 (and/or respective portions thereof), providing access to the error metrics 175 determined by the RS agent 110, providing access to the cyber-physical health metadata 180 determined by the RS agent 110 (and/or respective portions thereof), providing access to cyber health metadata 182 and/or cyber health metrics 282 determined by the RS agent 110, providing access to physical health metadata 184 and/or physical health metrics 284 determined by the RS agent 110, and/or the like. Providing access may comprise generating notifications pertaining to one or more of the: cyber-physical state of the control system 101, cyber-physical state metadata 111, cyber state metadata 220, physical state metadata 240, cyber-physical health metadata 180, cyber health metadata 182, cyber health metrics 282, physical health metadata 184, physical health metrics 284, and/or the like. Generating notifications may comprise sending notifications to one or more users and/or end-points within the CS network 122 and/or one or more external networks (e.g., computing devices, RTU, HMI devices, automation controllers 134, and/or the like).

The mitigation operations may comprise generating notifications in response to error metrics 175 that exceed one or more error thresholds. Generating notifications pertaining to an error metric 175 that exceeds a determined error threshold and/or an anomalous error metric 175, may comprise generating a notification identifying the error metric 175, a CPCE 105 associated with the error metric 175, the cyber-physical component(s) 102 identified as the cause and/or source of the error metric 175, cyber-physical components 102 identified as potential causes and/or sources of the error metric 175 (and/or respective weights assigned thereof), and/or the like. Generating notifications pertaining to a cyber and/or physical confidence metric may comprise generating a notification identifying the confidence metric, a CPCE 105 associated with the confidence metric, cyber-physical state metadata 111 corresponding to the confidence metric, cyber-physical components 102 associated with the cyber-physical state metadata 111, and/or the like.

The mitigation operations may comprise generating notifications in response to cyber health metadata 182, cyber health parameters 181, and/or cyber health metrics 282 failing to satisfy one or more cyber health thresholds. Alternatively, or in addition, the mitigation operations may comprise generating notifications in response to determining that the cyber state of the control system 101 (and/or a region thereof) corresponds to particular cyber behaviors (e.g., "healthy" cyber behavior, "unhealthy" cyber behavior, or the like as indicated by state metrics 181N of the cyber health metadata 184, as disclosed herein). Generating notifications pertaining to cyber health metrics 282 may comprise generating a notification identifying the cyber health metrics 282, a cyber region corresponding to the cyber health metrics 282 (e.g., cyber components 120, cyber nodes 124, CPCE 105, and/or the like), cyber behavior associated with the cyber health metrics 282 (e.g., "healthy" or "unhealthy" cyber behavior corresponding to the cyber health metrics 282), and/or the like.

The mitigation operations may comprise generating notifications in response to physical health metadata 184, physical health parameters 181, and/or physical health metrics 284 failing to satisfy one or more physical health thresholds. Alternatively, or in addition, the mitigation operations may comprise generating notifications in response to determining that the physical state of the control system 101 (and/or a region thereof) corresponds to particular physical behaviors (e.g., "healthy" physical behavior, "unhealthy" physical behavior, or the like as indicated by state metrics 181N of the physical health metadata 184, as disclosed herein). Generating notifications pertaining to physical health metrics 284 may comprise generating a notification identifying the physical health metrics 284, a physical control region corresponding to the physical health metrics 284 (e.g., computational components 130, physical components 140, CPCE 105, and/or the like), physical behavior associated with the physical health metrics 284 (e.g., "healthy" or "unhealthy" physical behavior corresponding to the physical health metrics 284), and/or the like.

The mitigation operations may comprise operations to modify CPCE 105, CPC paths 108, respective cyber-physical components 102, and/or the like. The mitigation operations may comprise modifying CPCE 105 associated with high error metrics 175, anomalies, poor cyber health metrics 282, poor physical health metrics 284, "unhealthy" cyber behavior, "unhealthy" physical behavior, and/or the like. The mitigation operations may comprise slowing control function(s) of respective CPCE 105, halting control function(s) of the CPCE 105, modifying the control function(s) of the CPCE 105 (e.g., implementing a "safe mode" of the CPCE 105), isolating the CPCE 105 from other CPCE 105 of the control system 101, isolating cyber-physical components 102 of the CPCE 105 from other cyber-physical components 102 of the control system 101, and/or the like. The RS agent 110 may implement mitigation operations in accordance with the security policy 211. The security policy 211 may be maintained within memory and/or storage resources of the RS agent 110 (e.g., in volatile memory, non-volatile memory, non-transitory storage, and/or the like). Alternatively, or in addition, the RS agent 110 may be communicatively coupled to the security policy 211 maintained within memory and/or storage resources of another cyber-physical component 102 of the control system 101. The security policy 211 may define triggers for respective mitigation operations, as disclosed herein (e.g., may define error thresholds, health thresholds, confidence thresholds, and/or the like). The security policy 211 may further comprise information pertaining to notifications (e.g., specify contents of the notifications, recipients and/or end points for the notifications, and/or the like). The security policy 211 may further define mitigation operations to implement in response to particular error metrics 211, health metrics, confidence metrics, and/or the like. The security policy 211 may specify modifications to respective CPCE 105, control functions, the cyber-physical topology 115 (to isolate respective CPCE 105 and/or cyber-physical components 102), and/or the like.

Figure 5A:
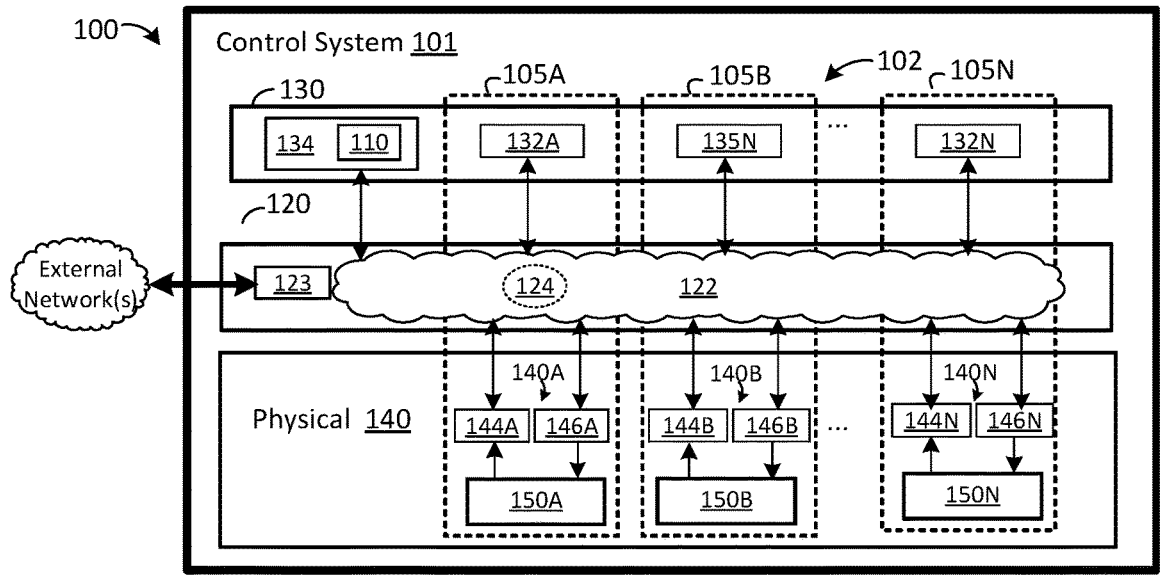
FIG. 5A is a schematic block diagram of another embodiment of a resilient security agent, as disclosed herein.
Figure 5A:
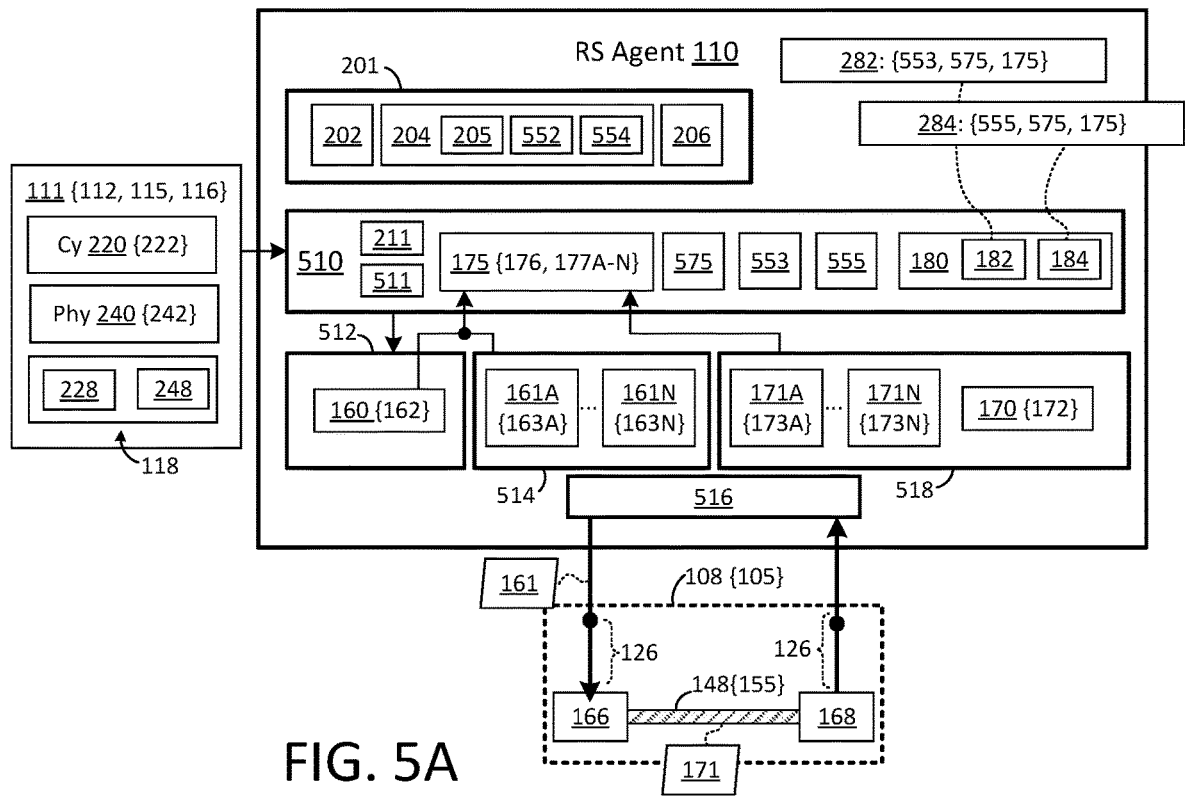
Figure 5B:
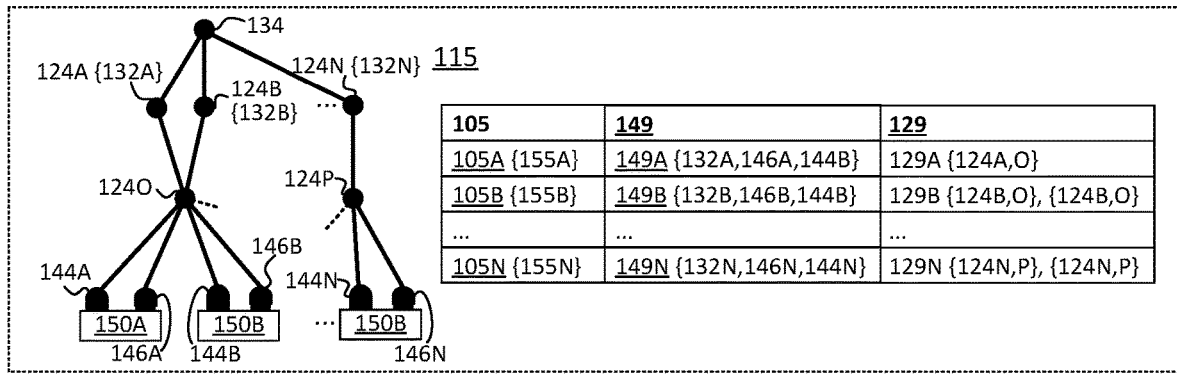
FIG. 5B is a schematic block diagram illustrating embodiments of data structures comprising embodiments of cyber-physical state metadata, as disclosed herein.

FIG. 5A is a schematic block diagram of another embodiment of a cyber-physical system 100 comprising a resilient security agent 110, as disclosed herein. In the FIG. 5A embodiment, the cyber-physical system 100 comprises a control system 101, as disclosed herein. The control system 101 of the FIG. 5A embodiment may comprise a plurality of CPCE 105A-N, each CPCE 105A-N comprising respective computational components 130 (e.g., respective controllers 132A-N) configured to implement a control function pertaining to respective PPV 155A-N (e.g., respective physical processes 150A-N) by use of respective physical components 140A-N (e.g., respective sensor and actuator devices 144A-N/146A-N). FIG. 5B is a schematic diagram of data structures configured to represent and/or correspond to a cyber-physical topology 115 of the control system 101. As illustrated in FIG. 5A, the controllers 132A-N may comprise and/or correspond to respective cyber nodes 124A-N. The controllers 132A-N may be coupled to physical components 140 through cyber nodes 1240 and 124P, respectively. The physical components 140A-N may be operatively coupled to PPV 155A-N of respective CPCE 105A-N (sensor and actuator devices 144A-N/146A-N may be operatively coupled to physical processes 150A-N of CPCE 105A-N, respectively). In FIG. 5B, the cyber-physical topology 115 may further comprise information pertaining to respective CPCE 105A-N, including information pertaining to the physical control sections 149A-N and/or cyber sections 129A-N, thereof, as disclosed herein. The physical control sections 149A-N may identify: the computational components 130 configured to implement control functions of the respective CPCE 105A-N (e.g., controllers 132A-N), and the physical components 140 by which the control functions are realized (e.g., actuator devices 146A-N and sensor devices 144A-N, respectively). The cyber sections 129A-N comprise information pertaining to cyber paths 126 between respective controllers 132A-N and the physical components 140A-N thereof (e.g., cyber paths coupling each controller 132A-N to respective actuator devices 146A-N and sensor devices 144A-N).

FIG. 5B further illustrates embodiments of cyber-physical state metadata 111 configured to, inter alia, comprise, define, and/or characterize a cyber-physical state of the control system 101, as disclosed herein. The cyber-physical state metadata 111 may comprise cyber state metadata 220 and/or physical state metadata 240, as disclosed herein. The cyber state metadata 220 may be configured to comprise, define, and/or characterize respective regions of the control system 101 (e.g., respective cyber-physical components 102, cyber nodes 124, cyber paths 126, CPCE 105, CPC paths 108, and/or the like). In the FIG. 5B embodiment, the cyber-physical state metadata 111 may comprise: cyber state metadata 220A-N, and cyber state metadata 220N-P, which may comprise cyber state parameters 222 configured to characterize the state of respective cyber nodes 124A-P, as disclosed herein (individual cyber state parameters 222 not shown in FIG. 5B to avoid obscuring details of the illustrated embodiments). Alternatively, or in addition, the cyber state metadata 220 may comprise physical state metadata 220Z configured to characterize a cyber state of the cyber-physical system 100 (e.g., may correspond to a cyber state of the CS network 122 and/or the cyber nodes 124 coupled thereto). The cyber-physical state metadata 111 may further comprise: physical state metadata 240AA-ND, which may comprise physical state parameters 242 configured to characterize the physical state of respective actuator devices 146A-N, sensor devices 144A-N, and/or controllers 132A-N, as disclosed herein (individual physical state parameters 242 not shown in FIG. 5B to avoid obscuring details of the illustrated embodiments). Alternatively, or in addition, the physical state metadata 240 may comprise an entry 240ZZ configured to characterize a physical state of the control system 101 (e.g., may correspond to a physical state of the computational and/or physical components 130/140 of the control system 101).

FIG. 5B further illustrates embodiments of a signature schema 116, which may comprise and/or define CPSS 118 pertaining to respective regions of the control system 101 (e.g., respective cyber regions, physical control regions, and/or the like). The signature schema 116 may define cyber state signatures 228A-P, which may characterize a state of cyber communication at respective cyber nodes 124A-P, and may be derived from respective cyber state metadata 220A-P, as disclosed herein. The signature schema 116 may further define cyber signatures 228Q-S, which may be configured to characterize a cyber state of respective cyber sections 129A-N of CPCE 105A-N (may be derived from cyber state metadata 220 characterizing the cyber state of cyber nodes 124 included in the respective cyber sections 129A-N). Alternatively, or in addition, the signature schema 116 may comprise a cyber state signature 228Z, which may be configured to characterize a cyber state of the cyber-physical system 100.

The signature schema 116 may further define physical state signatures 248AA-AC, which may be configured to characterize portions of the physical control section 149A of CPCE 105A (e.g., characterize a physical state of the actuator device 146A, sensor device 144A, and controller 132A, respectively). The signature schema 116 may further define a physical state signature 248AD, which may be configured to characterize a state of the physical control section 149A of CPCE 105A, as disclosed herein. The signature schema 116 may define similar physical state signatures 248BA-BN through 248NA-ND, which may be configured to characterize a physical state of respective physical control sections 149B-N of CPCE 105B-N. Alternatively, or in addition, the signature schema 116 may define a physical state signature 240ZZ, which may be configured to characterize a physical state of the control system 101.

Referring to FIG. 5A, the control system 101 may comprise an RS agent 110, as disclosed herein. The RS agent 110 may comprise and/or be communicatively coupled to cyber-physical state metadata 111, as disclosed herein. In the FIG. 5A embodiment, the RS agent 110 may be configured for operation on an automation controller 134, which may be communicatively coupled to the controllers 132A-N of respective CPCE 105A-N. In some embodiments, the automation controller 134 may be configured to control and/or manage the CPCE 105A-N, as disclosed herein (e.g., may configure the controllers 132A-N to implement one or more higher-level functions pertaining to the physical processes 150A-N).

The signature schema 116 may further comprise and/or correspond to cyber-physical health metadata 180 determined by the RS agent 110. As illustrated in FIG. 5B, the RS agent 110 may be configured to maintain cyber-physical health metadata 180 corresponding to respective cyber and/or physical regions of the control system 101 (e.g., at a same and/or similar granularity as the signature schema 116). The disclosure is not limited in this regard, however, and may be adapted to maintain cyber and/or physical health metadata 182/184 in any suitable data structure and/or at any suitable level of granularity. The granularity at which the cyber-physical health metadata 180 are maintained may correspond to, inter alia, the cyber-physical topology 115 (may correspond to a granularity at which the RS agent 110 is capable of assigning error metrics 175 to respective cyber-physical components 102, as disclosed herein).

In the FIG. 5A embodiment, the RS agent 110 may comprise a security module 510, which may be configured to, inter alia, communicate state keys 160 through selected CPCE 105A-N of the control system 101, determine error metrics 175 corresponding to communication of the respective state keys 160, and/or determine cyber-physical health metadata 180 for the control system 101 based on, inter alia, the determined error metrics 175, as disclosed herein. The RS agent 110 may further comprise a key module 512 configured to generate state keys 160, a parse module 514 configured to parse state keys 160 into respective state key fragments 161A-N, a communication module 516 configured to communicate the state key fragments 161A-N through selected regions of the control system 101, and a reconstruction module 514 configured to generate validation keys 170 corresponding to the state keys 160 by use of validation data 171A-N acquired in response to communication of the fragments 161A-N thereof.

The RS agent 110 may comprise, be embodied by, and/or be coupled to computing resources 201, which may include, but are not limited to: processing resources 202, storage resources 204, cyber communication resources 206, and/or the like, as disclosed herein. Portions of the RS agent 110 (e.g., one or more of the modules 510, 512, 514, 516, 518, and/or portion(s) thereof) may be embodied by the computing resources 201 (e.g., may comprise and/or be embodied by hardware components of the computing resources 201, such as one or more processors, programmable logic, and/or the like). Alternatively, or in addition, one or more of the modules 510, 512, 514, 516, and/or 518 of the RS agent 110 may be embodied as computer-readable instructions 205 stored within the non-transitory storage resources 206, as disclosed herein.

The security module 510 may be configured to communicate state keys 160 in accordance with a security policy 211. The security policy 211 may comprise and/or specify any suitable information pertaining to operation of the RS agent 110 including, but not limited to: a rate at which state keys 160 are communicated through the control system 101 (e.g., a frequency, period, and/or the like), thresholds (e.g., error thresholds, key error thresholds, fragment error thresholds, health thresholds, confidence thresholds, and/or the like), a mitigation policy, and/or the like.

The security policy 211 may comprise and/or correspond to a coverage schema 511. The coverage schema 511 may comprise a scheme for coverage of the control system 101 (and/or respective portions thereof) by respective state keys 160 and/or the CPKD 162 of the respective state keys 160. The coverage schema 511 may define criteria by which regions through which respective state keys 160 (and/or the fragments 161A-N thereof) are to be communicated may be selected. The coverage schema 511 may further define criteria by which regions of the control system 101 to be covered by CPKD 162 of the respective state keys 160 may be selected (e.g., a configuration of CPSS 118 and/or cyber-physical state parameters 112 from which to derive the CPKD 162 of respective state keys 160). The coverage schema 511 may further comprise a schema for parsing state keys 160 into respective fragments 161A-N, communicating the state key fragments 161A-N and/or corresponding validation data 171A-N through selected CPE paths 108, reconstructing the validation data 171A-N to form respective validation keys 170, and so on. In some embodiments, the security module 510 may adapt the coverage schema 511 in accordance with a cyber-physical state of the control system 101, error metrics 175 of respective state keys 160, and/or the like. The security module 510 may be configured to, inter alia, adapt the coverage schema 511 in accordance with an isolation scheme, as disclosed herein (e.g., to implement a cyber-physical isolation scheme). The security module 510 may be configured to adapt the coverage schema 511 to determine and/or refine potential causes of high error metrics, determine anomaly weights for respective regions of the control system 101 (e.g., respective cyber-physical components 102), characterize a cyber-physical health of selected regions of the control system 101, determine error weights for respective regions of the control system 101 (e.g., respective cyber-physical components 102), and/or the like, as disclosed herein.

The key module 512 may be configured to generate state keys 160 (e.g., may comprise a state key generator, as disclosed herein). The key module 512 may be configured to generate state keys 160 configured to cover selected regions of the control system 101 (e.g., state keys 160 configured for communication through CPC paths 108 of the selected regions). The key module 512 may be further configured to generate state keys 160 comprising CPKD 160 configured to cover selected regions of the control system 101 (e.g., CPKD 162 comprising cyber key data and/or physical key data configured to cover selected regions of the control system 101). The key module 512 may be configured to generate state keys 160 in response to commands from the security module 510, which may be configured to specify regions to be covered by the state keys 160 and/or specify CPKD 162 to include in the state keys 160 (e.g., cyber-physical state parameters 112, CPSS 118, and/or the like).

The parse module 514 may be configured to parse state keys 160 into a plurality of fragments 161A-N, as disclosed herein. The parse module 514 may be configured to parse the state keys 160, such that the fragments 161A-N thereof pertain to corresponding CPKD fragments 163A-N. The parse module 514 may be configured to parse the state keys 160 in accordance with the cyber-physical state metadata 111, cyber-physical topology 115 and/or signature schema 116 for the control system 101 (e.g., in accordance with a parsing schema 117, as disclosed herein).

The communication module 516 may be configured to monitor and/or cover selected regions of the control system 101, which may comprise communicating state keys 160 (and/or fragments 161A-N thereof) through the selected regions of the control system 101. The communication module 516 may be configured to communicate state keys 160 through CPCE 105 and/or CPC paths 108 specified by the security module 510. The security module 510 may select CPCE 105 and/or CPC paths 108 for communication of respective state keys 160 and/or state key fragments 161A-N in accordance with a key scheme, which may comprise selection criteria by which the security module 510 may select CPCE 105 and/or CPC paths 108. The selection criteria may comprise a weighted criterion, in which CPCE 105A-N are assigned respective weights ($w_i$ comprising the weight assigned to the ith CPCE 105 of CPCE 105A-N). The security module 510 may be configured to select CPCE 105A-N in accordance with the weights assigned thereto (e.g., in a weighted selection, weighted round-robin selection, and/or the like). The security module 510 may be further configured to determine weights for respective CPCE 105A-N based on one or more weighting factors. In some embodiments, the security module 510 may be configured to assign weights to respective CPCE 105A-N, as follows:

$$w_i = W_{pri,i} + W_{err} \cdot e_i + W_{err\_age} \cdot err\_age_i$$

In the expression above, $w_i$ is the weight assigned to the ith CPCE 105 of CPCE 105A-N, and $W_{pri,i}$ may be a weighting factor assigned to the CPCE 105, which may correspond to a relative priority for monitoring of the CPCE 105 compared to others of the CPCE 105A-N. $W_{err}$ may be a weighting and/or scaling factor applied to error metrics 175 and/or error parameters 181A/183A of the CPCE 105 ($e_i$), such that CPCE 105 having higher error metrics 175 and/or error parameters 181A/183A are monitored more frequently than other CPCE 105. $W_{err\_age}$ may be a weighting and/or scaling factor applied to an error age parameter ($err\_age_i$), which may correspond to an age of the error metrics 175 (and/or error parameters 181A/183A) of the CPCE 105 (e.g., a time elapsed since a state key 160 and/or state key fragment 161 was last communicated through the CPCE 105), such that CPCE 105 having higher error age parameters are more likely to be selected than other CPCE 105. Alternatively, or in addition, the security module 510 may be configured to select CPCE 105 and/or CPC paths 108 in accordance with an isolation scheme, as disclosed herein. The security module 510 may be configured to adapt communication of a sequence of state keys 160 (and/or fragments 161A-N thereof) such that resulting error metrics 175 may be attributed to particular cyber and/or physical regions of the control system 101 (e.g., to determine a cause and/or source of high error metrics 175, as disclosed herein).

The communication module 516 may be configured to transmit state key fragments 161A-N through CPCE 105 and/or CPC paths 108 selected by the security module 510, as disclosed herein. Communication of a state key fragment 161 through a CPC path 108 may comprise transmitting the fragment 161 to a selected correlator 166 (e.g., an actuator device 146), and receiving corresponding validation data 171 from a receiver 168 (e.g., a sensor device 144). Communication through a CPC path 108 may comprise communication of validation data 171 corresponding to the state key fragment 161 through a physical control coupling 148 that comprises and/or corresponds to the PPV 155 of the selected CPCE 105 (e.g., a particular physical process 150), as disclosed herein. The communication module 516 may be further configured to acquire validation data 171A-N corresponding to each state key fragment 161A-A, validate message(s) comprising the validation data 171A-N, determine a latency of the validation data 171A-N, synchronize the validation data 171A-N, associate the validation data 171A-N with the state key 160 and/or corresponding CPKD fragments 163A-N thereof, and/or the like, as disclosed herein. The reconstruction module 518 may be configured to generate a validation key 170, validation CPKD 172, and/or validation CPKD fragments 173A-N by use of, inter alia, the acquired validation data 171A-N. The reconstruction module 518 may be configured to generate a cyber-physical reconstruction of the state key 160 (validation key 170) from cyber-physical reproductions (validation data 171A-N) of the respective fragments 161A-N thereof, as disclosed herein.

In the FIG. 5A embodiment, the security module 510 of the RS agent 110 may be further configured to, inter alia, determine error metrics 175 in response to communication of respective state keys 160, as disclosed herein. The error metrics 175 may comprise key errors 176 configured to quantify errors and/or differences between state keys 160 (and/or the CPKD 162 thereof) and corresponding validation keys 170 (and/or the validation CPKD 162 thereof), as disclosed herein. The error metrics 175 may comprise fragment errors 177A-N, which may be configured to quantify errors and/or differences between state key fragments 161A-N (and/or CPKD fragments 163A-N thereof) and corresponding validation data 171A-N (and/or CPKD fragments 163A-N thereof). The security module 510 may be further configured to determine cyber-physical health metadata 180, including cyber health metadata 182 and/or physical health metadata 184 based on, inter alia, the determined error metrics 175, as disclosed herein.

In some embodiments, the security module 510 may be further configured to determine, adapt, and/or modify the coverage schema 511 based on, inter alia, error metrics 175 and/or cyber-physical health metadata 180 pertaining to the control system 101. As disclosed above, the coverage schema 511 may specify a configuration of state keys 160 generated and/or communicated by the RS agent 110. The coverage schema 511 may define a configuration of one or more subsequent state keys 160, sequences of state keys 160, and/or the like. The security module 510 may determine the coverage schema 511 in accordance with, inter alia, the error metrics 175 and/or cyber-physical health metadata 180. In some embodiments, the security module 510 may be configured to determine a source and/or cause of high error metrics 175. The security module 510 may detect error metrics 175 that exceed one or more thresholds in response to communication of an identified state key 160 (and/or fragments 161A-N thereof) through particular CPCE 105A-N. In response, the security module 510 may implement an iterative isolation scheme (e.g., a cyber-physical isolation scheme, as disclosed herein). Each iteration of the isolation scheme may comprise the security module 510 configuring a subsequent state key 160, such that the subsequent state key 160 correlates and/or relates to the identified state key 160. A state key 160 that correlates and/or relates to a particular state key 160 refers to a state key 160 configured for communication through the same CPCE 105A-N as the particular state key 160 and/or through related CPC paths 108 as the particular state key 160. The security module 510 may configure the subsequent state key 160 to correspond to the identified state key 160 (by use of the coverage schema 511), such that the subsequent state key 160 (and/or fragments 161A-N thereof) is configured for communication through the particular CPCE 105A-N and/or CPC paths 108 corresponding to the identified CPC paths 108. The security module 510 may further configure the subsequent state key 160 for communication through CPC paths 108 that differ from the identified CPC paths 108 (and/or CPC paths 108 of one or more previous iterations) with respect to inclusion/ exclusion of particular cyber-physical components 102. In one embodiment, the iterative isolation scheme may comprise identifying a group of cyber-physical components 102 that are potential causes of the high error metrics 175, which may comprise determining cyber-physical components 102 comprising the particular CPCE 105A-N. Each iteration of the isolation scheme may comprise configuring a state key 160 for communication through the particular CPCE 105A-N via a CPC path 108 that includes and/or excludes one or more of the cyber-physical components of the group, evaluating error metrics 175 of the subsequent state key 160, and either removing or retaining respective cyber-physical components 102 within the group based on, inter alia, evaluation of the error metrics 175 (and/or weighting respective cyber-physical components 102 of the group), as disclosed herein. The security module 510 may continue the iterative isolation scheme until the source of the high error metric is determined, no further refinement of the source of the error is possible, and/or other termination criteria have been satisfied. In response to determining the source of a high error metric 175 (and/or determining weights indicating a likelihood that particular cyber-physical components 102 and/or regions are the source of the error), the security module 510 may update the cyber-physical health metadata 180 and/or implement one or more mitigation operations, as disclosed herein.

In some embodiments, the security module 510 may use the coverage schema 511 to generate an isolation sequence (e.g., a sequence of overlapping state keys 160, as disclosed herein). The isolation sequence may be configured, such that differences in the error metrics 175 of respective overlapping state keys 160 thereof may be attributed to particular regions of the control system 101 (e.g., particular cyber-physical components 102, cyber nodes 124, cyber paths 126, CPCE 105, CPC paths 108, CPCE sections 109, and/or the like, as disclosed herein). Implementing an isolation sequence may comprise the security module 510 iteratively communicating overlapping state keys 160 through respective isolation CPC paths 108, evaluating the resulting error metrics 175, and attributing differences in the error metrics 175 to particular regions of the control system 101, as disclosed herein. The security module 510 may continue iteratively communicating overlapping state keys 160 until error metrics 175 are attributed to respective regions thereof at a designated level of granularity, no further refinement is possible, and/or other termination criteria are satisfied. Implementing an isolation sequence may further comprise the security module 510 updating the cyber-physical health metadata 180 in accordance with the error metrics 175 attributed to the respective regions of the control system 101, as disclosed herein.

The following is an exemplary isolation sequence comprising state keys 160A-N configured for communication through an overlap region comprising CPCE 105A-N (e.g., overlapping state keys 160A-N).

| 160A {105A, B} | | | | | | | 175A |
|---|---|---|---|---|---|---|---|
| Fragments | In. 126 | 148 | | | | Ret. 126 | 170A: 176A |
| 161AA {105A} | 124A, O | 146A | 150A | 144A | 124O, A | 171AA: 177AA |
| 161AN {105B} | 124B, O | 146B | 150B | 144B | 124O, B | 171BN: 177BN |

| 160A {105A, N} | | | | | | | 175B |
|---|---|---|---|---|---|---|---|
| Fragments | In. 126 | 148 | | | | Ret. 126 | 170B: 176B |
| 161BA {105A} | 124A, O | 146A | 150A | 144A | 124O, A | 171BA: 177BA |
| 161BN {105N} | 124N, P | 146N | 150N | 144N | 124P, N | 171BN: 177BN |

| 160C {105B, N} | | | | | | | 175C |
|---|---|---|---|---|---|---|---|
| Fragments | In. 126 | 148 | | | | Ret. 126 | 170C: 176C |
| 161CA {105B} | 124B, O | 146B | 150B | 144B | 124O, B | 171CA: 177CA |
| 161CN {105N} | 124N, P | 146N | 150N | 144N | 124P, N | 171CN: 177CN |

As illustrated above, fragments 161AA-AN of state key 160A may be configured for communication through CPCE 105A and 105N, respectively; fragments 161BA-BN of state key 160B may be configured for communication through CPCE 105A and 105N, respectively; and so on, with fragments 161CA-CN of state key 160C being communicated through CPCE 105B and 105N, respectively. The resulting error metrics 175A-C may comprise key errors 176A-C, which may indicate error between state keys 160A-N and corresponding validation keys 170A-C, and fragment errors 177AA-CN, which may indicate error between state key fragments 161AA-CN and corresponding validation data 171AA-CN.

The security module 510 may be configured to evaluate the error metrics 175A-N in order to, inter alia, attribute differences therebetween to respective regions of the control system 101, as disclosed herein. In one embodiment, the security module 510 may evaluate key errors 175A-C in order to, inter alia, attribute differences to particular CPCE 105A-N. By way of non-limiting example, key error 176C may be significantly lower than key errors 176A and/or 176B, which may be substantially the same (e.g., key error 176C may be lower than 176A and 176B by $\Delta E$). Based on the coverage schema 511, the security module 510 may determine that the cause of $\Delta E$ is CPCE 105A (since the higher key errors 176A and 176C both include error introduced by CPCE 105C, which is excluded from key error 176C). The security module 510 may also exclude cyber node 124O as a potential cause of the increased error since, inter alia, cyber node 124O is also included in the lower key error 176C. The security module 510 may, therefore, refine the error region and/or error group to components 132A, 144A, and/or 146A. The security module 510 may determine that further refinement is not possible without creation of an alternative physical control coupling 148 for physical process 150A (e.g., a physical control coupling 148 that includes/excludes one or more of the actuator device 146A and/or sensor device 144A). The security module 510 may be further configured to verify that $\Delta E$ is attributable to CPCE 105A by, inter alia, adapting one or more subsequent state keys 160 to include and/or exclude CPCE 105A (and/or the physical control region thereof), and evaluating the resulting error metrics 175, as disclosed herein.

In another embodiment, the security module 510 may determine that each of the key errors 176A-C comprise error attributable to a respective CPCE 105A-N, as follows: $176A=E\{105A\}+E\{105B\}$; $176B=E\{105A\}+E\{105N\}$; and $176C=E\{105B\}+E\{105N\}$. Accordingly, a difference between key errors 176A and 176B may correspond to a difference between $E\{105B\}$ and $E\{105N\}$ ($\Delta BN$), the difference between key errors 176B and 176C may correspond to a difference between $E\{105A\}$ and $E\{105B\}$ ($\Delta AB$), and a difference between key errors 176A and 176C may correspond to a difference between E{105A} and E{105N} (ΔBN). The security module 510 may attribute the determined differences to respective CPCE 105A-N and/or adapt subsequent state keys 160 to verify and/or further refine the determined differences, as disclosed herein. The security module 510 may be further configured to attribute differences between fragment errors 177AA-CN to respective regions of the control system 101 and/or adapt subsequent state keys 160 to verify and/or further refine the determined differences, as disclosed herein.

By way of further example, the security module 510 may configure one or more subsequent state keys 160D-F for communication through respective CPCE 105 of CPCE 105A-N, as follows:

| 160D {105A} | | | | | | 175D | |
|---|---|---|---|---|---|---|---|
| Fragments | In. 126 | 148 | | | Ret. 126 | 170D: 176D | |
| 161DA {105A} | 124A, O | 146A | 150A | 144A | 124O, A | 171DA: 177DA | |
| 161DN {105A} | 124A, O | 146A | 150A | 144A | 124O, A | 171DN: 177DN | |
| 160E {105B} | | | | | | 175E | |
| Fragments | In. 126 | 148 | | | Ret. 126 | 170E: 176E | |
| 161EA {105B} | 124B, O | 146B | 150B | 144B | 124P, B | 171EA: 177EA | |
| 161EN {105B} | 124B, O | 146B | 150B | 144B | 124P, B | 171EN: 177EN | |
| 160F {105B, N} | | | | | | 175F | |
| Fragments | In. 126 | 148 | | | Ret. 126 | 170F: 176F | |
| 161FA {105N} | 124N, P | 146N | 150N | 144N | 124P, N | 171FA: 177FA | |
| 161FN {105N} | 124N, P | 146N | 150N | 144N | 124P, N | 171FN: 177FN | |

As illustrated above, fragments 161DA-FN of state keys 160D-F may be communicated through same and/or similar CPC paths 108 through respective CPCE 105A-N. Accordingly, the resulting key errors 170F-E may correspond to communication error through the respective CPCE 105A-N and differences between key errors 170F-E and key errors 170A-C may be attributable to respective CPCE 105A-N, as disclosed herein. Moreover, differences in fragment errors 177DA-DN, 177EA-EN, and/or 177FA-FN of the respective state keys 160D-F may be attributable to individual cyber-physical components 102 of the CPCE 105A-N, as disclosed herein.

In some embodiments, the security engine 510 may be further configured to determine cyber-physical state confidence (CPSC) metrics 575, which may be configured to, inter alia, quantify a confidence in the accuracy of the cyber-physical state metadata 111 (and/or respective portions thereof). The CPCS metrics 575 may be based on, inter alia, error metrics 175 determined for respective state keys 160. As disclosed above, the error metrics 175 may quantify a degree to which CPDK 162 is modified during communication through respective CPC paths 108. The error metrics 175 may, therefore, indicate the likelihood that cyber and/or physical state information acquired from cyber-physical components 102 of respective CPC paths 108 is accurate (e.g., accurately represents the actual, current cyber and/or physical state of the control system 101 and/or respective regions thereof). The security engine 510 may determine CPSC metrics 575 to be inversely proportional to the error metrics 175. The security engine 510 may determine CPSC metrics 575 for respective portions of the cyber-physical state metadata 111. The security engine 510 may determine CPSC metrics 575 for regions of the control system 101 based on, inter alia, error metrics 175 of state keys 160 covering the respective regions. The security engine 510 may determine CPSC metrics 575 for cyber regions of the control system 101 (e.g., cyber state metadata 220 configured to characterize a state of respective cyber components 120, cyber nodes 124, cyber paths 126, and/or the like) based on, inter alia, error metrics 175 corresponding to communication of respective state key fragments 161 (and/or corresponding validation data 171) by, across, and/or through the respective cyber regions. The security engine 510 may determine CPSC metrics 575 for physical control regions of the control system 101 (e.g., physical state metadata 240 configured to characterize a state of respective computational component 130, physical components 140, physical control couplings 148, PPV 155, and/or the like) based on, inter alia, error metrics 175 corresponding to communication of respective state key fragments 161 (and/or corresponding validation data 171) by, across, and/or through the respective physical control regions.

As disclosed above, the security module 510 may be configured to determine cyber-physical health metadata 180 for the control system 101 (and/or respective regions thereof), which may be based on error metrics 175 determined for respective state keys 160, as disclosed herein. The security module 510 may be further configured to incorporate CPSC metrics 575 into the cyber-physical health metadata 180, which may indicate, inter alia, a confidence that the cyber-physical state metadata 111 accurately represents the cyber-physical state of the control system 101. The security module 510 may be configured to incorporate CPSC metrics 575 to the cyber health metadata 182, the incorporating comprising indicating a determined confidence that the cyber state metadata 220 accurately represents the cyber state of the controls system 101 (and/or respective regions thereof). The security module 510 may be further configured to incorporate CPSC metrics 575 into the cyber health metadata 182, the incorporating comprising indicating a determined confidence that the physical state metadata 240 accurately represents the physical state of the controls system 101 (and/or respective regions thereof).

In some embodiments, the security engine 510 may further configured to evaluate and/or monitor the cyber-physical state metadata 111 (and/or respective portions thereof). The security module 510 may be configured to determine cyber state metrics 553 corresponding to evaluation of the cyber state of the control system 101 (as indicated by the cyber state metadata 220), and physical state metrics 555 corresponding to evaluation of the physical state of the control system 101 (as indicated by the physical state metadata 240).

Determining the cyber state metrics 553 may comprise the security module 510 applying one or more cyber state evaluation rules to the cyber state metadata 220. As used herein, a "cyber state evaluation rule" (CSER) refers to criteria and/or computer-readable instructions by which the security module 510 may evaluate specified cyber state characteristics. As used herein, a "cyber state characteristic" may comprise and/or correspond to the cyber state metadata 220, one or more cyber state parameters 222, one or more cyber state signatures 228, portion(s) thereof, and/or the like. A CSER may comprise any means for evaluating specified cyber state characteristics including, but not limited to: an expression, a regular expression, a mathematical expression, a logical expression, a comparison, a mathematical comparison, an inequality, linear programming (LP) logic, non-LP logic, and/or the like. The cyber state metrics 553 may indicate CSER evaluated by the security module 510, identify successfully validated CSER, identify CSER evaluation failures (and/or cyber-physical components 102 associated with the CSER evaluation failures), specify scores resulting from evaluation of respective CSER, and/or the like. By way of non-limiting example, a CSER may specify that the messages-per-sender at specified cyber nodes 124 be lower than one or more thresholds. Evaluation of the CSER may comprise comparing cyber state characteristics of the specified cyber nodes 124 to one or more thresholds (e.g., comparing messages-per-sender cyber state parameters 222 of the specified cyber nodes 124 to the thresholds). Alternatively, evaluation of the CSER may comprise determining a CSER score corresponding to the messages-per-sender characteristics of the specified cyber nodes 124. By further non-limiting example, the cyber state metrics 553 may indicate whether the specified cyber nodes 124 satisfy the CSER, identify cyber nodes 124 having messages-per-sender cyber state parameters 222 that are near to and/or exceed one or more of the thresholds, and/or specify CSER evaluation scores for the respective cyber nodes 124.

In some embodiments, determining the physical state metrics 555 may comprise the security module 510 applying one or more physical state evaluation rules. As used herein, a "physical state evaluation rule" (PSER) refers to computer-readable instructions by which the physical state evaluator 1252 may evaluate specified characteristics of the physical state 1202 of the control system 101 (evaluate one or more physical state characteristics). As used herein, a "physical state characteristic" may comprise and/or correspond to the physical state metadata 240, one or more physical state parameters 242, one or more physical state signatures 248, portion(s) thereof, and/or the like. Alternatively, or in addition, a physical state characteristic and/or PSER may correspond to a physical control coupling 148 and/or physical control metadata 249 (e.g., may correspond to a relationship between physical components 140 and one or more PPV 155 as defined in, inter alia, physical control metadata 249, as disclosed herein). A PSER may comprise any means for evaluating specified physical state characteristics, as disclosed herein (e.g., criteria, instructions, expressions, and/or the like). The physical state metrics 555 may indicate PSER evaluated by the security module 510, identify successfully validated PSER, identify PSER evaluation failures (and/or cyber-physical components 102 associated with the PSER evaluation failures), specify scores corresponding to evaluation of respective PSER, and/or the like.

By way of non-limiting example, a PSER may specify that a controller 132 should cause a specified actuator device 146 to open a circuit breaker in response to current measurements acquired by a specified sensor device 144 exceeding a current threshold. Evaluating the PSER may comprise determining whether the physical state of the sensor device 144 corresponds to the physical state of the actuator device 146 (and/or vice versa). The evaluating may comprise determining whether current measurements acquired by the sensor device 144 exceed the threshold and, if so, whether the actuator device 146 is configured to open the circuit breaker. Evaluation of the PSER may fail in response to determining that the actuator device 146 failed to open the circuit breaker and/or failed to open the circuit breaker within the threshold time. Alternatively, or in addition, evaluation of the PSER may comprise determining a PSER score corresponding to a time at which the actuator device 146 opened the circuit breaker. In another non-limiting example, a PSER may specify that input electrical power to a motor controlled by a specified actuator device 146 (a motor controller), as measured by a first sensor device 144 coupled to a power source (an electrical power meter), should be within an efficiency threshold of an output mechanical power of the electrical motor system, as measured by a second sensor device 144 (a mechanical power meter). Evaluating the PSER may comprise determining whether the input electrical power acquired from the first sensor device 144 is within the threshold of the output mechanical power acquired from the second sensor device 144, and/or whether the acquired actuation state of the actuator device 146 corresponds to the input electrical power and/or output mechanical power reported by the first/second sensor devices 144. The evaluating may comprise determining that the input electrical power reported by the first sensor device 144 corresponds to the actuation state of the actuator device 146, but that the output mechanical power reported by the second device 144 is lower than the input electrical power by more than the efficiency threshold. In response, the security engine 510 may determine that evaluation of the PSER indicates failure and/or compromise of the first sensor device 144 and/or electrical motor. By further non-limiting example, evaluation of the PSER may comprise correlating the physical states of the first and second sensor devices 144 (e.g., determining that the input electrical power reported by the first sensor device 144 is within the efficiency threshold of the output mechanical power reported by the second sensor device 144), but failing to correlate the physical state of the actuator device 146 (e.g., determining that the actuation state of the actuator device 146 corresponds to an input electrical power and/or output mechanical power different from the physical states of the first and second sensor devices 144). In response, the security engine 510 may determine that evaluation of the PSER indicates failure and/or compromise of the actuator device 146. The CSER and/or PSER may be maintained within the security policy 211 of the RS agent 110, as disclosed herein. Although particular examples of CSER and/or PSER are described herein, the disclosure is not limited in this regard and could be adapted to use, define, and/or evaluate any suitable cyber and/or physical state characteristics pertaining to the control system 101.

In some embodiments, determining the cyber state metrics 553 may comprise the security module 510 comparing the cyber state metadata 220 to one or more cyber state baselines 552. As used herein, a "cyber state baseline" (CSB) 552 refers to a particular type and/or classification of cyber behaviour, cyber state, and/or cyber state metadata 220 of the control system 101 (and/or respective regions thereof). A CSB 552 may comprise and/or correspond to one or more characteristics (cyber state baseline characteristics), which may correspond to respective cyber state characteristics of the control system 101 (e.g., correspond to cyber state metadata 220 and/or portions thereof, as disclosed herein). The features of respective CSB 552 may be extracted, learned, and/or determined from cyber-physical state information, such as cyber-physical state information acquired during operation of the control system 101, cyber-physical state information acquired during simulated operation of the control system 101, training data (e.g., cyber and/or physical state information corresponding to specified cyber and/or physical state classifications), current cyber-physical state metadata 111, previous cyber-physical state metadata, and/or the like. In some embodiments, CSB 552 (and/or the characteristics thereof) may be determined by machine learning techniques (e.g., a classifier, as disclosed in further detail herein). In some embodiments, CSB 552 pertaining to the control system 101 (and/or respective regions thereof) may be maintained within storage resources 204 of the RS agent 110. Alternatively, or in addition, one or more CSB 552 may be maintained by one or more other components 102 of the control system 101.

In some embodiments, the RS agent 110 may comprise and/or be communicatively coupled to a plurality of CSB 552, each comprising features configured to characterize a respective type, class, and/or classification of cyber behavior of the control system 101 (and/or respective regions thereof), including, but not limited to "healthy" CSB 552, "unhealthy" CSB 552, and/or the like. As used herein, a "healthy" CSB 552 refers to a CSB 552 configured to characterize "healthy" cyber states, behaviors, and/or characteristics of the control system 101 (as indicated by the cyber state metadata 220). The RS agent 110 may comprise a plurality of healthy CSB 552, each corresponding to cyber states, behavior, and/or cyber state metadata 220 under different respective conditions (e.g., in different operating modes, under different ambient conditions, different operating times, operation in response to different types of disturbances, and/or the like). As used herein, an "unhealthy" CSB 552 refers to a CSB 552 configured to characterize "unhealthy" cyber states, behaviors, and/or characteristics of the control system 101 (as indicated by the cyber state metadata 220). The RS agent 110 may comprise a plurality of unhealthy CSB 552, each corresponding to cyber states, behaviour, and/or cyber state metadata 220 under different respective cyber threat conditions, which may include, but are not limited to: particular types of cyber-attacks, attacks directed against particular cyber components 120 (e.g., cyber infrastructure, cyber security components 123, cyber nodes 124, and/or the like), compromise of particular cyber components 120, attacks directed against the CS network 122, external cyber-attacks from one or more external networks, injection of adversarial cyber communication into the CS network 122, control manipulation attempts, DoS attacks, dropped packet attacks, flooding traffic attacks, data integrity attacks, replay attacks, MiTM attacks, targeted host attacks, targeted protocol attacks, manipulated traffic attacks, manipulated sensor data attacks (e.g., injection and/or replay of captured sensor data), manipulated control attacks (e.g., injection and/or replay of captured control outputs), and/or the like.

The CSB 552 may further comprise and/or define means by which the features of respective CSB 552 may be compared to the cyber state metadata 220. The cyber baseline characteristics of respective CSB 552 may define values, ranges, thresholds, and/or other criteria for evaluating specific cyber state characteristics of the control system 101 (e.g., specified cyber state metadata 220, cyber state parameters 222, cyber state signatures, portion(s) thereof, and/or the like). The CSB 552 define operations by which errors, differences, and/or distances between the cyber state metadata 220 and respective CSB 552 may be determined. In some embodiments, the CSB 552 may be associated with confidence metrics, which may quantify a confidence in the CSB 552 accurately characterizing particular types of cyber states, behaviors, and/or cyber state metadata 220. The confidence metrics of the CSB 552 may indicate a confidence that healthy CSB 552 accurately characterize healthy cyber behaviors (and are distinguishable from unhealthy CSB 552), and/or the like.

Determining the cyber state metrics 553 for the control system 101 (and/or respective regions thereof) may comprise comparing cyber state metadata 220 pertaining to the control system 101 (and/or respective regions thereof) to one or more CSB 552. The comparing may comprise comparing cyber baseline characteristics of respective CSB 550 to corresponding cyber state characteristics (e.g., cyber state metadata 220, cyber state parameters 222, cyber state signatures 228, portion(s) thereof, and/or the like). The comparing may comprise determining CSB error metrics for respective CSB 552, which may be configured to quantify an error, difference, and/or distance between the cyber state, behaviour, and/or cyber state metadata 220 of the control system 101 (and/or respective regions thereof) and respective CSB 552. The cyber state metrics 553 determined by the security module 510 may comprise and/or correspond to the determined CSB error metrics. In some embodiments, the security module 510 may configure the cyber state metrics 553 to quantify a degree to which the cyber state of the control system 101 (as indicated by the cyber state metadata 220) corresponds to healthy CSB 552, unhealthy CSB 552, and/or the like. The cyber state metrics 553 may indicate a cyber health of the control system 101 (and/or respective regions thereof), which may be inversely proportional to CSB error metrics of health CSB 552 and/or be proportional to CSB error metrics of unhealthy CSB 552. Alternatively, or in addition, the cyber state metrics 553 determined by the security module 510 may identify one or more proximate CSB 552, which may comprise CSB 552 having a closest proximity to the cyber state of the control system 101 (e.g., smallest CSB error metrics) and/or CSB 552 having CSB error metrics that satisfy one or more proximity thresholds. The cyber state metrics 553 may indicate whether the proximate CSB 552 comprise healthy CSB 552, unhealthy CSB 552, and/or the like. The cyber state metrics 553 may further comprise confidence metrics, which may correspond to confidence metrics of the CSB 552, as disclosed herein.

In some embodiments, determining the physical state metrics 550 may comprise the security module 510 comparing the physical state metadata 240 to one or more physical state baselines 554. As used herein, a "physical state baseline" (PSB) refers to a particular type and/or classification of physical behaviour, physical state, and/or physical state metadata 240 of the control system 101 (and/or respective regions thereof). A PSB 554 may comprise and/or correspond to one or more characteristics (physical baseline characteristics), which may correspond to respective physical state characteristics of the control system 101 (e.g., correspond to physical state metadata 240 and/or portions thereof, as disclosed herein). The features of respective PSB 554 may be extracted, learned, and/or determined, as disclosed above (e.g., from cyber-physical state information, cyber-physical state metadata 111, previous cyber-physical state metadata 111, machine learning techniques, and/or the like).

In some embodiments, the RS agent 110 may comprise and/or be communicatively coupled to a plurality of PSB 554, each comprising features configured to characterize a respective type, class, and/or classification of physical behavior of the control system 101 (and/or respective regions thereof), including, but not limited to "healthy" PSB 554, "unhealthy" PSB 554, and/or the like. As used herein, a "healthy" PSB 554 refers to a PSB 554 configured to characterize "healthy" physical states, behaviors, and/or characteristics of the control system 101, physical state metadata 240, and/or the like. The RS agent 110 may comprise a plurality of healthy PSB 554, each corresponding to physical states, behavior, and/or physical state metadata 240 under different respective conditions (e.g., in different operating modes, under different ambient conditions, different operating times, operation in response to different types of disturbances, and/or the like). As used herein, an "unhealthy" PSB 554 refers to a PSB 554 configured to characterize "unhealthy" physical states, behaviors, characteristics, physical failure modes, and/or the like. The RS agent 110 may comprise a plurality of unhealthy PSB 554, each corresponding to physical states, behaviour, and/or physical state metadata 240 under different respective physical threat conditions, which may include, but are not limited to: particular types of physical and/or component attacks, attacks directed against particular computational components 130, compromise of particular computational components 130, attacks directed against particular physical components 140, compromise of particular physical components 140, attacks through the physical environment, physical failure modes, and/or the like. The PSB 554 may be associated with confidence metrics, and may comprise and/or define means by which the features of respective PSB 554 may be to the physical state metadata 240, as disclosed herein.

Determining the physical state metrics 555 for the control system 101 (and/or respective regions thereof) may comprise comparing physical state metadata 240 pertaining to the control system 101 (and/or respective regions thereof) to one or more PSB 554. The comparing may comprise comparing physical baseline characteristics of respective PSB 554 to corresponding physical state characteristics (e.g., physical state metadata 240, physical state parameters 242, physical state signatures 248, portion(s) thereof, and/or the like). The comparing may comprise determining PSB error metrics for respective PSB 554, which may be configured to quantify an error, difference, and/or distance between the physical state, behaviour, and/or physical state metadata 240 of the control system 101 (and/or respective regions thereof) and respective PSB 554. The physical state metrics 555 determined by the security module 510 may comprise and/or correspond to the determined PSB error metrics. In some embodiments, the security module 510 may configure the physical state metrics 555 to quantify a degree to which the physical state of the control system 101 (as indicated by the physical state metadata 240) corresponds to healthy PSB 554, unhealthy PSB 554, and/or the like. The physical state metrics 555 may indicate a physical health of the control system 101 (and/or respective regions thereof), which may be inversely proportional to PSB error metrics of healthy PSB 554 and/or be proportional to PSB error metrics of unhealthy PSB 554. Alternatively, or in addition, the physical state metrics 555 determined by the security module 510 may identify one or more proximate PSB 554, which may comprise PSB 554 having a closest proximity to the physical state of the control system 101 (e.g., smallest PSB error metrics) and/or PSB 554 having PSB error metrics that satisfy one or more proximity thresholds. The physical state metrics 555 may indicate whether the proximate PSB 554 comprise healthy PSB 554, unhealthy PSB 554, and/or the like. The physical state metrics 555 may further comprise confidence metrics, which may correspond to confidence metrics of the PSB 554, as disclosed herein.

As disclosed above, the security engine 510 may be configured to determine cyber health metadata 182 for the control system 101, which may comprise determining cyber health metrics 282 configured to quantify a cyber health of the control system 101 (and/or respective regions thereof). The cyber health metrics 282 may be based on, inter alia, the error and/or confidence metrics 175/575 determined by the security module 510, as disclosed herein. The security engine 510 may be further configured to incorporate the cyber state metrics 553 into the cyber health metrics 282. In some embodiments, the cyber health metrics 282 may be based on, inter alia, evaluation of one or more CSER, as disclosed herein. Alternatively, or in addition, determining the cyber health metrics 282 may comprise comparing the cyber state of the control system 101 (as indicated by the cyber state metadata 220) to one or more CSB 552. The cyber health metrics 282 may, therefore, indicate a degree to which the control system 101 (and/or respective regions thereof) corresponds to healthy CSB 552 and/or differs from unhealthy CSB 552. The cyber health metrics 282 may be further configured to identify one or more proximate CSB 552 and/or indicate whether the proximate CSB 552 comprise healthy and/or unhealthy CSB 552.

The security engine 510 may be further configured to determine physical health metadata 184 for the control system 101, which may comprise determining physical health metrics 284 configured to quantify a physical health of the control system 101 (and/or respective regions thereof). The physical health metrics 284 may be based on, inter alia, the error and/or confidence metrics 175/575 determined by the security module 510, as disclosed herein. The security engine 510 may be further configured to incorporate the physical state metrics 555 into the physical health metrics 284. In some embodiments, the physical health metrics 284 may be based on, inter alia, evaluation of one or more PSER, as disclosed herein. Alternatively, or in addition, the physical health metrics 284 may correspond to comparisons between the physical state of the control system 101 (as indicated by the physical state metadata 240) to one or more PSB 554. The physical health metrics 284 may indicate a degree to which the control system 101 (and/or respective regions thereof) corresponds to healthy PSB 554 and/or differs from unhealthy PSB 554. The physical health metrics 284 may be further configured to identify one or more proximate PSB 554 and/or indicate whether the proximate PSB 554 comprise healthy and/or unhealthy PSB 554.

The security module 510 may be further configured to implement mitigation operations in accordance with the error metrics 175 and/or cyber-physical health metadata 180, as disclosed herein. The mitigation operations may comprise causing the automation controller 134 to modify one or more of the CPCE 105A-N based on error metrics 175 and/or cyber-physical health metadata 180 pertaining thereto. The modifying may comprise slowing one or more of the CPCE 105A-N (reducing a control frequency of one or more of the controllers 132A-N), halting control functions of one or more of the CPCE 105A-N, modifying control functions of one or more of the CPCE 105A-N (e.g., configuring one or more of the controllers 132 to operate in a "safe mode"), isolating one or more of the CPCE 105A-N from the control system 101, and/or the like. The security module 510 may implement mitigation operations in accordance with a security policy 211, as disclosed herein.

The security engine 510 may be further configured to implement mitigation operations in accordance with the cyber and/or physical state metrics 553/555 and/or the corresponding cyber and/or physical health metrics 282/284. The security engine 510 may be configured to implement mitigation operations in response to cyber and/or physical state metrics 553/555 indicating failure of one or more CSER and/or PSER and/or proximity to one or more unhealthy CSB and/or PSB 552/554, as disclosed herein. As disclosed above, the cyber state metrics 553 may identify CSER failures and/or indicate proximity to an unhealthy CSB 552. A CSER failure and/or unhealthy CSB 552 may correspond to a particular type of cyber-attack, cyber-attack directed to particular cyber components 120, compromise of particular cyber components 120 (e.g., one or more cyber nodes 124), and/or the like. The security engine 510 may implement mitigation operations in accordance with the identified CSER failure(s) and/or unhealthy CSB 552, which may comprise operations to: generate notifications corresponding to the failed CSER, generate notifications indicating the unhealthy CSB 552, mitigate cyber-attacks and/or cyber-attack vectors associated with the failed CSER and/or unhealthy CSB 552, which may comprise implementing operations to: mitigate cyber-attacks directed against identified cyber components 120 (e.g., deactivating identified cyber components 120), mitigate compromise of identified cyber components 120 (e.g., filter adversarial messages injected by the identified cyber components 120), shut down identified cyber-attack vectors (e.g., shut down one or more gateways and/or external channels), and/or the like.

The security engine 510 may be further configured to implement mitigation operations in response to failure of one or more PSER and/or proximity to an unhealthy PSB 554. As disclosed above, a PSER failure and/or unhealthy PSB 555 may correspond to a particular type of physical and/or component attack, physical failure mode, and/or the like. Implementing mitigation operations corresponding to a PSER failure and/or proximity to an unhealthy PSB 555 may comprise implementing operations to: generate notifications indicating the failed PSER, generate notifications indicating the unhealthy PSB 554, mitigate attack(s) and/or failure modes associated with the failed PSER and/or unhealthy PSB 554, and/or the like. The mitigation operations may comprise operations to mitigate attacks directed against identified computational components 130 (e.g., reset specified computational components 130, modify control functions implemented thereby, and/or the like), mitigate attacks directed against identified physical components 140 (e.g., ignore sensor data acquired by identified sensor devices 144 and/or deactivate identified actuator devices 146), deactivate physical components 140 and/or PPV 155 operating in identified failure modes, and/or the like.

Figure 6:
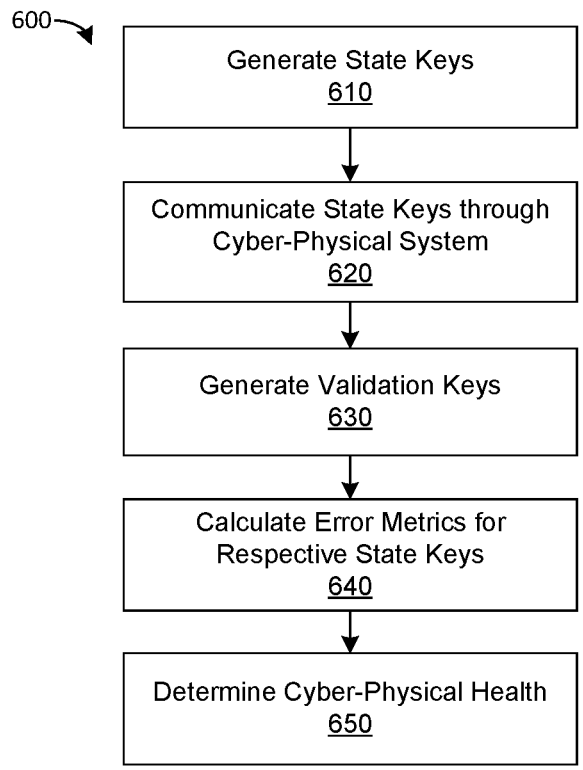
FIG. 6 is a flow diagram of one embodiment of a method for securing a cyber-physical system, as disclosed herein.

FIG. 6 is a flow diagram of one embodiment of a method 600 for securing a cyber-physical system 100, as disclosed herein. Step 610 may comprise generating state keys 160, each state key 160 comprising CPKD 162 comprising and/or corresponding to the cyber-physical state of the control system 101. Step 610 may comprise generating state keys 160 having respective CPKD 162, the CPKD 162 of each state key 160 comprising a respective cyber seed (e.g., cyber state metadata 220, one or more cyber state parameters 222, one or more cyber state signatures 228, portion(s) thereof, ad/or the like) and a respective physical seed (e.g., physical state metadata 240, one or more physical state parameters 242, one or more physical state signatures 248, portion(s) thereof, and/or the like).

Step 620 may comprise communicating the state keys 160 through a cyber-physical system 100, as disclosed herein. Step 620 may comprise communicating the state keys 160 through respective cyber-physical components 102 of the cyber-physical system 100. Step 620 may comprise communicating the state keys 160 through respective CPCE 105 (and/or respective CPC paths 108), as disclosed herein. Step 620 may comprise communicating each state key 160 through one or more cyber paths 126 and one or more physical process couplings 148. Step 620 may comprise sending state keys 160 to selected correlators 166 (e.g., selected actuator devices 146), transmitting corresponding validation data 171 to selected receivers 168 (e.g., selected sensor devices 144), and returning the validation data 171 from the selected receivers 168. Step 620 may comprise selecting CPCE 105 and/or CPC paths 108 for respective state keys 160 in accordance with determined selection criteria. The selection criteria may comprise a weighted selection criterion, as disclosed herein. Step 620 may further comprise acquiring the validation data 171 corresponding to communication of respective state keys 160, as disclosed herein.

Step 630 may comprise generating validation keys 170 corresponding to respective state keys 160. Step 630 may comprise generating validation keys 170 from and/or by use of the acquired validation data 171. Step 630 may comprise producing cyber-physical reconstructions of respective state keys 160, as disclosed herein.

Step 640 may comprise calculating error metrics 175 for respective state keys 160. Step 640 may comprise comparing respective state keys 160 to corresponding validation keys 170 (e.g., validation keys 170 constructed from validation data 171 acquired in response to communication of the respective state keys 160). The error metrics 175 may be calculated in accordance with any suitable technique including, but not limited to: an RMS error, an edit distance, and/or the like.

Step 650 may comprise determining cyber-physical health metadata 180 for the control system based on, inter alia, the error metrics 175 determined at step 640, as disclosed herein. Step 650 may comprise determining cyber health metadata 182, physical health metadata 184, and/or the like, as disclosed herein. Step 650 may comprise determining cyber health and/or confidence metrics pertaining to respective cyber regions of the control system 101 and/or corresponding cyber state metadata 220 (e.g., respective cyber components 120, cyber nodes 124, cyber paths 126, and/or the like). Step 650 may comprise determining physical health and/or confidence metrics pertaining to respective physical control regions of the control system 101 and/or corresponding physical state metadata 240 (e.g., respective cyber components 120, cyber nodes 124, cyber paths 126, and/or the like). Step 650 may further comprise implementing one or more mitigation operations based on the determined error metrics 175 and/or cyber-physical health metadata 180, as disclosed herein. In some embodiments, step 650 may comprise determining cyber and/or physical health metrics 282/284, as disclosed herein. Determining the cyber health metrics 282 may comprise determining and/or evaluating one or more cyber health parameters 181, such as error parameters 181A, confidence parameters 181B, state parameters 181N, and/or the like. Determining the physical health metrics 284 may comprise determining and/or evaluating one or more physical health parameters 183, such as error parameters 183A, confidence parameters 183B, state parameters 183N, and/or the like. Determining state parameters 181N of the cyber state metadata 182 (and/or cyber health metrics 282) may comprise comparing the cyber state of the control system 101 (e.g., cyber state metadata 220) to one or more CSB 552 (e.g., healthy CSB 552, unhealthy CSB 552, cyber baseline characteristics, cyber state projections, cyber state estimates, and/or the like), as disclosed herein. Determining state parameters 183N of the physical state metadata 184 (and/or physical health metrics 284) may comprise comparing the physical state of the control system 101 (e.g., physical state metadata 240) to one or more PSB 554 (e.g., healthy PSB 554, unhealthy PSB 554, physical baseline characteristics, physical state projections, physical state estimates, and/or the like), as disclosed herein. Step 650 may further comprise implementing one or more mitigation operations in accordance with the determined error metrics 175, cyber-physical health metadata 180, cyber health metadata 182, cyber health metrics 282, physical health metadata 184, physical health metrics 284, and/or the like, as disclosed herein.

Figure 7A:
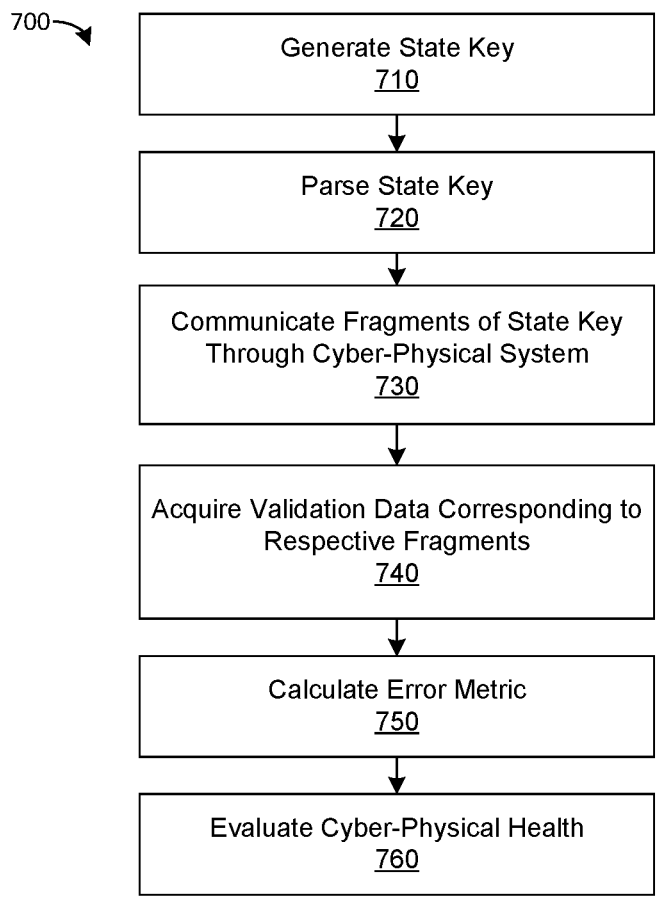
FIG. 7A is a flow diagram of another embodiment of a method for securing a cyber-physical system, as disclosed herein.

FIG. 7A is a flow diagram of another embodiment of a method 700 for securing a cyber-physical control system 101, as disclosed herein. Step 710 may comprise generating a state key 160 comprising CPKD 162 pertaining to a cyber-physical state of the control system 101, as disclosed herein. The CPKD 162 may comprise one or more of a cyber state parameter 222, a cyber state signature 228, a physical state parameter 242, physical state signature 248, and/or the like. Step 710 may comprise generating corresponding CPKD 162 in accordance with a cyber-physical topology 115 and/or signature schema 116, as disclosed herein (e.g., cyber key data and physical key data configured to cover corresponding regions of the control system 101).

Step 720 may comprise parsing the state key 160 into a plurality of fragments 161A-N, each fragment 161A-N comprising a respective CPKD fragment 163A-N. The CPKD fragments 163A-N may comprise: a cyber state parameter 222 and/or cyber state signature 228 (or portion thereof), and a physical state parameter 242 and/or physical state signature 248 (or portion thereof). Step 720 may comprise generating corresponding CPKD fragments 163A-N in accordance with one or more of the cyber-physical topology 115, signature schema 116, and/or key schema, as disclosed herein.

Step 730 may comprise communicating the fragments 161A-N of the state key 160 through selected CPCE 105, which CPCE 105 may be selected in accordance with any suitable selection mechanism and/or criteria, as disclosed herein. Alternatively, or in addition, the CPCE 105 may be selected in accordance with CPKD 162 and/or CPKD fragments 163 covered thereby. Step 730 may comprise communicating each fragment 161A-N of the state key 160 through the selected CPCE 105 via a respective CPC path 108, each CPC path 108 comprising a first cyber path 126, a physical control coupling 148, and a second cyber path 126. Communicating a state key fragment 161A-N through a CPC path 108 may comprise sending the fragment 161A-N to a selected correlator 166 (e.g., a selected actuator device 146), transmitting validation data 171A-N corresponding to the fragment 161A-N by, across, and/or through a PPV 155 of the CPCE 105 (e.g., a physical process 150, physical process attribute 152), and returning the validation data 171A-N from the receiver 168, as disclosed herein.

Step 740 may comprise acquiring validation data 171A-N corresponding to communication of the respective fragments 161A-N of the state key 160, as disclosed herein. Step 740 may further comprise determining validation CPKD fragments 173A-N and/or generating a cyber-physical reconstruction of the state key 160 (a validation key 170) by use of the determined validation CPKD fragments 173A-N.

Step 750 may comprise determining error metrics 175 for the state key 160. Step 750 may comprise determining a key error 176 by, inter alia, comparing the state key 160 to the validation key 170 (and/or comparing respective CPKD 162 to corresponding validation CPKD 172). Step 750 may further comprise determining respective fragment errors 177A-N by, inter alia, comparing respective state key fragments 161A-N to corresponding validation data 171A-N (and/or comparing respective CPKD fragments 163A-N to corresponding validation CPKD fragments 173A-N).

Step 760 may comprise determining cyber-physical health metadata 180 for the control system based on, inter alia, the error metrics 175 determined at step 750, as disclosed herein. Step 760 may comprise determining cyber health metrics 282, physical health metrics 284, and/or the like. Step 760 may further comprise evaluating one or more CSER and/or comparing a cyber state of the control system 101 (and/or respective regions thereof) to one or more CSB 552, as disclosed herein. Step 760 may further comprise evaluating one or more PSER and/or comparing a physical state of the control system 101 (and/or respective regions thereof) to one or more PSB 554, as disclosed herein. Step 760 may further comprise implementing one or more mitigation operations based on the determined error metrics 175, cyber-physical health metadata 180, cyber health metrics 282, and/or physical health metrics 284, as disclosed herein.

Figure 7B:
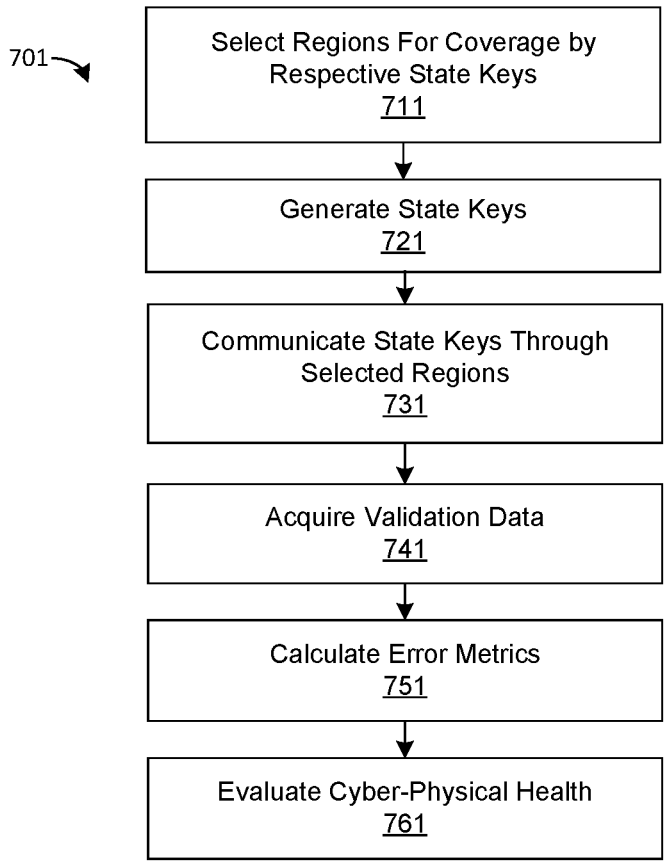
FIG. 7B is a flow diagram of one embodiment of a method for securing a cyber-physical system by communicating state keys through selected regions of a cyber-physical system, as disclosed herein.

FIG. 7B is a flow diagram of one embodiment of a method 701 for securing a cyber-physical system by communicating state keys 160 through selected regions of a cyber-physical system 100, as disclosed herein. Step 711 may comprise selecting regions to be covered by respective state keys 160. Step 711 may comprise selecting the regions based on one or more of a random selection, pseudorandom selection, a round-robin selection, an adaptive selection (to ensure adequate coverage of the control system 101), a weighted selection (to increase monitoring of venerable and/or sensitive portions of the control system 101), a deterministic selection (e.g., selection based on an isolation scheme, as disclosed herein), and/or the like. In some embodiments, step 711 may comprise a selection scheme configured to distribute coverage of regions of the control system 101 108 (e.g., may comprise a round-robin selection scheme). The selection scheme of step 711 may be configured to evenly distribute coverage of respective CPCE 105 and/or CPCE paths 108 of the control system 101. Alternatively, the selecting of step 711 may be configured to bias coverage of designated regions of the control system 101 (e.g., increase coverage of regions assigned higher priorities over regions assigned lower priorities). In some embodiments, the selecting of step 711 may be configured to bias selection based on characteristics of the regions (e.g., increase coverage of regions exhibiting higher error metrics 175). Step 711 may comprise implementing a weighted selection scheme (e.g., a weighted random, pseudo random, and/or round-robin selection scheme). Step 711 may comprise weighting respective regions of the control system 101, as disclosed herein. The weighting may be based on one or more of: a priority assigned to the respective regions, error metrics 175 associated with the respective regions, an age of the error metrics 175, confidence metrics of cyber-physical state metadata 111 corresponding to the respective regions, an age of the confidence metrics, cyber-physical health metadata 180 pertaining to the respective regions, and/or the like.

Step 721 may comprise generating the respective state keys 160. Step 721 may comprise generating the respective state keys 160 in accordance with the regions selected at step 711. Step 721 may comprise generating CPKD 162 for the respective state keys 160, such that the CPKD 162 of each state key 160 is configured to cover the selected region of the state key 160. Alternatively, step 721 may comprise generating CPKD 162 for the respective state keys 160 independently of the selection of step 711, such that the CPKD 162 of the respective state keys 160 is independent of the region of the control system 101 through which the respective state keys 160 (and/r fragments 161 thereof) are communicated. Step 721 may comprise selecting regions of the control system 101 to be covered by the CPKD 162 of the respective state keys 160 using any suitable selection criteria, as disclosed herein.

Step 731 may comprise communicating the state keys 160 through the regions of the control system 101 selected for the state keys 160 at step 711. Communicating a state key 160 may comprise splitting the state key 160 into a plurality of fragments 161A-N, and communicating each fragment 161A-N through the selected region of the state key 160. In some embodiments, step 731 may comprise communicating each fragment 161A-N through the selected region via a respective CPE path 108. Step 731 may comprise selecting CPE paths 108 in accordance with a selection mechanism, as disclosed herein. Step 731 may comprise selecting CPE paths 108 for the fragments 161A-N to ensure coverage of the selected region (e.g., to cover different CPE paths 108 through the selected region, cover different cyber-physical components 102 of the region, cover different cyber paths 126, cover different physical control couplings 148, and/or the like).

Step 741 may comprise acquiring validation data 171 corresponding to communication of the respective state keys 160 through the selected regions of the control system 101, and step 751 may comprise determining corresponding error metrics 175, as disclosed herein. Step 761 may comprise determining cyber-physical health metadata 180 for the control system 101 (and/or the selected regions thereof) based on, inter alia, the determined error metrics 175, as disclosed herein. Step 761 may further comprise determining cyber-physical health metadata 180 comprising: cyber health metadata 182, cyber health parameters 181, cyber health metrics 282, physical health metadata 184, physical health parameters 183, and/or physical health metrics 284, as disclosed herein. Step 761 may comprise implementing mitigation operations in accordance with the determined error metrics 175 and/or cyber-physical health metadata 180, as disclosed herein.

Figure 8:
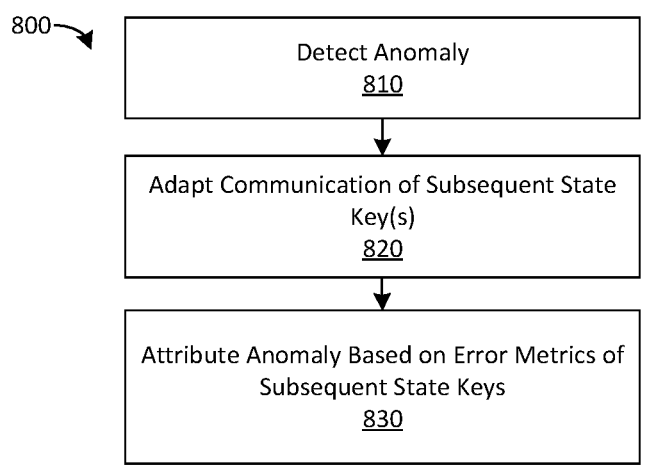
FIG. 8 is a flow diagram of one embodiment of a method for determining a source of anomalous error metrics by a resilient security agent, as disclosed herein.

FIG. 8 is a flow diagram of another embodiment of a method 800 for securing a cyber-physical system 100, as disclosed herein. Step 810 may comprise detecting an anomalous error metric 175. Step 810 may comprise detecting an error metric 175 that exceeds one or more error thresholds (e.g., a key error 176 and/or fragment errors 177A-N exceeding respective error thresholds). Step 810 may correspond to communication of a state key 160, and the detection of the anomaly may correspond to calculation of error metrics 175 of the state key 160 by, inter alia, comparing the state key 160 (and/or CPKD 162 thereof) to a cyber-physical reconstruction of the state key 160 (a corresponding validation key 170 and/or validation CPKD 172, as disclosed herein). Step 810 may further comprise updating cyber-physical health metadata 180 to, inter alia, associate the anomalous error metric with the CPCE 105 and/or CPC path 108 through which the state key 160 (and/or fragments 161 thereof) was communicated.

Step 820 may comprise adapting communication of one or more subsequent state keys 160 to, inter alia, isolate a source of the detected anomaly. Step 820 may comprise configuring communication of the subsequent state key(s) 160 in accordance with a cyber-physical isolation scheme, as disclosed herein. Step 820 may comprise configuring the subsequent state keys 160 for communication through an overlap region, the overlap region corresponding to a region covered by the state key 160 associated with the anomalous error metric 175. Step 820 may comprise configuring the subsequent state keys 160 for communication through isolation CPC paths 108 through the overlap region that vary with respect to inclusion and/or exclusion of designated cyber-physical components 102, as disclosed herein.

Step 830 may comprise attributing the anomaly based on, inter alia, error metrics 175 of the subsequent state keys 160, as disclosed herein. Step 830 may comprise determining that the error metric 175 of a subsequent state key 160 is nominal and, in response, preventing the detected anomaly from being attributed to cyber-physical components 102 included in communication of the subsequent state key 160. Alternatively, or in addition, step 830 may comprise determining that the error metric 175 of a subsequent state key 160 is high and/or anomalous and, in response, attributing the detected anomaly to designated cyber-physical components 102 included in communication of the subsequent state key 160. Step 830 may comprise iteratively adapting communication of subsequent state keys 160 until a termination criterion is satisfied (e.g., a source of the detected anomaly is determined, no further refinement is possible, and/or the like, as disclosed herein). Step 830 may further comprise updating the cyber-physical health metadata 180 to, inter alia, associate the detected anomaly with the determined source(s) thereof and/or implementing one or more mitigation operations in response to detection and/or attribution of the anomaly, as disclosed herein.

Figure 9:
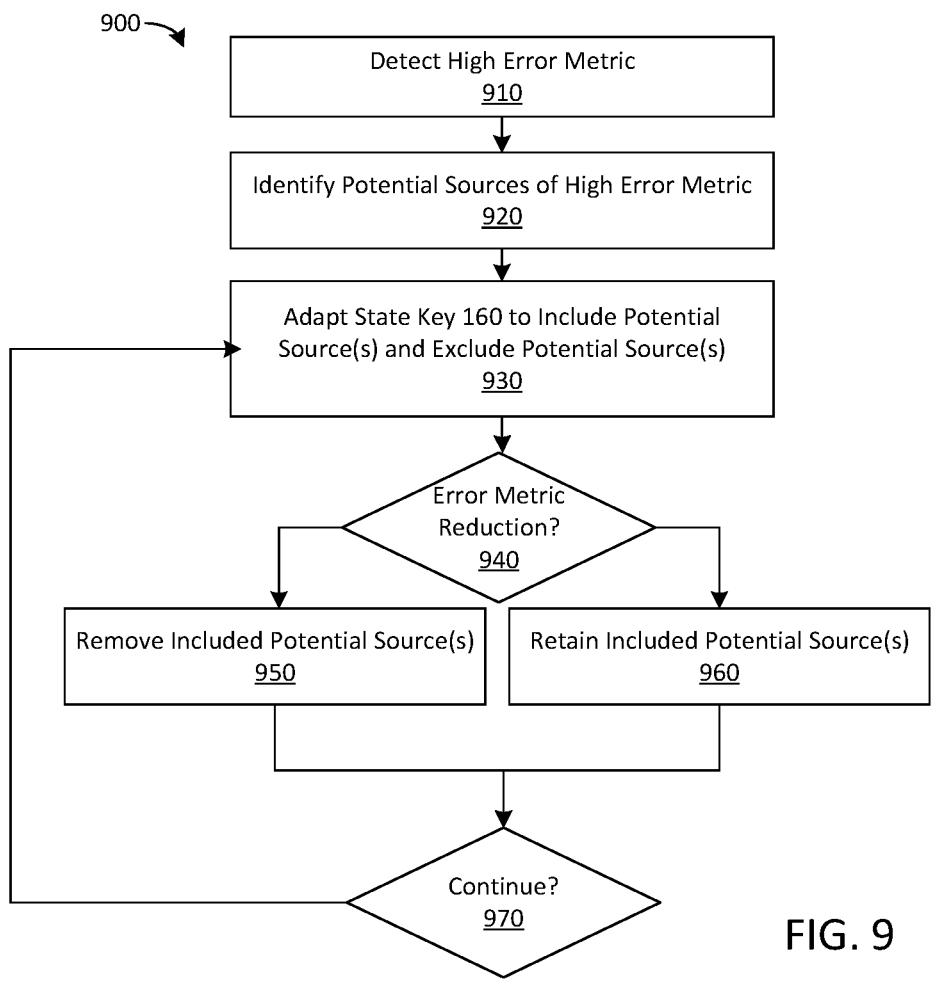
FIG. 9 is a flow diagram of another embodiment of a method for determining a source of high error metrics by a resilient security agent, as disclosed herein.

FIG. 9 is a flow diagram of another embodiment of a method 900 for securing a cyber-physical system 100, as disclosed herein. Step 910 may comprise detecting a state key 160 having a high error metric 175, as disclosed herein (e.g., a state key 160 having an error metric 175 that exceeds one or more error thresholds). Step 910 may further comprise implementing one or more mitigation operations in response to detection of the anomaly, as disclosed herein.

Step 920 may comprise identifying potential sources of the high error metric, as disclosed herein. Step 920 may comprise identifying an error region, the error region comprising the region of the control system 101 covered by the state key 160. The identifying may comprise identifying CPCE 105 through which the state key 160 was communicated, CPC paths 108 through which fragments 161A-N of the state key 160 were communicated, and/or the like. Step 920 may further comprise identifying an error group comprising potential sources of the anomaly. The error group may initially comprise cyber-physical components 102 within the determined error region (e.g., cyber-physical components 102 through which the state key 160 and/or fragments 161 thereof were communicated). Step 920 may further comprise assigning an initial anomaly weight to each of the identified cyber-physical components 102, as disclosed herein.

Step 930 may comprise adapting communication of a subsequent state key 160 to include one or more of the potential source(s) and exclude one or more of the potential source(s), as disclosed herein. Step 930 may comprise configuring the subsequent state key 160 to overlap with the error region (e.g., configure the subsequent state key 160 for communication through a group of CPCE 105 that include one or more of the identified CPCE 105 and/or exclude one or more of the identified CPCE 105). Step 930 may comprise configuring the subsequent state key 160 such that fragments 161A-N thereof are communicated through respective isolation CPC paths 108 that vary from the identified CPC paths 108 by, inter alia, excluding one or more of the identified potential sources (e.g., including/excluding one or more of the identified cyber-physical components 102, as disclosed herein).

Step 940 may comprise determining whether the error metric 175 of the subsequent state key 160 was reduced relative to the high error metric 175 (e.g., whether the error metric 175 is indicative of nominal operation). If the error metric 175 has been reduced, the flow may continue at step 950; otherwise, the flow may continue at step 960.

Step 950 may comprise removing the potential source(s) included in communication of the subsequent state key 160 as potential sources of the high error metric 175 (e.g., removing corresponding cyber-physical components 102 from the error group and/or error region). Step 950 may further comprise retaining potential source(s) excluded from the subsequent state key 160 as potential sources of the high error metric 175 (e.g., retaining the corresponding cyber-physical components 102 in the error group and/or error region). Alternatively, or in addition, step 950 may comprise decreasing an anomaly weight of respective cyber-physical components 102 covered by the subsequent state key 160, as disclosed herein.

Step 960 may comprise retaining the included potential sources, as disclosed herein (e.g., retaining the corresponding cyber-physical component 102 in the error group and/or error region). Alternatively, or in addition, step 960 may comprise increasing an anomaly weight of respective cyber-physical components 102 covered by the subsequent state key 160, as disclosed herein.

Step 970 may comprise determining whether to continue refining the potential sources of the high error metric 175. Step 970 may comprise determining: whether the source of the high error metric has been identified (e.g., whether the potential sources have been refined to a threshold number of cyber-physical components 102, a sufficiently narrow region of the control system 101, and/or the like), whether further refinement of the potential sources is possible (e.g., based on the cyber-physical topology 115 of the control system 101), and/or whether another termination criterion has been satisfied (e.g., whether a threshold number of iterations have been completed). Step 970 may further comprise updating cyber-physical health metadata 180 to indicate potential sources of the anomaly and/or indicate an anomaly weight assigned to respective cyber-physical components 102, as disclosed herein. Step 970 may comprise implementing one or more mitigation operations in response to determination of the source of the anomaly (and/or refinement of the potential sources thereof), as disclosed herein. If the determination at step 970 is to continue, the flow may continue at step 930, where another subsequent state key 160 may be adapted to include and/or exclude remaining potential sources of the high error metric 175, as disclosed herein.

Figure 10:
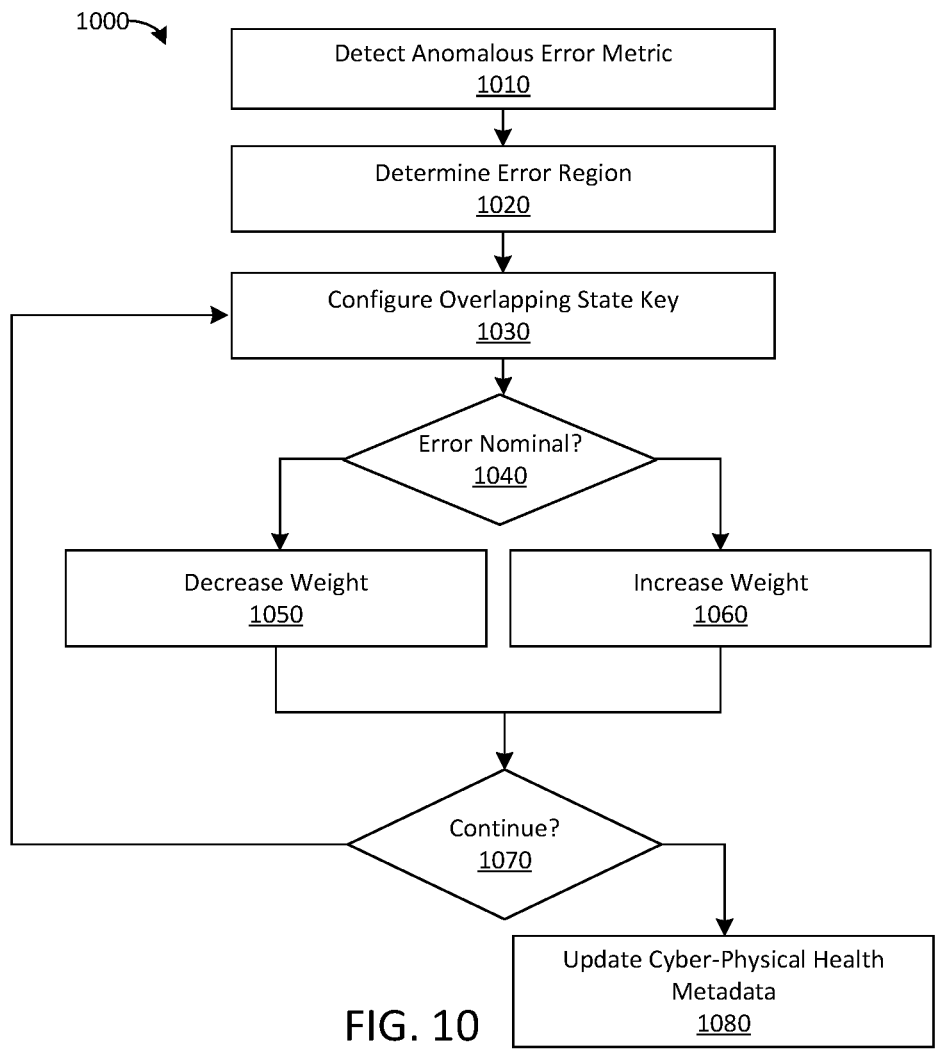
FIG. 10 is a flow diagram of another embodiment of a method for determining a source of anomalous error metrics by a resilient security agent, as disclosed herein.

FIG. 10 is a flow diagram of another embodiment of a method 1000 for securing a cyber-physical system 100, as disclosed herein. Step 1010 may comprise detecting a state key anomaly (e.g., a state key 160 having an anomalous error metric 175, as disclosed herein). Step 1010 may further comprise implementing one or more mitigation operations in response to detection of the anomaly, as disclosed herein. Step 1020 may comprise determining an error region, which may comprise and/or correspond to a region covered by the state key 160 having the anomalous error metric 175. Step 1020 may further comprise assigning an initial anomaly weight to each cyber-physical component 102 within the determined error region, as disclosed herein. Step 1030 may comprise configuring an overlapping state key 160, which may comprise configuring the state key 160 to cover a region that overlaps with the error region, as disclosed herein. Step 1030 may comprise communicating the overlapping state key 160 through a region of the control system 101 that corresponds to and/or overlaps the error region. The error region may comprise and/or correspond to one or more CPCE 105, and step 1030 may comprise communicating the overlapping state key 160 through at least one of the one or more CPCE 105. Step 1030 may further comprise communicating fragments 161 of the overlapping state key 160 through one or more isolation CPC paths 108, as disclosed herein.

Step 1040 may comprise determining whether an error metric 175 of the overlapping state key 160 is nominal (e.g., is lower than the anomalous error metric 175). If the error metric 175 is nominal, the flow may continue at step 1050; otherwise, the flow may continue at step 1060. Step 1050 may comprise decreasing anomaly weights of respective cyber-physical components 102 covered by the overlapping state key 160 and/or CPC paths 108 through which fragments 161 of the overlapping state key 160 were communicated, as disclosed herein. Step 1060 may comprise increasing anomaly weights of respective cyber-physical components 102 covered by the overlapping state key 160 and/or CPC paths 108 through which fragments 161 of the overlapping state key 160 were communicated, as disclosed herein.

Step 1070 may comprise determining whether to continue iteratively refining the anomaly weights assigned to the respective cyber-physical components 102 of the error region, as disclosed herein. Step 1070 may comprise determining whether the anomaly weights have converged, the distribution of the anomaly weights sufficiently distinguishes the cause of the anomaly, no further refinement is possible, and/or other termination criteria.

FIG. 10 is a flow diagram of one embodiment of a method 1100 for characterizing a cyber-physical health of a selected region of a cyber-physical system 100. Step 1010 may comprise detecting a state key anomaly (e.g., a state key 160 having an anomalous error metric 175, as disclosed herein). Step 1010 may further comprise implementing one or more mitigation operations in response to detection of the anomaly, as disclosed herein. Step 1020 may comprise determining an error region, which may comprise and/or correspond to a region covered by the state key 160 having the anomalous error metric 175. Step 1020 may further comprise assigning an initial anomaly weight to each cyber-physical component 102 within the determined error region, as disclosed herein. Step 1030 may comprise configuring an overlapping state key 160, which may comprise configuring the state key 160 to cover a region that overlaps with the error region, as disclosed herein. Step 1030 may comprise communicating the overlapping state key 160 through a region of the control system 101 that corresponds to and/or overlaps the error region. The error region may comprise and/or correspond to one or more CPCE 105, and step 1030 may comprise communicating the overlapping state key 160 through at least one of the one or more CPCE 105. Step 1030 may further comprise communicating fragments 161 of the overlapping state key 160 through one or more isolation CPC paths 108, as disclosed herein.

Step 1040 may comprise determining whether an error metric 175 of the overlapping state key 160 is nominal (e.g., is lower than the anomalous error metric 175). If the error metric 175 is nominal, the flow may continue at step 1050; otherwise, the flow may continue at step 1060. Step 1050 may comprise decreasing anomaly weights of respective cyber-physical components 102 covered by the overlapping state key 160 and/or CPC paths 108 through which fragments 161 of the overlapping state key 160 were communicated, as disclosed herein. Step 1060 may comprise increasing anomaly weights of respective cyber-physical components 102 covered by the overlapping state key 160 and/or CPC paths 108 through which fragments 161 of the overlapping state key 160 were communicated, as disclosed herein.

Step 1070 may comprise determining whether to continue iteratively refining the anomaly weights assigned to the respective cyber-physical components 102 of the error region, as disclosed herein. Step 1070 may comprise determining whether the anomaly weights have converged, the distribution of the anomaly weights sufficiently distinguishes the cause of the anomaly, no further refinement is possible, and/or other termination criteria.

Figure 11:
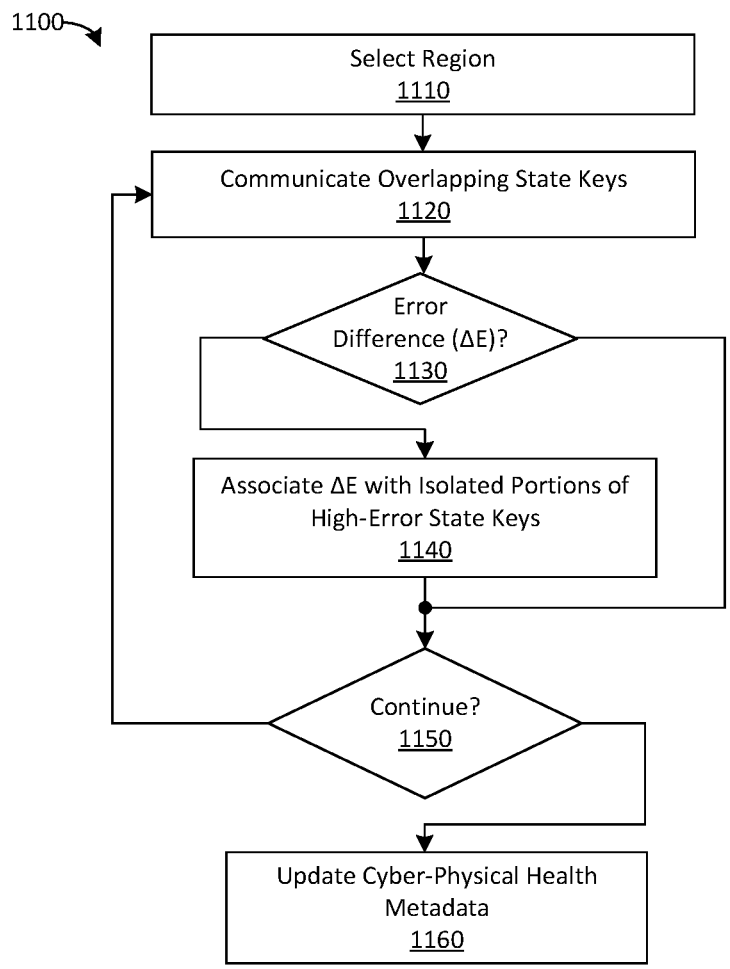
FIG. 11 is a flow diagram of one embodiment of a method for characterizing a cyber-physical health of a selected region of a cyber-physical system, as disclosed herein.

FIG. 11 is a flow diagram of one embodiment of a method 1100 for characterizing a cyber-physical health of a selected region of a cyber-physical system, as disclosed herein. Step 1100 may comprise selecting a region of the control system 101 to characterize. Step 1110 may comprise detecting a state key 160 having a high and/or anomalous error metric 175, as disclosed herein. Alternatively, Step 1100 may comprise selecting the region based on a selection criterion, such as a weighted selection criterion, as disclosed herein. The selected region may comprise and/or correspond to one or more CPCE 105 of the control system 101. In some embodiments, step 1110 may further comprise assigning initial error weights to respective cyber-physical components 102, cyber regions, and/or physical control regions, of the selected region, as disclosed herein.

Step 1120 may comprise communicating overlapping state keys 160 through the selected region (e.g., state keys 160 that overlap with respect to the selected region, as disclosed herein). Step 1120 may comprise communicating the overlapping state keys 160 in accordance with a cyber-physical isolation scheme, as disclosed herein. Communicating the overlapping state keys 160 may comprise communicating respective fragments 161 of the overlapping state keys 160 through respective isolation CPC paths 108, which may be configured to differ with respect to inclusion and/or exclusion of respective portions of the selected region (e.g., differ with respect to inclusion and/or exclusion of one or more cyber-physical components 102).

Step 1130 may comprise determining whether error metrics 175 of respective overlapping state keys 160 differ by more than a threshold. In response to determining that error metrics 175 of the overlapping state keys 160 have an error differential (ΔE) that exceeds a threshold, the flow may continue at step 1140; otherwise, the flow may continue at step 1150. Step 1140 may comprise associating the error differential ΔE with isolated portions of the high-error state keys 160. The high-error state keys 160 may comprise state keys 160 of the overlapping state keys 160 having error metrics 175 that exceed the error metrics 175 of other, low-error state keys 160 of the overlapping state keys 160. The isolated portion of a high-error state key 160 may comprise a portion, section, and/or sub-region of the selected region that is covered by the high-error state key 160 and is not covered by the low-error state keys 160. The isolated portion may comprise cyber-physical components 102 that: a) were included in the isolation CPC paths 108 through which fragments 161 of the high-error state keys 160 were communicated, and b) were excluded from the isolation CPC paths 108 through which fragments 161 of the low-error state keys 160 were communicated. Step 1140 may comprise attributing the error differential (ΔE), and/or a portion thereof, to the isolated portions of the high-error state keys 160. In some embodiments, step 1140 may comprise increasing error weights of respective cyber-physical components 102, cyber regions, and/or physical control regions, of the isolated portions of the high-error state keys 160, as disclosed herein. In some embodiments, step 1140 may further comprise disassociating isolated portions of the low-error state keys 160 with the error differential, which may comprise decreasing error weights of respective cyber-physical components 102, cyber regions, and/or physical control regions, of the isolated portions of the low-error state keys 160, as disclosed herein.

As disclosed above, the RS agent 110 may be configured to determine error associated with the communication of state keys 160 through respective CPCE 105 of the control system 101 (and/or respective cyber-physical components 102, CPCE sections 109, and/or the like). The state keys 160 may comprise CPKD 162, which may be configured to characterize the acquired cyber-physical state of the control system 101 (e.g., may comprise and/or be derived from the cyber-physical state metadata 111). In some embodiments, the RS agent 110 may be configured to acquire cyber-physical state information pertaining to the control system 101. The RS agent 110 may be configured to acquire the cyber-physical state information in conjunction with the communication of state keys 160 through selected regions of the control system 101. The RS agent 110 may be configured to acquire cyber-physical state information from the same and/or similar region as the regions through which the state keys 160 are communicated (and/or corresponding cyber-physical reconstruction data are returned). The error metrics 175 associated with the state keys 160 may, therefore, indicate a likelihood that cyber-physical state information acquired in conjunction with communication of the state keys 160 accurately reflects the cyber-physical state of the control system 101.

Figure 12A:
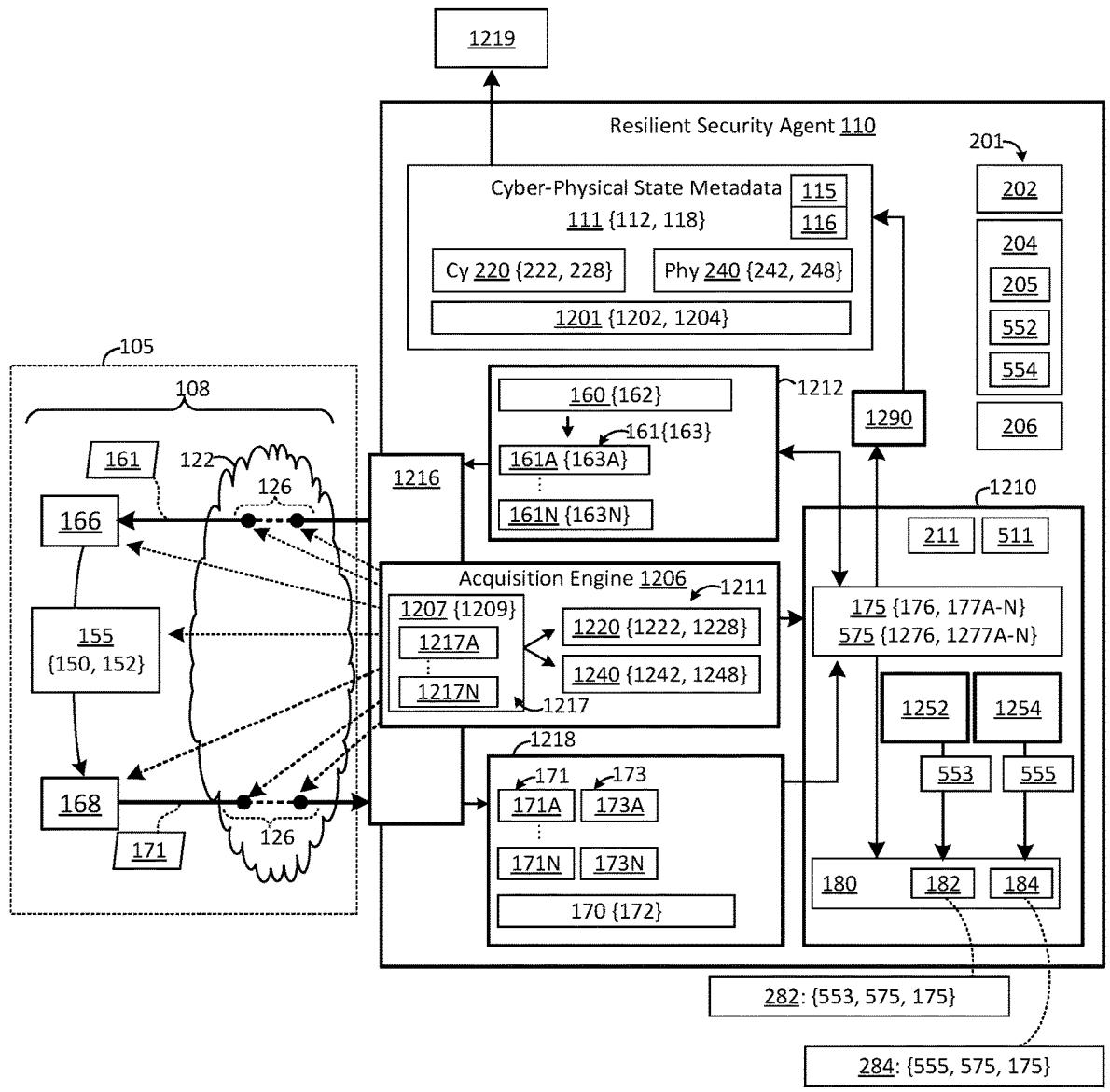
FIG. 12A-13B are schematic block diagrams of embodiments of a resilient security agent, as disclosed herein.

FIG. 12A is a schematic block diagram of another embodiment of cyber-physical system 100 comprising an RS agent 110, as disclosed herein. The RS agent 110 may comprise a security engine 1210, key generator 1212, communication manager 1216, and cyber-physical error monitor (error monitor 1218), which may be configured to, inter alia, communicate state keys 160 through the control system 101, determine error metrics 175 corresponding to communication of the state keys 160 (and/or respective fragments 161A-N thereof), and/or determine cyber-physical health metadata 180 for the control system 101 based on, inter alia, the determined error metrics 175. The RS agent 110 may further comprise an acquisition engine 1206 and state engine 1290, which may be configured to, inter alia, acquire the cyber-physical state 1201 of the control system 101 and/or respective regions thereof (denoted as cyber-physical state 1201 in FIG. 12A). The RS agent 110 may comprise, be embodied by, and/or be coupled to computing resources 201, which may include, but are not limited to: processing resources 202, storage resources 204, cyber communication resources 206, and/or the like, as disclosed herein. Portions of the RS agent 110 (e.g., one or more of 1206, 1210, 1212, 1216, 1218, and/or 1219, and/or portion(s) thereof) may be embodied by the computing resources 201 (e.g., may comprise and/or be embodied by hardware components of the computing resources 201, such as one or more processors, programmable logic, and/or the like). Alternatively, or in addition, one or more of 1206, 1210, 1212, 1216, 1218, and/or 1219 may be embodied as computer-readable instructions 205 stored within the non-transitory storage resources 206, as disclosed herein.

The security engine 1210 may be configured to implement a security policy 211, as disclosed herein, which may comprise and/or correspond to a coverage schema 511. The coverage schema 511 may comprise a scheme for the generation and/or communication of state keys 160 (and/or respective fragments 161A-N thereof), as disclosed herein. The security engine 1210 may be further configured to implement mitigation operations based on and/or in response to error metrics 175 and/or the determined cyber-physical health metadata 180, as disclosed herein.

The key generator 1212 may be configured to generate state keys 160 comprising respective CPKD 162 and/or split the state keys 160 into respective fragments 161A-N, each fragment 161A-N comprising a respective CPKD fragment 163A-N, as disclosed herein. The communication manager 1216 may be configured to communicate fragments 161A-N of the state keys 160 through respective CPC paths 108 of the control system 101, and acquire validation data 171A-N in response to communication of the fragments 161A-N, as disclosed herein. The error monitor 1218 may be configured to monitor error introduced during communication of state keys 160 (and/or state key fragments 161A-N) through CPE paths 108 of the control system 101, which may comprise generating cyber-physical reconstructions of the state keys 160 (validation keys 170) by use of the acquired validation data 171A-N, and/or comparing the state keys 160 to corresponding validation keys 170, as disclosed herein. Generating the validation keys 170 may comprise reconstructing validation CPKD fragments 173A-N from acquired validation data 171A-N and/or reconstructing validation CPKD 172 for respective state keys 160 by use of the validation CPKD fragments 173A-N, as disclosed herein.

In the FIG. 12A embodiment, the RS agent 110 may further comprise an acquisition engine 1206, which may be configured to acquire cyber-physical state data 1207 corresponding to the cyber-physical state metadata 111, which, as disclosed herein may be configured to comprise, define, and/or characterize the cyber-physical state of the control system 101 and/or respective regions thereof. The acquisition engine 1206 may be configured to acquire cyber-physical state data 1207 pertaining to: cyber state metadata 220, one or more cyber state parameters 222, one or more cyber state signatures 228, physical state metadata 240, one or more physical state parameters 242, one or more physical state signatures 248, portion(s) thereof and/or the like. The acquisition engine 1206 may be configured to acquire cyber-physical state information pertaining to respective: cyber-physical components 102, CPCE 105, CPE paths 108, CPE sections 109, cyber components 120, the CS network 122 (and/or portions thereof), cyber nodes 124, cyber paths 126, cyber sections 129, computational components 130, physical components 140 (e.g., sensor devices 144, actuator devices 146, and/or the like), PPV 155 (e.g., physical processes 150, physical process attributes 152, and/or the like), physical control couplings 148, physical control sections 149, and/or the like. The acquisition engine 1206 may be configured to acquire cyber-physical state data 1207 using any suitable means, mechanism and/or technique, as disclosed herein, which may include, but is not limited to: requesting cyber-physical state information (e.g., sending requests for cyber-physical state information through the CS network 122), capturing messages comprising cyber-physical state information, capturing control messages communicated between respective computational components 130 and physical components 140 (e.g., messages between a controller 132 and one or more sensor and/or actuator devices 144/146), capturing messages on the CS network 122, inspecting messages being communicated on the CS network 122 (e.g., deep packet inspection), extracting cyber-physical state information messages on the CS network 122, acquiring cyber-physical state information from message(s) comprising validation data 171 returned in response to communication of respective state keys 160 and/or state key fragments 161, and/or the like.

The acquisition engine 1206 may be configured to acquire cyber-physical state information from the control system 101 (and/or respective regions thereof) in accordance with the coverage schema 511, as disclosed herein. The coverage schema 511 may comprise any suitable information pertaining to the acquisition of cyber-physical state data 1207 including, but not limited to: an acquisition frequency (e.g., may specify the frequency at which the acquisition engine 1206 is configured to acquire cyber-physical state data 1207 pertaining to respective regions of the control system 101), an acquisition period (e.g., may specify a period at which the acquisition engine 1206 is configured to acquire cyber-physical state data 1207 pertaining to respective regions of the control system 101), a monitoring frequency, a monitoring period, a continuous acquisition scheme, a continuous monitoring scheme, a discrete acquisition scheme, a discrete monitoring scheme, a staged monitoring scheme, a staged acquisition scheme, and/or the like. The acquisition engine 1206 may acquire cyber-physical state data 1207 configured to characterize the cyber-physical state 1201 of the control system 101 at designated acquisition times α (the acquisition times α corresponding to an acquisition frequency, period, continuous acquisition, staged acquisition, and/or the like). As disclosed above, the acquisition engine 1206 may be configured to acquire the cyber-physical state data 1207 by a plurality of different means and/or from a plurality of different sources (e.g., different cyber-physical components 102). Acquiring cyber-physical state data 1207 corresponding to a designated acquisition time α may, therefore, comprise acquiring a plurality of cyber-physical state (CPS) datasets 1209, each CPS dataset 1209 corresponding to the same (or similar) acquisition time α, and comprising cyber and/or physical state data 1207 captured by respective means and/or acquired from a respective source (e.g., respective cyber-physical components 102). Acquiring cyber-physical state information 1201 corresponding to an acquisition time α may comprise generating, requesting, and/or receiving a plurality of CPS datasets 1209, and associating the CPS datasets 1209 with the acquisition time α. The associating may comprise synchronizing the CPS datasets 1209 in accordance with, inter alia, acquisition latencies of the CPS datasets 1209. As used herein, the acquisition latency ($L_{ACQ}$) of a CPS dataset 1209 refers to a latency between the time at which the acquisition engine 1206 attempts and/or expects to acquire the CPS dataset 1209 and the time at which the particular CPS dataset 1209 is received, captured, extracted, and/or otherwise acquired by the acquisition engine 1206. The acquisition latency ($L_{ACQ}$) of a CPS dataset 1209 may comprise a latency for: communication of a request to a source of the CPS dataset 1209 (a particular cyber-physical component 102), acquisition of the CPS dataset 1209 at the source, communication of the CPS dataset 1209 back to the acquisition engine 1206, acquisition of the CPS dataset 1209 by the acquisition engine (e.g., latency for monitoring, capturing, inspecting, extracting, and/or otherwise acquiring the CPS dataset 1209 at the RS agent 110), and/or the like. The synchronizing may comprise correlating the acquisition time α (a timestamp and/or other identifying information) with received CPS datasets 1209 (e.g., timestamps and/or other identifying information of the CPS datasets 1209). The acquisition engine 1206 may be configured to evaluate acquisition latencies of the CPS datasets 1209, and may reject CPS datasets 1209 having acquisition latencies that exceed one or more latency thresholds (e.g., reject CPS datasets 1209 where $L_{ACQ} > \Delta AT$, where $\Delta AT$ is an acquisition latency threshold).

The acquisition engine 1206 may be further configured to synchronize cyber and/or physical state information of the CPS datasets 1209. The synchronizing may comprise mitigating state synchronization deviation between the CPS datasets 1209. As used herein, "state jitter" or "state synchronization deviation" ($S_{DEV}$) refers to differences between the target acquisition time for cyber-physical state data 1207 (e.g., $\alpha$) and acquisition times of respective CPS datasets 1209 (e.g., $\alpha_{CPS}-\alpha=S_{DEV}$, where $\alpha_{CPS}$ is the acquisition time of the CPS dataset 1209 and $S_{DEV}$ is a deviation between $\alpha_{CPS}$ and the target acquisition time $\alpha$). The acquisition engine 1206 may be configured to synchronize cyber-physical state information of the CPS datasets 1209, such that the cyber-physical state information of the CPS datasets 1209 corresponding to a same (and/or substantially same) acquisition time (e.g., acquisition time $\alpha$). In some embodiments, the CPS datasets 1209 may comprise timestamps and/or other synchronization information indicating acquisition times for the cyber and/or physical state information thereof. Alternatively, or in addition, the acquisition engine 1206 may determine the CPS acquisition time ($\alpha_{CPS}$) of respective CPS datasets 1209 by, inter alia, inspecting cyber-physical state information of the CPS datasets 1209, evaluating timestamps associated with the cyber-physical state information, accessing synchronization information of the CPS datasets 1209 (e.g., accessing timestamps associated with sensor, actuator, and/or control data of the CPS dataset 1209), and/or the like. In some embodiments, the acquisition engine 1206 may be configured to estimate the CPS acquisition time ($\alpha_{CPS}$) of a CPS dataset 1209 based on a latency involved in requesting, capturing, extracting, and/or otherwise acquiring the CPS dataset 1209. The CPS acquisition time ($\alpha_{CPS}$) of a CPS dataset 1209 may correspond to a latency involved in requesting the CPS dataset 1209 (e.g., latency for communication of a request to a cyber-physical component 102 ($L_{REQ}$), such that the cyber and/or physical state information returned therefrom corresponds to $\alpha+L_{REQ}$ rather than $\alpha$). The $L_{REQ}$ for respective sources of CPS datasets 1209 may be defined by, inter alia, cyber state metadata 220 pertaining to cyber paths 126 and/or cyber fnodes 124 therebetween coupling the RS agent 110 to the respective sources. In another embodiment, the acquisition engine 1206 may determine the CPS acquisition time ($\alpha_{CPS}$) for a CPS dataset 1209 received from a cyber-physical component 102 configured to send cyber-physical state information to the RS agent 110 in accordance with a particular monitoring scheme. The acquisition engine 1206 may determine the CPS acquisition time ($\alpha_{CPS}$) in accordance with the monitoring scheme (e.g., based on the frequency and/or period thereof); the $S_{DEV}$ may correspond to a difference and/or offset between the acquisition times $\alpha$ (e.g., acquisition frequency and/or period), and the monitoring scheme of the source of the CPS dataset 1209 (e.g., $\alpha_{CPS}=\alpha \pm O_{MON}$ and/or $S_{DEV}=O_{MON}$, where $O_{MON}$ is an offset and/or difference between the monitoring scheme of the source of the CPS dataset 1209 and the target acquisition time $\alpha$). In other embodiments, the CPS acquisition time ($\alpha_{CPS}$) of a CPS dataset 1209 may correspond to latency involved in the acquisition engine 1206 generating the CPS dataset 1209 (capturing, inspecting, extracting, and/or otherwise acquiring cyber-physical state information of the CPS dataset 1209 from, e.g., messages communicated between cyber-physical components 102 of the control system 101, as disclosed herein), such that $\alpha_{CPS}=\alpha+L_{GEN}$, and/or $S_{DEV}=L_{GEN}$, where $L_{GEN}$ is a latency involved in the acquisition engine 1206 generating the CPS dataset 1209.

In some embodiments, the acquisition engine 1206 may be configured to modify the cyber-physical state information of one or more CPS datasets 1209 in accordance with the determined CPS acquisition times ($\alpha_{CPS}$), latencies, and/or state deviations $S_{DEV}$ thereof. The acquisition engine 1206 may be configured to ignore $S_{DEV}$ that are unlikely to adversely affect the accuracy of the cyber-physical state metadata 111 (e.g., may ignore $S_{DEV}$ lower than a state deviation threshold). In some embodiments, the acquisition engine 1206 may be configured to mitigate state deviations ($S_{DEV}$), which may comprise modifying the cyber-physical state information having state deviations $S_{DEV}$ that exceed one or more thresholds. The modifying may comprise estimating, extrapolating, calculating, and/or otherwise determining cyber-physical state information corresponding to the target acquisition time $\alpha$ based on the cyber-physical state information acquired at $\alpha_{CPS}$, where $\alpha_{CPS}-\alpha=S_{DEV}$. The acquisition engine 1206 may be configured to modify the cyber-physical state information in accordance with a model, such as a process model, observer model, Kalman filter, and/or the like, as disclosed in further detail herein. Alternatively, or in addition, the acquisition engine 1206 may be configured to adapt acquisition of the respective CPS datasets 1209 to, inter alia, reduce the $S_{DEV}$ thereof (and/or reduce differences in CPS acquisition times ($\alpha_{CPS}$) therebetween). The acquisition engine 1206 may be configured to schedule acquisition of respective CPS datasets 1209 based on the $S_{DEV}$ thereof, which may comprise scheduling communication of requests for one or more CPS datasets 1209 (e.g., scheduling the requests in accordance with request latencies $L_{REQ}$ of respective sources of cyber-physical state information of the one or more CPS datasets 1209), configuring respective sources to acquire and/or communicate cyber-physical state information in accordance with target acquisition times $\alpha$ (e.g., synchronizing monitoring schemes of one or more cyber-physical components 102 with target acquisition times $\alpha$), scheduling operations to generate one or more CPS datasets 1209 (e.g., scheduling the operations based on latencies $L_{GEN}$ for the acquisition engine 1206 to generate cyber-physical state information of the one or more CPS datasets 1209), and/or the like. Acquiring cyber-physical state data 1207 configured to characterize the cyber-physical state of the control system 101 at a target acquisition time $\alpha$ may comprise the acquisition engine 1206 sending requests for respective cyber-physical state information prior to the acquisition time $\alpha$ (e.g., sending a request for a CPS dataset 1209 at $\alpha-L_{REQ}$, where $L_{REQ}$ is the request latency of the source of the cyber-physical state information of the CPS dataset 1209). The acquisition engine 1206 may be further configured to schedule operations to generate cyber-physical state information prior to the acquisition time $\alpha$ (e.g., schedule operations to monitor, capture, inspect, and/or extract cyber-physical state information from messages on the CS network 122 at $\alpha-L_{GEN}$, where $L_{GEN}$ is the latency for generation of the cyber-physical state information by the acquisition engine 1206). Although particular examples of means for synchronizing acquired cyber-physical state data 1207 (and/or respective CPS datasets 1209) are described herein, the disclosure is not limited in this regard, and could be adapted to use any suitable synchronization technique.

The acquisition engine 1206 may be further configured to derive acquired cyber-physical state metadata 1211 from the acquired cyber-physical state data 1207. The acquisition engine 1206 may be configured to derive: acquired cyber state metadata 1211 corresponding to the cyber state metadata 220 (and/or respective portions thereof), acquired cyber state parameters 1222 corresponding to one or more cyber state parameters 222, acquired cyber state signatures 1228 corresponding to one or more cyber state signatures 228 (and/or portions thereof), acquired physical state metadata 1240 corresponding to the physical state metadata 240 (and/or respective portions thereof), acquired physical state parameters 1242 corresponding to one or more physical state parameters 242, acquired cyber state signatures 1248 corresponding to one or more physical state signatures (and/or portions thereof), and so on. The deriving may include, but is not limited to: extracting features from the acquired cyber-physical state data 1207, performing calculations on the acquired cyber-physical state data 1207 (e.g., calculating statistical characteristics of cyber communication at particular cyber nodes 124, as disclosed herein), extrapolating acquired cyber state parameters 1222 and/or physical state parameters 1242 from the acquired cyber-physical state data 1207, estimating acquired cyber state parameters 1222 and/or physical state parameters 1242 from the acquired cyber-physical state data 1207, predicting acquired cyber state parameters 1222 and/or physical state parameters 1242 from the acquired cyber-physical state data 1207, and/or the like. The deriving may further comprise calculating one or more CPSS 118 signatures characterizing the acquired cyber-physical state metadata 1211, which may include acquired cyber state signatures 1228, acquired physical state signatures 1248, and/or the like. The acquisition engine 1206 may be configured to generate the signatures 1228 and/or 1248 in accordance with the signature schema 116, as disclosed herein.

The RS agent 110 may further comprise a state engine 1290, which may be configured to incorporate the acquired cyber-physical state metadata 1211 into the cyber-physical state metadata 111. In some embodiments, incorporating the acquired cyber-physical state metadata 1211 may comprise importing the acquired cyber-physical state metadata 1211 into the cyber-physical metadata 111. The importing may comprise replacing existing cyber-physical state metadata 111 (if any) with the acquired cyber-physical state metadata 1211. Alternatively, or in addition, the importing may comprise retaining cyber-physical state metadata 111 configured to characterize the cyber-physical state of the control system 101 at one or more previous acquisition times, as disclosed in further detail herein. The state engine 1290 may be further configured to update the cyber-physical state metadata 111 with acquisition information (e.g., associate the cyber-physical state metadata 111 with the acquisition time(s) thereof, as disclosed herein).

In some embodiments, the acquisition engine 1206 may be configured to acquire cyber-physical state data 1207 (and/or CPS datasets 1209) in conjunction with communication of state keys 160 by the communication manager 1216. As disclosed above, the RS agent 110 may be configured to communicate state keys 160 through selected regions of the control system 101. The region of the control system 101 covered by a state key 160 may, therefore, refer to the region of the control system 101 through which the state key 160 is to be communicated. The acquisition engine 1206 may be configured to acquire cyber-physical state data 1207 from regions of the control system 101 covered by respective state keys 160. The acquisition engine 1206 may be configured to acquire the cyber-physical state data 1207 during communication of the respective state keys 160 (e.g., concurrently with communication of the state keys 160). Communication of a state key 160 through a selected region of the control system 101 may trigger acquisition of cyber-physical state information pertaining to the selected region by the acquisition engine 1206 (e.g., the time at which the state key 160 is communicated may comprise and/or correspond to the target acquisition time $\alpha$ of the acquisition engine 1206). In response to communication of a state key 160, the acquisition engine 1206 may be configured to acquire cyber-physical state data 1207 pertaining to, inter alia, cyber-physical components 102 within the region covered by the state key 160. Error metrics 175 of the respective state keys 160 may, therefore, accurately indicate the likelihood of error in the corresponding acquired cyber-physical state data 1207 (and/or the acquired cyber-physical state metadata 1211 derived therefrom).

In some embodiments, the acquisition engine 1206 may be further configured to acquire cyber-physical state data 1207 (and/or respective CPS datasets 1209) in conjunction with communication of state key fragments 161. As disclosed above, communicating a state key 160 through a selected region of the control system 101 may comprise communicating fragments 161A-N of the state key 160 through CPC paths 108 of the selected region. Communicating a state key fragment 161 through a CPC path 108 of a CPCE 105 may comprise: sending the fragment 161 through a first cyber path 126 (to a correlator 166, such as an actuator device 146, controller 132, and/or the like), communicating corresponding validation data 171 to a receiver 168 (e.g., a sensor device 144, controller 132, and/or the like) by a physical control coupling 148 that comprises and/or corresponds to a PPV 155 of the CPCE 105, and returning the validation data 171 through a second cyber path 126. Acquiring cyber-physical state data 1207 in conjunction with communication of a state key fragment 161 through a CPC path 108 may comprise acquiring cyber-physical state data 1207 pertaining to the CPE path 108 (e.g., acquiring CPS datasets 1209 pertaining to cyber-physical components 102 of the CPE path 108). In some embodiments, acquiring cyber-physical state data 1207 corresponding to a state key 160 may comprise acquiring a plurality of regional cyber-physical state (RCPS) datasets 1217A-N, the RCPS datasets 1217A-N comprising cyber and/or physical state data 1207 corresponding to communication of a respective fragment 161A-N of the state key 160 through a respective CPC path 108. The RCPS dataset 1217 corresponding to communication of a state key fragment 161 may include, but is not limited to cyber-physical state information pertaining to: cyber-physical components 102 of the CPE path 108, one or more cyber paths 126, one or more physical control couplings 148, one or more PPV 155, and/or the like. Acquiring an RCPS dataset 1217 may comprise acquiring one or more CPS datasets 1209 corresponding to a target acquisition time $\alpha$, as disclosed herein. In some embodiments, the CPE paths 108 through which respective state key fragments 161A-N are communicated may overlap (may have one or more cyber-physical components 102 in common). The acquisition engine 1206 may be configured to adapt acquisition of the RCPS data 1217A-N to prevent redundant acquisition (e.g., prevent acquisition of same cyber-physical state data 1207 in conjunction with communication of different fragments 161A-N of same state keys 160). The acquisition engine 1206 may be further configured to derive acquired cyber-physical state metadata 1211 from the RCPS data 1217A-N, which may be incorporated into the cyber-physical state metadata 111, as disclosed herein.

The security engine 1210 may be configured to, inter alia, determine error metrics 175 in response to communication of respective state keys 160, which may comprise determining key errors 176 quantifying differences between state keys 160 and corresponding cyber-physical reconstructions thereof (validation keys 170) and/or fragment errors 177A-N quantifying differences between fragments 161A-N of the respective state keys 160 and corresponding cyber-physical reproductions thereof (respective validation data 171A-N). The security engine 1210 may be further configured to determine cyber-physical health metadata 180 pertaining to the control system 101 based on, inter alia, the determined error metrics 175.

As disclosed above, the acquisition engine 1206 may be configured to acquire cyber-physical state metadata 1211 in conjunction with communication of respective state keys 160 (and/or fragments 161 thereof). The acquisition engine 1206 may be configured to acquire cyber-physical state metadata 1211 configured to cover the same and/or similar regions as the respective state keys 160. The error metrics 175 determined in response to communication of the respective state keys 160 may, therefore, indicate whether the corresponding acquired cyber-physical state metadata 1211 comprises an accurate characterization of the cyber-physical state 1201 of the control system 101 (and/or respective regions thereof).

The security engine 1210 may be configured to determine CPSC metrics 575, which may be configured to quantify a confidence in the cyber-physical state metadata 111 (and/or respective portions thereof), as disclosed herein. In the FIG. 12A embodiment, the security engine 1210 may be further configured to determine CPSC metrics 575 pertaining to the acquired cyber-physical state metadata 1211. The CPSC metrics 575 may be based on, inter alia, error metrics 175 of the state keys 160 corresponding to the acquired cyber-physical state metadata 1211. The CPSC metrics 575 may comprise an acquisition confidence 1276, which may quantify a confidence that the acquired cyber-physical state metadata 1211 accurately represents the cyber-physical state 1201 of the control system 101 (and/or regions of the control system 101 covered by the state keys 160 associated therewith). The acquisition confidence 1276 determined for acquired cyber-physical state metadata 1211 obtained in conjunction with communication of particular state keys 160 may correspond to error metrics 175 (e.g., key errors 176) of the particular state keys 160. In some embodiments, the CPSC metrics 575 may further comprise one or more acquisition set confidences 1277A-N, which may quantify a confidence that portions of the acquired cyber-physical state metadata 1211 derived from respective acquired RCPS data 1217A-N accurately represent the cyber-physical state 1201 of the control system 101 (and/or respective regions thereof). The acquisition set confidences 1277A-N determined for acquired cyber-physical state metadata 1211 obtained in conjunction with communication of respective fragments 161A-N of particular state keys 160 may correspond to error metrics 175 of the particular state keys 160 (e.g., respective fragment errors 177A-N of the particular state keys 160). The CPSC metrics 575 may further incorporate characteristics pertaining to the acquisition of the cyber-physical state metadata 1211 from the control system 101, as state acquisition noise, acquisition latency, acquisition frequency, state jitter, state deviation, and/or the like, as disclosed herein.

As disclosed above, the state engine 1290 may be configured to incorporate acquired cyber-physical state metadata 1211 into the cyber-physical state metadata 111. The state engine 1290 may be configured to incorporate the acquired cyber-physical state metadata 1211 in accordance with the CPSC metrics 575 thereof. In response to CPSC metrics 575 indicating high confidence in the accuracy of the acquired cyber-physical state metadata 1211 (CPSC metrics 575 that satisfy a confidence threshold), the state engine 1290 may be configured to import the acquired cyber-physical state metadata 1211 into the cyber-physical metadata 111, as disclosed herein (e.g., replace existing cyber-physical state metadata 111 with the acquired cyber-physical state metadata 1211). The importing may comprise updating the cyber-physical state metadata 111 to indicate, inter alia, times at which respective portions of the cyber-physical state metadata 111 were acquired (e.g., specify the acquisition time $\alpha$ of the imported cyber-physical state metadata 111). In some embodiments, the state engine 1290 may be configured to discard cyber-physical state metadata 111 replaced by the acquired cyber-physical state metadata 1211 (e.g., discard cyber-physical state metadata 111 acquired prior to the current acquisition time $\alpha$). Alternatively, or in addition, the state engine 1290 may be configured to maintain cyber-physical state metadata 111 corresponding to one or more previous acquisition times $\alpha$ in a data store (e.g., historical data store 1219). The historical data store 1219 may comprise any suitable storage means, as disclosed herein. The historical data store 1219 may comprise and/or correspond to storage resources of the RS agent 110. Alternatively, or in addition, the historical data store 1219 may comprise external storage resources (e.g., may comprise data storage resources of another cyber-physical component 102 of the control system 101). The historical data store 1219 may comprise a plurality of historical cyber-physical state datasets, each comprising cyber-physical state metadata 111 corresponding to a respective time.

Importing the acquired cyber-physical state metadata 1211 may further comprise determining cyber-physical health metadata 180 based on, inter alia, error and/or CPSC metrics 175/575 corresponding to the acquired cyber-physical state metadata 1211 as disclosed herein. In some embodiments, the state engine 1290 may be configured to determine whether to import acquired cyber-physical state metadata 1211 based on the error and/or CPSC metrics 175/575 thereof. The state engine 1290 may compare the error and/or CPSC metrics 175/575 of the acquired cyber-physical state metadata 1211 to one or more thresholds, and may determine whether to incorporate the acquired cyber-physical state metadata 1211 based on the comparing. The state engine 1290 may defer incorporation of low-confidence acquired cyber-physical state metadata 1211 (acquired cyber-physical state metadata 1211 having error and/or CPSC metrics 175/575 that fail to satisfy one or more error and/or confidence thresholds). In response to low-confidence acquired cyber-physical state metadata 1211, the state engine 1290 may configure subsequent state keys 160 to cover the same and/or overlapping regions of the control system 101. The state engine 1290 may evaluate the resulting error and/or CPSC metrics 175/575, determine whether the error and/or CPSC metrics 175/575 satisfy the error and/or confidence thresholds, and, if so, import the more recently acquired cyber-physical state metadata 1211. If state engine 1290 determines that the error and/or CPSC metrics 175/575 still fail to satisfy the error and/or confidence thresholds, the state engine 1290 may incorporate the acquired cyber-physical state metadata 1211, which may comprise recording the low CPSC metrics 575 associated therewith in the cyber-physical health metadata 180, as disclosed herein. The state engine 1290 may be further configured to update corresponding acquisition parameters 112 to indicate the low CPSC metrics 575 and/or mark the corresponding portions of the cyber-physical state metadata 111 for reacquisition.

In some embodiments, the RS agent 110 may be configured to generate and/or communicate state keys 160 in accordance with a coverage schema 511. The coverage schema 511 may comprise selection criteria by which regions of the control system 101 may be selected for coverage by respective state keys 160 (and/or respective fragments 161A-N thereof). Selecting a region for a state key 160 may comprise selecting a region through which the state key 160 (and/or fragments 161A-N thereof) are to be communicated. The selecting may further comprise selecting the region for acquisition of cyber-physical state metadata 1211 therefrom, as disclosed herein. In some embodiments, the coverage schema 511 may comprise a weighted selection criterion that incorporates various factors pertaining to respective regions of the control system 101 (e.g., respective CPCE 105), such as a priority, error metrics 175, error metric age, and/or the like. In the FIG. 12 embodiment, the coverage schema 511 may comprise weighted selection criteria corresponding to acquisition of cyber-physical state metadata 1211 pertaining to respective regions of the control system 101. The selection criteria may configure the communication of state keys 160 to ensure coverage of the control system 101 by the acquired cyber-physical state metadata 1211. In some embodiments, weights may be assigned to respective CPCE 105 as follows:

$$w_i = W_{pri,i} + W_{err} \cdot e_i + W_{err\_age} \cdot err\_age_i + W_c c_i + W_{state\_age} \cdot state\_age_i$$

In the expression above, $w_i$ is the weight assigned to a particular CPCE 105, $W_{pri,i}$ may be a priority weighting factor, $W_{err}$ may be an error weighting and/or scaling factor applied to error metrics 175 and/or error metric parameters 181 of the CPCE 105 ($e_i$), and $W_{err\_age}$ may be a weighting and/or scaling factor applied to an error age parameter ($err\_age_i$), as disclosed herein. The weighting may further comprise a confidence weighting factor ($W_c$) applied to a cyber-physical state confidence parameter ($c_i$), which may comprise and/or correspond to a confidence that the cyber-physical state metadata 111 corresponding to the CPCE 105 accurately represents the cyber-physical state of the CPCE 105 (e.g., may comprise and/or correspond to confidence metrics of the cyber-physical health metadata 180 and/or CPSC metrics 575, as disclosed herein). The cyber-physical state confidence parameter ($c_i$) may be inversely proportional to the confidence and/or CPSC metrics 575, such that CPCE 105 having lower confidence and/or CPSC metrics 575 are prioritized for coverage over CPCE 105 having higher confidence and/or CPSC metrics 575. $W_{state\_age}$ may be a weighting and/or scaling factor applied to a cyber-physical state parameter ($state\_age_i$), which may correspond to an age of cyber-physical state metadata 111 of the CPCE 105, such that CPCE 105 having higher state age parameters are weighted for selection over other CPCE 105. In some embodiments, the time at which error metrics 175 of a CPCE 105 are obtained may correspond to the time at which corresponding cyber-physical metadata 111 are acquired therefrom and, as such, the cyber-physical state age parameter ($state\_ager_i$) of a CPCE 105 may be similar to, or the same as, the error age parameter ($err\_ager_i$) of the CPCE 105, such that one or more of the parameters may be omitted (or combined) in the weighting. The coverage schema 511 may, therefore, define selection and/or weighting criteria by which regions of the control system 101 may be selected for coverage by respective state keys 160 and/or cyber-physical state metadata 111 are acquired therefrom.

In some embodiments, the coverage schema 511 may define one or more "snapshot" schemes. As used herein, a "snapshot" coverage scheme (snapshot scheme) refers to a coverage scheme in which a set of state keys 160 are configured for communication through a target region of the control system 101 substantially concurrently. The target region may comprise and/or correspond to a plurality of CPCE 105 of the control system 101. In some embodiments, the target region may cover the control system 101 (e.g., may comprise substantially all of the cyber-physical components 102, CPE 105, CPE paths 108 and/or PPV 155 of the control system 101). Implementing a snapshot scheme covering a target region may comprise configuring a set of state keys 160 to cover the target region (e.g., configuring a set of state keys 160 such that the target region is fully covered by and/or contained within a union of the regions covered by the respective state keys 160).

Communicating a set of state keys 160 "substantially concurrently" may comprise communicating the set of state keys 160 at substantially a same time, substantially simultaneously, in parallel, on separate threads, and/or the like. Communicating a set of state keys 160 substantially concurrently may comprise transmitting the state keys 160 independently of acquiring validation keys 170 corresponding thereto (e.g., may comprise transmitting a plurality of state key 160 of the set prior to acquiring validation keys 170 corresponding to any of the set of state keys 160). Communicating the set of state keys 160 substantially concurrently may comprise communicating fragments 161A-N of respective state keys 160 of the set at substantially a same time, substantially simultaneously, in parallel, on separate threads, and/or the like. Alternatively, or in addition, communicating the set of state keys 160 substantially concurrently may comprise interleaving communication of fragments 161A-N of respective state keys 160 of the set. Communicating the set of state keys 160 substantially concurrently may comprise communicating fragments 161A-N of the state keys 160 independently of acquiring validation data 171A-N corresponding thereto (e.g., may comprise transmitting a plurality of fragments 161A-N of a plurality of state keys 160 of the set prior to acquiring validation data 171A-N corresponding to any of the fragments 161A-N of any of the state keys 160 of the set).

Implementing a snapshot scheme may further comprise acquiring cyber-physical state metadata 1211 covering the target region in conjunction with the substantially concurrent communication of the set of state keys 160. Implementing the snapshot scheme may comprise acquiring cyber-physical state metadata 1211 configured to characterize the cyber and/or physical state of the target region at an acquisition time α, the acquisition time α corresponding to concurrent communication of the set of state keys 160. The acquisition engine 1206 may be configured to acquire a plurality of CPS datasets 1209, each CPS dataset 1209 comprising cyber-physical state data 1207 configured to characterize a cyber and/or physical state of respective portions of the target region. Implementing the snapshot scheme may comprise requesting, monitoring, capturing, inspecting, generating, and/or otherwise acquiring the plurality CPS datasets 1209 substantially concurrently (e.g., a substantially a same time, simultaneously, in parallel, interleaved, and/or the like). In some embodiments, implementing a snapshot scheme may comprise associating the CPS datasets 1209 with the acquisition time α, synchronizing the CPS datasets 1209 to the acquisition time α, modifying cyber-physical state information of one or more of the CPS datasets 1209 in accordance with the acquisition time α, deriving acquired cyber-physical state metadata 1211 therefrom, and/or the like, as disclosed herein. Implementing the snapshot scheme may further comprise the state engine 1290 importing the acquired cyber-physical state metadata 1211 in accordance with the error and/or CPSC metrics 127/575 of the corresponding set of state keys 160, as disclosed herein.

The cyber-physical state metadata 111 maintained by the state engine 1290 may be comprise, define, and/or characterize the cyber-physical state 1201 of the control system 101, including the cyber state 1202 and the physical state 1204 of the control system 101 (and/or respective regions thereof). The cyber state 1202 may comprise and/or characterized by cyber state metadata 220, cyber state parameters 222, cyber state signatures 228, acquired cyber state metadata 1220, acquired cyber state parameters 1222, acquired cyber state signatures 1228, and/or the like. The physical state 1204 may comprise and/or be characterized by physical state metadata 240, physical state parameters 242, physical state signatures 248, acquired physical state metadata 1240, acquired physical state parameters 1242, acquired physical state signatures 1248, and/or the like.

The security engine 1210 may be configured to determine cyber-physical health metadata 180 for the control system 101 (and/or respective regions thereof) in accordance with error metrics 175, CPSC metrics 575, and/or other information pertaining to the communication of state keys 160 and/or acquisition of cyber-physical state metadata 111, as disclosed herein. In the FIG. 12A embodiment, the security engine 1210 may be further configured to determine the cyber-physical health metadata 180 based on the determined cyber-physical state 1201 of the control system 101. The security engine 1210 may comprise a cyber state evaluator 1252 configured to determine cyber state metrics 553, which may be configured to quantify a health of the cyber state 1202 of the control system 101 (and/or respective regions thereof), as disclosed herein. The security engine 1210 may further comprise a physical state evaluator 1254 configured to determine physical state metrics 555, which may be configured to quantify a health of the physical state 1204 of the control system 101 (and/or respective regions thereof), as disclosed herein. Determining the cyber state metrics 553 may comprise the cyber state evaluator 1252 applying one or more CSER to cyber state characteristics of the control system 101, as disclosed herein, the cyber state characteristics comprising and/or corresponding to one or more of: the cyber state 1202 of the control system 101, the cyber state metadata 220, the acquired cyber state metadata 1220, portion(s) thereof, and/or the like. Determining the physical state metrics 555 may comprise the physical state evaluator 1254 applying one or more PSER to physical state characteristics of the control system 101, as disclosed herein, the physical state characteristics comprising and/or corresponding to one or more of: the physical state 1204 of the control system 101, the physical state metadata 240, the acquired physical state metadata 1240, portion(s) thereof, and/or the like.

In some embodiments, determining the cyber state metrics 553 may comprise the cyber state evaluator 1252 comparing the acquired cyber state 1202 of the control system 101 (and/or respective regions thereof) to one or more CSB 552, as disclosed herein. The CSB 552 may comprise cyber baseline characteristics, which as disclosed herein, may be configured to characterize respective cyber states 1202, cyber behaviors, and/or cyber state metadata 220/1220. The features of respective CSB 552 may correspond to respective characteristics of the cyber state 1202 of the control system 101 (and/or respective regions thereof), such as the cyber state metadata 220, cyber state parameters 222, cyber state signatures 228, acquired cyber state metadata 1220, acquired cyber state parameters 1222, acquired cyber state signatures 1228, portion(s) thereof, and/or the like.

The features of respective CSB 552 may be extracted, determined, and/or learned from the cyber state information (e.g., acquired cyber-physical state data 1205, acquired cyber state metadata 1220, cyber state metadata 220, cyber state metadata 20 maintained within the historical data store 1219, training data and/or the like). Determining the cyber state metrics 553 may comprise determining CSB error metrics for respective CSB 552, which may quantify a degree to which the cyber state 1202 of the control system 101 corresponding to respective CSB 552, including healthy CSB 552 and unhealthy CSB 552. The comparing may further comprise identifying one or more proximate CSB 552, which may comprise CSB 552 that most closely correspond to the current cyber state 1202 of the control system 101, as disclosed herein.

In some embodiments, determining the physical state metrics 555 may comprise the physical state evaluator 1252 comparing the acquired physical state 1204 of the control system 101 (and/or respective regions thereof) to one or more PSB 554, as disclosed herein. The PSB 554 may comprise physical baseline characteristics, which as disclosed herein, may be configured to characterize respective physical states 1204, physical behaviors, and/or physical state metadata 240/1240. The features of respective PSB 554 may correspond to respective characteristics of the physical state 1204 of the control system 101 (and/or respective regions thereof), such as the physical state metadata 240, physical state parameters 242, physical state signatures 248, acquired physical state metadata 1240, acquired physical state parameters 1242, acquired physical state signatures 1248, portion(s) thereof, and/or the like. The features of respective PSB 554 may be extracted, determined, and/or learned from the physical state information (e.g., acquired physical-physical state data 1205, acquired physical state metadata 1240, physical state metadata 240, physical state metadata 20 maintained within the historical data store 1219, training data and/or the like). Determining the physical state metrics 555 may comprise determining PSB error metrics for respective PSB 554, which may quantify a degree to which the physical state 1204 of the control system 101 corresponding to respective PSB 554, including healthy PSB 554 and unhealthy PSB 554. The comparing may further comprise identifying one or more proximate PSB 554, which may comprise PSB 554 that most closely correspond to the current physical state 1204 of the control system 101, as disclosed herein.

The security engine 1210 may be further configured to incorporate the cyber state metrics 553 into the cyber health metadata 182, as disclosed herein. The security engine 1210 may be configured to determine cyber health metrics 282 for the control system 101 (and/or respective regions thereof), which may comprise and/or correspond to the error and/or CPSC metrics 175/575, as disclosed herein. The security engine 1210 may be further configured to incorporate the cyber state metrics 553 into the cyber health metrics 282, as disclosed herein. In some embodiments, the cyber health metrics 282 may be based on, inter alia, evaluation of one or more CSER, CSB error metrics of respective CSB 552 (e.g., healthy and/or unhealthy CSB 552), and/or the like, as disclosed herein. The cyber health metrics 282 may be configured to quantify a degree to which the acquired cyber state 1202 of the control system 101 (and/or respective regions thereof) correspond to healthy and/or unhealthy CSB 552, identify proximate CSB 552, and/or the like.

The security engine 1210 may be further configured to incorporate the physical state metrics 555 into the physical health metadata 184, as disclosed herein. The security engine 1210 may be configured to determine physical health metrics 284 for the control system 101 (and/or respective regions thereof), which may comprise and/or correspond to the error and/or CPSC metrics 175/575, as disclosed herein. The security engine 1210 may be further configured to incorporate the physical state metrics 555 into the physical health metrics 284, as disclosed herein. In some embodiments, the physical health metrics 284 may be based on, inter alia, evaluation of one or more PSER, PSB error metrics of respective PSB 554 (e.g., healthy and/or unhealthy PSB 554), and/or the like, as disclosed herein. The physical health metrics 284 may be configured to quantify a degree to which the acquired physical state 1202 of the control system 101 (and/or respective regions thereof) correspond to healthy and/or unhealthy PSB 554, identify proximate PSB 554, and/or the like.

The security engine 1210 may be configured to implement one or more mitigation operations in accordance with the determined cyber-physical state metadata 180, cyber health metadata 182, cyber health metrics 282, physical health metadata 184, and/or physical health metrics 284, as disclosed herein. The security engine 1210 may be configured to implement mitigation operations in response to cyber and/or physical state metrics 553/555 indicating failure of one or more CSER and/or PSER, as disclosed herein. Alternatively, or in addition, the security engine 1210 may be configured to implement mitigation operations in response to cyber and/or physical state metrics 553/555 indicating that the cyber and/or physical state 1202/1204 of the control system 101 is proximate to unhealthy CSB and/or PSB 552/554. The security engine 1210 may be configured to implement mitigation operations in accordance with identified CSER/PSER failures, proximate unhealthy CSB and/or PSB 552/554, and/or the like. As disclosed above, the cyber state metrics 553 may identify CSER failures and/or indicate that the acquired cyber state 1202 is proximate to (and/or is within a proximity threshold of) an unhealthy CSB 552. A CSER failure and/or proximity to an unhealthy CSB 552 may indicate a particular type of cyber-attack, cyber-attack directed to particular cyber components 120, compromise of particular cyber components 120 (e.g., one or more cyber nodes 124), and/or the like. The security engine 1210 may implement corresponding mitigation operations, which may comprise operations to: generate notifications corresponding to the failed CSER, generate notifications indicating the unhealthy CSB 552, mitigate cyber-attacks and/or cyber-attack vectors associated with the failed CSER and/or unhealthy CSB 552, which may comprise implementing operations to: mitigate cyber-attacks directed against identified cyber components 120 (e.g., deactivating identified cyber components 120), mitigate compromise of identified cyber components 120 (e.g., filter adversarial messages injected by the identified cyber components 120), shut down identified cyber-attack vectors (e.g., shut down one or more gateways and/or external channels), and/or the like.

The security engine 1210 may be further configured to implement mitigation operations in response to failure of one or more PSER and/or determining that the acquired physical state 1204 is proximate to an unhealthy PSB 554. As disclosed above, a PSER failure and/or proximity to an unhealthy PSB 554 may indicate a particular type of physical and/or component attack, physical attack vector, physical failure mode, and/or the like. The security engine 1210 may implement corresponding mitigation operations, which may comprise operations to: generate notifications indicating the failed PSER, generate notifications indicating the unhealthy PSB 554, mitigate attack(s) and/or failure modes associated with the failed PSER and/or unhealthy PSB 554, and/or the like. The mitigation operations may comprise operations to mitigate attacks directed against identified computational components 130 (e.g., reset specified computational components 130, modify control functions implemented thereby, and/or the like), mitigate attacks directed against identified physical components 140 (e.g., ignore sensor data acquired by identified sensor devices 144 and/or deactivate identified actuator devices 146), deactivate physical components 140 and/or PPV 155 operating in identified failure modes, and/or the like.

Figure 12B:
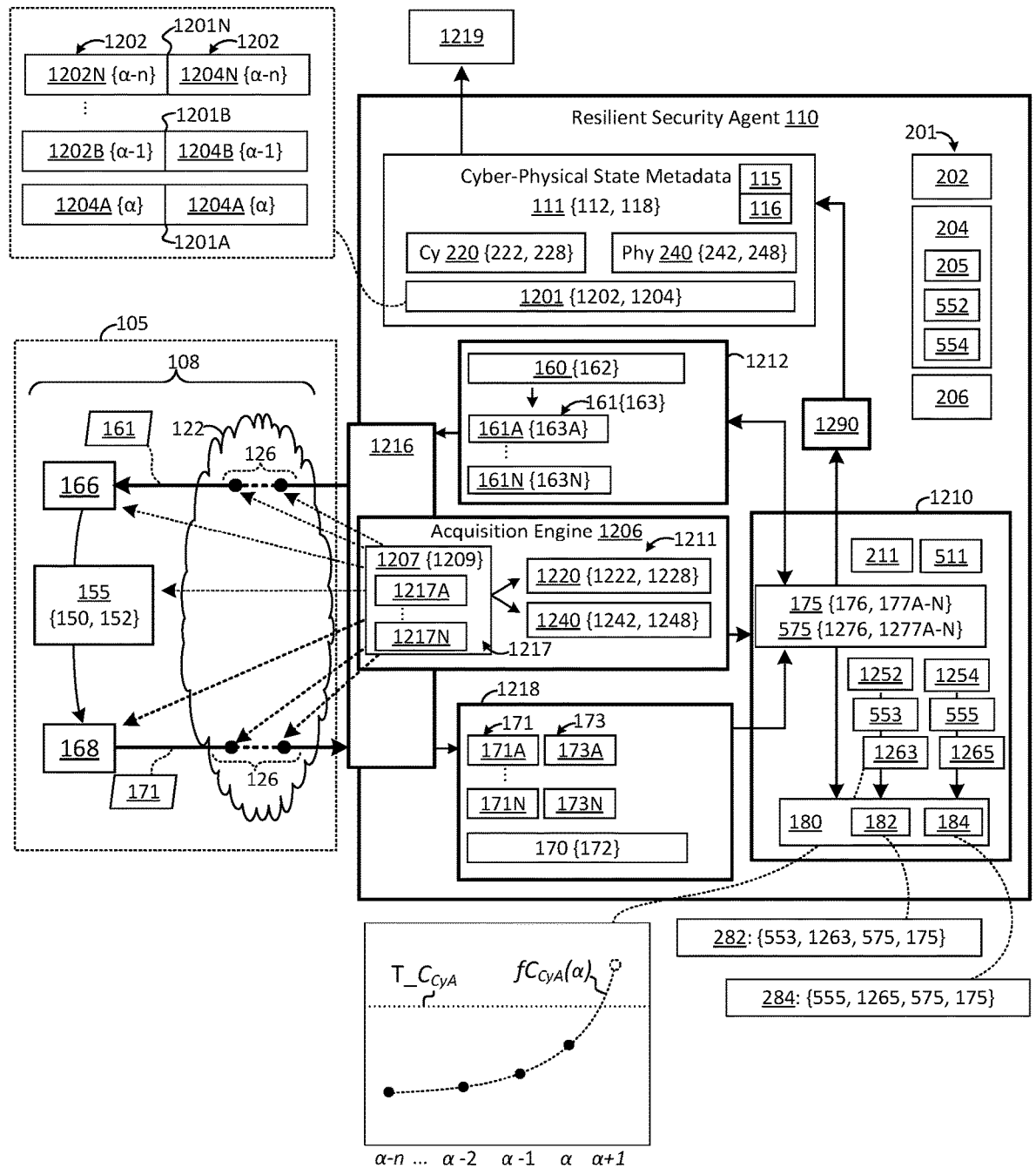

FIG. 12B is a schematic block diagram of another embodiment of cyber-physical system 100 comprising an RS agent 110, as disclosed herein. The RS agent 110 may be configured to communicate state keys 160 through selected regions of the control system 101, and determine error metrics 175 for the state keys 160, as disclosed herein. The RS agent 110 may be further configured to acquire the cyber-physical state 1201 of the control system 101 (and/or respective regions thereof), which may comprise acquiring cyber-physical state metadata 1211 in conjunction with communication of respective state keys 160 (and/or fragments 161 thereof), determining CPSC metrics 575 quantifying a confidence in the accuracy of the acquired cyber-physical state metadata 1211, and/or incorporating the acquired cyber-physical state metadata 1211 in accordance with the determined CPSC metrics 575. The RS agent 110 may comprise a cyber state evaluator 1252, which may be configured to, inter alia, determine cyber state metrics 553 for the control system 101 (and/or respective regions thereof) in accordance with the acquired cyber state 1202, as disclosed herein. The RS agent 110 may further comprise a physical state evaluator 1254, which may be configured to, inter alia, determine physical state metrics 555 for the control system 101 (and/or respective regions thereof) in accordance with the acquired physical state 1204, as disclosed herein.

As disclosed above, acquiring cyber-physical state metadata 1211 may comprise acquiring cyber-physical state data 1207 configured to comprise, define, and/or characterize the cyber-physical state 1201 of the control system 101 (and/or respective regions thereof) at a specified acquisition time α. The corresponding cyber-physical state metadata 111 maintained by the RS agent 110 may correspond to a time previous to the specified acquisition time α (e.g., may correspond to a previous acquisition time α-1 or α-Δα, where 1 and/or Δα represents the time between the specified acquisition time α and the time at which the cyber-physical state metadata 111 was last acquired, which may correspond to an acquisition frequency and/or period, as disclosed herein). In some embodiments, the state engine 1290 may be configured to incorporate the acquired cyber-physical state metadata 1211, which may comprise importing into the cyber-physical state metadata 111, discarding cyber-physical state metadata 111 replaced thereby, and/or destaging the discarded cyber-physical state metadata 111 to the historical data store 1219, as disclosed herein. In response to incorporating the acquired cyber-physical state metadata 1211, the updated cyber-physical state metadata 111 may characterize the cyber and/or physical state 1202/1204 of the control system 101 (and/or respective regions thereof) at the specified acquisition time α.

In the FIG. 12B embodiment, the state engine 1290 may be further configured to maintain cyber-physical state metadata 111 corresponding a plurality and/or range of acquisition times α. The state engine 1290 may be configured to retain cyber-physical state metadata 111 corresponding to a current acquisition time α and one or more previous acquisition times α-1, α-2, and so on. In some embodiments, the state engine 1290 is configured to maintain cyber-physical state metadata 111 corresponding to a sliding window of cyber-physical states 1201 of the control system 101 (and/or respective regions thereof), including, but not limited to: a cyber-physical state 1201A corresponding to a current acquisition time α, a cyber-physical state 1201B corresponding to a previous acquisition time α-1, and so on, including cyber-physical state 1201N corresponding to acquisition time α-n. Maintaining the cyber-physical state metadata may comprise: acquiring cyber-physical state metadata 1211 at a specified acquisition time α, importing the acquired cyber-physical state metadata 1211, designating the specified acquisition time α as the current acquisition time α of the cyber-physical state metadata 111, retaining cyber-physical state metadata 111 corresponding to acquisition times α through α-n, and discarding cyber-physical state metadata 111 corresponding to acquisition times outside of a through α-n. The retaining may comprise maintaining multiple versions of cyber-physical state metadata 111, each version associated with respective acquisition times between a and α-n (e.g., retaining cyber state metadata 220, cyber state parameters 222, cyber state signatures 228, physical state metadata 240, physical state parameters 242, and/or physical state signatures 248 having acquisition times between a and α-n). The discarding may comprise identifying cyber-physical state metadata 111 having acquisition times outside of a through α-n, removing the identified cyber-physical state metadata 111, and/or moving the identified cyber-physical state metadata 111 to a data store (e.g., historical data store 1219, as disclosed above). The cyber-physical state metadata 111 maintained by the RS agent 110 may comprise, define, and/or characterize the cyber-physical state 1201 of the control system 101 (and/or respective regions thereof) at respective acquisition times α through α-n, which may correspond to cyber-physical states 1201A-N, respectively.

As disclosed above, the cyber state evaluator 1252 may be configured to determine cyber state metrics 553 for the control system 101 (and/or respective regions thereof), which may comprise, inter alia, evaluating one or more CSER, as disclosed herein. Alternatively, or in addition, determining the cyber state metrics 553 may comprise comparing one or more of the cyber states 1202A-N (e.g., the current cyber state 1202A) to respective CSB 552, as disclosed herein. The physical state evaluator 1254 may be configured to determine physical state metrics 555 for the control system 101 (and/or respective regions thereof), which may comprise, inter alia, evaluating one or more PSER, as disclosed herein. Alternatively, or in addition, determining the physical state metrics 555 may comprise comparing one or more of the physical states 1204A-N (e.g., the current physical state 1204A) to respective PSB 554, as disclosed herein.

In the FIG. 12B embodiment, determining the cyber state metrics 553 may comprise the evaluating CSER that correspond to a sliding window of cyber states 1202A-N. By way of non-limiting example, a CSER may require that a mean message size characteristic of one or more cyber nodes 124 remain below a specified threshold. Evaluating the CSER may comprise determining mean message size characteristics of the cyber nodes 124 at respective acquisition times α-n through a (at cyber states 1202N-A as maintained in the cyber-state metadata 111). Evaluating the CSER may comprise determining whether the mean message size satisfies the specified threshold throughout the sliding window (from α-n to α). Alternatively, or in addition, evaluating the CSER may comprise calculating a mean message size from α-n through a (e.g., combining mean message size characteristics across cyber states 1202N-A), and comparing the calculated mean message size to the specified threshold. By way of further non-limiting example, a CSER may pertain to cyber behavior spanning a range of acquisition times (e.g., from α-n to α). A CSER may comprise an "unused connection" rule, which may require the number of "unused connections" to be lower than a threshold. Evaluating the "unused connection" CSER rule may comprise: identifying requests to open connections at earlier acquisition times in the window (e.g., at or around α-n), and detecting "unused" connections (e.g., detecting connections opened at about acquisition time α-n that remained unused at acquisition time α). Evaluation of the CSER may fail if the number of unused connections exceed an unused connection threshold.

In the FIG. 12B embodiment, determining the physical state metrics 555 may comprise the evaluating PSER that correspond to a sliding window of physical states 1204A-N. By way of non-limiting example, a PSER may require that generators controlled by one or more CPCE 105 remain in phase, and/or return to in-phase operation within a threshold time after being disturbed. Evaluating a PSER may comprise determining whether the physical state metadata 240 indicates that the generators were out-of-phase from α-n to a and, if so, determining an amount of time the generators remained out-of-phase. Evaluation of the PSER may fail in response to determining that the generators were out-of-phase for more than a threshold re-synchronization time. By way of further non-limiting example, a PSER may indicate that an actuator 146 (protective relay) is to open a branch breaker in response to detection of a fault by one or more sensor devices 144. Evaluating the PSER may comprise determining whether a fault was detected during α-n to a (based on physical state metadata 240 of the one or more sensor devices 144) and, if so, determining whether the actuator 146 opened the branch breaker in response to detection of the fault. Evaluation of the PSER may fail in response to determining that the actuator device 146 failed to open the branch breaker and/or failed to open the branch breaker by a specified time after detection of the fault. By further non-limiting example, another PSER may specify that the actuator 146 is to close the branch breaker within a specified time after clearance of the fault condition. Evaluating the PSER may comprise determining whether the fault was cleared during α-n to α (based on physical state metadata 111 pertaining to physical states 1204N-A) and, if so, determining whether the actuator 146 closed the branch breaker within the specified time of the detection. Although particular examples of CSER and/or PSER pertaining to cyber-physical state 1201A-N at multiple acquisition times α as described herein, the disclosure is not limited in this regard and could be adapted to use, define, and/or evaluate any suitable cyber and/or physical state characteristics covering any suitable time period, window, and/or time range.

In the FIG. 12B embodiment, the cyber state evaluator 1252 may be further configured to determine cyber state delta (CyΔ) metrics 1263. Determining the CyΔ metrics 1263 may comprise quantifying changes to the cyber state 1202 of the control system 101 (and/or respective regions thereof) as a function of acquisition time. Determining the CyΔ metrics 1263 may comprise correlating cyber state information to a sliding window of cyber states 1202A-N, which may provide for detection of cyber-attacks resulting in delayed and/or gradual changes to the cyber and/or physical state 1202/1204 of the control system 101. The CyΔ metrics 1263 may enable the security engine 1210 to detect and/or mitigate cyber-physical attacks before the cyber state 1202 of the control system 101 exhibits the characteristics thereof (e.g., before the cyber state 1202 transitions from a healthy CSB 552 to an unhealthy CSB 552). The physical state evaluator 1254 may be further configured to determine physical state Δ (PhyΔ) metrics 1265. Determining the PhyΔ metrics 1265 may comprise quantifying changes to the physical state 1204 of the control system 101 (and/or respective regions thereof) as a function of acquisition time. Determining the PhyΔ metrics 1265 may comprise correlating physical state information to a sliding window of physical states 1204A-N, which may provide for detection of cyber-physical attacks and/or failure modes resulting in delayed and/or gradual changes to the cyber and/or physical state 1202/1204 of the control system 101. The PhyΔ metrics 1265 may enable the security engine 1210 to detect and/or mitigate cyber-physical attacks and/or failure modes before the physical state 1204 of the control system 101 exhibits the characteristics thereof (e.g., before the physical state 1204 transitions from a healthy CSB 554 to an unhealthy PSB 554).

Determining the CyΔ metrics 1263 may comprise the cyber state evaluator 1252 determining differences between respective cyber states 1202A-N, and quantifying a degree to which the respective cyber states 1202A-N are trending with respect to the evaluation of one or more CSER. Determining the CyΔ metrics 1263 may comprise determining trends regarding CSER evaluation scores (e.g., whether the CSER scores are trending towards CSER failure). Alternatively, or in addition, determining the CyΔ metrics 1263 may comprise determining trends in CSER failures (e.g., number of CSER failures from acquisition time α-n to α). In some embodiments, determining the CyΔ metrics 1263 may comprise determining whether the acquired cyber states 1202A-N are trending toward unhealthy CSB 552 and away from healthy CSB 552 (or vice versa).

Determining the PhyΔ metrics 1265 may comprise the physical state evaluator 1254 determining differences between respective physical states 1204A-N, and quantifying a degree to which the respective physical states 1204A-N are trending with respect to the evaluation of one or more PSER. Determining the PhyΔ metrics 1265 may comprise determining trends regarding PSER evaluation scores (e.g., whether the PSER scores are trending towards PSER failure). Alternatively, or in addition, determining the PhyΔ metrics 1265 may comprise determining trends in PSER failures (e.g., number of PSER failures from acquisition time α-n to a. In some embodiments, determining the PhyΔ metrics 1265 may comprise evaluating differences between respective physical states 1204A-N, and quantifying a degree to which the acquired physical states 1204A-N are trending toward unhealthy PSB 554 and away from healthy PSB 554 (or vice versa).

In some embodiments, determining the CyΔ metrics 1263 may comprise estimating a trajectory of the cyber state 1202 of the control system 101, and/or respective regions thereof (e.g., estimating $\vec{Cy}$). The trajectory estimate $\vec{Cy}$ may be based on, inter alia, the sliding window of cyber states 1202A-N. Estimating the trajectory $\vec{Cy}$ may comprise modeling the changes in the cyber states 1202A-N (e.g., modeling changes to the cyber state 1202 from acquisition time α-n to the current acquisition time α). Determining the CyΔ metrics 1263 may further comprise projecting the cyber state 1202 of the control system 101 (and/or respective regions thereof) in accordance with the estimated trajectory $\vec{Cy}$ (e.g., projecting the cyber state 1202 at times α+1, α+2, and so on), and/or comparing the projected cyber state 1202 to one or more CSB 552, as disclosed herein. The CyΔ metrics 1263 may, therefore, indicate a likelihood that the cyber state 1202 will correspond to specified CSB 552 prior to cyber state 1202 exhibiting characteristics of the specified CSB 552. The CyΔ metrics 1263 may quantify a probability that future cyber state(s) 1202 of the control system 101 (and/or respective regions thereof) will correspond to healthy CSB 552, unhealthy CSB 552, and/or the like. Determining the CyΔ metrics 1263 may comprise determining projected proximate CSB 552 (e.g., CSB 552 projected to be proximate to future cyber states 1202 of the control system 101 and/or respective regions thereof). Determining the PhyΔ metrics 1265 may comprise estimating a trajectory of the physical state 1204 ($\vec{Phy}$), projecting the physical state 1204, and/or comparing the projected physical state 1204 to one or more PSB 554, as disclosed herein.

In some embodiments, determining the CyΔ metrics 1263 may comprise estimating a trajectory of one or more characteristics of the cyber state 1202 as a function of acquisition time α (the characteristics comprising and/or corresponding to: cyber state metadata 220, cyber state parameters 222, cyber state signatures 228, acquired cyber state metadata 1220, acquired cyber state parameters 1222, acquired cyber state signatures 1228, portion(s) thereof, and/or the like). Determining the trajectory of a cyber state characteristic may comprise fitting values of the characteristic at respective acquisition times (in cyber states 1202N-A corresponding to acquisition times α-n through α, respectively) to a modeling function. Determining the trajectory of the cyber state characteristic may further comprise determining a projected value of the characteristic (e.g., projecting a value of the characteristic at a future acquisition time α+1, α+2, ... α+n). As illustrated in FIG. 12B, determining the trajectory of a cyber state characteristic A (CyA) may comprise fitting values of CyA at acquisition times α-n through α to a modeling function ($fC_{CyA}$). A projected value of CyA may be determined by use of the fit modeling function ($fC_{CyA}$). FIG. 12B embodiment, the cyber state evaluator 1252 is configured to determine a projected value of CyA at next acquisition time α+1. Determining the CyA metrics 1263 may comprise comparing the projected values of the one or more cyber state characteristics to corresponding features of one or more CSB 552. In the FIG. 12B embodiment, the comparing may comprise comparing the projected value of CyA to a threshold ($T\_C_{CyA}$), which may distinguish a "healthy" cyber state 1202 from an "unhealthy" cyber state 1202 (e.g. the "healthy" cyber state 1202 may correspond to cyber states 1202 in which CyA is lower than $T\_C_{CyA}$ the "unhealthy" cyber state 1202 may correspond to cyber states 1202 in which CyA exceeds $T\_C_{CyA}$). The resulting cyber state metrics 1263 produced by the cyber state evaluator 1252 may, therefore, be configured to indicate that cyber state 1202 is transitioning to an "unhealthy" cyber state 1202 (e.g., an unhealthy CSB 552). Determining the CyΔ metrics 1263 may, therefore, comprise determining projected proximate CSB 552, as disclosed above. Determining the PhyΔ metrics 1265 may comprise estimating a trajectory of one or more characteristics of the physical state 1202, projecting the physical state characteristics, and/or comparing the projected physical state characteristics to one or more PSB 554, as disclosed herein. Although particular techniques for estimating the trajectory of cyber and/or physical states 1202/1204 (and/or characteristics thereof) and/or determining projected states and/or state characteristics are described herein, the disclosure is not limited in this regard and could be adapted to use any suitable estimation and/or projection means (e.g., interpolation, linear fit, curve fit, exponential fit, polynomial fit, Savitsky-Golay polynomial estimation, and/or the like).

The security engine 1210 may be configured to determine cyber-physical health metadata 180 for the control system 101 (and/or respective regions thereof), which may comprise determining cyber health metadata 182, and physical health metadata 184. The security engine 1210 may be configured to determine the cyber health metrics 282, which may be based on, inter alia, error metrics 175, CPSC metrics 575, and cyber state metrics 553, as disclosed herein. In the FIG. 12B embodiment, determining the cyber health metrics 282 may further comprise incorporating CyΔ metrics 1263 determined by the cyber state evaluator 1252, as disclosed herein. The cyber health metrics 282 may, therefore, be configured to correlate cyber state information to a sliding window of cyber states 1202A-N, which may provide for detection of cyber-attacks resulting in delayed and/or gradual changes to the cyber and/or physical state 1202/1204 of the control system 101. Incorporating the CyΔ metrics 1263 may comprise monitoring changes to the cyber state 1202N-A of the control system 101 (and/or respective regions thereof) with respect to evaluation of one or more CSER (e.g., whether the cyber state 1202 is trending towards increased CSER failures). Incorporating the CyΔ metrics 1263 may comprise quantifying a degree to which the cyber state 1202 of the control system 101 (and/or respective regions thereof) is trending away from healthy CSB 552, towards unhealthy CSB 552, and/or the like. Alternatively, or in addition, incorporating the CyΔ metrics 1263 may comprise quantifying a degree to which respective cyber state characteristics are trending away from characteristics of healthy CSB 552, towards characteristics of unhealthy CSB 552, and/or the like. In some embodiments, incorporating the CyΔ metrics 1263 may comprise identifying projected proximate CSB 552, which may comprise CSB 552 to which the cyber state 1202 of the control system 101 (and/or respective regions thereof) is projected to converge.

The security engine 1210 may be further configured to determine the physical health metrics 284, which may be based on, inter alia, error metrics 175, CPSC metrics 575, and physical state metrics 555, as disclosed herein. In the FIG. 12B embodiment, determining the physical health metrics 284 may further comprise incorporating PhyΔ metrics 1265 determined by the physical state evaluator 1254, as disclosed herein. The physical health metrics 284 may, therefore, be configured to correlate physical state information to a sliding window of physical states 1204A-N, which may provide for detection of component attacks, physical attack vectors, and/or failure modes resulting in delayed and/or gradual changes to the cyber and/or physical state 1202/1204 of the control system 101. Incorporating the PhyΔ metrics 1265 may comprise monitoring changes to the physical state 1204N-A of the control system 101 (and/or respective regions thereof) with respect to evaluation of one or more PSER (e.g., whether the physical state 1204 is trending towards increased PSER failures). Incorporating the PhyΔ metrics 1265 may comprise quantifying a degree to which the physical state 1204 of the control system 101 (and/or respective regions thereof) is trending away from healthy PSB 554, towards unhealthy PSB 554, and/or the like. Alternatively, or in addition, incorporating the PhyΔ metrics 1265 may comprise quantifying a degree to which respective physical state characteristics are trending away from characteristics of healthy PSB 554, towards characteristics of unhealthy PSB 554, and/or the like. In some embodiments, incorporating the PhyΔ metrics 1265 may comprise identifying projected proximate PSB 554, which may comprise PSB 554 to which the physical state 1204 of the control system 101 (and/or respective regions thereof) is projected to converge.

The security engine 1210 may be configured to implement mitigation operations in accordance with the determined cyber-physical state metadata 180, as disclosed herein. The security engine 1210 may be further configured to implement mitigation operations in accordance with the cyber and/or physical state metrics 553/555 and/or the corresponding cyber and/or physical health metrics 282/284. In the FIG. 12B embodiment, the security engine 1210 may be further configured to implement mitigation operations in response to CyΔ and/or PhyΔ metrics 1263/1265 indicating that the cyber and/or physical health of the control system 101 is degrading (e.g., trending towards unhealthy CSB and/or PSB 552/554). The security engine 1210 may be configured to determine that a cyber state 1202 of the control system 101 (and/or region thereof) is trending toward an unhealthy CSB 552 in response to one or more of: CSB error metrics between projected cyber states 1202 and healthy CSB 552 failing to satisfy one or more healthy state error thresholds, CSB error metrics between the projected cyber states 1202, projected proximate CSB 552 failing to include a healthy CSB 552, CSB error metrics between the projected cyber states 1202 and unhealthy CSB 552 failing to satisfy one or more unhealthy state error thresholds, projected proximate CSB 552 including an unhealthy CSB 552, and/or the like. The security engine 1210 may be further configured to determine that a physical state 1202 of the control system 101 is degrading and/or trending towards an unhealthy PSB 554, as disclosed above (e.g., based on, inter alia, PSB error metrics between projected physical states 1204 and healthy and/or unhealthy PSB 552, projected proximate PSB 554, and/or the like).

The security engine 1210 may be configured to implement mitigation operations in accordance with identified proximate CSB and/or PSB 552/554, as disclosed above. In the FIG. 12B embodiment, the security engine 1210 may be further configured to implement mitigation operations in accordance with projected proximate CSB and/or PSB 552/554. As disclosed above, the CyΔ metrics 1263 may indicate that the cyber state 1202 of the control system 101 (and/or a region thereof) is projected to converge to an unhealthy CSB 552 at a future acquisition time (e.g, at an acquisition time α+p, where p is the projection time). In response, the security engine 1210 may implement mitigation operations in accordance with the projected unhealthy CSB 552, as disclosed above (may implement mitigation operations corresponding to the mitigation operations implemented in response to determining that the cyber state 1202 corresponds to the unhealthy CSB 552). The security engine 1210 may adapt the mitigation operations in accordance with confidence in the projection and/or a proximity of the projection. The security engine 1210 may be configured to increase the priority of the mitigation operations (and/or warning level(s) of corresponding notifications) in proportion to the corresponding CPSC metrics 575 and/or in inverse proportion to the proximity. The security engine 1210 may be further configured to implement mitigation operations in accordance with projected unhealthy PSB 554, as disclosed above.

Figure 13A:
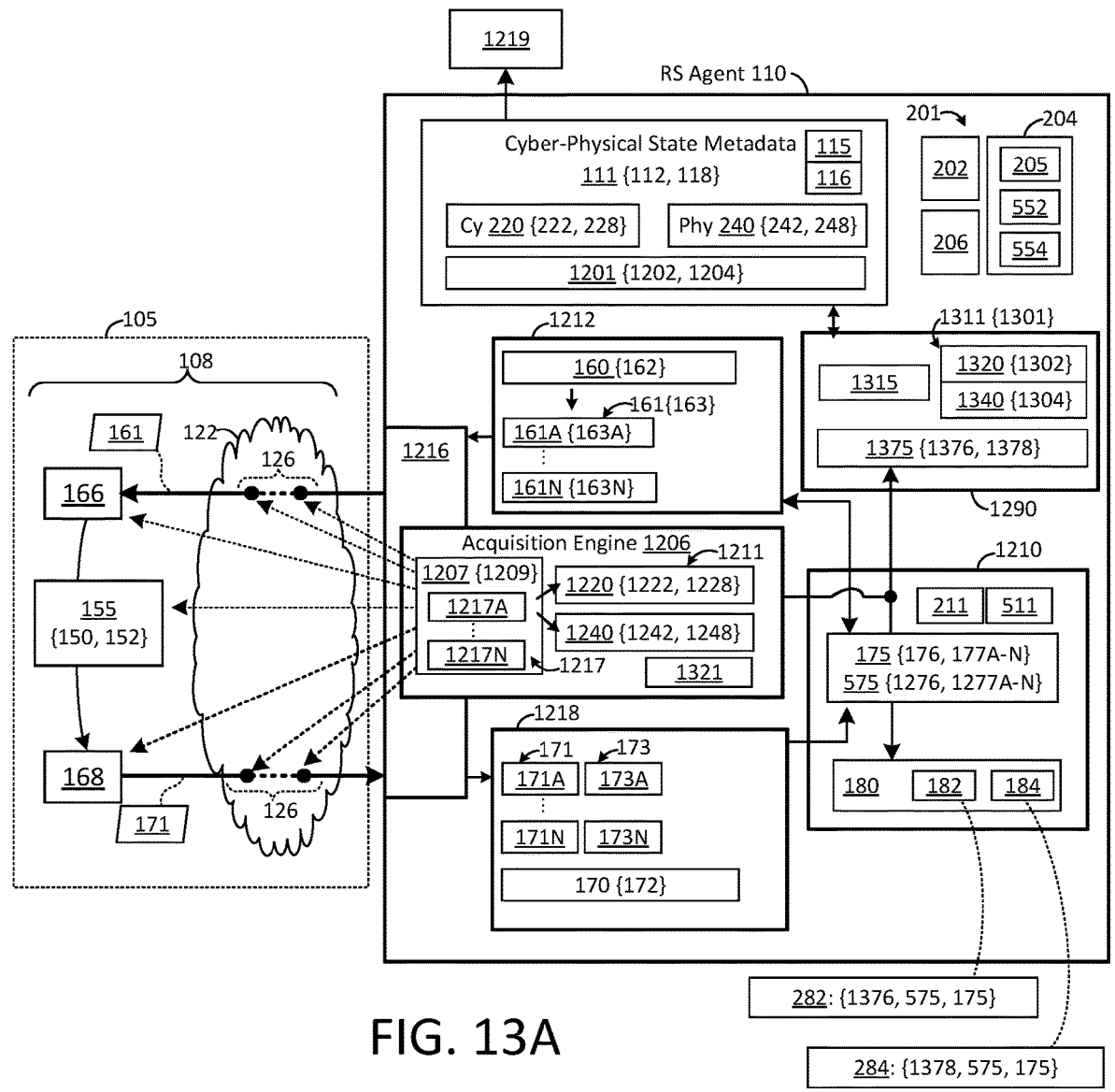

FIG. 13A is a schematic block diagram of another embodiment of an RS agent 110, as disclosed herein. In the FIG. 13A embodiment, the RS agent 110 may comprise a security engine 1210, key generator 1212, communication manager 1216, error monitor 1218, and/or acquisition engine 1206, as disclosed herein. The RS agent 110 may further comprise a state engine 1290, which may be configured to maintain cyber-physical state metadata 111 configured to characterize the cyber-physical state 1201 of the control system 101 (and/or respective regions thereof), as disclosed herein. In the FIG. 13A embodiment, the state engine 1290 may be further configured to determine estimated cyber-physical state metadata 1311 for the control system 101 (and/or respective regions thereof), which may comprise determining an estimated cyber-physical state 1301 of the control system 101 based on, inter alia, existing cyber-physical state metadata 111 maintained by the RS agent 110 (and/or an existing cyber-physical state 1201). The state engine 1290 may be further configured to determine state estimation metrics 1375, which may be configured to quantify errors, differences, and/or distances between acquired cyber-physical state metadata 1211 and corresponding estimated cyber-physical state metadata 1311.

As disclosed above, the acquisition engine 1206 may be configured to acquire cyber-physical state metadata 1211, which may be configured to characterize the cyber-physical state 1201 of the control system 101 (and/or selected regions thereof) at specified acquisition times $\alpha$. The state engine 1290 may be configured incorporate the acquired cyber-physical state metadata 1211, which may comprise incorporation into existing cyber-physical state metadata 111 configured to characterize the cyber-physical state 1201 of the control system 101 (and/or respective regions thereof) previous to the specified acquisition time $\alpha$ (e.g., at acquisition times $\alpha$-p, where p is a time since the cyber-physical state metadata 111 was last acquired). In the FIG. 13A embodiment, the state engine 1290 may be further configured to determine estimated cyber-physical state metadata 1311 corresponding to the acquired cyber-physical state metadata 1211, which comprise determining a cyber-physical state estimate 1301 at acquisition time $\alpha$ based on, inter alia, cyber-physical state metadata 111 corresponding to the previous acquisition time $\alpha$-p. Determining the cyber-physical state estimate 1301 may comprise determining estimated cyber-physical state metadata 1311 based on, inter alia, the existing cyber-physical state metadata 111 corresponding to the previous acquisition time $\alpha$-p. Determining the cyber-physical state estimate 1301 may comprise determining a cyber state estimate 1302 (and/or estimated cyber state metadata 1320), determining a physical state estimate 1304 (and/or estimated physical state metadata 1340), and/or the like. Determining the estimated cyber-physical state metadata 1311 may comprise projecting the existing cyber-physical state metadata 111 from acquisition time $\alpha$-p to the acquisition time $\alpha$ of the acquired cyber-physical state metadata 1211. The estimated cyber-physical state metadata 1311 and the acquired cyber-physical state metadata 1211 may, therefore, correspond to a same (and/or substantially similar) acquisition time $\alpha$. The state estimator 1290 may be further configured to determine state estimation metrics 1375 for the acquired cyber-physical state metadata 1211 by, inter alia, comparing the acquired cyber-physical state metadata 1211 to the estimated cyber-physical state metadata 1311. The state estimation metrics 1375 may comprise cyber state estimation metrics 1376, which may be configured to quantify error, differences, and/or distances between acquired cyber state metadata 1220 and estimated cyber state metadata 1320. The state estimation metrics 1375 may further comprise physical state estimation metrics 1378, which be configured to quantify error, differences, and/or distances between acquired physical state metadata 1240 and estimated physical state metadata 1340.

The state engine 1290 may determine cyber-physical state estimates 1301 corresponding to acquired cyber-physical state metadata 1211 using any suitable state estimation and/or observation technique. In some embodiments, the state engine 1290 is configured to determine cyber-physical state estimates 1301 by use of a process model 1315 of the control system 101 (and/or process models 1315 corresponding to respective CPCE 105). The process model may 1315 comprise any suitable means for modeling and/or determining cyber-physical state estimates 1301. In one embodiment, the process model 1315 may comprise and/or correspond to a linear time-varying (LTV) model of the control system 101 (and/or respective CPCE 105 thereof), as follows:

$$CPS_\alpha = A_{\alpha\text{-}p} CPS_{\alpha\text{-}p} + B_{\alpha\text{-}p} u_{\alpha\text{-}p} + N_{\alpha\text{-}p} W_{\alpha\text{-}p}$$

$$y_{\alpha\text{-}p} = C_{\alpha\text{-}p} CPS_{\alpha\text{-}p} + D_{\alpha\text{-}p} u_{\alpha\text{-}p} + v_{\alpha\text{-}p}$$

In the expression above, $CPS_\alpha$ may comprise an estimated cyber-physical state 1301 of the control system 101 at acquisition time $\alpha$ (acquisition time $\alpha$ corresponding to acquired cyber-physical state metadata 1211, as disclosed herein), which may be based on $CPS_{\alpha\text{-}p}$, which may be configured to model the cyber-physical state 1201 of the control system 101 at an earlier acquisition time (e.g., acquisition time $\alpha$-p of the existing cyber-physical state metadata 111 maintained by the RS agent 110); $u_{\alpha\text{-}p}$, $w_{\alpha\text{-}p}$, $v_{\alpha\text{-}p}$, and $y_{\alpha\text{-}p}$ may be configured to model control inputs, process noise, measurement noise, and output state of the control system 101 at the acquisition time $\alpha$-p, respectively. Parameters $A_{\alpha\text{-}p}$,-$N_{\alpha\text{-}p}$ may comprise weighting and/or scaling factors. The process and/or measurement noise ($w_{\alpha\text{-}p}$ and/or $v_{\alpha\text{-}p}$) may correspond to error and/or CPSC metrics 175/575 (and/or corresponding cyber-physical health metadata 180), as disclosed herein.

In some embodiments, the state engine 1290 may be configured to determine state estimation metrics 1375 for acquired cyber-physical state metadata 1211. Determining the state estimation metrics 1375 for acquired cyber-physical state metadata 1211 configured to characterize a cyber-physical state of selected CPCE 105 at a specified acquisition time $\alpha$ may comprise: determining a cyber-physical state estimate 1301 for the selected CPCE 105 based on the cyber-physical state 1201 of the CPCE 105 at a previous acquisition time (e.g., acquisition time $\alpha$-p), and comparing the cyber-physical state estimate 1301 to the acquired cyber-physical state metadata 1211. Determining the cyber-physical state estimate 1301 may comprise: identifying cyber-physical state metadata 111 pertaining to the selected CPCE 105, determining an acquisition time of the identified cyber-physical state metadata 111 relative to the specified acquisition time $\alpha$ (e.g., determining the previous acquisition time $\alpha$-p of the existing cyber-physical state metadata 111), and determining estimated cyber-physical state metadata 1311 based on the identified cyber-physical state metadata 111, the determined acquisition time α-p, and process model(s) 1315 of the selected CPCE 105. Determining the estimated cyber-physical state metadata 1311 may comprise projecting the existing cyber-physical state metadata 111 from the previous acquisition time α-p to the specified acquisition time α. Determining the estimated cyber-physical state metadata 1311 may comprise using the process model(s) 1315 to determine estimated cyber state metadata 1320 from existing cyber state metadata 220, determine estimated physical state metadata 1340 from existing physical state metadata 240, and/or the like.

The state estimate metrics 1375 may be configured to quantify a degree to which the acquired cyber-physical state metadata 1211 differs from the estimated cyber-physical state metadata 1311. Determining the state estimate metrics 1375 for acquired cyber-physical state metadata 1211 may comprise comparing the acquired cyber-physical state metadata 1211 to corresponding estimated cyber-physical state metadata 1311. The state estimate metrics 1375 may comprise cyber estimate metrics 1376 and physical estimate metrics 1378. The cyber state error metrics 1376 may quantify differences between acquired cyber state metadata 1220 (e.g., acquired cyber state parameters and/or signatures 1222/1228) and corresponding estimated cyber state metadata 1320. The physical state error metrics 1378 may quantify differences between acquired physical state metadata 1240 (e.g., acquired physical state parameters and/or signatures 1242/1248) and corresponding estimated physical state metadata 1340.

The state engine 1290 may be further configured to incorporate the determined state estimate metrics 1375 into the cyber-physical health metadata 180. The state engine 1290 may be configured to incorporate state error parameters 181 into the cyber and/or physical health metadata 182 and/or 184, which may quantify a degree to which respective acquired cyber-physical metadata 1211 diverges from corresponding estimated cyber-physical state metadata 1311. The state engine 1290 may be configured to incorporate cyber estimation metrics 1376 into corresponding cyber health metadata 182 and incorporate physical estimation metrics 1378 into corresponding physical health metadata 184. The security engine 1210 may be configured to determine composite cyber-physical health metrics pertaining to respective regions of the control system 101 based on the incorporated state estimation metrics 1375. The security engine 1210 may be configured to determine the cyber health metrics 282, which may be based on, inter alia, error metrics 175, CPSC metrics 575, and/or cyber estimation metrics 1376, as disclosed herein. The security engine 1210 may be configured to determine the physical health metrics 284, which may be based on, inter alia, error metrics 175, CPSC metrics 575, and/or physical estimation metrics 1378, as disclosed herein.

The security engine 1210 may be configured to implement mitigation operations in accordance with the determined cyber and/or physical health metrics 282/284. The security engine 1210 may be configured to implement mitigation operations in response to error metrics 175 that exceed one or more error thresholds, CPSC metrics 575 that fail to satisfy one or more confidence thresholds, and so on, as disclosed herein. The security engine 1210 may be configured to detect high cyber and/or physical estimation metrics 1376/1378 (by use of one or more cyber and/or physical estimation thresholds, or the like). The security engine 1210 may be configured to implement mitigation operations in response to high cyber estimation metrics 1376, which may indicate differences between acquired cyber-state metadata 1211 and corresponding estimated cyber-physical state metadata 1376, which may be due to cyber-attack, and/or compromise of one or more cyber components 120, the CS network 122, cyber nodes 124, and/or the like. In response to detecting high cyber estimation metrics 1376, the security engine 1210 may be configured to adapt communication of subsequent state keys 160 to, inter alia, determine a source of the high cyber estimation metrics 1376, as disclosed herein (e.g., adapt communication of the subsequent state keys 160 in accordance with a cyber isolation scheme). The security engine 1210 may be further configured to implement mitigation operations in response to cyber estimation metrics 1376, which may include, but are not limited to: generating notifications pertaining to cyber estimation metrics 1376 (e.g., the notifications identifying potential causes of the high cyber estimation metrics 1376), deactivating, isolating, and/or resetting cyber-physical components 102 associated with the high cyber estimation metrics 1376 (e.g., cyber components 120, cyber nodes 124, cyber paths 126, and/or the like), and so on.

The security engine 1210 may be further configured to implement mitigation operations in response to detecting high physical estimation metrics 1378. In response to acquired state metadata 1211 covering specified CPCE 105 having high physical estimation metrics 1378, the security engine 1210 may be configured to adapt communication of subsequent state keys 160 to, inter alia, determine a source of the high physical estimation metrics 1378, as disclosed herein (e.g., adapt communication of the subsequent state keys 160 in accordance with a physical isolation scheme). The security engine 1210 may be further configured to implement mitigation operations in response to the high physical estimation metrics 1378, which may include, but are not limited to: generating notifications pertaining to the high physical estimation metrics 1378 (e.g., the notifications identifying potential causes of the high physical estimation metrics 1378), slowing control function(s) of the CPCE 105, halting control function(s) of the CPCE 105, modifying the control function(s) of the CPCE 105 (e.g., implementing a "safe mode" of the CPCE 105), isolating the CPCE 105 from other CPCE 105 of the control system 101, physical components 140 of the CPCE 105 from other cyber-physical components 102 of the control system 101, and/or the like.

Figure 13B:
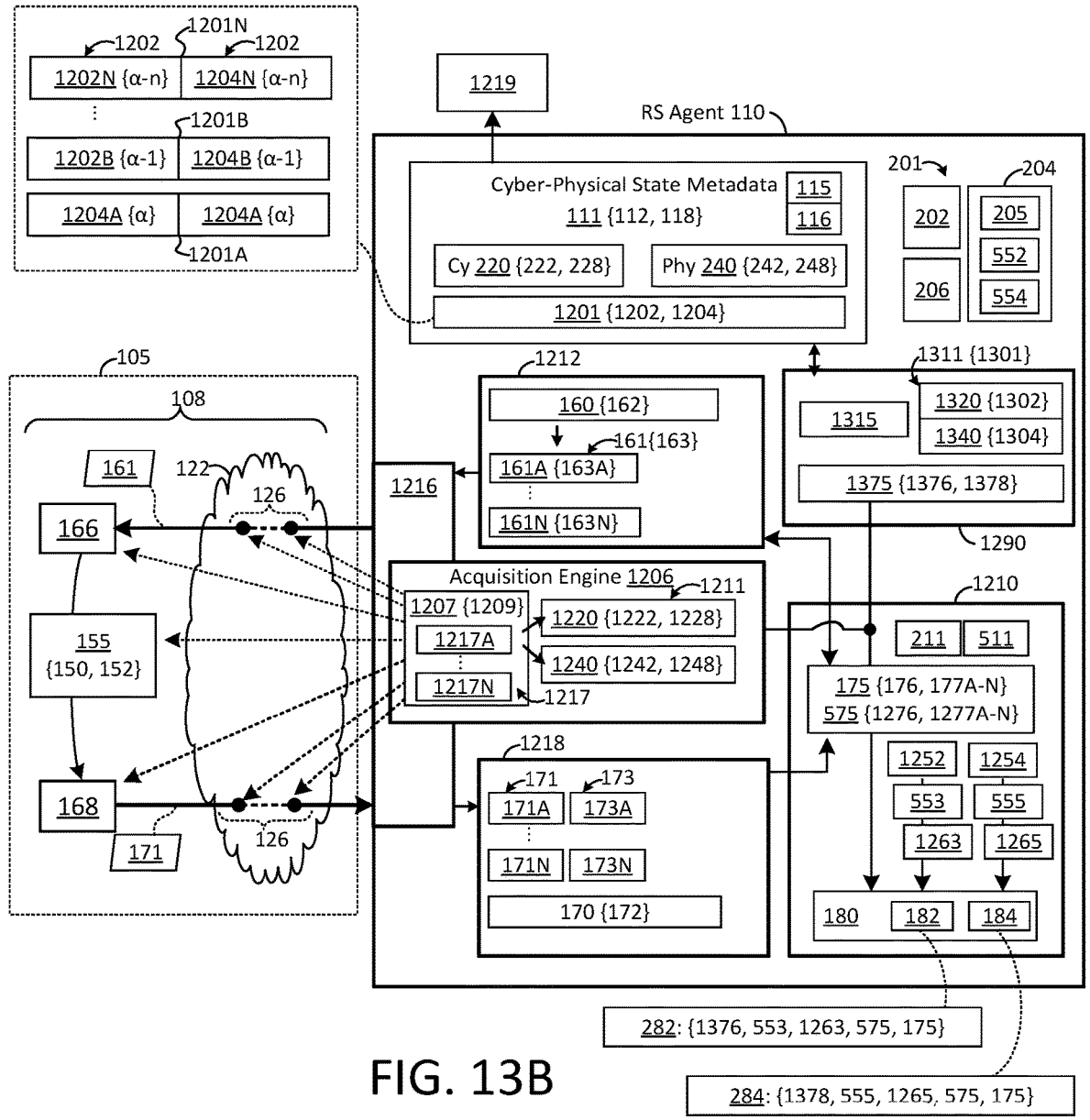

FIG. 13B is a schematic block diagram of another embodiment of cyber-physical system 100 comprising an RS agent 110, as disclosed herein. The RS agent 110 may be configured to communicate state keys 160 through selected regions of the control system 101, and determine error metrics 175 for the state keys 160, as disclosed herein. The RS agent 110 may be further configured to acquire the cyber-physical state 1201 of the control system 101 (and/or respective regions thereof), which may comprise acquiring cyber-physical state metadata 1211 in conjunction with communication of respective state keys 160 (and/or fragments 161 thereof), determining CPSC metrics 575 quantifying a confidence in the accuracy of the acquired cyber-physical state metadata 1211, and/or incorporating the acquired cyber-physical state metadata 1211 in accordance with the determined CPSC metrics 575. The RS agent 110 may be further configured to maintain cyber-physical state metadata 111 corresponding to a range of acquisition times α, including cyber-physical state metadata 111 configured to characterize a plurality of cyber-physical states 1201A-N of the control system 101 (and/or respective regions thereof), each cyber-physical state 1201A-N corresponding to a respective acquisition time α through α-n.

In the FIG. 13B embodiment, the state engine 1290 may be configured to determine estimated cyber-physical state metadata 1311 corresponding to acquired cyber-physical state metadata 1211, and determine corresponding state estimation metrics 1375, as disclosed herein. The state engine 1290 may be further configured to determine cyber state projections, physical state projections, cyber characteristic projections, physical characteristic projections and/or the like, as disclosed herein. The RS agent 110 may comprise a cyber state evaluator 1252, which may be configured to determine cyber state metrics 553 and/or Cy$\Delta$ metrics 1263 for the control system 101 (and/or respective regions thereof) in accordance with the acquired cyber state(s) 1202A-N and one or more CSB 552, as disclosed herein (e.g., by use of cyber state projections and/or cyber characteristic projections determined by the state engine 1290. The RS agent 110 may further comprise a physical state evaluator 1254, which may be configured to determine physical state metrics 555 and/or Phy$\Delta$ metrics 1265 for the control system 101 (and/or respective regions thereof) in accordance with the acquired physical state(s) 1204A-N and one or more PSB 554, as disclosed herein (e.g., by use of physical state projections and/or physical characteristic projections determined by the state engine 1290).

The security engine 1210 may be configured to determine cyber-physical health metadata 180 for the control system 101 (and/or respective regions thereof), which may comprise determining cyber health metadata 182, and physical health metadata 184. The security engine 1210 may be configured to determine the cyber health metrics 282, which may be based on, inter alia, error metrics 175, CPSC metrics 575, cyber state metrics 553, Cy$\Delta$ metrics 1263, and/or cyber estimation metrics 1376, as disclosed herein. The security engine 1210 may be configured to determine the physical health metrics 284, which may be based on, inter alia, error metrics 175, CPSC metrics 575, physical state metrics 555, Phy$\Delta$ metrics 1265, and/or physical estimation metrics 1378, as disclosed herein.

The security engine 1210 may be configured to implement mitigation operations in accordance with the determined cyber and/or physical health metrics 282/284. The security engine 1210 may be configured to implement mitigation operations in response to: error metrics 175 that exceed one or more error thresholds, CPSC metrics 575 that fail to satisfy one or more confidence thresholds, and/or the like. The security engine 1210 may be further configured to implement mitigation operations in response to: cyber state metrics 553, Cy$\Delta$ metrics 1263, physical state metrics 555, and/or Phy$\Delta$ metrics 1265, as disclosed herein. In the FIG. 13B embodiment, the security engine 1210 may be further configured to implement mitigation operations based on cyber estimation metrics 1376 and/or physical estimation metrics 1378, as disclosed above.

Figure 14A:
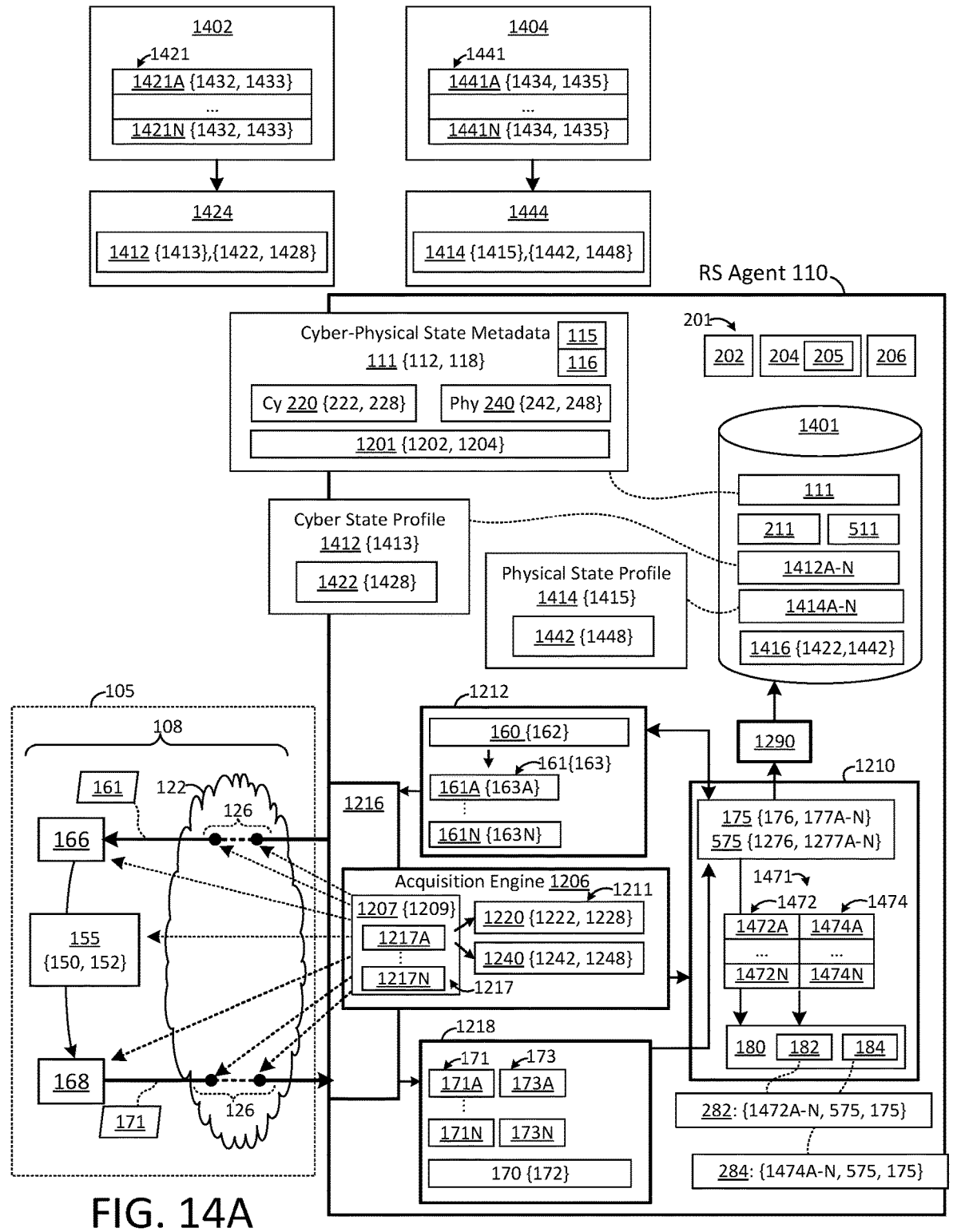
FIG. 14A-14B are schematic block diagrams of embodiments of a resilient security agent configured to evaluate cyber and/or physical health based on, inter alia, one or more cyber and/or physical state profiles.

FIG. 14A is a schematic block diagram of another embodiment of an RS agent 110, as disclosed herein. The RS agent 110 may comprise a security engine 1210, key generator 1212, communication manager 1216, error monitor 1218, acquisition engine 1206, and state engine 1290, as disclosed herein. The RS agent 110 may comprise and/or be communicatively coupled to a data store 1401, which may comprise cyber-physical state metadata 111, a security policy 211, and/or a coverage schema 511, as disclosed herein. In some embodiments, the data store 1401 may be embodied by storage resources 204 of the RS agent 110. Alternatively, or in addition, the data store 1401 may comprise storage resources of one or more other cyber-physical components 102 of the control system 101. The RS agent 110 may be configured to communicate state keys 160, acquire cyber-physical state metadata 1211, determine error metrics 175 corresponding to respective state keys 160, determine CPSC metrics 575 corresponding to the acquired cyber-physical state metadata 1211, incorporate the acquired cyber-physical state metadata 1211, and/or determine cyber-physical health metadata 180 in accordance with the determined error metrics 175, CPSC metrics 575, and/or the like, as disclosed herein.

In the FIG. 14A embodiment, the security engine 1210 may be further configured to determine cyber-physical state error metrics 1471 for the control system 101 (and/or respective regions thereof), the cyber-physical state error metrics 1471 quantifying error, differences, and/or distances between the acquired cyber-physical state 1201 and one or more cyber-physical state profiles. As used herein, a "cyber-physical state profile" refers to a collection of cyber state classification features and corresponding classification values configured to characterize designated cyber-physical classifications of the control system 101 and/or distinguish the designated cyber-physical state classifications from other cyber-physical state classifications. A cyber state profile 1412 may comprise cyber classification features and/or classification values configured to characterize a designated cyber state classification 1413. A physical state profiles 1414 may comprise physical classification features and/or classification values configured to characterize a designated physical state classification 1415. As used herein, a cyber state classification 1413 refers to a particular classification of cyber state(s) 1202 of the control system 101 (and/or range of cyber states 1202) that are indicative of particular cyber state types, cyber behaviors, cyber operation and/or the like. As used herein, a physical state classification 1415 refers to a particular classification of physical state(s) 1204 of the control system 101 (and/or range of physical states 1204) that are indicative of particular physical state types, physical behaviors, physical operation, and/or the like.

The data store 1401 may further comprise a classification schema 1416, which may define cyber classification features 1422 of the cyber state profiles 1412 (e.g., cyber classification features 1422 by which cyber state classifications 1413 of the cyber state profiles 1412 are characterized and/or distinguished). The cyber classification features 1422 may comprise a subset of cyber-physical state information capable of being acquired from the control system 101 (e.g., may correspond to a subset of the cyber-physical state data 1207, CPS datasets 1209, RCPS data 1217, acquired cyber-physical state metadata 1211, acquired cyber state metadata 1220, acquired cyber state parameters 1222, acquired cyber state signatures 1228 cyber-physical state metadata 111, cyber state metadata 220, cyber state parameters 222, and/or cyber state signatures 228, as disclosed herein). The cyber classification features 1422 may comprise and/or correspond to cyber state characteristics determined to characterize and/or distinguish the cyber state classifications 1413 of the cyber state profiles 1412, and may exclude cyber state characteristics determined to be non-distinguishing.

In some embodiments, the cyber classification features 1422 may be determined and/or learned by, inter alia, a cyber state classifier 1424. The cyber state classifier 1424 may learn the cyber classification features 1422 by use of cyber classification training data 1402. The cyber classification training data 1402 may comprise a plurality of training datasets 1421A-N, each comprising cyber state data 1432 corresponding to a designated cyber state classification 1413, which may indicate that the cyber state data 1432 corresponds to: a particular cyber state classification 1413

(e.g., is a true positive of the particular cyber state classification 1413), does not correspond to the particular cyber state classification 1413 (e.g., is a true negative), corresponds to a different cyber state classification 1413, does not correspond to any cyber state classification 1413, and/or the like. The cyber state classifier 1424 may use the training datasets 1421 to, inter alia, learn and/or extract cyber classification features 1422 that result in accurate classification of the cyber classification training data 1402. The cyber state classifier 1424 may use the training datasets 1421 to, inter alia, learn and/or extract cyber classification features 1422 capable of characterizing and/or distinguishing cyber classification training data 1402 corresponding to the designated cyber state classification 1413 from cyber classification training data 1402 corresponding to other cyber state classifications 1413. The cyber state classifier 1424 may comprise any suitable classification means including, but not limited to: a self-organizing map (SOM), an artificial neural network (ANN), an auto encoder, a Monte Carlo classifier, and/or the like. The training datasets 1421A-N may comprise cyber state data 1432 captured during operation of the control system 101 (and/or during simulated operation) and, as such, may have a large dimensionality (e.g., may comprise the full dimensionality of cyber state information, metadata 220, parameters 222, and/or signatures 228 capable of being acquired from the cyber-physical system 100). The cyber state classifier 1424 may be configured to reduce the dimensionality of the cyber classification training data 1402, which may comprise determining cyber classification features 1422 corresponding to a subset of the cyber state information capable of being acquired from the control system 101. The cyber state classifier 1424 may be further configured to determine cyber classification values 1428, which may comprise values, weights, and/or other classification information corresponding to the cyber state classification features 1422. The cyber classification values 1428 may comprise and/or correspond to characteristics of the acquired cyber state 1202 of the control system 101 (cyber state characteristics), such as cyber state metadata 220, cyber state parameters 222, cyber state signatures 228, portion(s) thereof, and/or the like.

In some embodiments, the physical classification features 1442 may be determined and/or learned by, inter alia, a physical state classifier 1444. The physical state classifier 1444 may learn physical classification features 1444 by use of physical classification training data 1404, as disclosed herein. The physical classification training data 1404 may comprise a plurality of training datasets 1441A-N, each comprising physical state data 1434 having a designated physical state classification 1415, as disclosed herein. The physical state classifier 1444 may use the training datasets 1441 to, inter alia, learn and/or extract physical classification features 1442 that result in accurate classification of the physical classification training data 1404. The physical state classifier 1444 may comprise any suitable classification means, as disclosed herein. The physical state classifier 1444 may be configured to reduce the dimensionality of the physical training data 1404, which may comprise determining physical classification features 1442 comprising a subset of the physical state information capable of being acquired from the control system 101. The physical state classifier 1444 may be further configured to determine physical classification values 1448 corresponding to the physical state classification parameters 1442. The physical classification values 1448 may comprise values, weights, and/or other classification information corresponding to the physical state classification features 1442. The physical classification values 1448 may comprise and/or correspond to characteristics of the acquired physical state 1204 of the control system 101 (physical state characteristics), such as physical state metadata 240, physical state parameters 242, physical state signatures 248, portion(s) thereof, and/or the like.

In some embodiments, the RS agent 110 may comprise a plurality of cyber state profiles 1412A-N and/or physical state profiles 1414A-N. The RS agent 110 may comprise cyber state profiles 1412A configured to characterize "healthy" cyber states of the control system 101 (and/or respective regions thereof), cyber state profiles 1412N configured to characterize "unhealthy" cyber states, and so on. The healthy cyber state profiles 1412A may comprise cyber classification features 1422 and/or corresponding classification values 1428 configured to characterize "healthy" cyber states 1202 of the control system 101, as disclosed herein (e.g., healthy cyber states 1202 corresponding to different operating conditions). The "unhealthy" cyber state profiles 1412N may comprise cyber classification features 1422 and/or corresponding classification values 1428 configured to characterize "unhealthy" cyber states 1202 of the control system 101, as disclosed herein (e.g., cyber states 1202 corresponding to particular types of cyber-attacks, compromise of particular cyber components 120, and/or the like). The healthy and unhealthy cyber state profiles 1412A-N may be learned by use of corresponding cyber classification training data 1402, as disclosed herein (e.g., training datasets 1421 corresponding to various healthy and/or unhealthy cyber states 1202 and/or behavior).

The RS agent 110 may further comprise physical state profiles 1412A configured to characterize "healthy" physical states 1204 of the control system 101 (and/or respective regions thereof). The "healthy" physical state profiles 1412A may comprise physical classification features 1442 and/or corresponding classification values 1448 configured to characterize "healthy" physical states 1204 of the control system 101, as disclosed herein (e.g., healthy physical states 1204 corresponding to different operating conditions). The "unhealthy" physical state profiles 1414N may comprise physical classification features 1442 and/or corresponding classification values 1448 configured to characterize "unhealthy" physical states 1204 of the control system 101, as disclosed herein (e.g., physical states 1204 corresponding to particular types of component and/or physical attacks, physical attack vectors, compromise of particular computational and/or physical components 130/140, physical failure modes, and/or the like).

The healthy physical state profiles 1412A may, for example, characterize behavior of protective relay components under different load conditions (e.g., when generators and/or loads are brought online and/or taken offline), while responding to disturbances (e.g., when temporarily out-of-phase), during fault conditions, and/or the like. The healthy physical state profiles 1412A may comprise physical state information indicating healthy or "nominal" responses to such conditions (e.g., balance generation/load within a specified time, stabilize out-of-phase conditions, open breakers in response to fault conditions, and so on). The unhealthy physical state profiles 1414N may correspond to physical states 1204 and/or behavior during attacks directed to particular computational and/or physical components 130/140 (and/or physical environment), physical failure modes, and/or the like. The healthy and unhealthy physical state profiles 1414A-N may be learned by use of corresponding physical classification training data 1404, as disclosed herein (e.g., training datasets 1441 corresponding to various healthy and/or unhealthy physical states 1204 and/or behavior).

The RS agent 110 may be configured to acquire and/or maintain cyber-physical state metadata 111 by use of, inter alia, the acquisition engine 1206. As disclosed above, the acquisition engine 1206 may be configured to acquire cyber-physical state metadata 1211 pertaining to the cyber and/or physical state of selected regions of the control system 101, which may be incorporated into the cyber-physical state metadata 111 maintained by the RS agent 110 (along with corresponding CPSC metrics 575). In the FIG. 14A embodiment, the acquisition engine 1206 may be configured to acquire cyber-physical state metadata 1211 in accordance with the classification schema 1416, which may correspond to a subset of the cyber-physical state information capable of being acquired thereby (e.g., reduced dimensionality representation of the cyber and/or physical state of the control system 101, as disclosed herein). The acquisition engine 1206 may be configured to acquire cyber-physical state data 1207 that include information pertaining to the cyber classification features 1422 and/or physical classification features 1442 of the classification schema 1416, and exclude other cyber and/or physical state information. The acquisition engine 1206 may, therefore, acquire a more limited range of cyber-physical state information from the control system 101, which may reduce overhead imposed thereon. The acquisition engine 1206 may be further configured to acquire cyber-physical state metadata 1211, including acquired cyber state metadata 1220 (e.g., acquired cyber state parameters 1222 and/or cyber state signatures 1228) and/or acquired physical state metadata 1240 (e.g., acquired physical state parameters 1222 and/or physical state signatures 1248) in accordance with the classification schema 1416. The security engine 1210 may be configured to determine CPSC metrics 575 corresponding to the acquired cyber-physical state metadata 1211, and the state engine 1290 may be configured to incorporate the acquired cyber-physical state metadata 1211 into the cyber-physical state metadata 111 in accordance with the determined CPSC metrics 575, as disclosed herein.

In the FIG. 14A embodiment, the security engine 1210 may be further configured to determine cyber-physical state error metrics 1471, which may quantify a degree to which the cyber-physical state 1201 of control system 101 (and/or regions thereof) as acquired by the RS agent 110 differs from respective cyber and/or physical state profiles 1412/1414. The security engine 1210 may be configured to determine one or more cyber state error metrics 1472, which may quantify error between the acquired cyber state 1202 of the control system 101 (e.g., cyber state metadata 220) and respective cyber state profiles 1412. Determining cyber state error metrics 1472 for a cyber state profile 1412 may comprise comparing cyber classification values 1428 of the cyber state profile 1412 to corresponding characteristics of the cyber state 1202 (e.g., cyber state metadata 220, one or more cyber state parameters 222, one or more cyber state signatures 228, acquired cyber state metadata 1220, one or more acquired cyber state parameters 1222, one or more acquired cyber state signatures 1228, portion(s) thereof, and/or the like). The cyber classification values 1428 of a cyber state profile 1412 may comprise a signature of specified cyber state information (as specified by the cyber classification features 1422). Determining cyber state error metrics 1472 for the cyber state profile 1412 may comprise comparing the signature to signature(s) derived from the cyber state 1202 (e.g., signature(s) derived from cyber state metadata 220 maintained by the RS agent 110).

In some embodiments, the security engine 1210 may be configured to determine a plurality of cyber state error metrics 1472A-N, each of which may be configured to quantify errors, differences, and/or distances between the cyber state 1202 of the control system 101 (and/or respective regions thereof) and respective cyber profiles 1412A-N. The security engine 1210 may be configured to determine cyber state error metrics 1472A, which may quantify error, differences, and/or distances between the cyber state 1202 and healthy cyber state profiles 1412A. The security engine 1210 may be further configured to determine cyber state error metrics 1472 corresponding to other cyber state profiles 1412, including cyber state error metrics 1472N, which may be configured to quantify error, differences, and/or distances between the cyber state 1202 and unhealthy cyber state profiles 1412N (e.g., unhealthy cyber state profiles 1412N corresponding to particular types of cyber-attacks, compromise of particular cyber components 120, and/or the like).

In some embodiments, the security engine 1210 may be configured to determine cyber state error metrics 1472A-N pertaining to respective regions of the control system 101 (e.g., respective CPCE 105), which may comprise comparing cyber state metadata 220 covering the respective regions to corresponding cyber classification values 1428 of respective cyber state profiles 1412, as disclosed herein (e.g., healthy cyber state profiles 1412A, unhealthy cyber state profiles 1412N, and so on). The cyber error metrics 1472A-N may further comprise confidence metrics, which may comprise and/or correspond to confidence metrics of the corresponding cyber profiles 1412A-N and/or CPSC metrics 575 associated with the cyber states 1202A-N from which the cyber error metrics 1472A-N were derived (e.g., CPSC metrics 575 of cyber state metadata 220 and/or acquired physical state metadata 1220 of the respective cyber states 1202A-N).

The security engine 1210 may be configured to determine physical state error metrics 1474, which may quantify error, differences, and/or distances between the acquired physical state 1204 of the control system 101 and respective physical state profiles 1414. Determining physical state error metrics 1474 for a physical state profile 1412 may comprise comparing physical classification values 1448 of the physical state profile 1412 to corresponding characteristics of the physical state 1204 (e.g., physical state metadata 240, one or more physical state parameters 242, one or more physical state signatures 248, acquired physical state metadata 1240, one or more acquired physical state parameters 1242, one or more acquired physical state signatures 1248, portion(s) thereof, and/or the like). The physical classification values 1448 of a physical state profile 1412 may comprise a signature of specified physical state information (as specified by the physical classification features 1442). Determining physical state error metrics 1474 for the physical state profile 1412 may comprise comparing the signature to signature(s) derived from the physical state 1204 (e.g., signature(s) derived from physical state metadata 240 maintained by the RS agent 110).

In some embodiments, the security engine 1210 may be configured to determine a plurality of physical state error metrics 1474A-N, each of which may be configured to quantify errors, differences, and/or distances between the physical state 1204 of the control system 101 (and/or respective regions thereof) and respective physical profiles 1414A-N. The security engine 1210 may be configured to determine physical state error metrics 1474A, which may quantify error, differences, and/or distances between the physical state 1204 and healthy physical state profiles 1414A. The security engine 1210 may be further configured to determine physical state error metrics 1474 corresponding to other physical state profiles 1414, including physical state error metrics 1474N, which may be configured to quantify error, differences, and/or distances between the physical state 1204 and unhealthy physical state profiles 1414N (e.g., unhealthy physical state profiles 1414N corresponding to particular types of component attacks, physical attack vectors, compromise of particular physical components 130, failure modes, and/or the like).

In some embodiments, the security engine 1210 may be configured to determine physical state error metrics 1474A-N pertaining to respective regions of the control system 101 (e.g., respective CPCE 105), which may comprise comparing physical state metadata 240 covering the respective regions to corresponding physical classification values 1428 of respective physical state profiles 1414, as disclosed herein (e.g., healthy physical state profiles 1414A, unhealthy physical state profiles 1414N, and so on). The physical error metrics 1474A-N may further comprise confidence metrics, which may comprise and/or correspond to confidence metrics of the corresponding physical profiles 1414A-N and/or CPSC metrics 575 associated with the physical states 1204A-N from which the physical error metrics 1474A-N were derived (e.g., CPSC metrics 575 of physical state metadata 240 and/or acquired physical state metadata 1240 of the respective physical states 1204A-N).

The security engine 1210 may be further configured to determine the cyber-physical health metadata 180 for the control system 101. The security engine 1210 may determine cyber health metrics 182 of the control system 101 (and/or respective regions thereof) by use of cyber health metrics 282. The cyber health metrics 282 may incorporate one or more cyber state error metrics 1472. In some embodiments, the cyber health metrics 282 determined by the security engine 1210 may be inversely proportional to cyber state error metrics 1472A for healthy cyber state profiles 1412A. In some embodiments, the cyber health metrics 282 may incorporate cyber error metrics 1472 pertaining to other, unhealthy cyber state profiles 1412N. The cyber health metrics 282 may be proportional to cyber state error metrics 1472N for unhealthy cyber states profiles 1412N. The security engine 1210 may be further configured to quantify a physical health of the control system 101 (and/or respective regions thereof) by use of physical health metrics 284. The physical health metrics 284 may incorporate one or more physical state error metrics 1474A-N. In some embodiments, the physical health metrics 284 determined by the security engine 1210 may be inversely proportional to error between the acquired physical state 1204 of the control system 101 and physical state error metrics 1474A for healthy physical state profiles 1414A. In some embodiments, the physical health metric 284 may incorporate physical state error metrics 1474 pertaining to other physical state profiles 1414. The security engine 1210 may incorporate physical state error metrics 1474N for "unhealthy" physical state classifications 1415. The physical health metrics 284 may be proportional to the physical state error metrics 1474N of unhealthy physical state profiles 1414N (e.g., unhealthy physical state profiles 1414N corresponding to particular types of physical attacks, physical attack vectors, and/or failure modes).

In some embodiments, the security engine 1210 may be configured to determine cyber and/or physical health metrics 282/284 corresponding to selected regions of the control system 101 (e.g., selected CPCE 105, CPCE paths 108, CPCE sections 109, cyber sections 129, physical control sections 149, and/or the like). The security engine 1210 may determine cyber and/or physical health metrics 282/284 at any suitable level of granularity, in accordance with the granularity of the cyber-physical state metadata 111 and/or corresponding classification schema 1416. The security engine 1210 may be further configured to associate cyber and/or physical health metrics 282/284 determined for respective cyber regions with, inter alia, error metrics 175 and/or CPSC metrics 575 associated with the respective cyber regions.

The security engine 1210 may be further configured to implement one or more mitigation operations based on, inter alia, the determined cyber health metrics 282, as disclosed herein. The mitigation operations may comprise identifying "unhealthy" cyber components 120 and/or cyber nodes 124, as disclosed herein (e.g., identifying cyber nodes 124 having cyber communication characteristics that diverge from "healthy" cyber communication characteristics). The mitigation operations may comprise determining the cause and/or source of anomalous error metrics 175 (and/or cyber state errors 1472A-N), as disclosed herein. The mitigation operations may include, but are not limited to: providing access to the cyber health metrics 282 (and/or cyber state metadata 220, cyber state profiles 1412, cyber state error metrics 1472, error metrics 175, and/or CPSC metrics 575 from which the cyber health metrics 282 were derived), generating notifications pertaining to cyber health metrics 282 that fail to satisfy one or more cyber health thresholds, anomalous cyber health metrics 282, implementing mitigation operations in accordance with the determined cyber health metrics 282 (e.g., deactivating one or more cyber components 120, cyber nodes 124, and/or the like), and so on. The mitigation operations may pertain to particular cyber regions of the control system 101 and/or may be implemented in accordance with a security policy 211, as disclosed herein.

As disclosed above, the physical health metrics 284 determined by the security engine 1210 may indicate a physical health of the control system 101 (and/or respective physical control regions thereof). The security engine 1210 may be further configured to implement one or more mitigation operations based on, inter alia, the determined physical health metrics 284, as disclosed herein. The mitigation operations may comprise identifying "unhealthy" computational and/or physical components 130/140, as disclosed herein (e.g., identifying computational and/or physical components 130/140 having a physical state that diverges from healthy physical state profiles 1412A). The mitigation operations may comprise determining the cause and/or source of anomalous error metrics 175 (and/or physical state errors 1474A-N), as disclosed herein. The mitigation operations may include, but are not limited to: providing access to the physical health metrics 284 (and/or physical state metadata 240, physical state profiles 1414, physical state error metrics 1474A-N, error metrics 175, and/or CPSC metrics 575 from which the physical health metrics 284 were derived), generating notifications pertaining to physical health metrics 284 that fail to satisfy one or more physical health thresholds, implementing mitigation operations in accordance with the determined physical health metrics 284 (e.g., deactivating one or more physical components 140, halting control function(s) of one or more CPCE 105, modifying the control function(s) of one or more CPCE 105, isolating the CPCE 105 from other CPCE 105 of the control system 101, isolating cyber-physical components 102 of the CPCE 105 from other cyber-physical components 102 of the control system 101, and/or the like), and so on.

Figure 14B:
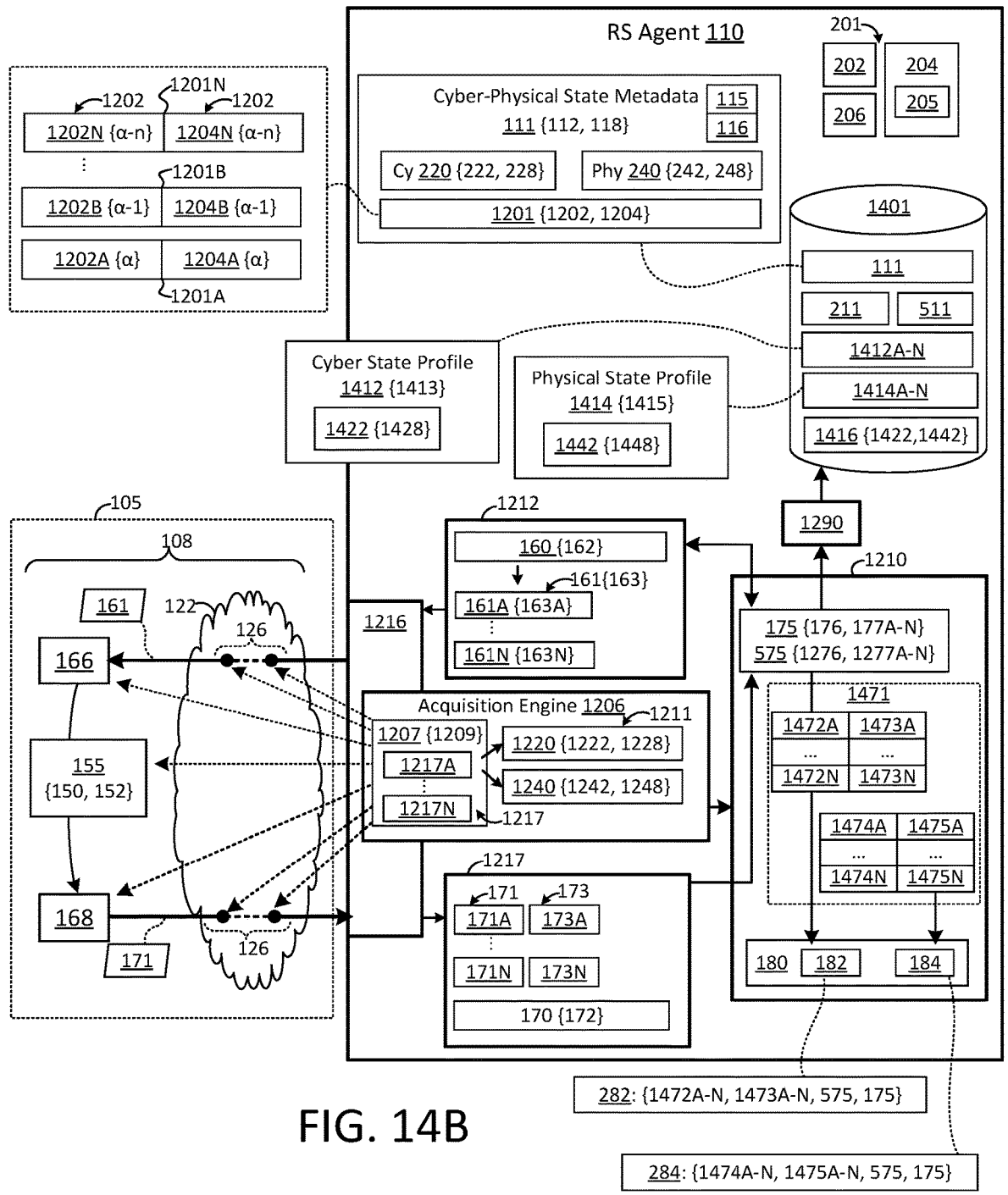

FIG. 14B is a schematic block diagram of another embodiment of an RS agent 110 configured to evaluate cyber and/or physical health of a control system 101. The RS agent 110 may comprise a security engine 1210, key generator 1212, communication manager 1216, error monitor 1218, acquisition engine 1206, state engine 1290, and state store 1401 comprising cyber-physical state profiles, as disclosed herein. The security engine 1210 may be configured to monitor a cyber-physical health of the control system 101 (e.g., determine cyber-physical health metadata 180) and/or implement mitigation operations in response to the monitoring. The security engine 1210 may configure the RS agent 110 to generate state keys 160, communicate the state keys 160 through the control system 101, acquire cyber-physical state metadata 1211 in conjunction with the communication of respective state keys 160, determine error metrics 175 for respective state keys 160, determine CPSC metrics 575 corresponding to cyber-physical state metadata 1211 acquired in conjunction with communication of the respective state keys 160, incorporate the acquired cyber-physical state metadata 1211, and/or determine cyber-physical health metadata 180 in accordance with the determined error metrics 175, CPSC metrics 575, and/or the like, as disclosed herein.

In the FIG. 14B embodiment, the state engine 1290 may be configured to maintain cyber-physical state metadata 111 configured to characterize the cyber-physical state 1201 of the control system 101 (and/or respective regions thereof) during a designated time range. The state engine 1290 may be configured to maintain cyber-physical state metadata 111 corresponding to cyber-physical states 1201A-N corresponding to respective acquisition times α through α-n, as disclosed herein. The security engine 1210 may be further configured to determine cyber state error metrics 1472A-N and/or physical state error metrics 1474A-N, as disclosed herein. The cyber state error metrics 1472A-N may be configured to quantify error, differences, and/or distances between respective the current cyber state 1202A of the control system 101 and respective cyber state profiles 1412A-N (including healthy cyber state profiles 1412A and/or unhealthy cyber state profiles 1412N). The physical state error metrics 1474A-N may be configured to quantify error, differences, and/or distances between respective the current physical state 1204A of the control system 101 and respective physical state profiles 1414A-N (including healthy physical state profiles 1414A and/or unhealthy physical state profiles 1414N).

In the FIG. 14B embodiment, the security engine 1210 may be further configured to determine cyber trend error metrics 1473A-N and/or physical trend error metrics 1475A-N. Determining the cyber trend error metrics 1473A-N may comprise quantifying changes to the cyber state 1202 of the control system 101 (and/or respective regions thereof) as a function of acquisition time, which may comprise monitoring changes to the cyber state 1202 relative to respective cyber state profiles 1412A-N within a sliding window of cyber states 1202A-N. The cyber trend error metrics 1473A-N may provide for detection of cyber-attacks resulting in delayed and/or gradual changes to the cyber state 1202 of the control system 101, as disclosed above. In some embodiments, determining the cyber trend error metrics 1473A-N may comprise comparing respective cyber states 1204A-N to respective cyber state profiles 1412A-N (e.g., comparing each cyber state 1204A-N to respective healthy cyber states 1412A and unhealthy cyber states 1412N, as disclosed herein). The determining may further comprise calculating cyber state error deltas (ΔCyErr), each quantifying a change to respective cyber state errors 1472A-N between respective acquisition times α-n through a (a change in cyber state errors 1472A-N of respective cyber states 1202A-N). The cyber trend error metrics 1473A-N may quantify a degree to which the cyber state 1202 of the control system 101 (and/or respective regions thereof) are trending away from and/or towards respective cyber state profiles 1412A-N over time. The cyber trend error metrics 1473A-N may indicate that the cyber state 1202 is trending away from a healthy cyber state profile 1412A and/or trending towards an unhealthy cyber state profile 1412N (or vice versa). The security engine 1210 may be further configured to estimate and/or project a time at which the cyber state 1202 of the control system 101 (and/or respective regions thereof) will transition between cyber state classifications 1413 (e.g., transition from a healthy cyber state profile 1412A to an unhealthy cyber state profile 1412N, or vice versa). Alternatively, or in addition, determining the cyber trend error metrics 1473A-N may comprise quantifying a degree to which respective characteristics of the cyber state 1202 are trending away from cyber classification values 1428 of respective cyber state profiles 1412A-N over time. Determining the cyber trend error metrics 1473A-N may further comprise estimating and/or projecting a time at which characteristics of the cyber state 1202 will correspond to specified cyber classification features 1422 of the respective cyber state profiles 1412A-N (e.g., the time at which a cyber state characteristic will correspond to an unhealthy cyber state profile 1412N). The cyber trend error metrics 1473A-N may be associated with AFCP metrics 575 of cyber-state metadata 111 from which the cyber trend error metrics 1473A-N were derived and/or confidence metrics associated with respective cyber state profiles 1412A-N, as disclosed herein.

In the FIG. 14B embodiment, the security engine 1210 may be further configured to determine physical trend errors 1475A-N and/or physical trend errors 1475A-N. Determining the physical trend error metrics 1475A-N may comprise quantifying changes to the physical state 1204 of the control system 101 (and/or respective regions thereof) as a function of acquisition time, which may comprise monitoring changes to the physical state 1204 relative to respective physical state profiles 1414A-N within a sliding window of physical states 1204A-N. The physical trend error metrics 1475A-N may provide for detection of physical-attacks resulting in delayed and/or gradual changes to the physical state 1204 of the control system 101, as disclosed above. In some embodiments, determining the physical trend error metrics 1475A-N may comprise comparing respective physical states 1204A-N to respective physical state profiles 1414A-N (e.g., comparing each physical state 1204A-N to respective healthy physical states 1414A and unhealthy physical states 1414N, as disclosed herein). The determining may further comprise calculating physical state error deltas (ΔPhyErr), each quantifying a change to respective physical state errors 1472A-N between respective acquisition times α-n through a (a change in physical state errors 1472A-N of respective physical states 1204A-N). The physical trend error metrics 1475A-N may quantify a degree to which the physical state 1204 of the control system 101 (and/or respective regions thereof) are trending away from and/or towards respective physical state profiles 1414A-N over time. The physical trend error metrics 1475A-N may indicate that the physical state 1204 is trending away from a healthy physical state profile 1414A and/or trending towards an unhealthy physical state profile 1414N (or vice versa). The security engine 1210 may be further configured to estimate and/or project a time at which the physical state 1204 of the control system 101 (and/or respective regions thereof) will transition between physical state classifications 1413 (e.g., transition from a healthy physical state profile 1414A to an unhealthy physical state profile 1414N, or vice versa). Alternatively, or in addition, determining the physical trend error metrics 1475A-N may comprise quantifying a degree to which respective characteristics of the physical state 1204 are trending away from physical classification values 1428 of respective physical state profiles 1414A-N over time. Determining the physical trend error metrics 1475A-N may further comprise estimating and/or projecting a time at which characteristics of the physical state 1204 will correspond to specified physical classification features 1422 of the respective physical state profiles 1414A-N (e.g., the time at which a physical state characteristic will correspond to an unhealthy physical state profile 1414N). The physical trend error metrics 1475A-N may be associated with AFCP metrics 575 of physical-state metadata 111 from which the physical trend error metrics 1475A-N were derived and/or confidence metrics associated with respective physical state profiles 1414A-N, as disclosed herein.

The security engine 1210 may be configured to determine cyber-physical health metadata 180 for the control system 101 (and/or respective regions thereof) based on, inter alia, the error metrics 175, CPSC metrics 575, cyber state error metrics 1472A-N, and/or physical state error metrics 1474A-N, as disclosed herein. In the FIG. 14B embodiment, the security engine 1210 may be further configured to incorporate the cyber trend error metrics 1473A-N into the cyber health metrics 282. Incorporating the cyber trend error metrics 1473A-N comprise adapting the cyber health metrics 282 to indicate a degree to which the cyber state 1202 of the control system 101 (and/or respective regions thereof) are trending away from healthy cyber state profiles 1412A and/or are trending toward unhealthy cyber state profiles 1412N. The cyber health metrics 282 may further indicate a time at which the cyber state 1202 of the control system 101 (and/or respective regions thereof) are estimated and/or projected to transition to specified unhealthy cyber state profiles 1412N. Alternatively, or in addition, the security engine 1210 may configure the cyber health metrics 282 to indicate a degree to which respective characteristics of the cyber state 1202 of the control system 101 are trending away from cyber classification features 1422 and/or cyber classification values 1428 of healthy cyber state profiles 1412A and/or are trending towards cyber classification features 1422 and/or cyber classification values 1428 of unhealthy cyber state profiles 1412N. The security engine 1210 may further configure the cyber health metrics 282 to indicate a time at which specified characteristics of the cyber state 1202 of the control system 101 are estimated and/or projected to transition to specified classification features of identified unhealthy cyber state profiles 1412N. The cyber health metrics 282 may further incorporate confidence metrics pertaining to the cyber trend error metrics 1473A-N, which may quantify a confidence in the cyber state metadata 220 from which the cyber trend error metrics 1473A-N were derived and/or a confidence in respective cyber state profiles 1412A-N.

The security engine 1210 may be further configured to incorporate the physical trend error metrics 1475A-N into the physical health metrics 284. Incorporating the physical trend error metrics 1475A-N comprise adapting the physical health metrics 284 to indicate a degree to which the physical state 1204 of the control system 101 (and/or respective regions thereof) are trending away from healthy physical state profiles 1414A and/or are trending toward unhealthy physical state profiles 1414N. The physical health metrics 284 may further indicate a time at which the physical state 1204 of the control system 101 (and/or respective regions thereof) are estimated and/or projected to transition to specified unhealthy physical state profiles 1414N. Alternatively, or in addition, the security engine 1210 may configure the physical health metrics 284 to indicate a degree to which respective characteristics of the physical state 1204 of the control system 101 are trending away from physical classification features 1422 and/or physical classification values 1428 of healthy physical state profiles 1414A and/or are trending towards physical classification features 1422 and/or physical classification values 1428 of unhealthy physical state profiles 1414N. The security engine 1210 may further configure the physical health metrics 284 to indicate a time at which specified characteristics of the physical state 1204 of the control system 101 are estimated and/or projected to transition to specified classification features of identified unhealthy physical state profiles 1414N. The physical health metrics 284 may further incorporate confidence metrics pertaining to the physical trend error metrics 1475A-N, which may quantify a confidence in the physical state metadata 220 from which the physical trend error metrics 1475A-N were derived and/or a confidence in respective physical state profiles 1414A-N.

The security engine 1210 may be further configured to implement one or more mitigation operations based on, inter alia, the determined cyber and/or physical health metrics 282/284, as disclosed herein. The security engine 1210 may be configured to implement mitigation operations in response to determining that the cyber state 1202A corresponds to an identified unhealthy cyber state profile 1412N. The mitigation operations may be implemented in accordance with the identified unhealthy cyber state profile 1412N, as disclosed herein. The security engine 1210 may be configured to implement mitigation operations in response to determining that the physical state 1202N corresponds to an identified unhealthy physical state profile 1414N. The mitigation operations may be implemented in accordance with the identified unhealthy physical state profile 1414N, as disclosed herein. In the FIG. 14B embodiment, the security engine 1210 may be further configured to implement mitigation operations based on the cyber trend error metrics 1473A-N, which may comprise identifying an unhealthy cyber state profile 1412N to which the cyber state 1202 of the control system 101 are trending. The mitigation operations may be adapted in accordance with the identified unhealthy cyber state profile 1412A, as disclosed above. The security engine 1210 may be further configured to implement mitigation operations based on the physical trend error metrics 1475A-N, which may comprise identifying an unhealthy physical state profile 1414N to which the physical state 1204 of the control system 101 is trending. The mitigation operations may be adapted in accordance with the identified unhealthy physical state profile 1414A, as disclosed above.

Figure 15:
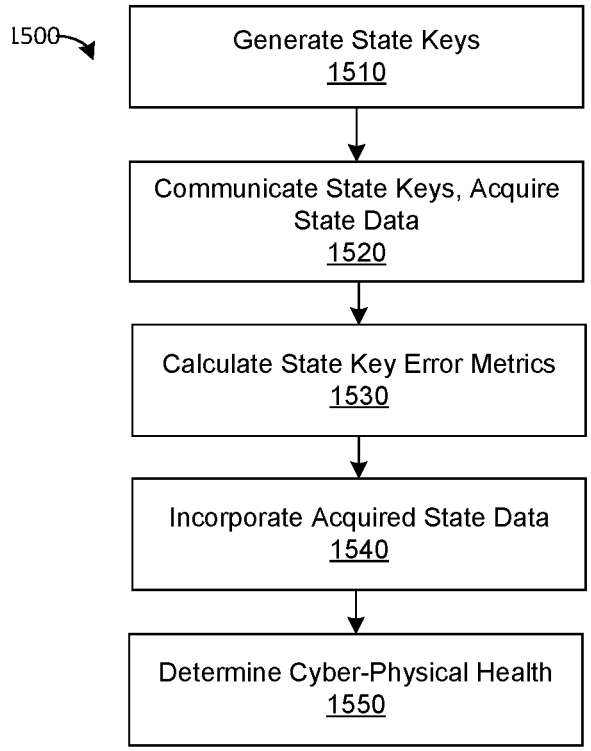
FIGS. 15-18 are flow diagrams of additional embodiments of methods for securing a cyber-physical system, as disclosed herein.

FIG. 15 is a flow diagram of another embodiment of a method 1500 for securing a cyber-physical system 100, such as the control system 101 as disclosed herein. Step 1510 may comprise generating state keys 160, each state key 160 comprising CPKD 162 comprising and/or corresponding to the cyber-physical state of the control system 101, as disclosed herein.

Step 1520 may comprise communicating the state keys 160 through a cyber-physical system 100, as disclosed herein. Step 1520 may further comprise acquiring cyber-physical state data 1207, as disclosed herein. Step 1520 may comprise acquiring cyber-physical state data 1207 from regions of the control system 101 covered by the state keys 160 (e.g., regions through which the state keys 160 and/or fragments 161 thereof were communicated). Alternatively, or in addition, step 1520 may comprise acquiring regional RCPS data 1217A-N corresponding to communication of respective state key fragments 161A-N, as disclosed herein. Step 1520 may comprise acquiring a plurality of CPS datasets 1209, as disclosed herein. Step 1520 may further comprise deriving cyber-physical state metadata 1211 from the acquired cyber-physical state data 1207, as disclosed herein.

Step 1530 may comprise calculating state key errors 175, which may quantify error between respective state keys 160 and/or cyber-physical reconstructions thereof. Step 1530 may comprise comparing each state key 160 to a corresponding validation key 170 (and/or comparing state key fragments 161A-N of respective state keys 160 to corresponding validation data 171A-N). Step 1530 may further comprise determining a source and/or cause of the error metrics 175, which may comprise adapting communication of one or more subsequent state keys 160, and/or evaluating the resulting error metrics 175 thereof, as disclosed herein. Step 1530 may further comprise determining CPSC metrics 575 for the acquired cyber-physical state metadata 1211. The CPSC metrics 575 may be configured to quantify a confidence that the acquired cyber-physical state metadata 1211 accurately represents the cyber-physical state of the control system 101 (and/or respective regions thereof). The CPSC metrics 575 may, therefore, be inversely proportional to the error metrics 175 determined for the corresponding state keys 160 (and/or state key fragments 161).

Step 1540 may comprise incorporating the acquired cyber-physical state metadata 1211 into the cyber-physical state metadata 111, as disclosed herein. Step 1540 may comprise incorporating the acquired cyber-physical state metadata 1211 into the cyber-physical state metadata 111 and/or associating the incorporated cyber-physical state metadata 111 with corresponding CPSC metrics 575. Step 1540 may comprise adapt communication of one or more subsequent state keys 160 to, inter alia, determine a cause and/or source of low CPSC metrics 575 and/or obtain acquired cyber-physical state metadata 1211 having higher CPSC metrics 575.

Step 1550 may comprise determining cyber-physical health metadata 180 for the control system based on, inter alia, the error metrics 175 and/or CPSC metrics 575 determined at steps 1530 and/or 1540, as disclosed herein. In some embodiments, step 1550 may further comprise comparing the acquired cyber-physical state of the control system 101 (e.g., the cyber-physical state metadata 111 and/or acquired cyber-physical state metadata 1211) to a cyber-physical state estimate (e.g., state estimate 1313). The comparing may comprise determining state estimate error metrics 1375, which may be incorporated into the cyber-physical health metadata 180, as disclosed herein. Alternatively, or in addition, step 1550 may further comprise determining one or more cyber and/or physical state errors 1472/1474, which may quantify error between the acquired cyber-physical state of the control system 101 (and/or regions thereof) to one or more cyber and/or physical state profiles 1412/1414, which errors 1472/1474 may be incorporated into the cyber-physical health metadata 180, as disclosed herein.

Figure 16:
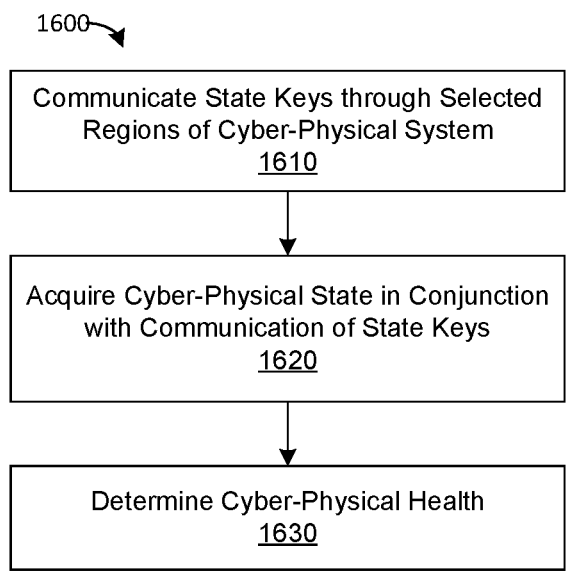

FIG. 16 is a flow diagram of another embodiment of a method 1600 for securing a cyber-physical system 100, as disclosed herein. Step 1610 may comprise communicating state keys 160 through selected regions of a control system 101, as disclosed herein. Step 1610 may comprise communicating fragments 161A-N of each state key 160 through selected CPC paths 108 of the control system 101, as disclosed herein, each CPC path 108 comprising a first cyber path 126 by which the fragment 161 is sent to a selected correlator 166, a physical control coupling 148 corresponding to a PPV 155 through which validation data 171 corresponding to the fragment 161 is transmitted to a selected receiver 168 (and/or by which the validation data 171 are otherwise determined), and a second cyber path 126 by which the validation data 171 are returned.

Step 1620 may comprise acquiring cyber-physical state data 1207 in conjunction with communication of the state keys 160. Step 1620 may comprise acquiring the cyber-physical state of the control system 101 in conjunction with communication of the state keys 160 through the control system 101. Step 1620 may comprise acquiring cyber-physical state data 1207 from regions of the control system 101 covered by respective state keys 160. Step 1620 may comprise acquiring the cyber-physical state data 1207 concurrently with communication of the state keys 160. In some embodiments, step 1620 may comprise acquiring RCPS data 1217A-N from regions of the control system 101 covered by respective state key fragments 161A-N, the RCPS data 1217A-N acquired in conjunction with communication of the respective state key fragments 161A-N. Alternatively, or in addition, step 1620 may comprise acquiring the cyber-physical state data 1207 and/or RPCS data 1217A-N separately from communication of the state keys 160 and/or state key fragments 161A-N (e.g., before, after, and/or interleaved with such communication). Step 1620 may further comprise determining acquired cyber-physical state metadata 1211 by use of the acquired cyber-physical state data 1207, as disclosed herein.

Step 1620 may further comprise determining error metrics 175 corresponding to communication of the state keys 160 and/or determining CPSC metrics 575 corresponding to acquisition of the cyber-physical state metadata 1211, as disclosed herein. Step 1620 may comprise determining a source and/or cause of high error metrics 175 and/or low CPSC metrics 575, as disclosed herein (e.g., by adapting communication of subsequent overlapping state keys 160, such that fragments 161A-N thereof are communicated through respective isolation CPC paths 108, and evaluating the resulting error metrics 175 thereof). Step 1620 may comprise assigning error and/or CPSC metrics 175/575 to respective regions of the control system 101 and/or acquired cyber-physical state metadata 1211, as disclosed herein. Step 1630 may further comprise incorporating the acquired cyber-physical state metadata 1211 into the cyber-physical state metadata 111, which may comprise associating the error and/or CPSC metrics 175/575 with the incorporated cyber-physical state metadata 111, as disclosed herein. The error metrics 175 may indicate errors associated with communication of state keys 160 (and/or state key fragments 161) through regions of the control system characterized by respective portions of the cyber and/or physical state metadata 220/240. The CPSC metrics 575 may indicate a confidence that respective portions of the cyber and/or physical state metadata 220/240 accurately represent the cyber and/or physical state of regions of the control system 101 characterized thereby (e.g., based on error metrics 175 associated with communication of state keys 160 and/or state key fragments 161 through such regions during acquisition of the cyber-physical state). In some embodiments step 1620 may further comprise maintaining cyber-physical state metadata 111 configured to characterize a plurality of cyber-physical states 1201A-N of the control system 101, the cyber-physical states 1201A-N corresponding to a range and/or sliding window of acquisition times (e.g., from a current acquisition time α to a previous acquisition time α-n).

Step 1630 may comprise evaluating the cyber-physical health of the control system 101 (and/or respective regions thereof). Step 1630 may comprise evaluating acquired cyber-physical state 1201 of the control system 101 (and/or regions thereof). In some embodiments, step 1630 may comprise determining a cyber health metrics 282 and/or physical health metrics 284, as disclosed herein. The cyber health metrics 282 may be based on, inter alia, error metrics 175, CPSC metrics 575, cyber state metrics 553, CyΔ metrics 1263, cyber state estimation metrics 1376, cyber state error metrics 1472, and/or the like. Step 1630 may comprise evaluating one or more CSER, comparing the acquired cyber state 1202 of the control system 101 to one or more CSB 552 (e.g., healthy CSB 552 and/or unhealthy CSB 552), comparing the cyber state 1202 to one or more cyber state profiles 1412 (e.g., healthy cyber state profiles 1412A and/or unhealthy cyber state profiles 1412N), and/or the like. Step 1630 may comprise determining CyΔ metrics 1263 by, inter alia, correlating cyber state information to a sliding window of cyber states 1202A-N, determining trends of respective CSER, cyber state metrics 553, and/or cyber state error metrics 1472A-N, determining a trajectory estimate for the cyber state 1202 (Cy), determining trajectories of respective cyber state characteristics, and/or the like. Step 1630 may comprise comparing the acquired cyber state 1202 to a healthy cyber state profile 1412A, as disclosed above. Step 1640 may comprise comparing cyber state metadata 220, cyber state parameters 222, cyber state signatures 228, and/or portion(s) thereof, to corresponding cyber classification values 1428 of the healthy cyber state profile 1412A. The comparing may comprise determining a cyber state error 1472A, which may quantify error between the acquired cyber state of the control system 101 (and/or region thereof) and the healthy cyber state profile 1412A. Step 1630 may further comprise associating the determined cyber state error 1472A with CPSC metrics 575 characterizing the cyber state metadata 220, cyber state parameters 222, and/or cyber state signatures 228 by which the cyber state error 1472A was determined, as disclosed herein.

Step 1630 may further comprise determining a physical health metrics 284. The physical health metrics 284 may be based on, inter alia, error metrics 175, CPSC metrics 575, physical state metrics 555, PhyΔ metrics 1265, physical state estimation metrics 1376, physical state error metrics 1474, and/or the like. Step 1630 may comprise evaluating one or more PSER, comparing the acquired physical state 1204 of the control system 101 to one or more PSB 554 (e.g., healthy PSB 554 and/or unhealthy PSB 554), comparing the physical state 1204 to one or more physical state profiles 1414 (e.g., healthy physical state profiles 1414A and/or unhealthy physical state profiles 1414N), and/or the like. Step 1630 may comprise determining PhyΔ metrics 1265 by, inter alia, correlating physical state information to a sliding window of physical states 1204A-N, determining trends of respective PSER, physical state metrics 555, and/or physical state error metrics 1474A-N, determining a trajectory estimate for the physical state 1204 (Pity), determining trajectories of respective physical state characteristics, and/or the like. Step 1630 may comprise comparing the acquired physical state 1204 to a healthy physical state profile 1414A, as disclosed above. Step 1640 may comprise comparing physical state metadata 240, physical state parameters 242, physical state signatures 248, and/or portion(s) thereof, to corresponding physical classification values 1448 of the healthy physical state profile 1414A. The comparing may comprise determining a physical state error 1474A, which may quantify error between the acquired physical state of the control system 101 (and/or region thereof) and the healthy physical state profile 1414A. Step 1630 may further comprise associating the determined physical state error 1474A with CPSC metrics 575 characterizing the physical state metadata 240, physical state parameters 242, and/or physical state signatures 248 by which the physical state error 1474A was determined, as disclosed herein.

In some embodiments, step 1630 may further comprise implementing mitigation operations in accordance with the determined cyber-physical health of the control system 101. Step 1630 may comprise implementing mitigation operations in accordance with the error metrics 175, CPSC metrics 575, cyber state metrics 553, physical state metrics 555, CyΔ metrics 1263, PhyΔ metrics 1265, cyber state error metrics 1472A-N, physical state error metrics 1474A-N, cyber trend error metrics 1473A-N, physical trend error metrics 1475A-N, cyber health metrics 282, and/or physical health metrics 284, as disclosed herein.

Figure 17:
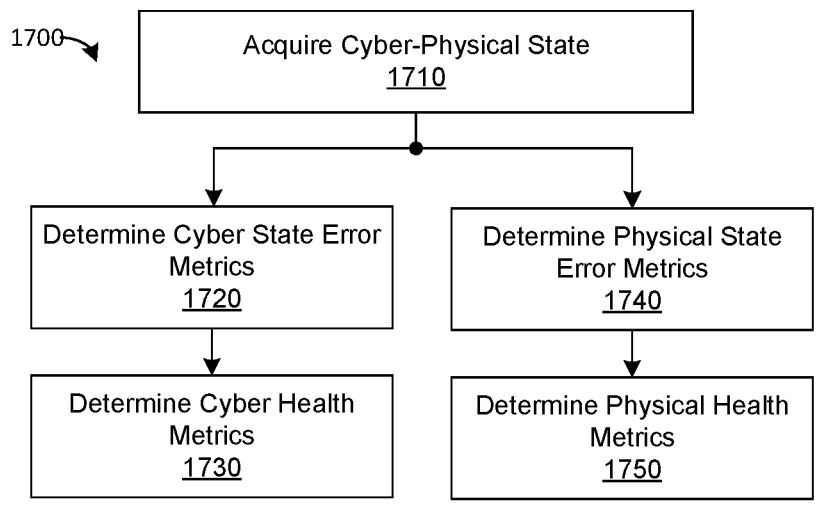

FIG. 17 is a flow diagram of another embodiment of a method 1700 for securing a cyber-physical system 100, as disclosed herein. Step 1710 may comprise acquiring the cyber-physical state of the system 100, as disclosed herein. Step 1710 may comprise acquiring a cyber state of the control system 101 and/or maintaining corresponding cyber state metadata 220. Step 1710 may further comprise acquiring a physical state of the control system 101 and/or maintaining corresponding physical state metadata 240. Step 1710 may comprise acquiring cyber-physical state data 1207 while communicating state keys 160 (and/or state key fragments 161) through the control system 101. Step 1710 may comprise acquiring cyber-physical state data 1207 from regions of the control system 101 covered by respective state keys 160. Step 1710 may further comprise acquiring RCPS datasets 1217 from regions of the control system 101 covered by respective CPKD fragments 163. Step 1710 may further comprise determining CPSC metrics 575 for the acquired cyber-physical state data 1207 and/or incorporating the acquired cyber-physical state data 1207 into cyber-physical state metadata 111, as disclosed herein. Step 1710 may further comprise acquiring and/or maintaining cyber-physical state metadata 111 in accordance with a classification schema 1416. Step 1710 may comprise acquiring cyber state metadata 220 corresponding to specified cyber classification features 1422 and/or acquiring physical state metadata 240 corresponding to specified physical classification factors 1442. The classification schema 1416 may comprise a subset of the cyber-physical state information capable of being acquired by the RS agent 110.

Step 1720 may comprise determining cyber state error metrics 1472 by, inter alia, comparing the acquired cyber state of the control system 101 to respective cyber state profiles 1412. Step 1720 may comprise determining a plurality of cyber state error metrics 1472A-N, each quantifying error between the acquired cyber state 1202 and a respective cyber state profile 1412A-N. The cyber state error metrics 1472A-N may comprise cyber state error metrics 1472A quantifying error between the acquired cyber state 1202 and one or more healthy cyber state profiles 1412A, cyber state error metrics 1472N quantifying error between the acquired cyber state 1202 and one or more unhealthy cyber state profiles 1412N, and/or the like, as disclosed herein.

Step 1730 may comprise determining cyber health metrics 282 for the control system 101 (and/or regions thereof). Step 1730 may comprise evaluating the cyber state error metrics 1472A-N determined at step 1720. Step 1730 may comprise determining cyber state error metrics 282 that are: inversely proportional to cyber state error metrics 1472A that quantify error between the acquired cyber state and healthy cyber state profiles 1412A and/or are proportional to cyber state error metrics 1472N that quantify error between the acquired cyber state and unhealthy cyber state profiles 1412N. Step 1730 may further comprise associating the cyber health metrics 282 with CPSC metrics 575, as disclosed herein. Step 1730 may further include implementing one or more mitigation operations in accordance with the determined cyber health metrics 282, as disclosed herein.

Step 1740 may comprise determining physical state error metrics 1474 by, inter alia, comparing the acquired physical state 1204 of the control system 101 to respective cyber state profiles 1412. Step 1720 may comprise determining a plurality of physical state error metrics 1474A-N, each quantifying error between the acquired physical state 1204 and a respective physical state profile 1412A-N. The physical state error metrics 1474A-N may comprise physical state error metrics 1474A quantifying error between the acquired physical state 1204 and one or more healthy physical state profiles 1414A, physical state error metrics 1474N quantifying error between the acquired physical state 1204 and one or more unhealthy physical state profiles 1414N, and/or the like, as disclosed herein.

Step 1750 may comprise determining physical health metrics 284 for the control system 101 (and/or regions thereof). Step 1750 may comprise evaluating the physical state error metrics 1474A-N determined at step 1740. Step 1750 may comprise determining physical state error metrics 284 that are: inversely proportional to physical state error metrics 1474 that quantify error between the acquired physical state 1204 and healthy physical state profiles 1414A and/or proportional to physical state error metrics 1474N that quantify error between the acquired physical state 1204 and unhealthy physical state profiles 1414N. Step 1750 may further comprise associating the physical health metrics 284 with CPSC metrics 575, as disclosed herein. Step 1750 may further include implementing one or more mitigation operations in response to the determined physical health metrics 284, as disclosed herein.

Figure 18:
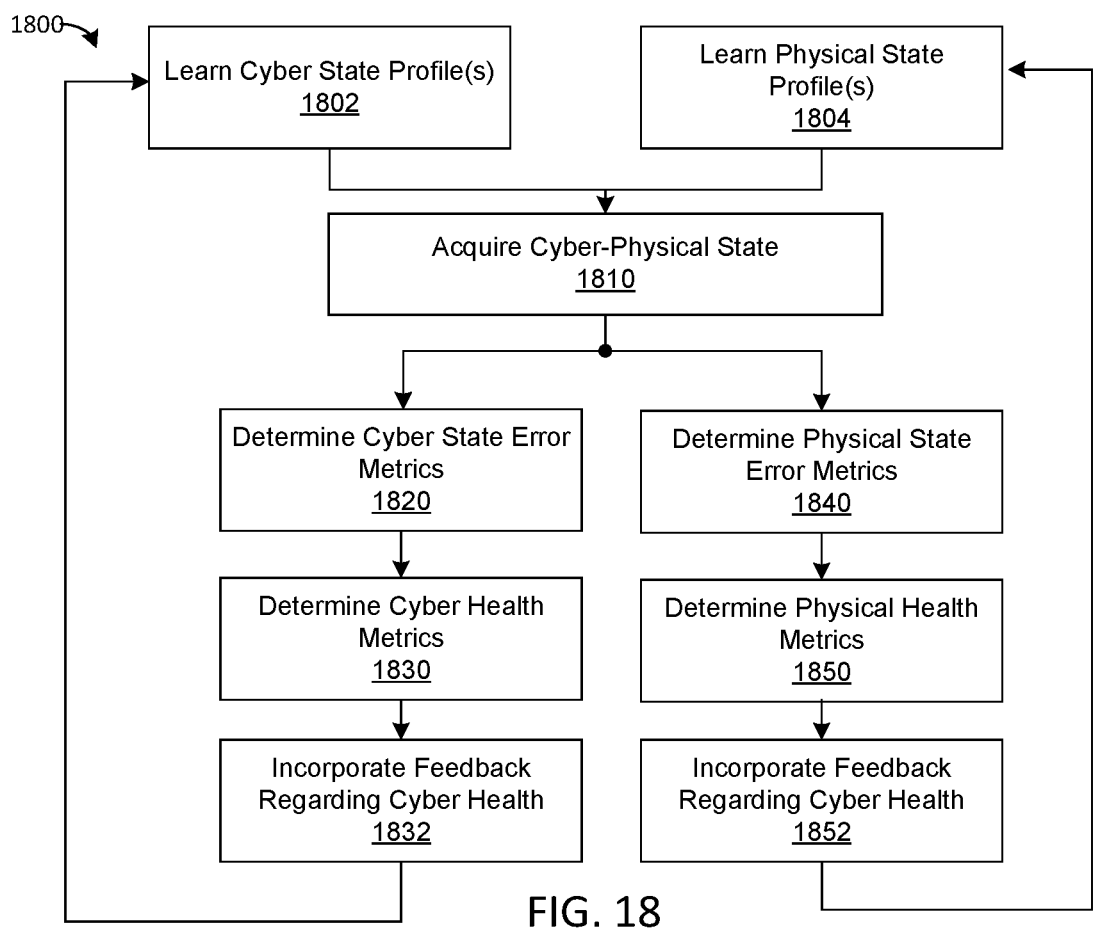

FIG. 18 is a flow diagram of another embodiment of a method 1800 for securing a cyber-physical system 100, as disclosed herein. Step 1802 may comprise learning one or more cyber state profiles 1412. Step 1802 may comprise learning one or more healthy cyber state profiles 1412A and/or unhealthy cyber state profiles 1412N, as disclosed herein. Step 1804 may comprise learning one or more physical state profiles 1414. Step 1804 may comprise learning one or more healthy physical state profiles 1414A and/or unhealthy physical state profiles 1414N, as disclosed herein.

Step 1810 may comprise acquiring the cyber and/or physical state 1202/1204 of the control system 101 (and/or regions thereof), as disclosed herein. Step 1820 may comprise determining cyber state error metrics 1472, and step 1830 may comprise determining corresponding cyber health metrics 282, as disclosed herein. Step 1832 may comprise receiving feedback regarding the cyber heath metrics 282. The feedback of step 1832 may comprise indications regarding the accuracy of the cyber health metrics 282 (e.g., whether heathy cyber health metrics 282 accurately indicated healthy cyber behavior, whether unhealthy cyber health metrics 282 accurately indicated unhealthy cyber behavior, and so on). Step 1832 may comprise incorporating the feedback into the cyber state profiles 1412, which may comprise adjusting one or more of the cyber state profiles 1412 in accordance with the feedback (e.g., adjusting cyber classification parameters 1422 and/or cyber classification parameters values 1428, and so on).

Step 1840 may comprise determining physical state error metrics 1474, and step 1850 may comprise determining corresponding physical health metrics 284, as disclosed herein. Step 1852 may comprise receiving feedback regarding the physical heath metrics 284. The feedback of step 1852 may comprise indications regarding the accuracy of the physical health metrics 284 (e.g., whether healthy physical health metrics 284 accurately indicated healthy physical behavior, whether unhealthy physical health metrics 284 accurately indicated unhealthy physical behavior, and so on). Step 1852 may comprise incorporating the feedback into the physical state profiles 1414, which may comprise adjusting one or more of the physical state profiles 1412 in accordance with the feedback (e.g., adjusting physical classification parameters 1442 and/or physical classification parameters values 1448, and so on).

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

Additionally, as will be appreciated by one of ordinary skill in the art, principles of the present disclosure may be reflected in a computer program product on a computer-readable storage medium having computer-readable program code means embodied in the storage medium. Any tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the claims.

We claim:

1. An apparatus for control system security, comprising:
   a processor coupled to a memory;
   a security agent adapted for operation on the processor and configured to:
      generate state keys pertaining to a control system, each state key comprising one or more of cyber key data corresponding to a cyber state of the control system and physical key data corresponding to a physical state of the control system, and
      communicate the state keys through control paths of the control system; and a security engine configured to:
      determine error metrics corresponding to communication of respective state keys through the control paths of the control system, and
      detect anomalous operation of the control system based, at least in part, on the determined error metrics.

2. The apparatus of claim 1, wherein each state key comprises cyber key data configured to characterize an aspect of a state of cyber communication within the control system and physical key data configured to characterize an aspect of a physical state of the control system.

3. The apparatus of claim 1, further comprising an acquisition engine configured to acquire cyber-physical state metadata from the control system, the cyber-physical state metadata pertaining to aspects of one or more of the cyber state of the control system and the physical state of the control system, wherein:
   the cyber state is configured to characterize aspects of electronic communication on a network of the control system, and
   the physical state is configured to characterize aspects of a physical state of the control system.

4. The apparatus of claim 3, wherein:
   the acquisition engine is further configured to determine confidence metrics for the acquired cyber-physical state metadata based, at least in part, on the error metrics corresponding to communication of the respective state keys through the control paths of the control system; and
   the confidence metrics are configured to quantify a confidence that the cyber-physical state metadata accurately captures aspects of one or more of the cyber state of the control system and the physical state of the control system.

5. The apparatus of claim 4, wherein the acquisition engine is further configured to estimate the cyber-physical state of the control system based, at least in part, on the cyber-physical state metadata acquired from the control system and the determined confidence metrics.

6. The apparatus of claim 5, wherein the security engine is further configured to detect the anomalous operation of the control system based, at least in part, on the determined cyber-physical state of the control system.

7. The apparatus of claim 5, wherein the security engine is further configured to detect the anomalous operation of the control system based, at least in part, on a comparison between the estimated cyber-physical state of the control system and a baseline cyber-physical state of the control system.

8. A method, comprising:
   generating state keys pertaining to a control system, each state key comprising one or more of cyber key data corresponding to a cyber state of the control system and physical key data corresponding to a physical state of the control system;
   communicating the state keys through control paths of the control system;
   determining error metrics corresponding to communication of respective state keys through the control paths of the control system; and
   detecting anomalous operation of the control system based, at least in part, on the determined error metrics.

9. The method of claim 8, wherein generating the state keys comprises:
   acquiring first physical key data configured to characterize an aspect of the physical state of the control system;
   acquiring first cyber key data configured to characterize an aspect of a state of cyber communication within the control system; and
   deriving a first state key from the first cyber key data and the first physical key data.

10. The method of claim 9, wherein communicating the state keys through the control paths of the control system further comprises communicating at least a portion of the first state key through a first control path, the first control path comprising a cyber-physical control loop configured to control a physical process of the control system.

11. The method of claim 10, wherein communicating the state keys through the control paths of the control system further comprises communicating at least a portion of the first state key through a physical control coupling of the control system.

12. The method of claim 10, wherein communicating the state keys through the control paths of the control system further comprises:
   parsing the first state key into a plurality of fragments; and
   transmitting the fragments of the first state key through respective control paths of the control system.

13. The method of claim 12, further comprising:
   receiving validation data from the respective control paths of the control system in response to transmitting the fragments of the first state key;
   generating a reconstruction of the first state key from the validation data; and
   comparing the first state key to the reconstruction of the first state key, wherein the error metric is based, at least in part, on the comparing.

14. The method of claim 9, wherein:
   acquiring the first physical key data comprises acquiring data configured to characterize an aspect of a state of a first physical component of the control system;
   acquiring the first cyber key data comprises acquiring data configured to characterize an aspect of a state of cyber communication at a first cyber component configured to communicatively couple the first physical component to an electronic communication network of the control system;
   communicating the state keys through the control paths of the control system comprises communicating least a portion of the first state key through a first group of components of the control system, the first group including the first physical component and the first cyber component;
   determining the error metrics corresponding to communication of the respective state keys comprises determining a first error metric corresponding to communication of the first state key through the first group of components of the control system; and
   the method further comprises:
   generating a second key for communication through a second group of components of the control system, the second group configured to include one or more components included in the first group of components and to exclude a designated component included in the first group of components,
   calculating a second error metric corresponding to communication of the second key through the second group of components of the control system, and
   attributing at least a portion of the first error metric to the designated component of the control system based, at least in part, on a comparison between the first error metric and the second error metric.

15. The method of claim 14, wherein:
   the first physical component comprises one or more of a sensor device, an acquisition device, an actuator device, a controller, and a first intelligent electronic device;
   the first cyber component comprises one or more of a communication component, a cyber communication component, cyber communication node, a network component, a network router, a network switch, a network hub, a network concentrator, a network security device, a firewall, a network filter, and a second intelligent electronic device;
   the designated component comprises one or more of the first physical component and the first cyber component; and
   the method further comprises detecting an anomaly pertaining to the designated component based, at least in part, on the portion of the first error metric attributed to the designated component.

16. A non-transitory storage medium comprising instructions configured for execution by a processor of a computing device, the instructions configured to cause the computing device to implement operations, comprising:
   generating state keys pertaining to a control system, each state key comprising one or more of cyber key data corresponding to a cyber state of the control system and physical key data corresponding to a physical state of the control system;
   communicating the state keys through control paths of the control system;
   determining error metrics corresponding to communication of respective state keys through the control paths of the control system; and
   detecting anomalous operation of the control system based, at least in part, on the determined error metrics.

17. The non-transitory storage medium of claim 16, wherein generating the state keys pertaining to the control system comprises:
   acquiring cyber-physical state metadata from the control system, the cyber-physical state metadata pertaining to aspects of one or more of the physical state of the control system and the cyber state of the control system, the physical state configured to characterize aspects of a physical state of the control system and the cyber state configured to characterize aspects of electronic communication on a network of the control system; and
   deriving cyber-physical key data for respective state keys from the cyber-physical state metadata.

18. The non-transitory storage medium of claim 17, the operations further comprising:
   determining confidence metrics for the acquired cyber-physical state metadata based, at least in part, on the error metrics corresponding to communication of the respective state keys through the control paths of the control system, the confidence metrics configured to quantify a confidence that the cyber-physical state metadata accurately captures aspects of one or more of the physical state of the control system and the cyber state of the control system; and
   estimating a cyber-physical state of the control system based, at least in part, on one or more of the cyber-physical state metadata and the confidence metrics.

19. The non-transitory storage medium of claim 18, wherein detecting anomalous operation of the control system comprises comparing the estimated cyber-physical state of the control system to a baseline cyber-physical state of the control system.

20. The non-transitory storage medium of claim 18, the operations further comprising detecting anomalous operation of the control system in response to one or more of:
   determining that the confidence metrics fail to satisfy one or more confidence thresholds; and
   applying a state evaluation rule to the estimated cyber-physical state of the control system.

21. The non-transitory storage medium of claim 18, further comprising:
    determining a trajectory of the cyber-physical state of the control system based, at least in part, on the cyber-physical state metadata; and
    detecting the anomaly pertaining to the control system based, at least in part, on the determined trajectory of the cyber-physical state of the control system.

\* \* \* \* \*